(12) United States Patent
Finn et al.

(10) Patent No.: US 12,533,396 B2
(45) Date of Patent: Jan. 27, 2026

(54) COMPOSITIONS AND METHODS FOR TREATING LATE-ONSET POMPE DISEASE

(71) Applicant: Genzyme Corporation, Cambridge, MA (US)

(72) Inventors: Patrick Finn, Franklin, MA (US); Alaa Hamed, Chestnut Hill, MA (US); Kristina An Haack, Shanghai (CN); Catherine Wilson, Durham, NC (US)

(73) Assignee: Genzyme Corporation, Cambridge, MA (US)

( * ) Notice: Subject to any disclaimer, the term of this patent is extended or adjusted under 35 U.S.C. 154(b) by 506 days.

(21) Appl. No.: 18/009,234

(22) PCT Filed: Jun. 11, 2021

(86) PCT No.: PCT/US2021/037111
§ 371 (c)(1),
(2) Date: Dec. 8, 2022

(87) PCT Pub. No.: WO2021/257409
PCT Pub. Date: Dec. 23, 2021

(65) Prior Publication Data
US 2023/0256062 A1   Aug. 17, 2023

Related U.S. Application Data

(60) Provisional application No. 63/157,490, filed on Mar. 5, 2021, provisional application No. 63/147,629, filed on Feb. 9, 2021, provisional application No. 63/076,037, filed on Sep. 9, 2020, provisional application No. 63/038,857, filed on Jun. 14, 2020.

(51) Int. Cl.
| | |
|---|---|
| *A61K 38/47* | (2006.01) |
| *A61K 47/26* | (2006.01) |
| *A61K 47/54* | (2017.01) |
| *A61P 21/00* | (2006.01) |

(52) U.S. Cl.
CPC ............... *A61K 38/47* (2013.01); *A61K 47/26* (2013.01); *A61K 47/549* (2017.08); *A61P 21/00* (2018.01); *C12Y 302/0102* (2013.01)

(58) Field of Classification Search
None
See application file for complete search history.

(56) References Cited

U.S. PATENT DOCUMENTS

| | | | |
|---|---|---|---|
| 7,723,296 B2 | 5/2010 | Zhu | |
| 8,835,614 B2 | 9/2014 | Avila et al. | |
| 8,883,979 B2 | 11/2014 | Ma et al. | |
| 11,278,601 B2 | 3/2022 | Do et al. | |
| 2006/0228348 A1 | 10/2006 | Stefano | |
| 2017/0335301 A1 | 11/2017 | Do et al. | |

FOREIGN PATENT DOCUMENTS

| | | |
|---|---|---|
| EA | 201891507 A1 | 12/2018 |
| JP | 2012512313 A | 5/2012 |
| TW | 201821103 A | 6/2018 |
| WO | 2008089403 A2 | 7/2008 |
| WO | 2008089403 A3 | 11/2008 |
| WO | 2010075010 A2 | 7/2010 |
| WO | 2010075010 A3 | 1/2011 |
| WO | 2017173060 A1 | 10/2017 |
| WO | 2021159092 A1 | 8/2021 |

OTHER PUBLICATIONS

Sanofi-aventis Canada Inc., "NEXVIAZYME™ avalglucosidase alfa for injection"; Product monograph; sanofi-aventis Canada Inc.: Quebec, Canada; pp. 1-27 (Year: 2021).*
Genzyme Corporation, "NEXVIAZYME NGPT"; Product label; Genzyme Corporation: Cambridge, MA, pp. 1-24 (Year: 2023).*
Angelini, C. et al. (Jun. 2012). "New Motor Outcome Function Measures In Evaluation Of Late-Onset Pompe Disease Before And After Enzyme Replacement Therapy," Muscle & Nerve 45(6):831-834.
Dimachkie, M. et al. (2019). "NEO1 and NEO-EXT Studies: Long-Term Safety and Exploratory Efficacy of Repeat Avalglucosidase Alfa Dosing for 5.5 Years in Late-Onset Pompe Disease Patients," Molecular Genetics and Metabolism 129(2):S16-S167, Abstract No. 98, 1 page.
Figueiredo, M. (Feb. 13, 2020). "Sanofi 's Next-generation ERT Halts Progression of Pompe Disease in Patients, Interim Trial Data Show," Pompe Disease, 8 pages.
Figueroa-Bonaparte, S. et al. (Oct. 6, 2016). "Muscle MRI Findings In Childhood/Adult Onset Pompe Disease Correlate With Muscle Function," PLoS ONE 11(10):e0163493, 19 pages.
Hoefsloot, L. H. et al. (1990). "Characterization Of The Human Lysosomal A-Glucosidase Gene," Biochemical Journal 272(2):493-497.
Jones, A.U.S. (1993). "Analysis of Polypeptides and Proteins," Adv. Drug Delivery Rev. 10:29-90.
Martiniuk, F. et al. (Dec. 1986). "Isolation Of A cDNA For Human Acid Alpha-Glucosidase And Detection Of Genetic Heterogeneity For mRNA In Three Alpha-Glucosidase-Deficient Patients," Proceedings Of The National Academy Of Sciences 83(24):9641-9644.
Moreland, R. J. et al. (Feb. 25, 2005). "Lysosomal Acid A-Glucosidase Consists Of Four Different Peptides Processed From A Single Chain Precursor," Journal Of Biological Chemistry 280(8):6780-6791.
NCBI (Mar. 12, 2023). "*Homo sapiens* Alpha Glucosidase (GAA), Transcript Variant 1, mRNA," GenBank Accession No. NM 000152, 6 pages.
Nunez-Peralta, C. et al. (Mar. 16, 2021). "Magnetization Transfer Ratio In Lower Limbs Of Late Onset Pompe Patients Correlates With Intramuscular Fat Fraction And Muscle Function Tests," Frontiers In Neurology 12(634766):9 pages.
Pearlman, R. et al. (1991). "Analysis of Protein Drugs," in Peptide and Protein Drug Delivery, Vincent H. L. Lee Ed., Marcel Dekker, Inc., New York, N.Y., Pubs., pp. 247-301.

(Continued)

*Primary Examiner* — Michelle F. Paguio Frising
(74) *Attorney, Agent, or Firm* — MORRISON & FOERSTER LLP

(57) ABSTRACT

The present application provides methods of treating late-onset Pompe disease (LOPD) using a pharmaceutical composition comprising an oligosaccharide-acid α-glucosidase (GAA) conjugate, such as avalglucosidase alfa.

11 Claims, 50 Drawing Sheets

(56) References Cited

OTHER PUBLICATIONS

Pena, L.D.M. et al. (Mar. 2019). "Safety Tolerability, Pharmacokinetics, Pharmacodynamics, and Exploratory Efficacy of the Novel Enzyme Replacement Therapy Avalglucosidase alfa (neoGAA) in Treatment-Naïve and Alglucosidase Alfa-Treated Patients with Late-Onset Pompe Disease: A Phase 1, Open-Label, Multicenter, Multinational, Ascend," Neuromuscular Disorders 29(3):167-186.

Perrot, S. et al. (2019). "Patients' Global Impression Of Change In The Management Of Peripheral Neuropathic Pain: Clinical Relevance And Correlations In Daily Practice," European Journal of Pain 23(6):1117-1128.

Quanjer, P. H. et al. (Jun. 27, 2012). "Multi-Ethnic Reference Values For Spirometry For The 3—95-Yr Age Range: The Global Lung Function 2012 Equations," Eur Respir J 40(6):1324-1343.

Raben, N. et al. (1995). "Genetic Defects In Patients With Glycogenosis Type II (Acid Maltase Deficiency)," Muscle & Nerve: Official Journal Of The American Association Of Electrodiagnostic Medicine 18(S14):S70-S74.

Sanofi (Jun. 16, 2020). "Sanofi's Investigational Enzyme Replacement Therapy Shows Clinically Meaningful Improvement in Critical Manifestations of Late-Onset Pompe Disease," http://www.globenewswire.com/news-release/2020/06/16/2048709/0/en/Sanofi-s-investigational-enzyme-replacement-therapy-shows-clinically-meaningful-imporvement-in-critical-manifestations-of-late-onset-Pompe-disease.html, last visited Nov. 18, 2021, 8 pages.

Schoser, B. et al. (Jan. 2018). "P-370 NEO1/NEO-EXT: Long-Term Safety of Repeat Avalglucosidase Alfa Dosing in Late-Onset Pompe Disease Patients for 3.5 years," J Inherit Metab Dis 41(Suppl 1):S37-S219, Abstract No. P-370, 1 page.

Straub, V. et al. (Jan. 2017). "792—COMET Methodology: Comparison of the Efficacy and Safety of the Enzyme Replacement Therapies, NeoGAA and Alglucosidase Alfa, in Treatment-Naïve Patients With Late-Onset Pompe Disease," J. of Inborn Errors of Metabolism and Screening 5:355-356, located at http://journals.sagepub.com/doi/full-xml/10.1177/2326409817722292, last visited Nov. 18, 2021, 3 pages.

Van Capelle, C. I. et al. (2012, e-pub. Sep. 13, 2011). "The Quick Motor Function Test: A New Tool To Rate Clinical Severity And Motor Function In Pompe Patients," Journal Of Inherited Metabolic Disease 35:317-323.

Van Der Beek, N.A.M.E. et al. (2013). "The Rasch-Built Pompe-Specific Activity (R-Pact) Scale," Neuromuscular Disorders 23(3):256-264.

Wang, L. et al. (Jan. 7, 2003). "Addition Of The Keto Functional Group To The Genetic Code Of *Escherichia coli*," Proceedings Of The National Academy Of Sciences 100(1):56-61.

Winkel, L. P. et al. (2004, e-pub. Feb. 18, 2004). "Enzyme Replacement Therapy In Late-Onset Pompe's Disease: A Three-Year Follow-Up," Annals Of Neurology 55(4):495-502.

Zhou, Q. et al. (Mar. 18, 2011). "Strategies For Neoglycan Conjugation To Human Acid A-Glucosidase," Bioconjugate Chemistry 22(4):741-751.

Zhou, Q. et al. (Oct. 28, 2013). "Glycan Structure Determinants For Cation-Independent Mannose 6-Phosphate Receptor Binding And Cellular Uptake Of A Recombinant Protein," Bioconjugate Chemistry 24(12):2025-2035.

Zhu, Y. et al. (Jun. 2009, e-pub. Mar. 10, 2009). "Glycoengineered Acid α-Glucosidase with Improved Efficacy at Correcting the Metabolic Aberrations and Motor Function Deficits in a Mouse Model of Pompe Disease," Molecular Therapy 17(6):954-963.

Angelini, C. et al. (2012, e-pub. Nov. 12, 2011). "Observational Clinical Study In Juvenile-Adult Glycogenosis Type 2 Patients Undergoing Enzyme Replacement Therapy For Up To 4 Years," Journal Of Neurology 259(5):952-958.

International Preliminary Report on Patentability issued on Dec. 13, 2022 for PCT Application No. PCT/US2021/037111 filed on Jun. 11, 2021, eight pages.

International Search Report and Written Opinion of the International Searching Authority mailed on Oct. 18, 2021, for PCT Application No. PCT/US2021/037111, filed on Jun. 11, 2021, 16 pages.

Musumeci, O. et al. (2019). "Diagnostic Tools In Late Onset Pompe Disease (LOPD)," Annals of Translational Medicine 7(13):286, 8 pages.

Sharma, R. et al. (2018). "Enzyme Replacement Therapy For Late-Onset Pompe Disease," Cochrane Database of Systematic Reviews 4(CD012993), 11 pages.

Zhu, Y. et al. (Aug. 2005). "Carbohydrate-Remodeled Acid A-Glucosidase With Higher Affinity For The Cation-Independent Mannose 6-Phosphate Receptor Demonstrates Improved Delivery To Muscles Of Pompe Mice," Biochem. J. 389:619-628.

\* cited by examiner

| Inclusion Criteria | Exclusion Criteria |
|---|---|
| • ≥ 3 years of age | • Pompe-specific cardiac hypertrophy |
| • Diagnosis of Pompe disease* | • Requires invasive ventilation (non-invasive ventilation is allowed) |
| • Naïve to treatment with alglucosidase alfa or any investigational therapy for Pompe disease | • Wheelchair dependency |
| • Able to successfully perform repeated FVC measurements of >30% & <85% predicted (upright) | • Clinically significant organic disease, apart from Pompe disease-related symptoms |
| • Able to ambulate 40 meters (≈130 feet) without stopping and without an ambulation assistance device | • Prior or current use of immune tolerance induction therapy |
| | • Pregnant or breastfeeding |
| | • Female patient of childbearing potential not protected by highly effective contraceptive method of birth control and/or is unwilling or unable to be tested for pregnancy |

*Confirmed by GAA enzyme deficiency from any tissue source and/or 2 confirmed GAA gene variants.

FIG. 1

| Parameter | Avalglucosidase alfa N=51 | Alglucosidase alfa N=49 | Total N=100 |
|---|---|---|---|
| Age (years) | | | |
|   Mean (SD) | 46.0(14.5) | 50.3(13.7) | 48.1(14.2) |
|   Median (Min, Max) | 47.7 (16, 78) | 48.9 (20, 78) | 48.5 (16, 78) |
| Gender, n (%) | | | |
|   Male | 27 (52.9) | 25 (51.0) | 52 (52.0) |
|   Females | 24 (47.1) | 24 (49.0) | 48 (48.0) |
| Race, n (%) | | | |
|   Asian | 3 (5.9) | 0 | 3 (3.0) |
|   Black/African American | 1 (2.0) | 2 (4.1) | 3 (3.0) |
|   White | 47 (92.2) | 47 (95.9) | 94 (94.0) |
| Ethnicity, n (%) | | | |
|   Hispanic or Latino | 3 (5.9) | 12 (24.5) | 15 (15.0) |
|   Not Hispanic or Latino | 44 (86.3) | 32 (65.3) | 76 (76.0) |
|   Not Reported | 4 (7.8) | 5 (10.2) | 9 (9.0) |
| Regions, n (%) | | | |
|   Europe | 31 (60.8) | 21 (42.9) | 52 (52.0) |
|   North America | 14 (27.5) | 20 (40.8) | 34 (34.0) |
|   Latin America | 2 (3.9) | 7 (14.3) | 9 (9.0) |
|   Asia-Pacific | 4 (7.8) | 1 (2.0) | 5 (5.0) |

*FIG. 4*

| Parameter | Avalglucosidase alfa N=51 | Alglucosidase alfa N=49 | Total N=100 |
|---|---|---|---|
| FVC% Predicted, Upright | | | |
|   Mean (SD) | 62.5(14.4) | 61.6(12.4) | 62.1(13.4) |
|   Median (Min, Max) | 65.5 (32, 85) | 60.8 (39, 85) | 63.2 (32, 85) |
| 6MWT (Distance Walked), m | | | |
|   Mean (SD) | 399.3(110.9) | 378.1(116.2) | 388.9(113.5) |
|   Median (Min, Max) | 415.7(118, 630) | 387.0 (138, 592) | 403.5 (118, 630) |
| 6MWT % Predicted | | | |
|   Mean (SD) | 57.3(15.0) | 55.3 (16.6) | 56.3(15.8) |
|   Median (Min, Max) | 61.0(19, 86) | 56.6(23,102) | 59.1(19,102) |
| MIP % Predicted, Upright* | | | |
|   Mean (SD) | 59.9(47.1) | 60.6 (41.0) | 60.3 (44.0) |
|   Median (Min, Max) | 47.6 (9, 263) | 51.1(18,234) | 48.1(9,263) |
| MEP % Predicted, Upright* | | | |
|   Mean (SD) | 65.77(38.97) | 74.83 (35.22) | 70.25 (37.25) |
|   Median (Min, Max) | 54.21 (28.7,232.5) | 68.00(19.7, 201.1) | 59.56 (19.7, 232.5) |

*FIG. 5*

| Parameter | Avalglucosidase alfa N=51 | Alglucosidase alfa N=49 | Total N=100 |
|---|---|---|---|
| HHD (lower extremity), composite | | | |
| Mean (SD) | n=50 1330.45 (625.44) | n=46 1466.16 (604.91) | n=96 1395.48 (616.23) |
| Median (Min, Max) | 1193.50 (323.0,3522.0) | 1427.50(329.0,3218.0) | 1290.00 (323.0,3522.0) |
| QMFT | | | |
| Mean (SD) | n=51 41.29(10.15) | n=46 42.30(10.58) | n=97 41.77(10.32) |
| Median (Min, Max) | 41.00 (17.0, 63.0) | 43.50 (19.0, 63.0) | 41.00 (17.0, 63.0) |
| SF-12 (PCS) | | | |
| Mean (SD) | n=50 35.95 (7.82) | n=48 36.76 (9.40) | n=98 36.35 (8.60) |
| Median (Min, Max) | 35.01 (17.8,55.9) | 36.04(16.3,57.3) | 35.40(16.3,57.3) |
| SF-12 (MCS) | | | |
| Mean (SD) | n=50 48.31 (10.11) | n=48 50.58 (8.69) | n=98 49.42 (9.46) |
| Median (Min, Max) | 47.53 (24.2,70.8) | 52.24 (30.4, 65.0) | 50.21 (24.2, 70.8) |

FIG. 6

| | Avalglucosidase alfa N=51 | Alglucosidase alfa N=49 |
|---|---|---|
| Mean (SD) duration of study drug exposure, months | 11.56(0.14) | 10.69 (2.69) |
| Mean number (SD) of infusions | 24.8(0.5) | 22.8(5.8) |
| Mean patient year | 0.96 | 0.91 |

FIG. 7

|  | Avalglucosidase alfa N=51 | Alglucosidase alfa N=49 |
|---|---|---|
| TEAEs | 44 (86.3) | 45 (91.8) |
| TEAEs Potentially Related to Treatment | 23 (45.0) | 24 (49.0) |
| Serious TEAEs | 8 (15.7) | 12 (24.5) |
| Serious TEAEs Potentially Related to Treatment | 1 (2.0) | 3 (6.1) |
| Severe TEAEs | 6 (11.8) | 7 (14.3) |
| TEAEs Leading to Study Withdrawal | 0 | 4 (8.2) |
| TEAEs Leading to Death | 0 | 1 (2.0) |
| IARs (protocol-defined)* | 13 (25.5) | 16 (32.7) |

FIG. 17

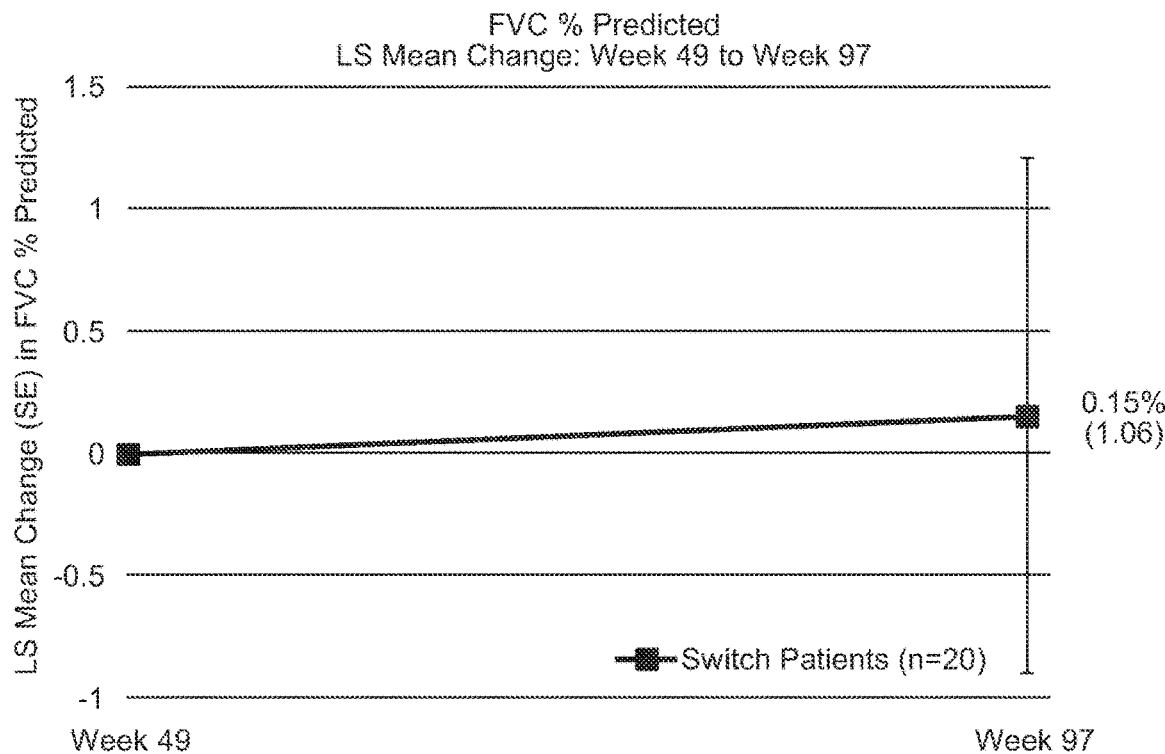
FIG. 18A   95% CI: -1.95, 2.25; p=0.8854
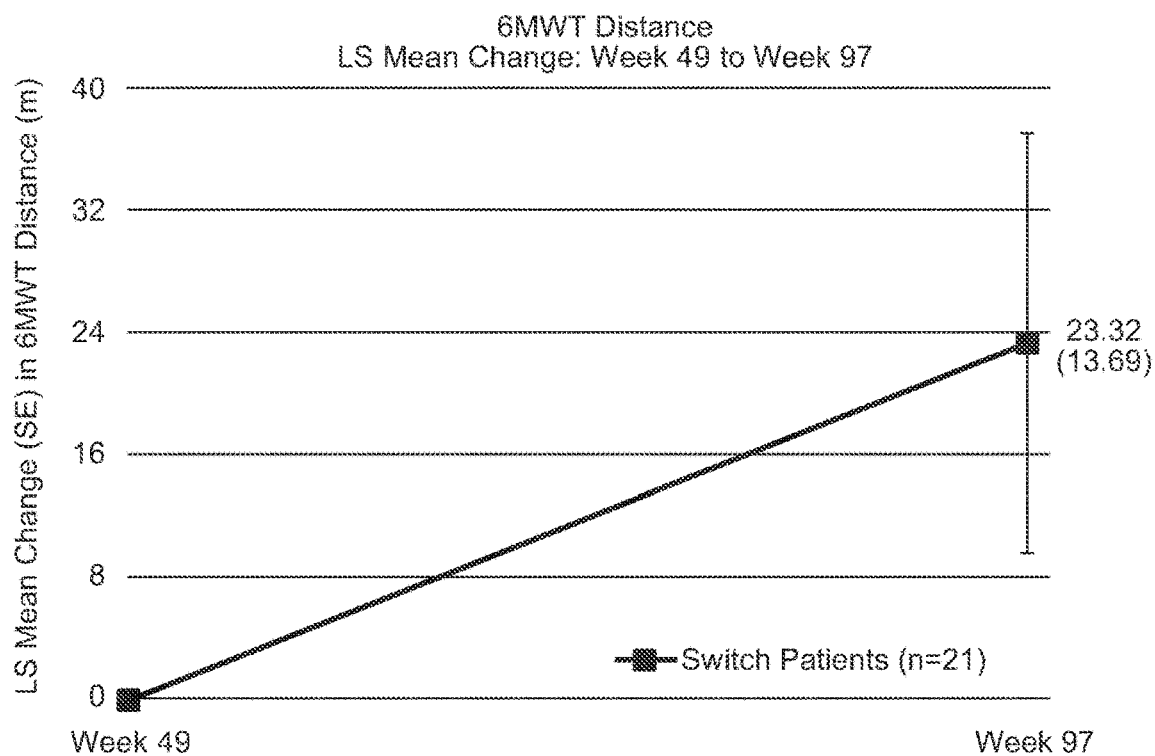
FIG. 18B   95% CI: -3.87, 50.51; p=0.0918

| Parameter, n (%) | avalglucosidase alfa (N=51) | alglucosidase alfa (N=49) | Total (N=100) |
|---|---|---|---|
| Number of randomized but not treated patients[a] | 0 | 0 | 0 |
| Number of randomized and treated patients[a] | 51 (100) | 49 (100) | 100 (100) |
| Treatment in PAP prematurely discontinued | 0 | 5 (10.2) | 5 (5.0) |
| Reason for PAP premature discontinuation | | | |
| Adverse Event | 0 | 4 (8.2) | 4 (4.0) |
| Other | 0 | 1 (2.0) | 1 (1.0) |
| Treatment in PAP completed | 51 (100) | 44 (89.8) | 95 (95.0) |
| Did not enter into ETP | 0 | 0 | 0 |
| Entered into ETP | 51 (100) | 44 (89.8) | 95 (95.0) |
| Treatment in ETP ongoing | 48 (94.1) | 43 (87.8) | 91 (91.0) |
| Treatment in ETP completed | 0 | 0 | 0 |
| Treatment in ETP prematurely discontinued | 3 (5.9) | 1 (2.0) | 4 (4.0) |
| Reason for ETP premature discontinuation | | | |
| Adverse Event | 2 (3.9) | 1 (2.0) | 3 (3.0) |
| Other | 1 (2.0) | 0 | 1 (1.0) |
| Efficacy populations | | | |
| mITT[b] | 51 (100) | 49 (100) | 100 (100) |
| Per Protocol | 46 (90.2) | 39 (79.6) | 85 (85.0) |
| Safety population[c] | 51 (100) | 49 (100) | 100 (100) |
| Number of randomized and treated patients at Week 97 | 24 (47.1) | 22 (44.9) | 46 (46.0) |

Percentages are calculated using the number of randomized patients as the denominator.
a. For any subject randomized more than once, only the data associated with the first randomization will be used in any analysis population.
b. MITT population includes randomized patients who receive at least 1 infusion (partial or total).
c. Safety population includes patients who received at least 1 infusion (partial or total).
d. Per Protocol population includes mITT population with no major protocol deviation expected to interfere with assessments of the primary endpoint.

FIG. 19

| Parameter | Statistics | avalglucosidase alfa (N=51) | alglucosidase alfa (N=49) | Total (N=100) |
|---|---|---|---|---|
| Age (years) | Number<br>Mean (SD)<br>Median<br>Min; Max | 51<br>46.0(14.5)<br>47.7<br>16; 78 | 49<br>50.3(13.7)<br>48.9<br>20; 78 | 100<br>48.1 (14.2)<br>48.5<br>16; 78 |
| Age (years) - categorized | Number<br><18<br>≥18 and <45<br>≥45 | 51<br>1 (2.0)<br>23 (45.1)<br>27 (52.9) | 49<br>0<br>19(38.8)<br>30(61.2) | 100<br>1 (1.0)<br>42 (42.0)<br>57(57.0) |
| Gender, n(%) | Number<br>Male<br>Female | 51<br>27 (52.9)<br>24 (47.1) | 49<br>25(51.0)<br>24 (49.0) | 100<br>52 (52.0)<br>48 (48.0) |
| Race, n(%) | Number<br>American Indian or Alaska Native<br>Asian<br>Black or African American<br>Native Hawaiian or Other Pacific Islander<br>White<br>Not Reported | 51<br>0<br>3(5.9)<br>1 (2.0)<br>0<br>47 (92.2)<br>0 | 49<br>0<br>0<br>2(4.1)<br>0<br>47 (95.9)<br>0 | 100<br>0<br>3(3.0)<br>3(3.0)<br>0<br>94 (94.0)<br>0 |
| Ethnicity, n(%) | Number<br>Hispanic or Latino<br>Not Hispanic or Latino<br>Unknown<br>Not reported | 51<br>3(5.9)<br>44 (86.3)<br>0<br>4(7.8) | 49<br>12(24.5)<br>32 (65.3)<br>0<br>5(10.2) | 100<br>15(15.0)<br>76 (76.0)<br>0<br>9 (9.0) |
| Regions, n(%) | Number<br>Europe<br>North America<br>Latin America<br>Asia-Pacific | 51<br>31(60.8)<br>14 (27.5)<br>2(3.9)<br>4(7.8) | 49<br>21 (42.9)<br>20(40.8)<br>7(14.3)<br>1(2.0) | 100<br>52 (52.0)<br>34 (34.0)<br>9 (9.0)<br>5(5.0) |
| Weight (kg) | Number<br>Mean (SD)<br>Median<br>Min; Max | 51<br>77.8(22.1)<br>75.9<br>38; 129 | 49<br>79.3(18.2)<br>78.6<br>46; 139 | 100<br>78.5 (20.2)<br>76.4<br>38; 139 |
| Height (cm) | Number<br>Mean (SD)<br>Median | 51<br>170.9(9.7)<br>169.8 | 49<br>172.0(8.9)<br>171.5 | 100<br>171.5 (9.3)<br>170.3 |

*FIG. 20A*

| Parameter | Statistics | avalglucosidase alfa (N=51) | alglucosidase alfa (N=49) | Total (N=100) |
|---|---|---|---|---|
| | Min; Max | 145;193 | 158; 191 | 145; 193 |
| BMI (kg/m2) | Number | 51 | 49 | 100 |
| | Mean (SD) | 26.39 (6.79) | 26.69(5.42) | 26.54 (6.13) |
| | Median | 25.40 | 27.40 | 26.45 |
| | Min; Max | 14.0; 42.7 | 16.9; 44.6 | 14.0; 44.6 |
| Alcohol Habit n(%) | Number | 51 | 49 | 100 |
| | Never | 21 (41.2) | 17(34.7) | 38 (38.0) |
| | Occasional | 18 (35.3) | 20 (40.8) | 38 (38.0) |
| | At least monthly | 4(7.8) | 3(6.1) | 7(7.0) |
| | At least weekly | 5(9.8) | 5(10.2) | 10 (10.0) |
| | At least daily | 3(5.9) | 4(8.2) | 7(7.0) |
| Randomization Strata, n(%) | Number | 51 | 49 | 100 |
| | Age<18 | 1 (2.0) | 0 | 1 (1.0) |
| | Age≥18, Japan | 1 (2.0) | 0 | 1 (1.0) |
| | Age≥18, male and FVC<55%, ex-Japan | 10 (19.6) | 11(22.4) | 21 (21.0) |
| | Age≥18, female and FVC<55%, ex-Japan | 5(9.8) | 5(10.2) | 10 (10.0) |
| | Age≥18, male and FVC≥55%, ex-Japan | 15 (29.4) | 14(28.6) | 29(29.0) |
| | Age≥18, female and FVC≥55%, ex-Japan | 19 (37.3) | 19 (38.8) | 38 (38.0) |

*FIG. 20B*

| Parameter | Statistics | avalglucosidase alfa (N=51) | alglucosidase alfa (N=49) | Total (N=100) |
|---|---|---|---|---|
| Cardiovascular History | | | | |
| Congestive Heart Failure [n(%)] | Number | 51 | 49 | 100 |
| | Yes | 1(2.0) | 2(4.1) | 3(3.0) |
| | No | 50 (98.0) | 47(95.9) | 97(97.0) |
| NYHA Heart Failure Classification [n(%)] | Number | 51 | 49 | 100 |
| | Class I | 0 | 2(4.1) | 2(2.0) |
| | Class II | 1(2.0) | 0 | 1 (1.0) |
| | Class III | 0 | 0 | 0 |
| | Class IV | 0 | 0 | 0 |
| | No | 50 (98.0) | 47(95.9) | 97(97.0) |
| Evidence of Cardiac Involvement [n(%)] | Number | 51 | 49 | 100 |
| | Yes | 0 | 4(8.2) | 4(4.0) |
| | No | 51 (100) | 45 (91.8) | 96 (96.0) |

*FIG. 21A*

| Parameter | Statistics | avalglucosidase alfa (N=51) | alglucosidase alfa (N=49) | Total (N=100) |
|---|---|---|---|---|
| Specify Cardiac Involvement [n(%)] | Number<br>Arrhythmia<br>Cardiomegaly<br>Other | 0<br>0<br>0<br>0 | 3<br>2(66.7)<br>0<br>1 (33.3) | 3<br>2(66.7)<br>0<br>1 (33.3) |
| Ear/Nose/Throat History<br>Enlarged Tongue [n(%)] | Number<br>Yes<br>No | 51<br>2(3.9)<br>49(96.1) | 49<br>4(8.2)<br>45 (91.8) | 100<br>6 (6.0)<br>94(94.0) |
| Hearing Loss [n(%>] | Number<br>Yes<br>No | 51<br>6(11.8)<br>45 (88.2) | 48<br>4(8.3)<br>44(91.7) | 99<br>10(10.1)<br>89 (89.9) |
| Gastrointestinal History<br>Hepatomegaly [n(%)] | Number<br>Yes<br>No | 51<br>0<br>51 (100) | 49<br>2(4.1)<br>47 (95.9) | 100<br>2 (2.0)<br>98 (98.0) |
| Gastroesophageal Reflux [n(%)] | Number<br>Yes<br>No | 51<br>6(11.8)<br>45 (88.2) | 49<br>6(12.2)<br>43 (87.8) | 100<br>12(12.0)<br>88 (88.0) |
| Respiratory History<br>Tracheostomy [n(%)] | Number<br>Yes<br>No | 51<br>1(2.0)<br>50 (98.0) | 49<br>0<br>49 (100) | 100<br>1 (1.0)<br>99 (99.0) |
| Pneumonia [n(%)] | Number<br>Yes<br>No | 51<br>10(19.6)<br>41 (80.4) | 49<br>9 (18.4)<br>40(81.6) | 100<br>19(19.0)<br>81 (81.0) |
| Number of pneumonia episodes in the past year [n(%)] | Number<br><5<br>5-10<br>>10 | 10<br>10(100)<br>0<br>0 | 9<br>9 (100)<br>0<br>0 | 19<br>19(100)<br>0<br>0 |
| Sleep Disturbances [n(%)] | Number<br>Yes<br>No | 51<br>12(23.5)<br>39 (76.5) | 49<br>18 (36.7)<br>31 (63.3) | 100<br>30(30.0)<br>70(70.0) |
| If Sleep Disturbance, Sleep Study Ever Performed? | Number<br>Yes<br>No | 12<br>9 (75.0)<br>3 (25.0) | 18<br>10(55.6)<br>8 (44.4) | 30<br>19(63.3)<br>11(36.7) |
| Sleep Apnea [n(%)] | Number<br>Yes<br>No | 51<br>10(19.6)<br>41 (80.4) | 49<br>13 (26.5)<br>36 (73.5) | 100<br>23 (23.0)<br>77 (77.0) |
| Use of Non-invasive Respiratory Support [n(%)] | Number<br>Yes<br>No | 51<br>13(25.5)<br>38 (74.5) | 49<br>11(22.4)<br>38 (77.6) | 100<br>24(24.0)<br>76(76.0) |

*FIG. 21B*

| Parameter | Statistics | avalglucosidase alfa (N=51) | alglucosidase alfa (N=49) | Total (N=100) |
|---|---|---|---|---|
| Musculoskeletal History Muscle Weakness in Upper Extremities [n(%)] | Number Yes No | 51 31 (60.8) 20 (39.2) | 49 24 (49.0) 25 (51.0) | 100 55 (55.0) 45 (45.0) |
| Muscle Weakness in Lower Extremities [n(%)] | Number Yes No | 51 48 (94.1) 3 (5.9) | 49 42 (85.7) 7 (14.3) | 100 90 (90.0) 10 (10.0) |
| Scoliosis [n(%)] | Number Yes No | 50 13 (26.0) 37 (74.0) | 49 9 (18.4) 40 (81.6) | 99 22 (22.2) 77 (77.8) |
| Surgical Intervention for Scoliosis [n(%)] | Number Yes No | 17 0 17 (100) | 15 0 15 (100) | 32 0 32 (100) |
| Currently Using Orthopedic Devices for Scoliosis [n(%)] | Number Yes No | 17 0 17 (100) | 13 1 (7-7) 12 (92.3) | 30 1 (3.3) 29 (96.7) |
| Joint Contractures [n(%)] | Number Yes No | 51 0 51 (100) | 49 2 (4.1) 47 (95.9) | 100 2 (2.0) 98 (98.0) |
| Surgical Repair Needed for Joint Contractures [n(%)] | Number Yes No | 4 0 4 (100) | 7 0 7 (100) | 11 0 11 (100) |
| Currently Using Orthopedic Devices for Joint Contractures [n(%)] | Number Yes No | 4 0 4 (100) | 8 0 8 (100) | 12 0 12 (100) |
| Currently Ambulatory [n(%)] | Number Yes No Ever ambulatory? | 50 48 (96.0) 2 (4.0) 0 | 49 48 (98.0) 1 (2.0) 0 | 99 96 (97.0) 3 (3.0) 0 |
| Assisted Walking Device and Wheelchair Use [n(%)] | Number None Cane Walker Wheelchair Other | 51 41 (80.4) 7 (13.7) 2 (3.9) 0 4 (7.8) | 49 38 (77.6) 9 (18.4) 3 (6.1) 1 (2.0) 4 (8.2) | 100 79 (79.0) 16 (16.0) 5 (5.0) 1 (10) 8 (8.0) |
| Pompe disease history Age at Pompe Disease Diagnosis (years) | Number | 51 | 49 | 100 |

FIG. 21C

| Parameter | Statistics | avalglucosidase alfa (N=51) | alglucosidase alfa (N=49) | Total (N=100) |
|---|---|---|---|---|
| | Mean (SD) | 44.73 (14.74) | 48.16 (14.64) | 46.41 (14.72) |
| | Median | 47.05 | 47.34 | 47.14 |
| | Min; Max | 10.8; 77.7 | 17.1; 76.7 | 10.8; 77.7 |
| Age at First Symptom of Pompe Disease (years) | Number | 50 | 49 | 99 |
| | Mean (SD) | 32.94 (16.58) | 37.73 (15.74) | 35.31 (16.27) |
| | Median | 32.35 | 39.42 | 38.89 |
| | Min; Max | 3.8; 66.3 | 6.1; 73.2 | 3.8; 73.2 |
| Time from Pompe Disease Diagnosis to First Infusion of Study Drug (months) | Number | 51 | 49 | 100 |
| | Mean (SD) | 15.60 (32.06) | 26.52 (59.86) | 20.95 (47.82) |
| | Median | 6.08 | 7.85 | 6.92 |
| | Min; Max | 0.5; 155.2 | 0.3; 328.4 | 0.3; 328.4 |
| Time from First Symptom of Pompe Disease to First Infusion of Study Drug (months) | Number | 50 | 49 | 99 |
| | Mean (SD) | 160.36 (131.71) | 151.78 (120.90) | 156.11 (125.91) |
| | Median | 137.91 | 124.91 | 128.92 |
| | Min; Max | 10.5; 698.9 | 5.0; 458.4 | 5.0; 698.9 |
| Family History of Pompe Disease [n(%)] | Number | 51 | 49 | 100 |
| | Yes | 13 (25.5) | 15 (30.6) | 28 (28.0) |
| | No | 38 (74.5) | 34 (69.4) | 72 (72.0) |
| Relationship to Subject [n(%)] | Number | 13 | 15 | 28 |
| | Sibling | 12 (92.3) | 15 (100) | 27 (96.4) |
| | Mother | 0 | 0 | 0 |
| | Father | 0 | 0 | 0 |
| | Cousin | 1 (7.7) | 0 | 1 (3.6) |
| | Children | 0 | 0 | 0 |

*FIG. 21D*

| Parameter | Statistics | avalglucosidase alfa (N=51) | alglucosidase alfa (N=49) | Total (N=100) |
|---|---|---|---|---|
| Predicted FVC (%), upright | Number<br>Mean (SD)<br>Median<br>Min; Max | 51<br>62.5 (14.4)<br>65.5<br>32; 85 | 49<br>61.6 (12.4)<br>60.8<br>39; 85 | 100<br>62.1 (13.4)<br>63.2<br>32; 85 |
| Distance Walked from 6MWT (m) | Number<br>Mean (SD)<br>Median<br>Min; Max | 51<br>399.3 (110.9)<br>415.7<br>118; 630 | 49<br>378.1 (116.2)<br>387.0<br>138; 592 | 100<br>388.9 (113.5)<br>403.5<br>118; 630 |
| 6MWT (% predicted) | Number | 51 | 49 | 100 |

*FIG. 22A*

| Parameter | Statistics | avalglucosidase alfa (N=51) | alglucosidase alfa (N=49) | Total (N=100) |
|---|---|---|---|---|
| | Mean (SD) | 57.3 (15.0) | 55.3 (16.6) | 56.3 (15.8) |
| | Median | 61.0 | 56.6 | 59.1 |
| | Min; Max | 19; 86 | 23; 102 | 19; 102 |
| % Predicted MIP (%)[a], upright | Number | 50 | 49 | 99 |
| | Mean (SD) | 59.9 (47.1) | 60.6 (41.0) | 60.3 (44.0) |
| | Median | 47.6 | 51.1 | 48.1 |
| | Min; Max | 9; 263 | 18; 234 | 9; 263 |
| % Predicted MEP (%)[a], upright | Number | 50 | 49 | 99 |
| | Mean (SD) | 65.77 (38.97) | 74.83 (35.22) | 70.25 (37.25) |
| | Median | 54.21 | 68.00 | 59.56 |
| | Min; Max | 28.7; 232.5 | 19.7; 201.1 | 19.7; 232.5 |
| HHD (Lower extremity) composite score | Number | 50 | 46 | 96 |
| | Mean (SD) | 1330.45 (625.44) | 1466.16 (604.91) | 1395.48 (616.23) |
| | Median | 1193.50 | 1427.50 | 1290.00 |
| | Min; Max | 323.0; 3522.0 | 329.0; 3218.0 | 323.0; 3522.0 |
| % Predicted HHD (Lower extremity) composite score | Number | 50 | 46 | 96 |
| | Mean (SD) | 40.05 (21.76) | 45.02 (23.27) | 42.43 (22.52) |
| | Median | 30.51 | 40.60 | 38.61 |
| | Min; Max | 7.1; 112.7 | 9.6; 119.4 | 7.1; 119.4 |
| HHD (upper extremity) composite score | Number | 46 | 47 | 93 |
| | Mean (SD) | 1535.95 (673.60) | 1608.56 (633.95) | 1572.65 (651.32) |
| | Median | 1380.00 | 1501.00 | 1439.00 |
| | Min; Max | 350.5; 3869.0 | 347.0; 3102.0 | 347.0; 3869.0 |
| % Predicted HHD (upper extremity) composite score | Number | 46 | 47 | 93 |
| | Mean (SD) | 131.57 (59.26) | 142.08 (65.59) | 136.88 (62.42) |
| | Median | 104.92 | 131.10 | 123.00 |
| | Min; Max | 42.1; 269.8 | 34.7; 265.6 | 34.7; 269.8 |
| QMFT | Number | 51 | 46 | 97 |
| | Mean (SD) | 41.29 (10.15) | 42.30 (10.58) | 41.77 (10.32) |
| | Median | 41.00 | 43.50 | 41.00 |
| | Min; Max | 17.0; 63.0 | 19.0; 63.0 | 17.0; 63.0 |
| SF-12 (PCS) | Number | 50 | 48 | 98 |
| | Mean (SD) | 35.95 (7.82) | 36.76 (9.40) | 36.35 (8.60) |
| | Median | 35.01 | 36.04 | 35.40 |
| | Min; Max | 17.8; 55.9 | 16.3; 57.3 | 16.3; 57.3 |
| SF-12 (MCS) | Number | 50 | 48 | 98 |
| | Mean (SD) | 48.31 (10.11) | 50.58 (8.69) | 49.42 (9.46) |
| | Median | 47.53 | 52.24 | 50.21 |

*FIG. 22B*

| Parameter | Statistics | avalglucosidase alfa (N=51) | alglucosidase alfa (N=49) | Total (N=100) |
|---|---|---|---|---|
| | Min; Max | 24.2; 70.8 | 30.4; 65.0 | 24.2; 70.8 |
| GMFCS [n(%)] | Number | 51 | 49 | 100 |
| | Level I | 10(19.6) | 14 (28.6) | 24 (24.0) |
| | Level II | 36 (70.6) | 27(55.1) | 63 (63.0) |
| | Level III | 5(9.8) | 8(16.3) | 13 (13.0) |
| | Level IV | 0 | 0 | 0 |
| | Level V | 0 | 0 | 0 |
| Walking Device on 6MWT [n(%)] | Number | 51 | 49 | 100 |
| | Straight cane | 4(7.8) | 3 (6.1) | 7(7.0) |
| | Wide-based cane | 1(2.0) | 1(2.0) | 2(2.0) |
| | One crutch | 0 | 2(4.1) | 2(2.0) |
| | Two crutches | 0 | 0 | 0 |
| | Standard walker | 0 | 0 | 0 |
| | Rolling walker | 0 | 3 (6.1) | 3(3.0) |
| | Orthotics | 0 | 0 | 0 |
| | Other | 2(3.9) | 1(2.0) | 3(3.0) |
| | None | 44 (86.3) | 39 (79.6) | 83 (83.0) |

Note baseline value is defined as the last non-missing value prior to first treatment.
a Because the reference values will be available only for patients of age 7 years or older, the % predicted MIP and MEP will not be derived for patients aged <7.

FIG. 22C

| Parameter | Statistics | avalglucosidase alfa (N=51) | alglucosidase alfa (N=49) |
|---|---|---|---|
| Duration of Study Drug Exposure (months) | Number<br>Mean (SD)<br>Median<br>Min;Max | 51<br>11.56 (0.14)<br>11.53<br>11.4;12.4 | 49<br>10.69 (2.69)<br>11.50<br>0.5;11.8 |
| Duration of Study Drug Exposure, n (%) | Number<br><=3 months<br><3-<=6 months<br><6-<=9 months<br><9-<=12 months<br>>12 months | 51<br>0<br>0<br>0<br>50 (98.0)<br>1 (2.0) | 49<br>3 (6.1)<br>1 (2.0)<br>1 (2.0)<br>44 (89.8)<br>0 |
| Total Number of Infusions Per Patient | Number<br>Mean (SD)<br>Median<br>Min; Max | 51<br>24.8 (0.5)<br>25.0<br>23;25 | 49<br>22.8 (5.8)<br>25.0<br>1;25 |

*FIG. 23A*

| Parameter | Statistics | avalglucosidase alfa (N=51) | alglucosidase alfa (N=49) |
|---|---|---|---|
| Patient Year | Number | 51 | 49 |
| | Mean (SD) | 0.96 (0.01) | 0.91 (0.19) |
| | Median | 0.96 | 0.96 |
| | Min;Max | 1.0;1.0 | 0.0;1.0 |

Duration of exposure: for those entered in ETP: 1st infusion date in ETP - 1st infusion date in PAP;
For those who did not enter in ETP: last infusion date in PAP + 14 - 1st infusion date in PAP.
Avalglucosidase alfa group includes Patients who were in mITT population and received at least one infusion of avalglucosidase alfa during PAP.
Alglucosidase alfa group includes Patients who were in mITT population and only received alglucosidase alfa during PAP.
Patient year is calculated from the first infusion date to the date of last follow-up visit.

FIG. 23B

| | Statistics[a] | avalglucosidase alfa (N=51) | alglucosidase alfa (N=49) | Difference |
|---|---|---|---|---|
| Week 13 | Estimate | 3.05 | 0.65 | 2.40 |
| | SE | 0.78 | 0.81 | 1.13 |
| | 95% CI | 1.50,4.59 | -0.95,2.26 | 0.16,4.63 |
| | p-value for non-inferiority[b] | | | 0.0026 |
| | p-value for superiority | | | 0.0363 |
| Week 25 | Estimate | 3.21 | 0.57 | 2.64 |
| | SE | 0.80 | 0.84 | 1.17 |
| | 95% CI | 1.62,4.80 | -1.10,2.24 | 0.32,4.96 |
| | p-value for non-inferiority[b] | | | 0.0018 |
| | p-value for superiority | | | 0.0259 |
| Week 37 | Estimate | 2.21 | 0.55 | 1.66 |
| | SE | 1.00 | 1.05 | 1.45 |
| | 95% CI | 0.23,4.19 | -1.53,2.64 | -1.22,4.54 |
| | p-value for non-inferiority[b] | | | 0.0603 |
| | p-value for superiority | | | 0.2556 |
| Week 49 | Estimate | 2.89 | 0.46 | 2.43 |
| | SE | 0.88 | 0.93 | 1.29 |
| | 95% CI | 1.13,4.65 | -1.39,2.31 | -0.13,4.99 |
| | p-value for non-inferiority[b] | | | 0.0074 |
| | p-value for superiority | | | 0.0626 | a. Based on MMRM model, the model includes baseline FVC (% predicted, as continuous), sex, age (in years at baseline), treatment group, visit, interaction term between treatment group and visit as fixed effects.
b. Non-inferiority margin is -1.1%

FIG. 24

| Statistics | Difference Between Week 97 and Week 49 |
|---|---|
| Number of subjects with value at Week 49 and Week 97 | 20 |
| Estimate | 0.15 |
| SE | 1.06 |
| 95% CI | -1.95,2.25 |
| p-value | 0.8854 |

The analysis will be based on % predicted FVC data from Week 49 and subsequent visits in ETP and the MMRM includes visit as a fixed effect and subject as a random effect.

FIG. 25

| Analysis Visit | Statistics | avalglucosidase alfa (N=51) | alglucosidase alfa (N=49) | Difference |
|---|---|---|---|---|
| Week 13 | | | | |
| 6MWT total distance change from baseline | Estimate<br>SE<br>95% CI<br>p-value for superiority | 18.02<br>8.79<br>0.57,35.47 | 15.11<br>9.16<br>-3.09,33.30 | 2.91<br>12.75<br>-22.41,28.24<br>0.8198 |
| 6MWT % predicted change from baseline | Estimate<br>SE<br>95% CI<br>p-value for superiority | 2.84<br>1.35<br>0.16,5.52 | 1.96<br>1.41<br>-0.84,4.76 | 0.88<br>1.96<br>-3.02,4.77<br>0.6559 |
| Week 25 | | | | |
| 6MWT total distance change from baseline | Estimate<br>SE<br>95% CI<br>p-value for superiority | 27.26<br>9.98<br>7.43,47.09 | 9.58<br>10.41<br>-11.10,30.27 | 17.67<br>14.48<br>-11.08,46.42<br>0.2253 |
| 6MWT % predicted change from baseline | Estimate<br>SE<br>95% CI<br>p-value for superiority | 4.23<br>1.54<br>1.17,7.28 | 1.13<br>1.61<br>-2.06,4.32 | 3.09<br>2.23<br>-1.34,7.53<br>0.1697 |
| Week 37 | | | | |
| 6MWT total distance change from baseline | Estimate<br>SE<br>95% CI<br>p-value superiority | 28.43<br>9.06<br>10.44,46.42 | 15.49<br>9.48<br>-3.34,34.31 | 12.94<br>13.17<br>-13.20,39.09<br>0.3282 |

FIG. 26A

| Analysis Visit | Statistics | avalglucosidase alfa (N=51) | alglucosidase alfa (N=49) | Difference |
|---|---|---|---|---|
| 6MWT % predicted change from baseline | Estimate<br>SE<br>95% CI<br>p-value for superiority | 4.44<br>1.40<br>1.66,7.23 | 2.14<br>1.47<br>-0.77,5.05 | 2.30<br>2.04<br>-1.74,6.35<br>0.2612 |
| Week 49 | | | | |
| 6MWT total distance change from baseline | Estimate<br>SE<br>95% CI<br>p-value for superiority | 32.21<br>9.93<br>12.47,51.94 | 2.19<br>10.40<br>-18.48,22.86 | 30.01<br>14.43<br>1.33,58.69<br>0.0405 |
| 6MWT % predicted change from baseline | Estimate<br>SE<br>95% CI<br>p-value for superiority | 5.02<br>1.54<br>1.95,8.09 | 0.31<br>1.62<br>-2.90,3.52 | 4.71<br>2.24<br>0.25,9.17<br>0.0386 |

6MWT: 6-minute walk test, MMRM: mixed model repeated measure.
The MMRM model for 6MWT distance adjusts for 6MWT distance at baseline,
baseline % predicted FVC and baseline 6MWT (distance walked in meter), age (in years, at baseline),
gender, treatment group, visit, and treatment-by-visit interaction as fixed effects.
The MMRM model for 6MWT % predicted adjusts for 6MWT % predicted at baseline,
baseline % predicted FVC and baseline 6MWT (% predicted), age (in years, at baseline), gender,
treatment group, visit, and treatment-by-visit interaction as fixed effects.

*FIG. 26B*

| Statistics | Difference Between Week 97 and Week 49 |
|---|---|
| Number of subjects with value at Week 49 and Week 97 | 21 |
| Estimate | 23.32 |
| SE | 13.69 |
| 95% CI | -3.87,50.51 |
| p-value | 0.0918 |

The analysis will be based on 6MWT data from Week 49 and subsequent visits in ETP and the MMRM includes visit as a fixed effect and subject as a random effect.

*FIG. 27*

| Analysis Visit | Statistics | avalglucosidase alfa (N=51) | alglucosidase alfa (N=49) | Difference |
|---|---|---|---|---|
| Week 13 | | | | |
| MIP % predicted, upright change from baseline | Estimate<br>SE<br>95% CI<br>p-value | -1.18<br>3.70<br>-8.55,6.19 | -0.39<br>3.84<br>-8.03,7.25 | -0.78<br>5.35<br>-11.43,9.86<br>0.8837 |
| MEP % predicted, upright change from baseline | Estimate<br>SE<br>95% CI<br>p-value | 1.19<br>3.65<br>-6.07,8.44 | 5.28<br>3.78<br>-2.23,12.79 | -4.09<br>5.29<br>-14.60,6.41<br>0.4412 |
| Week 25 | | | | |
| MIP % predicted, upright change from baseline | Estimate<br>SE<br>95% CI<br>p-value | 2.29<br>3.35<br>-4.37,8.95 | -3.15<br>3.52<br>-10.16,3.85 | 5.44<br>4.88<br>-4.26,15.14<br>0.2676 |
| MEP % predicted, upright change from baseline | Estimate<br>SE<br>95% CI<br>p-value | 4.03<br>3.12<br>-2.18,10.24 | 2.90<br>3.28<br>-3.64,9.43 | 1.14<br>4.56<br>-7.94,10.22<br>0.8034 |
| Week 37 | | | | |
| MIP % predicted, upright change from baseline | Estimate<br>SE<br>95% CI<br>p-value | -0.85<br>3.73<br>-8.28,6.57 | 3.31<br>3.92<br>-11.12,4.50 | 2.45<br>5.43<br>-8.35,13.25<br>0.6527 |
| MEP % predicted, upright change from baseline | Estimate<br>SE<br>95% CI<br>p-value | 4.19<br>3.79<br>-3.34,11.72 | 4.02<br>3.97<br>-3.88,11.92 | 0.17<br>5.52<br>-10.80,11.14<br>0.9758 |
| Week 49 | | | | |
| MIP % predicted, upright change from baseline | Estimate<br>SE<br>95% CI<br>p-value | -0.29<br>3.84<br>-7.94,7.36 | -2.87<br>4.04<br>-10.92,5.17 | 2.58<br>5.59<br>-8.54,13.71<br>0.6451 |
| MEP % predicted, upright change from baseline | Estimate<br>SE<br>95% CI<br>p-value | 2.39<br>4.00<br>-5.59,10.36 | 5.00<br>4.20<br>-3.36,13.36 | -2.61<br>5.83<br>-14.22,9.00<br>0.6557 |

MMRM: mixed model repeated measure
The MMRM model for MIP % predicted adjusts for MIP % predicted at baseline, age (in years, at baseline), gender, treatment group, visit, and treatment-by-visit interaction as fixed effects.
The MMRM model for MEP % predicted adjusts for MEP % predicted at baseline, age (in years, at baseline), gender, treatment group, visit, and treatment-by-visit interaction as fixed effects.

*FIG. 28*

| Analysis Visit | Statistics | avalglucosidase alfa (N=51) | alglucosidase alfa (N=49) | Difference |
|---|---|---|---|---|
| Week 13 | | | | |
| Composite score change from baseline | Estimate | 146.80 | 87.29 | 59.51 |
| | SE | 38.26 | 40.18 | 55.80 |
| | 95% CI | 70.75,222.86 | 7.41,167.17 | -51.40,170.42 |
| | p-value | | | 0.2891 |
| Summary score, % predicted change from baseline | Estimate | 3.88 | 2.39 | 1.49 |
| | SE | 1.16 | 1.20 | 1.68 |
| | 95% CI | 1.58,6.18 | 0.01,4.77 | -1.84,4.82 |
| | p-value | | | 0.3767 |
| Week 25 | | | | |
| Composite score change from baseline | Estimate | 214.54 | 99.16 | 115.38 |
| | SE | 41.42 | 43.64 | 60.43 |
| | 95% CI | 132.22,296.87 | 12.44,185.89 | -4.71,235.48 |
| | p-value | | | 0.0595 |
| Summary score, % predicted change from baseline | Estimate | 5.21 | 3.13 | 2.08 |
| | SE | 1.26 | 1.32 | 1.83 |
| | 95% CI | 2.70,7.72 | 0.50,5.75 | -1.56,5.73 |
| | p-value | | | 0.2590 |
| Week 37 | | | | |
| Composite score change from baseline | Estimate | 229.41 | 158.83 | 70.57 |
| | SE | 40.53 | 42.49 | 59.01 |
| | 95% CI | 148.84,309.98 | 74.37,243.29 | -46.71,187.86 |
| | p-value | | | 0.2350 |
| Summary score, % predicted change from baseline | Estimate | 5.61 | 4.80 | 0.81 |
| | SE | 1.23 | 1.29 | 1.79 |
| | 95% CI | 3.16,8.07 | 2.24,7.37 | -2.76,4.37 |
| | p-value | | | 0.6536 |
| Week 49 | | | | |
| Composite score change from baseline | Estimate | 260.69 | 153.72 | 106.97 |
| | SE | 46.07 | 48.54 | 67.17 |
| | 95% CI | 169.11,352.27 | 57.22,250.22 | -26.56,240.50 |
| | p-value | | | 0.1150 |
| Summary score, % predicted change from baseline | Estimate | 6.97 | 4.78 | 2.18 |
| | SE | 1.34 | 1.41 | 1.96 |
| | 95% CI | 4.30,9.63 | 1.98,7.59 | -1.71,6.08 |
| | p-value | | | 0.2681 |

MMRM: mixed model repeated measure; HHD: hand-held dynamometry;
Muscle strengths are collected in Newton.
The MMRM model for HHD lower extremity muscle strength composite score adjusts for summary HHD lower extremity score at baseline, baseline % predicted FVC, age (in years, at baseline), gender, treatment group, visit, and treatment-by-visit interaction as fixed effects.
The MMRM model for HHD summary score % predicted adjusts for summary score % predicted at baseline, baseline % predicted FVC, age (in years, at baseline), gender, treatment group, visit, baseline % predicted HHD score-by-visit interaction, and treatment-by-visit interaction as fixed effects.

*FIG. 29*

| Analysis Visit | Statistics | avalglucosidase alfa (N=51) | alglucosidase alfa (N=49) | Difference |
|---|---|---|---|---|
| Week 13 | | | | |
| QMFT total score change from baseline | Estimate | 2.00 | 1.09 | 0.90 |
| | SE | 0.55 | 0.59 | 0.81 |
| | 95% CI | 0.91,3.09 | -0.08,2.27 | -0.70,2.51 |
| | p-value | | | 0.2673 |
| Week 25 | | | | |
| QMFT total score change from baseline | Estimate | 3.27 | 1.95 | 1.32 |
| | SE | 0.55 | 0.59 | 0.81 |
| | 95% CI | 2.18,4.35 | 0.77,3.12 | -0.29,2.92 |
| | p-value | | | 0.1062 |
| Week 37 | | | | |
| QMFT total score change from baseline | Estimate | 3.79 | 1.66 | 2.13 |
| | SE | 0.60 | 0.65 | 0.89 |
| | 95% CI | 2.60,4.99 | 0.38,2.95 | 0.37,3.89 |
| | p-value | | | 0.0183 |
| Week 49 | | | | |
| QMFT total score change from baseline | Estimate | 3.98 | 1.89 | 2.08 |
| | SE | 0.63 | 0.69 | 0.94 |
| | 95% CI | 2.72,5.23 | 0.52,3.26 | 0.22,3.95 |
| | p-value | | | 0.0288 |

QMFT: quick motor function test, MMRM: mixed model repeated measure
The MMRM models adjust for total QMFT score at baseline, baseline % predicted FVC, age (in years, at baseline), gender, treatment group, visit, and treatment-by-visit interaction as fixed effects.

FIG. 30

| Analysis Visit | Statistics | avalglucosidase alfa (N=50) | alglucosidase alfa (N=49) | Difference |
|---|---|---|---|---|
| Week 25 | | | | |
| SF-12 PCS score change from baseline | Estimate | 1.03 | 2.25 | -1.21 |
| | SE | 0.76 | 0.78 | 1.09 |
| | 95% CI | -0.48, 2.54 | 0.69, 3.80 | -3.39, 0.96 |
| | p-value | | | 0.2700 |
| SF-12 MCS score change from baseline | Estimate | 0.99 | 1.22 | -0.22 |
| | SE | 1.08 | 1.11 | 1.56 |
| | 95% CI | -1.15, 3.14 | -0.99, 3.42 | -3.32, 2.87 |
| | p-value | | | 0.8864 |

FIG. 31A

| Analysis Visit | Statistics | avalglucosidase alfa (N=50) | alglucosidase alfa (N=49) | Difference |
|---|---|---|---|---|
| Week 25 | | | | |
| SF-12 PCS score change from baseline | Estimate | 2.93 | 2.03 | 0.90 |
| | SE | 0.81 | 0.85 | 1.18 |
| | 95% CI | 1.32,4.54 | 0.34,3.72 | -1.44,3.24 |
| | p-value | | | 0.4479 |
| SF-12 MCS score change from baseline | Estimate | 1.98 | 1.29 | 0.69 |
| | SE | 1.02 | 1.07 | 1.48 |
| | 95% CI | -0.04,4.00 | -0.83,3.41 | -2.25,3.63 |
| | p-value | | | 0.6428 |
| Week 37 | | | | |
| SF-12 PCS score change from baseline | Estimate | 2.36 | 2.84 | -0.48 |
| | SE | 0.80 | 0.85 | 1.17 |
| | 95% CI | 0.77,3.95 | 1.15,4.52 | -2.80,1.84 |
| | p-value | | | 0.6816 |
| SF-12 MCS score change from baseline | Estimate | 2.72 | -0.41 | 3.13 |
| | SE | 1.02 | 1.08 | 1.49 |
| | 95% CI | 0.69,4.74 | -2.56,1.73 | 0.17,6.09 |
| | p-value | | | 0.0388 |
| Week 49 | | | | |
| SF-12 PCS score change from baseline | Estimate | 2.37 | 1.60 | 0.77 |
| | SE | 0.99 | 1.07 | 1.46 |
| | 95% CI | 0.40,4.34 | -0.52,3.72 | -2.13,3.67 |
| | p-value | | | 0.5996 |
| SF-12 MCS score change from baseline | Estimate | 2.88 | 0.76 | 2.12 |
| | SE | 1.22 | 1.32 | 1.80 |
| | 95% CI | 0.47,5.30 | -1.86,3.39 | -1.46,5.69 |
| | p-value | | | 0.2427 |

SF-12:12-item short form health survey, PCS: physical component summary, MCS: mental component summary, MMRM: mixed model repeated measure
The MMRM models adjust for baseline score (PCS or MCS), baseline % predicted FVC, age (in years, at baseline), gender, treatment group, visit, and treatment-by-visit interaction as fixed effects.

FIG. 31B

| Parameter, n (%) | avalglucosidase alfa (N=51) | alglucosidase alfa (N=49) |
|---|---|---|
| TEAEs | 45 (88.2) | 45 (91.8) |
| TEAEs potentially related to Study Treatment | 24 (47.1) | 24 (49.0) |

FIG. 32A

| Parameter, n (%) | avalglucosidase alfa (N=51) | alglucosidase alfa (N=49) |
|---|---|---|
| Serious TEAEs | 8 (15.7) | 12 (24.5) |
| Serious TEAEs potentially related to Study Treatment | 1 (2.0) | 3 (6.1) |
| Severe TEAEs | 6 (11.8) | 7 (14.3) |
| TEAEs leading to permanent treatment discontinuation | 0 | 4 (8.2) |
| TEAEs leading to death | 0 | 1 (2.0) |
| Protocol-defined IARs | 14 (27.5) | 16 (32.7) |
| Algorithm-defined IARs | 15 (29.4) | 20 (40.8) |

TEAE: treatment-emergent adverse event; IAR: infusion associated reaction
n (%) = number and percentage of patients/subjects with at least one TEAE in each category.
Include adverse events that developed, worsen or became serious on or after the 1st infusion of study drug in PAP and (1) up to 28 days after last infusion in PAP for patients who did not enter ETP or (2) up to 28 days after last infusion in PAP or date and time just prior to 1st infusion in ETP, whichever occur earlier, for those who entered ETP.
Protocol defined IAR: IARs defined as AESIs that occurred during either infusion or observation period following infusion, related or possibly related to IMP. At the discretion of Investigator, AEs occurring after completion of post infusion observation period assessed as related could also be considered IARs.
Algorithm defined IAR: any IMP-related TEAE that occurred from start of infusion plus 24 hours window or any TEAE meeting the following criterion: if AE start date is non-missing but time component is missing, compare AE Start date with infusion start date (date component only) and infusion end date (date component only). If AE Start date is between infusion start date and infusion end date plus 1 day, consider such AE as Algorithm-defined IAR if AE is related to study drug (missing relatedness is assumed related).
Protocol rules for IARs reporting: In instances where a patient experiences an IAR, allergic, or anaphylactic reaction, either during infusion or post-observation period, each of the individual signs and/or symptoms comprising the reaction were to be captured as individual AE terms.

FIG. 32B

| Parameter | Avalglucosidase alfa N=51 | Alglucosidase alfa N=49 | Total N=100 |
|---|---|---|---|
| Urinary Hex4 (mmol/mol) Mean (SD) Median (Min, Max) | n=51 12.71 (10.10) 8.55 (3.0, 48.0) | n=49 8.74 (5.04) 7.30 (2.0, 25.3) | - - |
| ALT (IU/L) Mean (SD) Median (Min, Max) | n=50 81.30(56.51) 66.50 (24.0, 319.0) | n=49 60.76 (30.28) 58.0 (12.0, 186.0) | - - |
| AST (IU/L) Mean (SD) Median (Min, Max) | n=50 79.64 (55.58) 59.0 (27.0, 285.0) | n=49 57.73 (25.49) 54.0(16.0,141.0) | - - |
| Creatine Kinase (IU/L) Mean (SD) Median (Min, Max) | n=50 739.9 (577.62) 583.0(158.0, 3128.0) | n=48 566.35 (431.46) 471.0 (66.0, 2545.0) | - - |
| Creatine Kinase MB (µg/L) Mean (SD) Median (Min, Max) | n=49 15.64(10.49) 12.9 (2.4, 42.7) | n=48 16.69 (12.98) 13.65 (1.1, 55.1) | - - |

*FIG. 34*

|  | Avalglucosidase alfa N=51 | Alglucosidase alfa N=49 |
|---|---|---|
| ADA Status, n (%) | | |
| Always negative | 2 (3.9) | 2 (4.2) |
| Ever positive but negative at baseline | 47 (92.2) | 44 (91.7) |
| Positive at baseline | 2 (3.9) | 2 (4.2) |
| Treatment-emergent ADA, n (%[a]) | 49 (96.1) | 46 (95.8) |
| Treatment-induced ADA, n (%[b]) | 47 (95.9) | 44 (95.7) |
| Transient ADA | 1 (2.0) | 1 (2.2) |
| Persistent ADA | 43 (87.8) | 39 (84.8) |
| Tolerized ADA | 3 (6.1) | 4 (7.7) |
| Treatment-boosted ADA, n (%[c]) | 2 (100) | 2 (100) |
| ADA peak titer, n (%) | | |
| 100-800 | 17 (33.3) | 8 (16.7) |
| 1600-6400 | 20 (39.2) | 20 (41.7) |
| ≥12,800 | 10 (19.6) | 16 (33.3) |
| NAb response type based on enzyme activity inhibition, n (%) | | |
| Always negative | 49 (96.1) | 44 (91.7) |
| Positive at baseline | 0 | 0 |
| Positive post baseline | 2 (3.9) | 4 (8.3) |
| NAb response type based on enzyme uptake inhibition, n (%) | | |
| Always negative | 38 (74.5) | 28 (58.3) |
| Positive at baseline | 1 (2.0) | 1 (2.1) |
| Positive post baseline | 12 (23.5) | 19 (39.6) |

*FIG. 36*

|  | Naïve Group (n=10) | Switch Group (n=14) |
|---|---|---|
| Age at NEO1 enrollment, years, mean ± SD (range) | 44.8 ± 20.3 (20-78) | 46.7 ±14.1 (21-68) |
| Males, n (%) | 3(30) | 9(64) |
| Use of walking device, n (%) | 2(20) | 3(21) |
| 6MWT distance, m, mean ± SD (median) | 449.2 ± 118.36 (488.5) | 440.4 ± 141.02 (439.0) |
| Upright FVC % predicted,* mean ± SD (median) | 69.2 ± 19.27 (58.7) | 77.3 ±16.45 (75.9) |

6MWT, 6-minute walk test; FVC, forced vital capacity; SD, standard deviation
*Calculated according to Quanjer PH, et al. *Eur Respir J.* . 2012;40(6):1324-43

*FIG. 37C*

|  |  |  | Mean ± SD (range) | |
| --- | --- | --- | --- | --- |
|  |  |  | Naïve Group | Switch Group |
| Area occupied by glycogen in quadriceps muscle, % |  |  | 6.0±7.13 (0.6-24.1) (n=10) | 6.5±7.92 (0.6-24.7) (n=14) |
| MRI | Mercuri grading* | Lower leg | 1.3±0.39 (1.0-2.0) (n=8) | 1.3±0.37 (1.0-2.0) (n=13) |
|  |  | Thigh | 1.9±0.72 (1.2-2.9) (n=9) | 2.3±0.65 (1.2-3.5) (n=13) |
|  | 3-point Dixon fat fraction, % | Lower leg | 5.7±2.54 (2.0-10.7) (n=9) | 7.2±2.10 (4.0-11.0) (n=11) |
|  |  | Thigh | 8.1±3.17 (5.6-14.0) (n=9) | 17.3±15.31 (3.0-54.9) (n=11) |
|  | T2 water with B1+, ms | Lower leg | 37.2±1.82 (34.1-39.7) (n=10) | 39.1±3.28 (34.4-43.8) (n=14) |
|  |  | Thigh | 37.1±1.52 (34.9-39.8) (n=10) | 36.7±2.81 (30.4-41.1) (n=14) |
|  | Trophicity index, ms | Thigh | 4296±890 (2956-5388) (n=10) | 4642±1807 (1702-7596) (n=14) |
| Motor function | 6MWT % predicted |  | 69.6±11.84 (46.7-86.9) (n=10) | 67.2±20.43 (29.7-102.2) (n=14) |
|  | GSGC functional ability score |  | 11.0±5.19 (4.0-18.0) (n=10) | 11.8±5.98 (4.0-21.0) (n=14) |
|  | GMFM-88 functional strength total (D+E) |  | 82.2±14.46 (59.3-95.6) (n=10) | 78.5±17.11 (48.5-95.6) (n=14) |
|  | QMFT total score |  | 47.2±10.84 (31.0-61.0) (n=10) | 44.7±12.80 (25.0-64.0) (n=14) |
|  | HHD % predicted lower body |  | 46.9±15.00 (21.3-67.7) (n=10) | 43.6±16.86 (14.2-75.5) (n=14) |

6MWT, 6-minute walk test; GMFM-88, Gross Motor Function Measure-88; GSGC, Gait, Stair, Gowers' Maneuver, Chair; HHD, hand-held dynamometry; QMFT, Quick Motor Function Test; SD, standard deviation
*Mercuri Grading: 1 = normal appearance; 2 = mild involvement; 3 = moderate involvement; 4 = severe involvement
+T2 with B1: abnormal value defined as >39 ms

*FIG. 38*

COMPOSITIONS AND METHODS FOR TREATING LATE-ONSET POMPE DISEASE

CROSS REFERENCE TO RELATED APPLICATIONS

This application is a national stage application under 35 U.S.C. § 371 of International Application No. PCT/US2021/037111, filed internationally on Jun. 11, 2021, which claims the benefit of U.S. Provisional Application No. 63/038,857, filed on Jun. 14, 2020, U.S. Provisional Application No. 63/076,037, filed on Sep. 9, 2020, U.S. Provisional Application No. 63/147,629, filed on Feb. 9, 2021, and U.S. Provisional Application No. 63/157,490, filed on Mar. 5, 2021, the contents of each of which are incorporated herein by reference in their entirety.

FIELD

The present application relates to compositions and methods for treating late-onset Pompe disease (LOPD).

BACKGROUND

Pompe disease (also known as glycogen storage disease type II, or GSD-II) is a rare, autosomal recessive, progressive neuromuscular disorder caused by a deficient lysosomal acid α-glucosidase (GAA), an enzyme responsible for breaking down glycogen. The resulting abnormal accumulation of glycogen in lysosomes leads to cellular dysfunction; progressive respiratory, cardiac, skeletal, and smooth muscle damage; and functional disabilities.

In late-onset Pompe disease (LOPD), symptoms can present at any age, but without the cardiomyopathy that is characteristically seen in infantile-onset patients. While multiple systems are affected, respiratory muscle dysfunction and failure lead to significant morbidity and mortality in patients with LOPD. In untreated LOPD patients, the progressive muscle damage causes respiratory and mobility problems that manifest at variable rates and, for many patients, ultimately lead to the need for respiratory support and wheelchair use. There is need for effective and safe therapy for LOPD.

BRIEF SUMMARY

The present application provides methods and compositions for treating late-onset Pompe disease (LOPD) in an individual in need thereof.

One aspect of the present application provides a method for treating LOPD in a human individual, comprising administering to the individual a pharmaceutical composition comprising an oligosaccharide-protein conjugate and a pharmaceutically acceptable carrier, wherein the oligosaccharide-protein conjugate has a structure of Formula I:

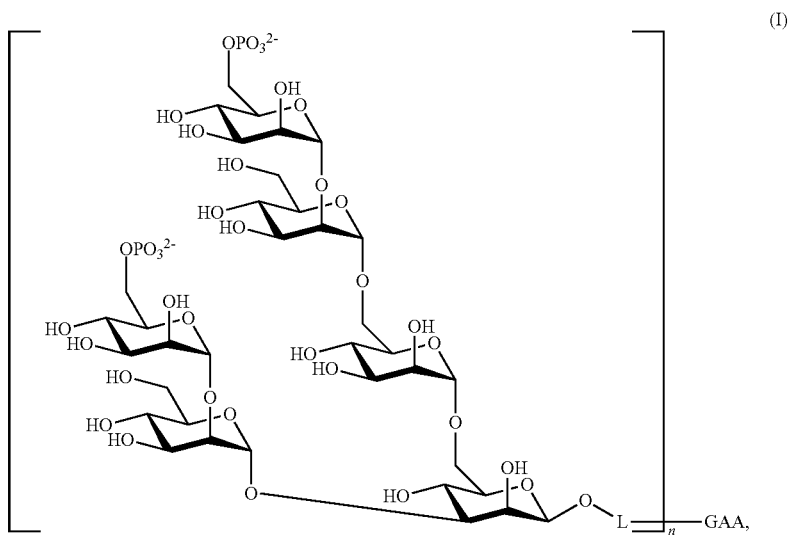

wherein GAA is acid α-glucosidase, L is a chemical linker connecting the oligosaccharide and the GAA, and n is 1 to 10, and wherein the pharmaceutical composition is administered at a dose of about 20 mg/kg.

In some embodiments according to any one of the methods described above, the individual is at least about 45 (e.g., at least 50, 60, 65 or more) years old. In some embodiments, the individual is between about 18 years old and about 45 years old. In some embodiments, the individual is no more than about 18 (e.g., no more than about 16, 12, 8, or 5) years old.

In some embodiments according to any one of the methods described above, the individual is diagnosed with Pompe disease at an age of at least about 18 (e.g., at least 25, 30, 35, 40, 45, or more) years old. In some embodiments, the individual is diagnosed with Pompe disease at an age of no more than about 18 (e.g., no more than about 16, 12, 8, or 5) years old.

In some embodiments according to any one of the methods described above, the individual shows the first symptom of Pompe Disease at an age of at least about 18 (e.g., at least 25, 30, 35, 40, 45, or more) years old. In some embodiments, the individual shows the first symptom of Pompe Disease at an age of no more than about 18 (e.g., no more than about 16, 12, 8, or 5) years old.

One aspect of the present application provides a method for treating a late-onset Pompe disease (LOPD) in a human individual in need thereof, comprising administering to the individual a pharmaceutical composition comprising an oligosaccharide-protein conjugate and a pharmaceutically acceptable carrier, wherein the oligosaccharide-protein conjugate has a structure of Formula I:

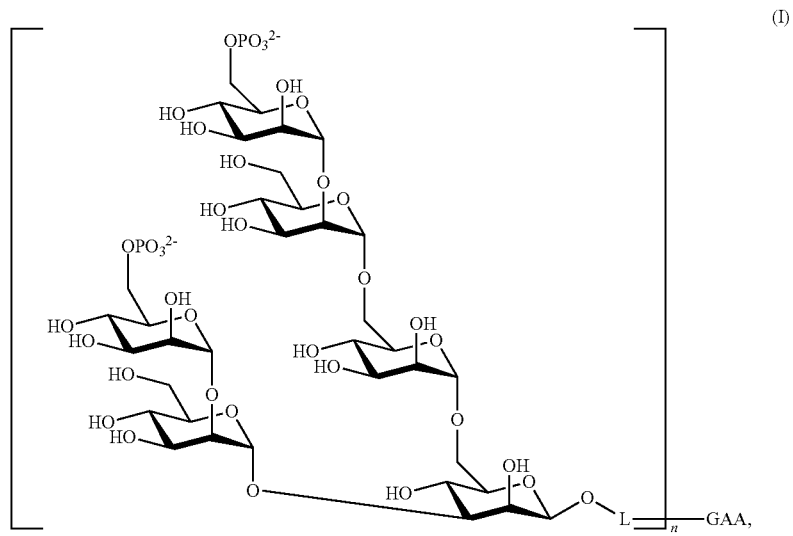

wherein GAA is acid α-glucosidase, L is a chemical linker connecting the oligosaccharide and the GAA, and n is 1 to 10,
wherein the pharmaceutical composition is administered at a dose of about 20 mg/kg,
wherein the individual has one or more of the following characteristics:
(a) the individual is about 3 years old to about 18 years old at the start of the treatment;
(b) the individual has a forced vital capacity (FVC) percentage of predicted value of about 30% to about 50% before receiving the treatment; and
(c) the individual is able to ambulate about 40 meters to about 50 meters without stopping or using an assistive device before receiving the treatment. In some embodiments, the individual is about 3 years old to about 18 years old at the start of the treatment. In some embodiments, the individual has a forced vital capacity (FVC) percentage of predicted value of about 30% to about 50% before receiving the treatment. In some embodiments, the individual is able to ambulate about 40 meters to about 50 meters without stopping or using an assistive device before receiving the treatment.

In some embodiments according to any one of the methods described above, administration of the pharmaceutical composition to a plurality of human individuals for 49 weeks results in one or more of the following:
(a) an average increase of FVC % in an upright position of at least about 1.1%, at least about 2.3%, or at least about 4.6%;
(b) an average increase of 6-minute walk test (6MWT) distance of at least about 12.5 m, at least about 23 m, or at least about 50 m;
(c) an average increase in 6MWT percentage of predicted value (6MWT %) of at least about 2%, at least about 3.5%, or at least about 8%;
(d) an average increase in maximum inspiratory pressure percentage of predicted value (MIP %) in an upright position of at least about 4.5%, at least about 8.7%, or at least about 12.5%;
(e) an average increase in maximum expiratory pressure percentage (MEP %) in an upright position of at least about 5.2%, at least about 10.9%, at least about 14.3%, or at least about 16.5%;
(f) an average increase in hand-held dynamometry (HHD) score for lower extremities of at least about 170 Newtons (N), at least about 250 N, or at least about 350 N;
(g) an average increase in HHD score for upper extremities of at least about 95 N, at least about 190 N, or at least about 245 N;
(h) an average increase in quick motor function test (QMFT) total score of at least about 2.7, at least about 3.3, or at least about 5.2;
(i) an average change of Gait, Stair, Gower's Maneuver, and Chair (GSGC) score of at least about −0.9, at least about −0.35, or at least about 0.40;
(j) an average increase of Gross Motor Function Measure-88 (GMFM-88) Dimension D score of at least about 2.2, at least about 3.3, or at least about 5.8;
(k) an average increase of GMFM-88 Dimension E score of at least about 0.7, at least about 4.5, or at least about 5.2;
(l) an average increase in health-related quality of life Short Form 12 Health Survey (SF-12®) physical component score (PCS) of at least about 0.4, at least about 3.7, or at least about 4.3%;
(m) an average increase in SF-12® mental component score (MCS) of at least about 0.45, at least about 3.4, or at least about 5.3;
(n) an average decrease in urinary HEX4 level of at least about 30%, at least about 43%, or at least about 78%;
(o) an average decrease in creatine kinase level of at least about 13%, at least about 39%, or at least about 63%;
(p) an average decrease in alanine aminotransferase (ALT) level of at least about 19%, at least about 38%, or at least about 68%; and
(q) an average decrease in aspartate aminotransferase (AST) level of at least about 26%, at least about 33%, or at least about 66%. In some embodiments, administration of the pharmaceutical composition to a plurality of human individuals for 49 weeks results in an average increase of FVC % in an upright position of at least about 1.1%, at least about 2.3%, or at least about 4.6%. In some embodiments, administration of the pharmaceutical composition to a plurality of human individuals for 49 weeks results in an average increase of 6-minute walk test (6MWT) distance of at least about 12.5 m, at least about 23 m, or at least about 50 m. In some embodiments, administration of the pharmaceutical composition to a plurality of human individuals for 49 weeks results in an average increase in 6MWT percentage of predicted value (6MWT %) of at least about 2%, at least about 3.5%, or at least about 8%.

In some embodiments according to any one of the methods described above, administration of the pharmaceutical composition to a plurality of human individuals for 49 weeks results in an average increase of FVC % in an upright position of about 2.89% within a 95% confidence interval of about 1.1% to about 4.7%. In some embodiments, administration of the pharmaceutical composition to a plurality of human individuals for 49 weeks results in an average increase of 6-minute walk test (6MWT) distance of about 32.2 meters within a 95% confidence interval of about 12.4 meters to about 52 meters. In some embodiments, administration of the pharmaceutical composition to a plurality of human individuals for 49 weeks results in an average increase in 6MWT percentage of predicted value (6MWT %) of about 5.0% within a 95% confidence interval of about 1.9% to about 8.1%. In some embodiments, administration of the pharmaceutical composition to a plurality of human individuals for 49 weeks results in an average increase in maximum inspiratory pressure percentage of predicted value (MIP %) in an upright position of about 8.7% within a 95% confidence interval of about 4.5% to about 12.9%. In some embodiments, administration of the pharmaceutical composition to a plurality of human individuals for 49 weeks results in an average increase in maximum expiratory pressure percentage (MEP %) in an upright position of at least about 10.9% within a 95% confidence interval of about 5.2% to about 16.5%. In some embodiments, administration of the pharmaceutical composition to a plurality of human individuals for 49 weeks results in an average increase in hand-held dynamometry (HHD) score for lower extremities of about 260 Newtons (N) within a 95% confidence interval of about 169 N to about 352 N. In some embodiments, administration of the pharmaceutical composition to a plurality of human individuals for 49 weeks results in an average increase in HHD score for upper extremities of about 174 N within a 95% confidence interval of about 97.8 N to about 249 N. In some embodiments, administration of the pharmaceutical composition to a plurality of human individuals for 49 weeks results in an average increase in quick motor function test (QMFT) total score of about 4.0 within a 95% confidence interval of about 2.7 to about 5.2. In some embodiments, administration of the pharmaceutical composition to a plurality of human individuals for 49 weeks results in an average change of Gait, Stair, Gower's Maneuver, and Chair (GSGC) score of about −0.25 within a 95% confidence interval of about −0.94 to about 0.43. In some embodiments, administration of the pharmaceutical composition to a plurality of human individuals for 49 weeks results in an average increase of Gross Motor Function Measure-88 (GMFM-88) Dimension D score of about 4.0 within a 95% confidence interval of about 2.2 to about 5.8. In some embodiments, administration of the pharmaceutical composition to a plurality of human individuals for 49 weeks results in an average increase of GMFM-88 Dimension E score of about 2.6 within a 95% confidence interval of about 0.72 to about 4.5. In some embodiments, administration of the pharmaceutical composition to a plurality of human individuals for 49 weeks results in an average increase in health-related quality of life Short Form 12 Health Survey (SF-12®) physical component score (PCS) of 2.4 within a 95% confidence interval of about 0.40 to about 4.4. In some embodiments, administration of the pharmaceutical composition to a plurality of human individuals for 49 weeks results in an average increase in SF-12® mental component score (MCS) of 2.9 within a 95% confidence interval of about 0.45 to about 5.3. In some embodiments, administration of the pharmaceutical composition to a plurality of human individuals for 49 weeks results in an average decrease in urinary HEX4 level of about 10.8% with a standard deviation of about 24.0%. In some embodiments, administration of the pharmaceutical composition to a plurality of human individuals for 49 weeks results in an average decrease in creatine kinase level of about 38.0% with a standard deviation of about 24.9%. In some embodiments, administration of the pharmaceutical composition to a plurality of human individuals for 49 weeks results in an average decrease in alanine aminotransferase (ALT) level of about 43.3% with a standard deviation of about 24.7%. In some embodiments, administration of the pharmaceutical composition to a plurality of human individuals for 49 weeks results in an average decrease in aspartate aminotransferase (AST) level of about 46.1% with a standard deviation of about 20.2%.

In some embodiments according to any one of the methods described above, the individual has not previously received treatment with a recombinant GAA. In some embodiments, the individual has previously received treatment with a recombinant GAA. In some embodiments, the individual has received at least 6 months (e.g., at least 12 months) of treatment with a recombinant GAA. In some embodiments, the individual shows clinical decline after treatment with the recombinant GAA, wherein the clinical decline is determined by assessing one or more parameters selected from the group consisting of respiratory functions, motor skills and cardiac parameters. In some embodiments, the individual has suboptimal clinical response to treatment with the recombinant GAA, wherein the clinical response is determined by assessing one or more parameters selected from the group consisting of respiratory functions, motor skills and cardiac parameters. In some embodiments, the recombinant GAA is alglucosidase alfa.

In some embodiments according to any one of the methods described above, prior to the treatment, the individual has a forced vital capacity percentage of predicted value (FVC %) in an upright position between about 30% and about 85% (e.g., at least about any one of 30%, 40%, 50%, 60%, 70%, or more).

In some embodiments according to any one of the methods described above, prior to the treatment, the individual is able to ambulate for at least about 40 meters (e.g., at least about 50, 60, 70, 80, 90, 100 meters or more) without stopping and without an ambulation assistance device.

In some embodiments according to any one of the methods described above, the individual does not have Pompe-specific cardiac hypertrophy.

In some embodiments according to any one of the methods described above, the individual has confirmed GAA enzyme deficiency from any tissue source. In some embodiments, the individual has at least 2 confirmed GAA gene variants. In some embodiments, the individual has confirmed GAA enzyme deficiency from any tissue source and at least 2 confirmed GAA gene variants.

In some embodiments according to any one of the methods described above, the individual is administered with the pharmaceutical composition for at least about 49 weeks, e.g., at least one year, 2 years, 3 years, 4 years, 5 years, or more.

In some embodiments according to any one of the methods described above, the individual has an increase in FVC % in an upright position by at least about 1.13% after receiving the treatment (e.g., at week 49 of the treatment). In some embodiments, the individual has an increase in FVC % in an upright position by at least about 2.89% after receiving the treatment (e.g., at week 49 of the treatment). In some embodiments, the individual has an increase in FVC % in an upright position after receiving the treatment (e.g., at week 49 of the treatment) that is at least about 2.43% higher compared to that after treatment with alglucosidase alfa.

In some embodiments according to any one of the methods described above, the individual has an increase in 6-minute walk test (6MWT) distance by at least about 12.47 meters after receiving the treatment (e.g., at week 49 of the treatment). In some embodiments, the individual has an increase in 6MWT distance by at least about 32.21 meters after receiving the treatment (e.g., at week 49 of the treatment). In some embodiments, the individual has an increase in 6MWT distance after receiving the treatment (e.g., at week 49 of the treatment) that is at least about 30.01 meters longer compared to that after treatment with alglucosidase alfa. In some embodiments, the individual has an increase in 6MWT percentage of predicted value (6MWT %) distance by at least about 1.95% after receiving the treatment (e.g., at week 49 of the treatment). In some embodiments, the individual has an increase in 6MWT % by at least about 5.02% after receiving the treatment (e.g., at week 49 of the treatment). In some embodiments, the individual has an increase in 6MWT % after receiving the treatment (e.g., at week 49 of the treatment) that is at least about 4.71% longer compared to that after treatment with alglucosidase alfa.

In some embodiments according to any one of the methods described above, the individual has a decrease in maximum inspiratory pressure percentage of predicted value (MIP %) in an upright position of no more than about 0.29% after receiving the treatment (e.g., at week 49 of the treatment). In some embodiments, the individual has a decrease in MIP % in an upright position after receiving the treatment (e.g., at week 49 of the treatment) that is at least about 2.58% lower compared to that after treatment with alglucosidase alfa. In some embodiments, the individual has an increase in maximum inspiratory pressure percentage of predicted value (MIP %) in an upright position of at least about 8.70% after receiving the treatment. In some embodiments, the individual has an increase in MIP % in an upright position after receiving the treatment that is at least about 4.40% higher compared to that after treatment with alglucosidase alfa.

In some embodiments according to any one of the methods described above, the individual has an increase in maximum expiratory pressure percentage of predicted value (MEP %) in an upright position of at least about 2.39% after receiving the treatment (e.g., at week 49 of the treatment). In some embodiments, the individual has an increase in MEP % in an upright position after receiving the treatment (e.g., at week 49 of the treatment) that is at least about 2.61% lower compared to that after treatment with alglucosidase alfa. In some embodiments, the individual has an increase in maximum expiratory pressure percentage (MEP %) in an upright position of at least about 10.89% after receiving the treatment. In some embodiments, the individual has an increase in MEP % in an upright position after receiving the treatment that is at least about 2.51% higher compared to that after treatment with alglucosidase alfa.

In some embodiments according to any one of the methods described above, the individual has an increase in hand-held dynamometry (HHD) score for lower extremities of at least about 169.11 Newton after receiving the treatment (e.g., at week 49 of the treatment). In some embodiments, the individual has an increase in HHD score for lower extremities of at least about 260.69 Newton after receiving the treatment (e.g., at week 49 of the treatment). In some embodiments, the individual has an increase in HHD score for lower extremities after receiving the treatment (e.g., at week 49 of the treatment) that is at least about 106.97 Newton higher compared to that after treatment with alglucosidase alfa.

In some embodiments according to any one of the methods described above, the individual has an increase in hand-held dynamometry (HHD) score for upper extremities of at least about 97.84 Newton after receiving the treatment (e.g., at week 49 of the treatment). In some embodiments, the individual has an increase in HHD score for upper extremities of at least about 173.54 Newton after receiving the treatment (e.g., at week 49 of the treatment). In some embodiments, the individual has an increase in HHD score for upper extremities after receiving the treatment (e.g., at week 49 of the treatment) that is at least about 63.87 Newton higher compared to that after treatment with alglucosidase alfa.

In some embodiments according to any one of the methods described above, the individual has an increase in quick motor function test (QMFT) total score of at least about 2.72 after receiving the treatment (e.g., at week 49 of the treatment). In some embodiments, the individual has an increase in QMFT total score of at least about 3.98 after receiving the treatment (e.g., at week 49 of the treatment). In some embodiments, the individual has an increase in QMFT total score after receiving the treatment (e.g., at week 49 of the treatment) that is at least about 2.08 higher compared to that after treatment with alglucosidase alfa.

In some embodiments according to any one of the methods described above, the individual has an increase in health-related quality of life Short Form 12 Health Survey (SF-12®) physical component score (PCS) of at least about 0.40 after receiving the treatment (e.g., at week 49 of the treatment). In some embodiments, the individual has an increase in SF-12® PCS of at least about 2.37 after receiving the treatment (e.g., at week 49 of the treatment). In some embodiments, the individual has an increase in SF-12® PCS after receiving the treatment (e.g., at week 49 of the treatment) that is at least about 0.77 higher compared to that after treatment with alglucosidase alfa.

In some embodiments according to any one of the methods described above, the individual has an increase SF-12® mental component score (MCS) of at least about 0.47 after receiving the treatment (e.g., at week 49 of the treatment). In some embodiments, the individual has an increase SF-12® mental component score (MCS) of at least about 2.88 after receiving the treatment (e.g., at week 49 of the treatment). In some embodiments, the individual has an increase in SF-12® MCS after receiving the treatment (e.g., at week 49 of the treatment) that is at least about 2.12 higher compared to that after treatment with alglucosidase alfa.

In some embodiments according to any one of the methods described above, the individual has a decrease in urinary HEX4 level of at least about 53.90% after receiving the treatment. In some embodiments, the individual has a decrease in urinary HEX4 level after receiving the treatment that is at least about 43.14% lower compared to that after treatment with alglucosidase alfa.

In some embodiments according to any one of the methods described above, the individual has a decrease in creatine kinase level of at least about 38.02% after receiving the treatment. In some embodiments, the individual has a decrease in creatine kinase level after receiving the treatment that is at least about 23.89% lower compared to that after treatment with alglucosidase alfa.

In some embodiments according to any one of the methods described above, the individual has a decrease in alanine aminotransferase (ALT) level after receiving the treatment that is at least about 33.9% lower compared to that after treatment with alglucosidase alfa. In some embodiments, the individual has a decrease in ALT level of at least about 43.32% after receiving the treatment.

In some embodiments according to any one of the methods described above, the individual has a decrease in aspartate aminotransferase (AST) level after receiving the treatment that is at least about 32.28% lower compared to that after treatment with alglucosidase alfa. In some embodiments, the individual has a decrease in AST level of at least about 46.12% after receiving the treatment.

In some embodiments according to any one of the methods described above, the individual has stable Mercuri scores according to skeletal muscle magnetic resonance imaging (MRI) during the course of the treatment. In some embodiments, the individual has stable 3-point Dixon fat fraction according to skeletal muscle MRI imaging during the course of the treatment. In some embodiments, the individual has stable T2 water with or without B1 correction according to skeletal muscle MRI imaging during the course of the treatment. In some embodiments, the skeletal muscle MRI is carried out in quadriceps and/or hamstring of the individual. In some embodiments, the Mercuri scores do not change for more than 5% (e.g., no more than 2%, 1%, 0.5%, or less) for at least 3 years (e.g., at least 4 years, 4.5 years, 5 years or more).

In some embodiments according to any one of the methods described above, the individual has lower risk of treatment-related adverse events (TEAE) after receiving the treatment (e.g., at week 49 of the treatment) compared to that after treatment with alglucosidase alfa. In some embodiments, the individual has lower risk of infusion-associated reaction (IARs) after receiving the treatment (e.g., at week 49 of the treatment) compared to that after treatment with alglucosidase alfa.

In some embodiments according to any one of the methods described above, the individual has decreasing level of antidrug antibody (ADA) against the oligosaccharide-protein conjugate over time.

In some embodiments according to any one of the methods described above, the pharmaceutical composition is administered to the individual once every two weeks. In some embodiments, the pharmaceutical composition is administered intravenously.

In some embodiments according to any one of the methods described above, the pharmaceutical composition is reconstituted from a lyophilized formulation comprising the oligosaccharide-protein conjugate. In some embodiments, the pharmaceutically acceptable carrier comprises mannitol. In some embodiments, the pharmaceutically acceptable carrier comprises glycine. In some embodiments, the pharmaceutically acceptable carrier comprises histidine. In some embodiments, the pharmaceutical composition has a pH of about 6.2. In some embodiments, the pharmaceutically acceptable carrier comprises about 10-50 mM histidine, about 0.25-2% glycine, about 1-4% mannitol, and about 0.005-0.05% polysorbate 80. In some embodiments, the pharmaceutically acceptable carrier comprises about 10 mM histidine, about 2% glycine, about 2% mannitol, and about 0.01% polysorbate 80.

In some embodiments according to any one of the methods described above, the oligosaccharide-protein conjugate has a structure of Formula II:

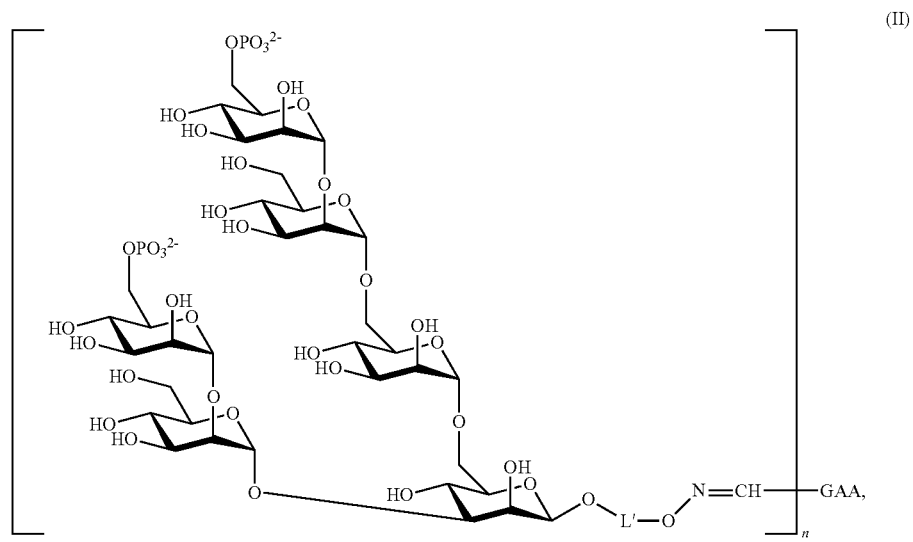

wherein GAA is acid α-glucosidase, L' is a chemical linker, and n is 1 to 10.

In some embodiments according to any one of the methods described above, the oligosaccharide-protein conjugate has a structure of Formula III:

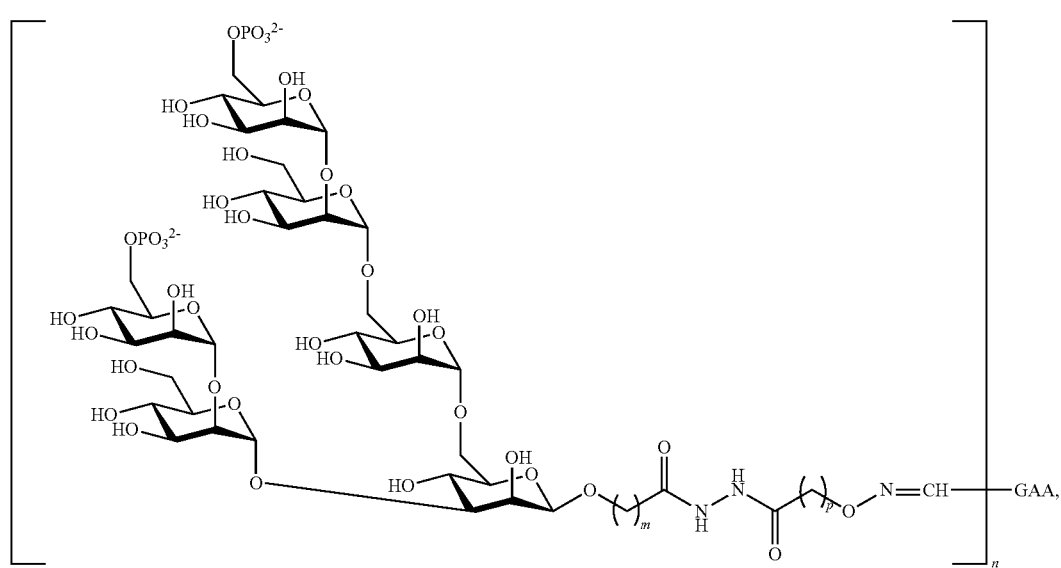

wherein GAA is acid α-glucosidase, n is 1 to 10, and wherein m and p are independently chosen from integers ranging from 1 to 10. In some embodiments, m is 3 and p is 1. In some embodiments, n is 5-7.

In some embodiments according to any one of the methods described above, the GAA is a human GAA produced in Chinese hamster ovary (CHO) cells. In some embodiments, the human GAA has glycoform alfa. In some embodiments, the oligosaccharide-protein conjugate is avalglucosidase alfa.

Also provided are compositions, kits and articles of manufacture for use in treating LOPD.

BRIEF DESCRIPTION OF THE DRAWINGS

FIG. 1 summarizes the patient selection and key inclusion and exclusion criteria for the clinical trial of Example 1. The study (NCT02782741; EFC14028; 2016-000942-77) is a Phase 3, multicenter, multinational, randomized, double-blinded trial comparing efficacy and safety of intravenous avalglucosidase alfa compared to alglucosidase alfa in treating patients with LOPD.

FIG. 4 shows the baseline demographics of the clinical study. The baseline demographics were representative of the general LOPD population and similar in the two treatment arms overall. For some parameters, the maximum (max), minimum (min) and standard deviation (SD) values are indicated.

FIG. 5 shows baseline characteristics for 6-minute walk test (6MWT), forced vital capacity (FVC), maximum expiratory pressure (MEP), and maximum inspiratory pressure (MIP) parameters. One (1) patient did not have assessments for MIP and MEP % predicted, upright at baseline in the avalglucosidase alfa arm; n=50 for both parameters. The baseline characteristics were representative of the general LOPD population and similar in the two treatment arms overall.

FIG. 6 shows baseline characteristics for hand-held dynamometry (HHD), late-onset Pompe disease (LOPD), mental health component score (MCS), PCS, physical component score (PCS), quick motor function test (QMFT), and health-related quality of life Short Form 12 Health Survey (SF-12®) parameters. The n values represent the number of patients who had Baseline assessments for each parameter. For some parameters, the maximum (max), minimum (min) and standard deviation (SD) values are indicated. The baseline characteristics were representative of the general LOPD population and were similar in the two treatment arms overall.

FIG. 7 shows the duration of exposure during the PAP. The duration of study drug exposure was between 9 and 12 months for the majority of patients in both groups: 50/51 (98.0%) of patients in the avalglucosidase alfa group and 44/49 (89.8%) of patients in the alglucosidase alfa group.

FIG. 8A shows the LS mean absolute change from baseline to week 49 in % predicted FVC. FIG. 8B shows the LS mean absolute change from baseline to week 49 in 6MWT distance (m, meters). Avalglucosidase alfa treatment resulted in greater improvements in FVC and 6MWT from baseline to week 49 as compared to alglucosidase alfa.

FIG. 9A shows the least squares (LS) mean change (at 95% CI) from baseline to week 49 in % predicted FVC. FIG. 9B shows the LS mean change (at 95% CI) from baseline to week 49 in 6MWT.

FIG. 13A shows the % predicted MIP LS mean change from baseline to week 49. FIG. 13B shows the % predicted MEP LS mean change from baseline to week 49. The difference in LS mean change is indicated.

FIG. 16A shows the LS mean change from baseline to week 49 in SF-12® PCS score. FIG. 16B shows the LS mean change from baseline to week 49 in SF-12® MCS score. The difference in LS mean change is indicated. The change from baseline in SF-12® (PCS and MCS scores) at week 49 showed positive trends for avalglucosidase alfa compared to alglucosidase alfa.

FIG. 17 shows the safety profile of avalglucosidase alfa. Numbers reported are the number (%) of patients with at least 1 treatment-emergent adverse event (TEAE) in each category. Infusion-associated reactions (IARs) are defined as an adverse event that occurred during either the infusion or observation period following the infusion, related or possible related to the investigational treatment. One patient treated with alglucosidase alfa died due to an SAE of acute myocardial infarction (unrelated) in the PAP. Four patients withdrew from the trial due to AEs in the alglucosidase alfa arm (including 2 patients with IARs); no patient withdrew in the avalglucosidase alfa arm. The safety profile of avalglucosidase alfa is consistent with previous long-term experience in NEO1 and NEO-EXT studies, without new safety signals.

FIGS. 18A-18B show the LS mean change from week 49 to week 97 in % predicted FVC and 6MWT distance. Preliminary analysis of 20 switch patients shows additional increases in FVC and 6MWT. Not all enrolled patients had data to Week 97 due to sequential enrollment in the trial.

FIG. 19 shows the disposition of patients and analysis populations for all randomized patients.

FIGS. 20A-20B show the baseline demographic characteristics in PAP for a modified intent-to-treat (mITT) population.

FIGS. 21A-21D show the disease characteristics at baseline for a mITT population.

FIGS. 22A-22C show the baseline values for the key efficacy parameters in PAP for a mITT population.

FIGS. 23A-23B show the duration of investigational medicinal product in PAP for a safety population.

FIG. 24 shows the primary analysis of estimates and hypothesis tests of change from baseline by visit for FVC (% predicted) in upright position in PAP for a mITT population.

FIG. 25 shows the change from Week 49 up to Week 97 in FVC (% predicted) in upright position for patients who switched from alglucosidase alfa in PAP to avalglucosidase alfa in ETP for a mITT population.

FIGS. 26A-26B show the estimates and hypothesis tests of change from baseline by visit for 6MWT (distance walked in meter and % predicted) in PAP for a mITT population.

FIG. 27 shows the 6MWT (distance walked, in meter) change from Week 49 up to Week 97 in patients who switched from alglucosidase alfa in PAP to avalglucosidase alfa in ETP for a mITT population.

FIG. 28 shows the estimates and hypothesis tests of change from baseline by visit in MIP (% predicted) and MEP (% predicted) values in upright position in PAP for a mITT population (age of 8 years or older).

FIG. 29 shows the estimates and hypothesis tests of change from baseline by visit for hand-held dynamometry (lower extremity muscle strength) in PAP for a mITT population (age of 6 years or older).

FIG. 30 shows the estimates and hypothesis tests of change from baseline by visit for quick motor function tests in PAP for a mITT population.

FIGS. 31A-31B show the estimates and hypothesis tests of change from baseline by visit for SF-12® (PCS and MCS score) in PAP for a mITT population (age of 18 years or older).

FIGS. 32A-32B show the overview of treatment-emergent adverse events in PAP for a safety population.

FIG. 33A shows the LS mean change in MIP % predicted from baseline to week 49 after reanalysis. The difference in LS mean change was 4.40 (3.04); p=0.1505; 95% CI: −1.63, 10.44. FIG. 33B shows the LS mean change in MEP % predicted from baseline to week 49 after reanalysis. The difference in LS mean change was 2.51 (4.14); p=0.5449; 95% CI: −5.70, 10.73.

FIG. 34 shows baseline characteristics for Pompe disease biomarkers: urinary Hex4, alanine aminotransferase (ALT), aspartate aminotransferase (AST), creatine kinase (CK), and creatine kinase myocardial band (CK-MB). Pompe disease biomarkers were elevated at baseline in both groups. Normal ranges are as follow: urinary Hex4 (mmol/mol): 0.194-3.36 (males and females, ages 13-18 years), 0.142-1.92 (males and females, ages >18 years); ALT (IU/L): 6-34 (females, ages <69 years), 6-32 (females, ages >69 years), 6-43 (males, ages 10-18 years), 6-35 (males, ages >69 years); AST (IU/L): 10-40 (males and females, ages 7-18 years), 9-34 (females, ages >18 years), 11-36 (males, ages >18 years); CK (IU/L): 18-169 (females, ages 16-18), 26-192 (females, ages >18 years), 18-408 (males, ages 16-18), 39-308 (males, ages >18 years); CK-MB (µg/L): 0.6-6.3 (males and females, all ages). The n values represent the number of patients who had Baseline assessments for each parameter.

FIG. 35A shows the mean change from baseline to week 49 in percent change in urinary hexose tetrasaccharide (Hex4) levels. FIG. 35B shows the mean change from baseline to week 49 in percent change creatine kinase (CK) levels.

FIG. 36 shows the anti-drug antibody (ADA) and neutralizing antibody (NAb) responses. ADAs were assessed monthly during the study, and all ADAs are either anti-avalglucosidase alfa antibodies or anti-alglucosidase alfa antibodies. The percent of treatment-emergent ADA was calculated as follows: 100×(treatment boosted+treatment induced ADA positive patients)/(number of evaluable patients). The percent of treatment-induced ADA was calculated as follows: 100×(treatment induced ADA positive patients)/(number of evaluable patients with ADA negative at baseline). The percent of treatment-boosted ADA was calculated as follows: 100×(treatment boosted ADA positive patients)/(number of evaluable patients with ADA positive at baseline).

FIGS. 37A-37C show the study design and characteristics at baseline, as described in Example 2. FIG. 37A is a schematic of the study design. The study included two study periods: (1) an open-label, multicenter, multinational, ascending dose study of avalglucosidase alfa in previously treated and treatment-naïve LOPD participants (NEO1, NTC01898364)); and (2) an open label, multicenter, multi-national study of avalglucosidase alfa in previously treated and treatment-naïve LOPD participants enrolled in the first study (NEO-EXT, NTC02032524). FIG. 37B is a schematic of the NEO1 multicented, multinational, open-label, ascending dose study of avalglucosidase in previously treated and treatment-naïve LOPD participants (Pena, L. D. M., et al. (2019) *Neuromuscul Disord.* 29(3):167-186). FIG. 37C shows the participant characteristics at baseline of the first study, as described in Example 2. The upright FVC predicted was calculated according to Quanjer, P. H., et al. (2012) *Eur Respir J.* 40(6):1324-43. As they appear in the figures: qow, every other week; LOPD, late-onset Pompe disease; *naïve to alglucosidase alfa; †prior alglucosidase alfa for ≥9 months; 6MWT, 6-minute walk test; FVC, forced vital capacity; SD, standard deviation.

FIG. 38 shows the disease burden at baseline of the first study period, as described in Example 2. As they appear in the figure: 6MWT, 6-minute walk test; GMFM-88, Gross Motor Function Measure-88; GSGC, Gait, Stair, Gowers' Maneuver, Chair; HHD, hand-held dynamometry; QMFT, Quick Motor Function Test; and SD, standard deviation. The Mercuri grading used was: 1=normal appearance; 2=mild involvement; 3=moderate involvement; 4=severe involvement. For the T2 with B1, an abnormal value defined as >39 ms.

FIGS. 40A-40B shows the 3-point Dixon fat fraction trajectories in naïve group quadriceps (n=7) (FIG. 40A) and hamstring (n=7) (FIG. 40B) during the NEO1 (Baseline) and NEO-EXT. FIGS. 40A-40B shows the 3-point Dixon fat fraction trajectories in switch Group quadriceps (n=9) (FIG. 40C) and hamstring (n=9) (FIG. 40D) during NEO1 (Baseline) and NEO-EXT. As they appear in the figure: CI, confidence interval; qow, every other week. The values displayed are based on average of left laterality and right laterality. The slope was calculated using a random intercept model assuming an unstructured covariance structure with time (weeks) as a fixed effect and intercept as a random effect.

DETAILED DESCRIPTION

Figure 2:
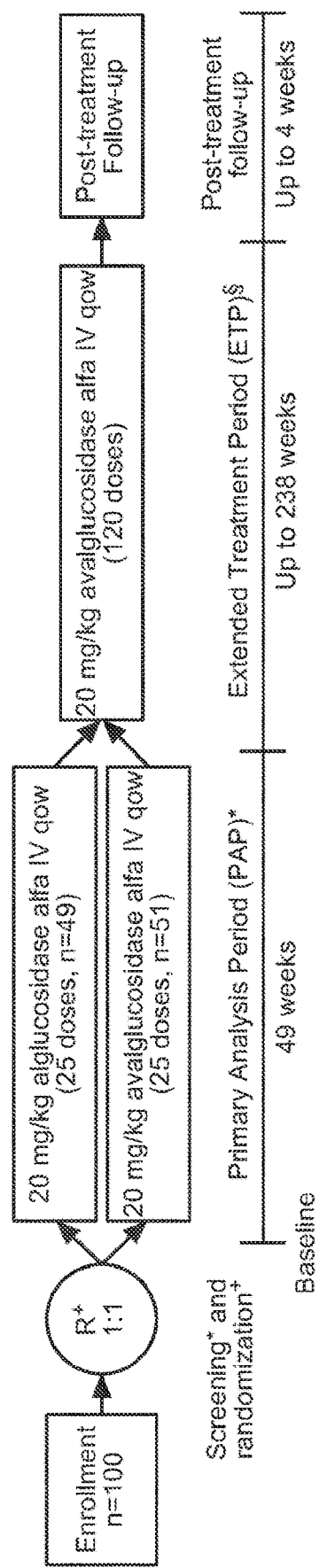
FIG. 2 provides a schematic summary of the study design, patients and timeline. The different stages of the study and treatment cohorts are indicated. Intravenous (IV) for LOPD (late-onset Pompe disease) is indicated (qow, every 2 weeks). The screening phase (up to 14 days) may be extended to up to 8 weeks in pre-specified situations. The randomization (R) 1:1 ratio with stratification factors is based on baseline forced vital capacity, sex, age, and country (Japan or ex-Japan). The primary analysis period (PAP) included study drug infusion, safety assessments, and efficacy evaluations. The extended treatment period (ETP) applied to all patients regardless of prior randomization.

The present application provides compositions and methods for treating late-onset Pompe Disease (LOPD) using an oligosaccharide-acid α-glucosidase (GAA) conjugate. In some embodiments, the oligosaccharide-GAA conjugate is avalglucosidase alfa. Clinical trials of avalglucosidase alfa in human patients demonstrate efficacy and safety of the compositions described herein for treating LOPD.

I. Definitions

Terms are used herein as generally used in the art, unless otherwise defined as follows.

The term "acid α-glucosidase" and "GAA" are used herein interchangeably to refer to the protein acid α-glucosidase. In some embodiments, the GAA is a recombinant GAA. In some embodiments, the GAA is a human GAA.

As used herein, "treatment" or "treating" is an approach for obtaining beneficial or desired results including clinical results. For purposes of this application, beneficial or desired clinical results include, but are not limited to, one or more of the following: decreasing one more symptoms resulting from the disease, diminishing the extent of the disease, stabilizing the disease (e.g., preventing or delaying the worsening of the disease), preventing or delaying the spread of the disease, preventing or delaying the occurrence or recurrence of the disease, delay or slowing the progression of the disease, ameliorating the disease state, providing a remission (whether partial or total) of the disease, decreasing the dose of one or more other medications required to treat the disease, delaying the progression of the disease, increasing the quality of life, and/or prolonging survival. Also encompassed by "treatment" is a reduction of pathological consequence of Pompe disease (such as LOPD). The methods of the present application contemplate any one or more of these aspects of treatment.

The terms "individual," "subject" and "patient" are used interchangeably herein to describe a mammal, including humans. In some embodiments, the individual is human. In some embodiments, an individual suffers from LOPD. In some embodiments, the individual is in need of treatment.

As is understood in the art, an "effective amount" refers to an amount of a composition (e.g. a composition comprising avalglucosidase alfa) sufficient to produce a desired therapeutic outcome (e.g., reducing the severity or duration of, stabilizing the severity of, or eliminating one or more symptoms of LOPD). For therapeutic use, beneficial or desired results include, e.g., decreasing one or more symptoms resulting from the disease (biochemical, histologic and/or behavioral), including its complications and intermediate pathological phenotypes presented during development of the disease, increasing the quality of life of those suffering from the disease, decreasing the dose of other medications required to treat the disease, enhancing effect of another medication, delaying the progression of the disease, and/or prolonging survival of patients. In some embodiments, an effective amount of the therapeutic agent may extend survival (including overall survival and progression free survival); result in an objective response (including a complete response or a partial response); relieve to some extent one or more signs or symptoms of the disease or condition; and/or improve the quality of life of the subject.

As used herein, "baseline value" refers to value of a clinical parameter or biomarker of an individual prior to or at the beginning of a treatment.

The term "pharmaceutical composition" refers to a preparation which is in such form as to permit the biological activity of an active ingredient contained therein to be effective, and which contains no additional components which are unacceptably toxic to a subject to which the formulation would be administered.

A "pharmaceutically acceptable carrier" refers to one or more ingredients in a pharmaceutical formulation, other than an active ingredient, which is nontoxic to a subject. A pharmaceutically acceptable carrier includes, but is not limited to, a buffer, excipient, stabilizer, cryoprotectant, tonicity agent, preservative, and combinations thereof.

The term "package insert" is used to refer to instructions customarily included in commercial packages of therapeutic products, that contain information about the indications, usage, dosage, administration, combination therapy, contraindications and/or warnings concerning the use of such therapeutic products.

An "article of manufacture" is any manufacture (e.g., a package or container) or kit comprising at least one reagent, e.g., a medicament for treatment of a disease or condition (e.g., LOPD), or a probe for specifically detecting a biomarker described herein. In certain embodiments, the manufacture or kit is promoted, distributed, or sold as a unit for performing the methods described herein.

Reference to "about" a value or parameter herein includes (and describes) variations that are directed to that value or parameter per se. For example, description referring to "about X" includes description of "X".

As used herein, reference to "not" a value or parameter generally means and describes "other than" a value or parameter. For example, the method is not used to treat disease of type X means the method is used to treat disease of types other than X.

The term "about X-Y" used herein has the same meaning as "about X to about Y."

As used herein and in the appended claims, the singular forms "a," "an," or "the" include plural referents unless the context clearly dictates otherwise.

The term "and/or" as used herein a phrase such as "A and/or B" is intended to include both A and B; A or B; A (alone); and B (alone). Likewise, the term "and/or" as used herein a phrase such as "A, B, and/or C" is intended to encompass each of the following embodiments: A, B, and C; A, B, or C; A or C; A or B; B or C; A and C; A and B; B and C; A (alone); B (alone); and C (alone).

It is appreciated that certain features of the present technology, which are, for clarity, described in the context of separate embodiments, may also be provided in combination in a single embodiment. Conversely, various features of the present technology, which are, for brevity, described in the context of a single embodiment, may also be provided separately or in any suitable subcombination. All combinations of the embodiments pertaining to the compositions and methods described herein are specifically embraced by the present technology and are disclosed herein just as if each and every combination was individually and explicitly disclosed. In addition, all subcombinations of features and properties of the compositions and methods in the embodiments describing such variables are also specifically embraced by the present technology and are disclosed herein just as if each and every such sub-combination was individually and explicitly disclosed herein.

II. Methods of Treatment

The present application provides methods of treating Pompe disease, such as late-onset Pompe disease (LOPD), in an individual in need thereof using any one of the oligosaccharide-GAA conjugates described herein (e.g., Formulae I-III, or avalglucosidase alfa).

In some embodiments, the present disclosure provides a method of treating Pompe disease in a human individual, comprising administering to the individual an effective amount of a pharmaceutical composition comprising an oligosaccharide-protein conjugate, wherein the oligosaccharide protein and a pharmaceutically acceptable carrier, wherein the oligosaccharide-protein conjugate has a structure of Formula I:

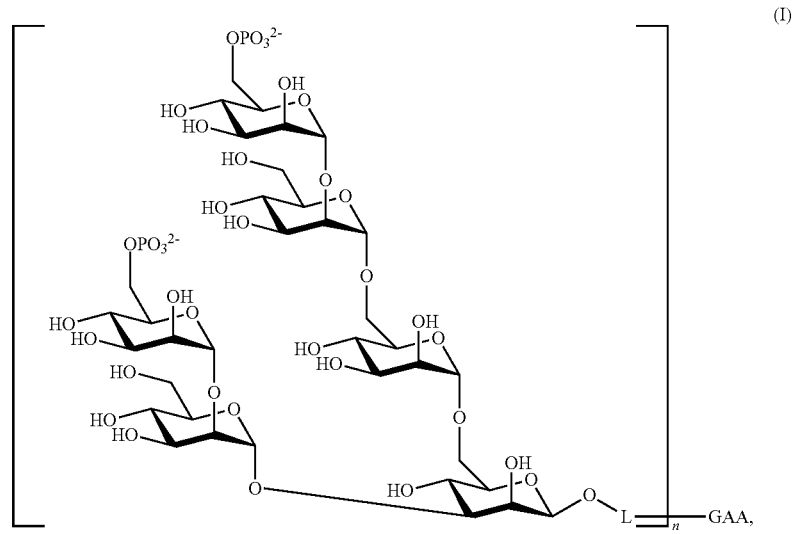

wherein GAA is acid α-glucosidase, L is a chemical linker connecting the oligosaccharide and the GAA, and n is 1 to 10. In some embodiments, the pharmaceutical composition is administered at a dose of about 5 mg/kg to about 40 mg/kg (e.g., about 20 mg/kg). In some embodiments, the pharmaceutically acceptable carrier comprises histidine, glycine, mannitol and/or polysorbate 80. In some embodiments, the pharmaceutically acceptable carrier comprises about 10-50 mM (e.g., about 10 mM) histidine, about 0.25-2% (e.g., about 2%) glycine, about 1-4% (e.g., about 2%) mannitol and about 0.005-0.05% (e.g., about 0.01%) polysorbate 80. In some embodiments, the pharmaceutical composition has a pH of about 5.5 to about 6.5, such as about 6.2. In some embodiments, the Pompe disease is LOPD. In some embodiments, the oligosaccharide-protein conjugate has a structure of Formula (II):

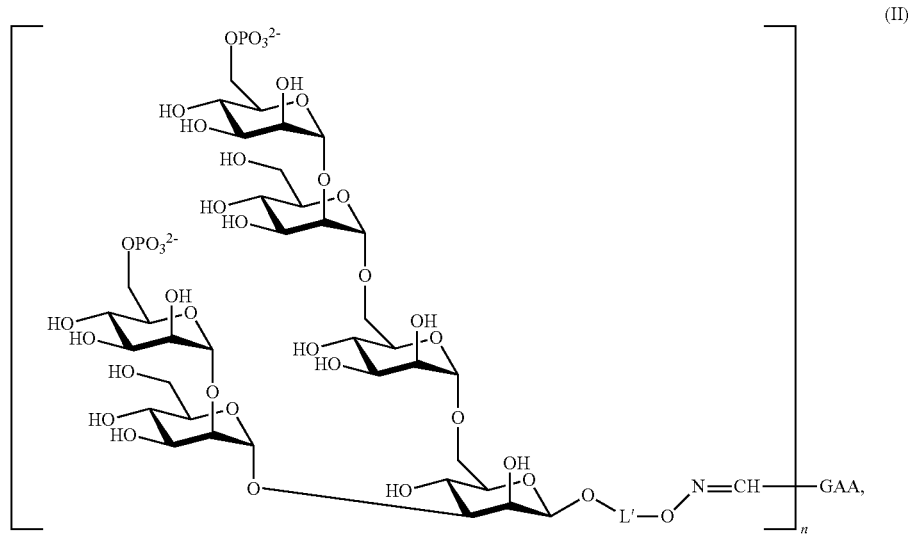

wherein GAA is acid α-glucosidase, L' is a chemical linker, and n is 1 to 10. In some embodiments, the oligosaccharide-protein conjugate has a structure of Formula (III):

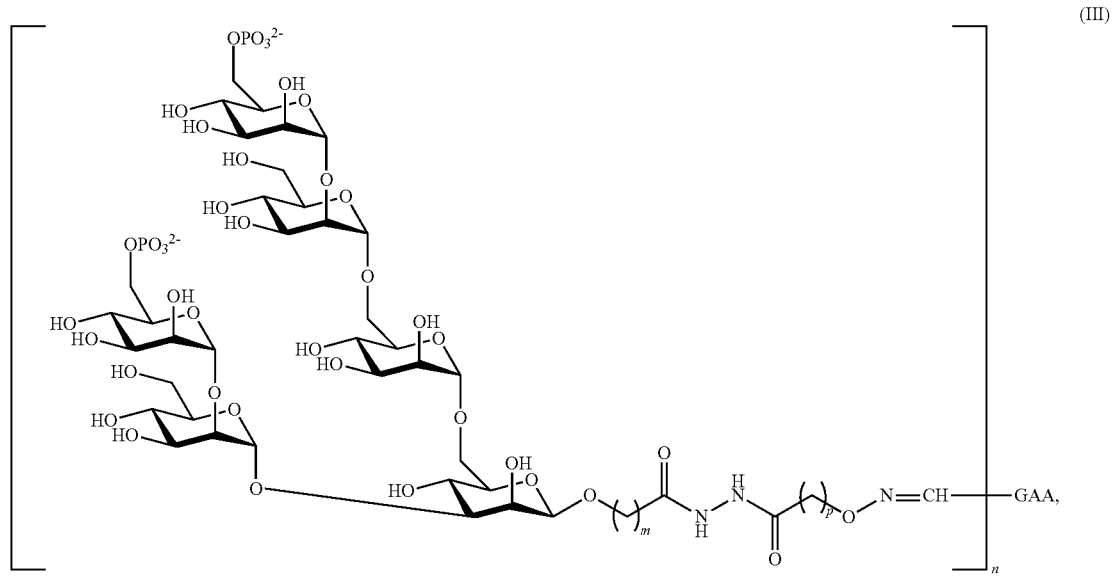

wherein GAA is acid α-glucosidase, n is 1 to 10, and m and p are independently chosen from integers ranging from 1 to 10. In some embodiments, m is 3 and p is 1. In some embodiments, n is 5-7. In some embodiments, the oligosaccharide-protein conjugate is avalglucosidase alfa. In some embodiments, the oligosaccharide-protein conjugate is avalglucosidase alfa. In some embodiments, the individual is about 3 years old to about 18 years old at the start of the treatment. In some embodiments, the individual has a forced vital capacity (FVC) percentage of predicted value of about 30% to about 50% before receiving the treatment. In some embodiments, the individual is able to ambulate about 40 meters to about 50 meters without stopping or using an assistive device before receiving the treatment.

In some embodiments, there is provided a method of treating LOPD in a human individual, comprising administering to the individual a pharmaceutical composition comprising an oligosaccharide-protein conjugate and a pharmaceutically acceptable carrier, wherein the oligosaccharide-protein conjugate has a structure of Formula I:

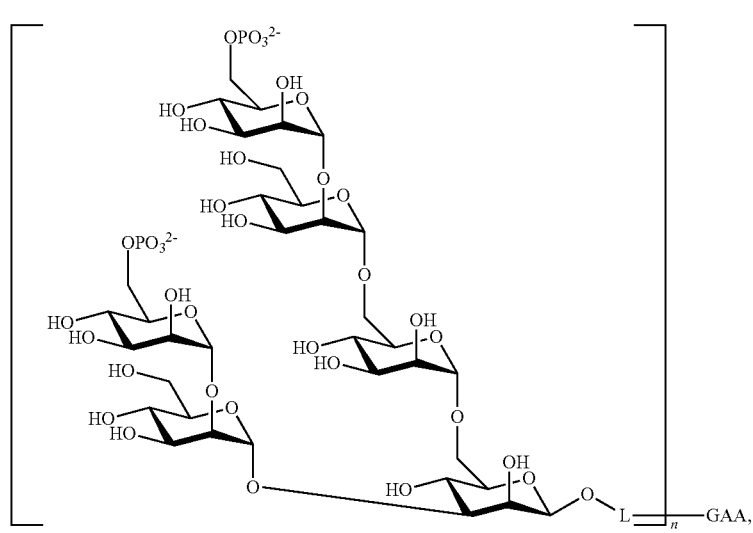
(I)
wherein GAA is acid α-glucosidase, L is a chemical linker connecting the oligosaccharide and the GAA, and n is 1 to 10, and wherein the pharmaceutical composition is administered at a dose of about 20 mg/kg. In some embodiments, the oligosaccharide-protein conjugate has a structure of Formula II:
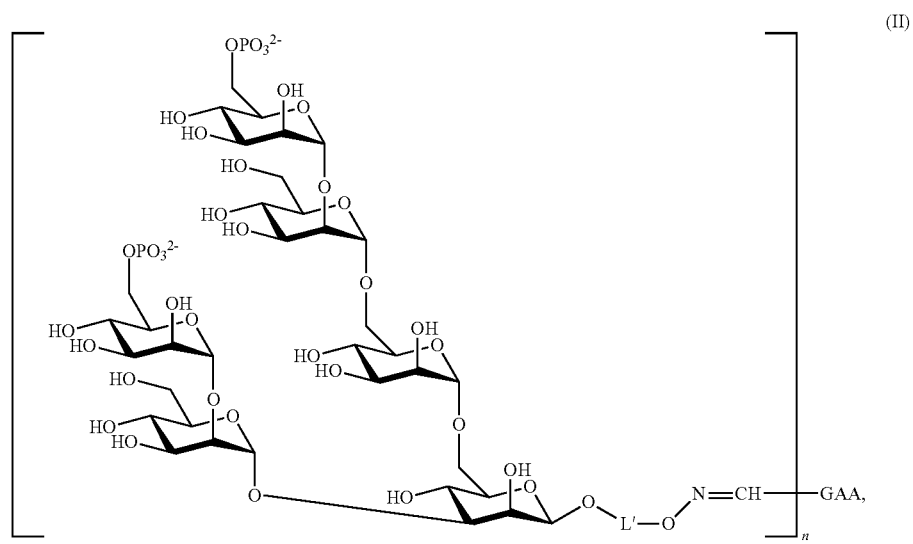
(II)

wherein GAA is acid α-glucosidase, L' is a chemical linker, and n is 1 to 10. In some embodiments, the oligosaccharide-protein conjugate has a structure of Formula III:

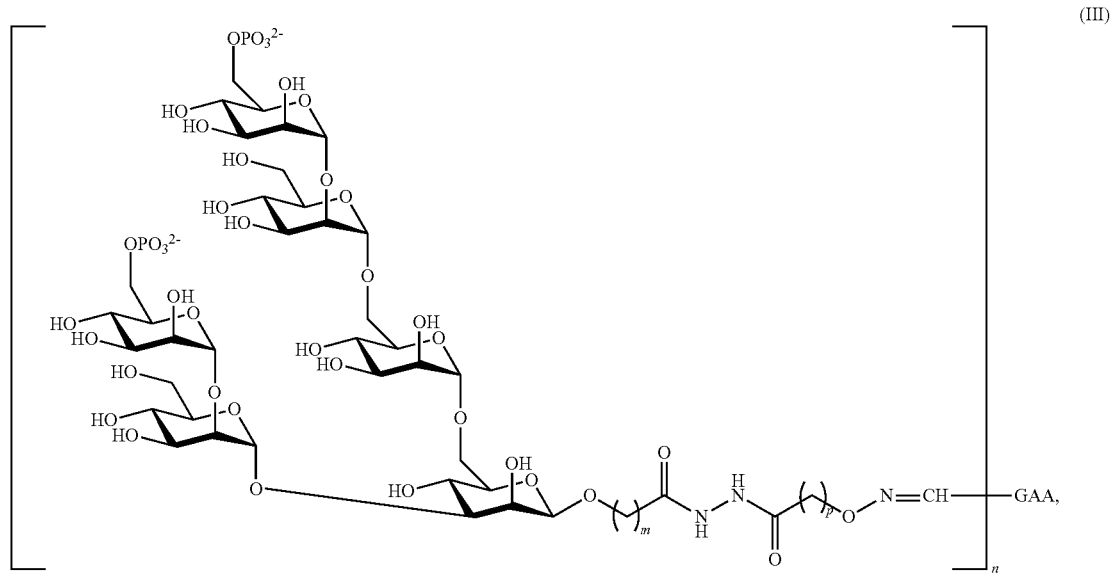

wherein GAA is acid α-glucosidase, n is 1 to 10, and m and p are independently chosen from integers ranging from 1 to 10. In some embodiments, m is 3 and p is 1. In some embodiments, n is 5-7. In some embodiments, the oligosaccharide-protein conjugate is avalglucosidase alfa. In some embodiments, the individual is about 3 years old to about 18 years old at the start of the treatment. In some embodiments, the individual has a forced vital capacity (FVC) percentage of predicted value of about 30% to about 50% before receiving the treatment. In some embodiments, the individual is able to ambulate about 40 meters to about 50 meters without stopping or using an assistive device before receiving the treatment.

Forced vital capacity (FVC) is a commonly used clinical parameter for assessing respiratory muscle strength of patients having Pompe disease. FVC data is typically reported as the percent of predicted normal value of FVC, which is referred herein as "FVC percentage of predicted value," "FVC % predicted," or "FVC %." FVC is the amount of air that can be forcibly exhaled from a patient's lungs after taking the deepest breath possible, as measured by spirometry. FVC may be assessed while a patient is in an upright position. Reduction in FVC is associated with an increased incidence of respiratory complications and death.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase of FVC % in an upright position of at least about 1.1%, at least about 2.3%, or at least about 4.6%. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase of FVC % in an upright position of about 2.89% within a 95% confidence interval of about 1.1% to about 4.7%. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in FVC % in an upright position by at least about 1.13% (e.g., at least about 2.89%) after receiving at least about 49 weeks of the treatment. In some embodiments, there is provided a method of increasing FVC in a human individual having an LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, and wherein the pharmaceutical composition is administered at a dose of about 20 mg/kg. In some embodiments, the oligosaccharide-protein conjugate is avalglucosidase alfa. In some embodiments, the individual has an increase in FVC % in an upright position after receiving the treatment (e.g., at week 49 of the treatment) that is at least about 2.43% higher compared to that after treatment with alglucosidase alfa.

In some embodiments, the individual has an increase in FVC % by at least about any one of 0.25%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5.0%, or more, when measured after a certain duration of treatment. In some embodiments, the individual has an increase in FVC % by about any one of 1.5%, 1.75%, 2%, 2.25%, 2.5%, 2.75%, 3%, 3.25%, 3.5%, 3.75%, 4%, 4.25%, 4.5%, or more, when measured after a certain duration of treatment, including any value or range in between these values. In some embodiments, the individual has an increase in FVC % by at least about any one of 10%, 20%, 30%, 40%, 50%, 60%, 70%, 80%, 90% or more, relative to baseline when measured after a certain duration of treatment. In some embodiments, the individual has an increase in FVC % by no more than about any one of 90%, 80%, 70%, 60%, 50%, 40%, 30%, 20%, or 10% relative to baseline when measured after a certain duration of treatment. In some embodiments, the individual has an increase in FVC % by about any one of 10%, 20%, 30%, 40%, 50%, 60%, 70%, 80%, 90%, including any value or range in between these values. In some embodiments, the individual has an increase in FVC % after receiving the treatment for a certain duration that is at least about 0.25%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, or higher compared to that after treatment with alglucosidase alfa. In some embodiments, the FVC % of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an increase in FVC % by about 1.5 to about 4.59 (e.g., about 3.05 or more) after at least about 13 weeks of treatment. In some embodiments, the individual has an increase in FVC % by about 1.62 to about 4.80 (e.g., about 3.21 or more) after at least about 25 weeks of treatment. In some embodiments, the individual has an increase in FVC % by about 0.23 to about 4.19 (e.g., about 2.21 or more) after at least about 37 weeks of treatment. In some embodiments, the individual has an increase in FVC % by about 1.13 to about 4.65 (e.g., about 2.89 or more) after at least about 49 weeks of treatment.

In some embodiments, the individual has an increase in FVC % in an upright position after receiving at least about 13 weeks of the treatment that is at least about 2.40% higher compared to that after treatment with alglucosidase alfa. In some embodiments, the individual has an increase in FVC % in an upright position after receiving at least about 25 weeks of the treatment that is at least about 2.64% higher compared to that after treatment with alglucosidase alfa. In some embodiments, the individual has an increase in FVC % in an upright position after receiving at least about 37 weeks of the treatment that is at least about 1.66% higher compared to that after treatment with alglucosidase alfa. In some embodiments, the individual has an increase in FVC % in an upright position after receiving at least about 49 weeks of the treatment that is at least about 2.43% higher compared to that after treatment with alglucosidase alfa.

In some embodiments, the individual has an average increase in FVC % in an upright position of about 2.89%, or between 2% and 3%, within a confidence interval after receiving 49 weeks of treatment. In some embodiments, the average increase in FVC % in an upright position is between 1% and 5%, or between 1.1% to 4.7%. In some embodiments, the confidence interval is a 95% confidence interval. In certain embodiments, the 95% confidence interval is between 1.1% to 4.7%. In other embodiments, the average increase in FVC % in the upright position is about 2.89% with a 95% confidence interval of 1.1% to 4.7% after the individual receives 49 weeks of treatment.

In some embodiments, the administration of the pharmaceutical composition to a plurality of individuals for 49 weeks results in an average increase in FVC % in an upright position of about 2.89% within a confidence interval. In some embodiments, the average increase in FVC % in an upright position is between 1.1% to 4.7%. In some embodiments, the confidence interval is a 95% confidence interval. In certain embodiments, the 95% confidence interval is between 1.1% to 4.6%. In other embodiments, the average increase in FVC % in the upright position is about 2.89% with a 95% confidence interval of 1.1% to 4.6%. In some embodiments, the plurality of individuals is 51 individuals.

In some embodiments, the individual has an increase in FVC % in an upright position of at least about 2.3% after receiving 49 weeks of the treatment. In some embodiments, the individual has an increase in FVC % in an upright position of at least about 2.0% after receiving 49 weeks of the treatment. In some embodiments, the individual has an increase in FVC % in an upright position of between 1.1% and 4.6% after receiving 49 weeks of treatment. In some embodiments, the individual has an increase in FVC % in an upright position of between 2.3% and 5.0% after receiving 49 weeks of treatment.

Maximum inspiratory pressure (MIP) and maximum expiratory pressure (MEP) measure the maximal efforts of the respiratory muscles. MIP and MEP are clinical parameters for assessing respiratory functions of patients with Pompe disease. MIP and MEP can be measured using a pressure manometer. "MIP percentage of predicted value," "MIP % predicted," or "MIP %" refers to percent of predicted normal value of MIP of a patient. "MEP percentage of predicted value," "MEP % predicted," or "MEP %" refers to percent of predicted normal value of MEP of a patient.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in maximum inspiratory pressure percentage of predicted value (MIP %) in an upright position of at least about 4.5%, at least about 8.7%, or at least about 12.5%. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in maximum inspiratory pressure percentage of predicted value (MIP %) in an upright position of about 8.7% within a 95% confidence interval of about 4.5% to about 12.9%.

In some embodiments, the individual has a decrease in maximum inspiratory pressure percentage of predicted value (MIP %) in an upright position of no more than about 0.29% after receiving the treatment (e.g., at week 49 of the treatment). In some embodiments, the individual has a decrease in MIP % in an upright position after receiving the treatment (e.g., at week 49 of the treatment) that is at least about 2.58% lower compared to that after treatment with alglucosidase alfa.

In some embodiments, the individual has an increase in maximum inspiratory pressure percentage of predicted value (MIP %) in an upright position of at least about 8.70% after receiving the treatment (e.g., at week 49 of the treatment). In some embodiments, the individual has an increase in MIP % in an upright position after receiving the treatment (e.g., at week 49 of the treatment) that is at least about 4.40% higher compared to that after treatment with alglucosidase alfa.

In some embodiments, the individual has an increase in MIP % in an upright position by at least about any one of 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12% or more, relative to baseline when measured after a certain duration of treatment. In some embodiments the individual has an increase in MIP % in an upright position by about any one of 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12%, or more, relative to baseline when measured after a certain duration of treatment, including any value or range in between these values. In some embodiments, the individual has an increase in MIP % in an upright position after receiving the treatment for a certain duration that is at least about 0.25%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, or more compared to that after treatment with alglucosidase alfa. In some embodiments, the MIP % in an upright position of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in MIP % in an upright position of about 8.7%, or between 5% and 10% or between 7% and 9%, within a confidence interval after receiving 49 weeks of treatment. In some embodiments, the average increase in MIP % in an upright position is between 4.5% to 12.9%, or between 4% and 15%, or between 5% and 13%. In some embodiments, the confidence interval is a 95% confidence interval. In certain embodiments, the 95% confidence interval is between 4.5% to 12.9%. In other embodiments, the average increase in MIP % in an upright position is about 8.7% with a 95% confidence interval of 4.5% to 12.9% after the individual receives 49 weeks of treatment.

In some embodiments, the administration of the pharmaceutical composition to a plurality of individuals for 49 weeks results in an average increase in MIP % in an upright position of about 8.7% within a confidence interval. In some embodiments, the average increase in MIP % in an upright position is between 4.5% to 12.9%. In some embodiments, the confidence interval is a 95% confidence interval. In certain embodiments, the 95% confidence interval is between 4.5% to 12.9%. In other embodiments, the average increase in MIP % in an upright position is about 8.7% with a 95% confidence interval of 4.5% to 12.9%. In some embodiments, the plurality of individuals is 48 individuals.

In some embodiments, the individual has an increase in MIP % in an upright position of at least about 6.5% after receiving 49 weeks of the treatment. In some embodiments, the individual has an increase in MIP % in an upright position of at least about 6.6% after receiving 49 weeks of the treatment. In some embodiments, the individual has an increase in MIP % in an upright position of between 6.6% and 8.8% after receiving 49 weeks of treatment. In some embodiments, the individual has an increase in MIP % in an upright position of between 6.5% and 9% after receiving 49 weeks of treatment.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in maximum expiratory pressure percentage (MEP %) in an upright position of at least about 5.2%, at least about 10.9%, at least about 14.3%, or at least about 16.5%. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in maximum expiratory pressure percentage (MEP %) in an upright position of at least about 10.9% within a 95% confidence interval of about 5.2% to about 16.5%.

In some embodiments, the individual has an increase in maximum expiratory pressure percentage of predicted value (MEP %) in an upright position of at least about 2.39% after receiving the treatment (e.g., at week 49 of the treatment). In some embodiments, the individual has an increase in MEP % in an upright position after receiving the treatment (e.g., at week 49 of the treatment) that is at least about 2.61% lower compared to that after treatment with alglucosidase alfa.

In some embodiments, the individual has an increase in maximum expiratory pressure percentage of predicted value (MEP %) in an upright position of at least about 10.89% after receiving the treatment (e.g., at week 49 of the treatment). In some embodiments, the individual has an increase in MEP % in an upright position after receiving the treatment (e.g., at week 49 of the treatment) that is at least about 2.51% higher compared to that after treatment with alglucosidase alfa.

In some embodiments, the individual has an increase in MEP % in an upright position by at least about any one of 5.0%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12%, 12.25%, 12.5%, 12.75%, 13%, 13.25%, 13.5%, 13.75%, 14%, 14.25%, 14.5% or more, relative to baseline when measured after a certain duration of treatment. In some embodiments the individual has an increase in MEP % in an upright position by about any one of 5.0%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12%, 12.25%, 12.5%, 12.75%, 13%, 13.25%, 13.5%, 13.75%, 14%, 14.25%, 14.5%, or more, relative to baseline when measured after a certain duration of treatment, including any value or range in between these values. In some embodiments, the individual has an increase in MEP % in an upright position after receiving the treatment for a certain duration that is at least about 0.25%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5.0%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, or more compared to that after treatment with alglucosidase alfa. In some embodiments, the MEP % in an upright position of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in MEP % in an upright position of about 10.9%, or between 5% and 15% or between 8% and 12%, or between 9% and 11%, within a confidence interval after receiving 49 weeks of treatment. In some embodiments, the average increase in MEP % in an upright position is between 5.2% to 16.5%, or between 5% and 17%. In some embodiments, the confidence interval is a 95% confidence interval. In certain embodiments, the 95% confidence interval is between 5.2% to 16.5%, or between 5% and 17%. In other embodiments, the average increase in MEP % in an upright position is about 10.9% with a 95% confidence interval of 5.2% to 16.5%, or between 5% and 17% after the individual receives 49 weeks of treatment.

In some embodiments, the administration of the pharmaceutical composition to a plurality of individuals for 49 weeks results in an average increase in MEP % in an upright position of about 10.9% within a confidence interval. In some embodiments, the average increase in MEP % in an upright position is between 5.2% to 16.5%. In some embodiments, the confidence interval is a 95% confidence interval. In certain embodiments, the 95% confidence interval is between 5.2% to 16.5%. In other embodiments, the average increase in MEP % in an upright position is about 10.9% with a 95% confidence interval of 5.2% to 16.5%. In some embodiments, the plurality of individuals is 51 individuals.

In some embodiments, the individual has an increase in MEP % in an upright position of at least about 11.3% after receiving 49 weeks of the treatment. In some embodiments, the individual has an increase in MEP % in an upright position of at least about 8.1% after receiving 49 weeks of the treatment. In some embodiments, the individual has an increase in MEP % in an upright position of between 8.1% and 13.7% after receiving 49 weeks of treatment. In some embodiments, the individual has an increase in MEP % in an upright position of between 11.3% and 14% after receiving 49 weeks of treatment.

The 6 Minute Walk Test (6MWT) distance is a clinical parameter for assessing motor functions of patients having Pompe disease. As used herein, a 6MWT assesses the distance walked in 6 minutes by patients who are able to ambulate at least 40 meters without stopping or using an assistive device. A 6MWT is improved, for example, if an individual is able to walk a greater distance in 6 minutes relative to baseline after a certain duration of treatment. As used herein, "6MWT percentage of predicted value" or "6MWT %" refers to percent of predicted normal value of 6MWT distance for a patient.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase of 6-minute walk test (6MWT) distance of at least about 12.5 m, at least about 23 m, or at least about 50 m. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase of 6-minute walk test (6MWT) distance of about 32.2 meters within a 95% confidence interval of about 12.4 meters to about 52 meters. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in 6MWT percentage of predicted value (6MWT %) of at least about 2%, at least about 3.5%, or at least about 8%. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in 6MWT percentage of predicted value (6MWT %) of about 5.0% within a 95% confidence interval of about 1.9% to about 8.1%. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in 6MWT distance by at least about 12.47 meters (e.g., at least about 32.21 meters) after receiving at least about 49 weeks of the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in 6MWT % by at least about 1.95% (e.g., at least about 5.02%) after receiving at least about 49 weeks of the treatment. In some embodiments, there is provided a method of increasing 6MWT distance or 6MWT % in a human individual having an LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, and wherein the pharmaceutical composition is administered at a dose of about 20 mg/kg. In some embodiments, the oligosaccharide-protein conjugate is avalglucosidase alfa. In some embodiments, the individual has an increase in 6MWT distance after receiving the treatment (e.g., at week 49 of the treatment) that is at least about 30.01 meters longer compared to that after treatment with alglucosidase alfa. In some embodiments, the individual has an increase in 6MWT % after receiving the treatment (e.g., at week 49 of the treatment) that is at least about 4.71% longer compared to that after treatment with alglucosidase alfa.

In some embodiments, the individual has an increase in 6MWT distance by at least about any one of 0.5, 1, 5, 10, 15, 20, 25, 30, 35, 40, 45, 50, 55, 60, or more meters, when measured after a certain duration of treatment. In some embodiments, the individual has an increase in 6MWT distance by about any one of 0.5, 1, 5, 10, 15, 20, 25, 30, 35, 40, 45, 50, 55, 60 or more meters, when measured after a certain duration of treatment, including any value or range in between these values. In some embodiments, the individual has an increase in 6MWT % by at least about any one of 0.25%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, or more, when measured after a certain duration of treatment. In some embodiments, the individual has an increase in 6MWT % by about any one of 0.25%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, or more, when measured after a certain duration of treatment, including any value or range in between these values. In some embodiments, the individual has an increase in 6MWT distance or 6MWT % by at least about any one of 10%, 20%, 30%, 40%, 50%, 60%, 70%, 80%, 90% or more, relative to baseline when measured after a certain duration of treatment. In some embodiments, the individual has an increase in 6MWT distance or 6MWT % by no more than about any one of 90%, 80%, 70%, 60%, 50%, 40%, 30%, 20%, or 10% relative to baseline when measured after a certain duration of treatment. In some embodiments, the individual has an increase in 6MWT distance or 6MWT % by about any one of 10%, 20%, 30%, 40%, 50%, 60%, 70%, 80%, 90%, including any value or range in between these values. In some embodiments, the individual has an increase in 6MWT distance after receiving the treatment for a certain duration that is at least about 5, 10, 15, 20, 25, 30, 35, 40, 45, 50, 55, 60 meters or longer compared to that after treatment with alglucosidase alfa. In some embodiments, the individual has an increase in 6MWT % after receiving the treatment for a certain duration that is at least about 0.25%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, or more compared to that after treatment with alglucosidase alfa. In some embodiments, the 6MWT distance or 6MWT % of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an increase in 6MWT distance by about 0.57 m to about 35.47 m (e.g., about 18.02 m or more) after at least about 13 weeks of treatment. In some embodiments, the individual has an increase in 6MWT % by about 0.16% to about 5.52% (e.g., about 2.84% or more) after at least about 13 weeks of treatment. In some embodiments, the individual has an increase in 6MWT distance by about 7.43 m to about 47.09 m (e.g., about 27.26 m or more) after at least about 25 weeks of treatment. In some embodiments, the individual has an increase in 6MWT % by about 1.17% to about 7.28% (e.g., about 4.23% or more) after at least about 25 weeks of treatment. In some embodiments, the individual has an increase in 6MWT distance by about 10.44 m to about 46.62 m (e.g., about 28.43 m or more) after at least about 37 weeks of treatment. In some embodiments, the individual has an increase in 6MWT % by about 1.66% to about 7.23% (e.g., about 4.44% or more) after at least about 37 weeks of treatment. In some embodiments, the individual has an increase in 6MWT distance by about 12.47 m to about 51.94 m (e.g., about 32.21 m or more) after at least about 49 weeks of treatment. In some embodiments, the individual has an increase in 6MWT % by about 1.95% to about 8.09% (e.g., about 5.02% or more) after at least about 49 weeks of treatment.

In some embodiments, the individual has an increase in 6MWT distance after receiving at least about 13 weeks of the treatment that is at least about 2.91 m longer compared to that after treatment with alglucosidase alfa. In some embodiments, the individual has an increase in 6MWT % after receiving at least about 13 weeks of the treatment that is at least about 0.88% longer compared to that after treatment with alglucosidase alfa. In some embodiments, the individual has an increase in 6MWT distance after receiving at least about 25 weeks of the treatment that is at least about 17.67 m longer compared to that after treatment with alglucosidase alfa. In some embodiments, the individual has an increase in 6MWT % after receiving at least about 25 weeks of the treatment that is at least about 3.09% longer compared to that after treatment with alglucosidase alfa. In some embodiments, the individual has an increase in 6MWT distance after receiving at least about 37 weeks of the treatment that is at least about 12.94 m longer compared to that after treatment with alglucosidase alfa. In some embodiments, the individual has an increase in 6MWT % after receiving at least about 37 weeks of the treatment that is at least about 2.30% longer compared to that after treatment with alglucosidase alfa. In some embodiments, the individual has an increase in 6MWT distance after receiving at least about 49 weeks of the treatment that is at least about 30.01 m longer compared to that after treatment with alglucosidase alfa. In some embodiments, the individual has an increase in 6MWT % after receiving at least about 49 weeks of the treatment that is at least about 4.71% longer compared to that after treatment with alglucosidase alfa.

In some embodiments, the individual has an average increase in 6MWT distance of about 32.2 m, or between 30 m and 35 m, within a confidence interval after receiving 49 weeks of treatment. In some embodiments, the average increase in 6MWT distance is between 12.5 m to 51.9 m, or between 12 m and 52 m. In some embodiments, the confidence interval is a 95% confidence interval. In certain embodiments, the 95% confidence interval is between 12.5 m to 51.9 m, or between 12 m and 52 m. In other embodiments, the average increase in 6MWT distance is about 32.2 m with a 95% confidence interval of 12.5 m to 51.9 m, or between 12 m and 52 m, after the individual receives 49 weeks of treatment.

In some embodiments, the administration of the pharmaceutical composition to a plurality of individuals for 49 weeks results in an average increase in 6MWT distance of about 32.2 m within a confidence interval. In some embodiments, the average increase in 6MWT distance is between 12.5 m to 51.9 m. In some embodiments, the confidence interval is a 95% confidence interval. In certain embodiments, the 95% confidence interval is between 12.5 m to 51.9 m. In other embodiments, the average increase in 6MWT distance is about 32.2 M with a 95% confidence interval of 12.5 m to 51.9 m. In some embodiments, the plurality of individuals is 51 individuals.

In some embodiments, the individual has an increase in 6MWT distance of at least about 23 m after receiving 49 weeks of the treatment. In some embodiments, the individual has an increase in 6MWT distance of at least about 23 m after receiving 49 weeks of the treatment. In some embodiments, the individual has an increase in 6MWT distance of between 12.5 m and 52 m after receiving 49 weeks of treatment. In some embodiments, the individual has an increase in 6MWT distance of between 23 m and 52 m after receiving 49 weeks of treatment.

In some embodiments, the individual has an average increase in 6MWT % of about 5.0% within a confidence interval after receiving 49 weeks of treatment. In some embodiments, the average increase in 6MWT % is between 2.0% to 8.0%. In some embodiments, the confidence interval is a 95% confidence interval. In certain embodiments, the 95% confidence interval is between 2.0% to 8.0%. In other embodiments, the average increase in 6MWT % is about 5.0% with a 95% confidence interval of 2.0% to 8.0% after the individual receives 49 weeks of treatment.

In some embodiments, the administration of the pharmaceutical composition to a plurality of individuals for 49 weeks results in an average increase in 6MWT % of about 5.0% within a confidence interval. In some embodiments, the average increase in 6MWT % is between 2.0% to 8.0%. In some embodiments, the confidence interval is a 95% confidence interval. In certain embodiments, the 95% confidence interval is between 2.0% to 8.0% m. In other embodiments, the average increase in 6MWT % is about 5.0% with a 95% confidence interval of 2.0% to 8.0%. In some embodiments, the plurality of individuals is 51 individuals.

In some embodiments, the individual has an increase in 6MWT % of at least about 2.0% after receiving 49 weeks of the treatment. In some embodiments, the individual has an increase in 6MWT % of at least about 3.5% after receiving 49 weeks of the treatment. In some embodiments, the individual has an increase in 6MWT % of between 3.5% and 8.0% after receiving 49 weeks of treatment. In some embodiments, the individual has an increase in 6MWT % of between 2.0% and 8.0% after receiving 49 weeks of treatment.

Hand-held dynamometry (HHD) score is a clinical parameter for assessing muscle strength of patients having Pompe disease. HHD score measures the force exerted by a patient holding a dynamometer using a muscle being tested, e.g., arm or leg. For Pompe patients, HHD score for lower extremeties are typically measured. HHD score for upper extremities can also be measured for Pompe patients. As used herein, "HHD score percentage of predicted value" or "HHD %" refers to percent of predicted normal value of HHD score for a patient.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in hand-held dynamometry (HHD) score for lower extremities of at least about 170 Newtons (N), at least about 250 N, or at least about 350 N. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in hand-held dynamometry (HHD) score for lower extremities of about 260 Newtons (N) within a 95% confidence interval of about 169 N to about 352 N. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in HHD score for lower extremities by at least about 169.11 Newton (e.g., at least about 260.69 Newton) after receiving at least about 49 weeks of the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in HHD % for lower extremities by at least about 4.3% (e.g., at least about 6.97%) after receiving at least about 49 weeks of the treatment. In some embodiments, there is provided a method of increasing HHD score or HHD % for lower extremities in a human individual having an LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, and wherein the pharmaceutical composition is administered at a dose of about 20 mg/kg. In some embodiments, the oligosaccharide-protein conjugate is avalglucosidase alfa. In some embodiments, the individual has an increase in HHD score for lower extremities after receiving the treatment (e.g., at week 49 of the treatment) that is at least about 106.97 Newton higher compared to that after treatment with alglucosidase alfa. In some embodiments, the individual has an increase in HHD % for lower extremities after receiving the treatment (e.g., at week 49 of the treatment) that is at least about 2.18% higher compared to that after treatment with alglucosidase alfa.

In some embodiments, the individual has an increase in HHD score for lower extremities by at least about any one of 70, 80, 90, 100, 125, 150, 175, 200, 225, 250, 275, 300, 325, 350, 375 or more Newtons, when measured after a certain duration of treatment. In some embodiments, the individual has an increase in HHD score for lower extremities by about any one of 70, 80, 90, 100, 125, 150, 175, 200, 225, 250, 275, 300, 325, 350, 375 or more Newtons, when measured after a certain duration of treatment, including any value or range in between these values. In some embodiments, the individual has an increase in HHD % for lower extremities by at least about any one of 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, or more, when measured after a certain duration of treatment. In some embodiments, the individual has an increase in HHD % for lower extremities by about any one of 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, or more, when measured after a certain duration of treatment, including any value or range in between these values. In some embodiments, the individual has an increase in HHD score or HHD % for lower extremities by at least about any one of 10%, 20%, 30%, 40%, 50%, 60%, 70%, 80%, 90% or more, relative to baseline when measured after a certain duration of treatment. In some embodiments, the individual has an increase in HHD score or HHD % for lower extremities by no more than about any one of 90%, 80%, 70%, 60%, 50%, 40%, 30%, 20%, or 10% relative to baseline when measured after a certain duration of treatment. In some embodiments, the individual has an increase in HHD score or HHD % for lower extremities by about any one of 10%, 20%, 30%, 40%, 50%, 60%, 70%, 80%, 90%, including any value or range in between these values. In some embodiments, the individual has an increase in HHD score for lower extremities after receiving the treatment for a certain duration that is at least about 50, 60, 70, 80, 90, 100, 125, 150, 175, 200, 225, 250 Newtons or more compared to that after treatment with alglucosidase alfa. In some embodiments, the individual has an increase in HHD % for lower extremities after receiving the treatment for a certain duration that is at least about 0.25%, 0.5%, 1%, 1.5%, 2%, 2.5%, 3%, 3.5%, 4%, 4.5%, 5%, 5.5%, 6%, 6.5%, 7%, or more compared to that after treatment with alglucosidase alfa. In some embodiments, the HHD score or HHD % for lower extremities of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an increase in HHD score for lower extremities by about 70.75N to about 222.86N (e.g., about 146.8N or more) after at least about 13 weeks of treatment. In some embodiments, the individual has an increase in HHD % for lower extremities by about 1.58% to about 6.18% (e.g., about 3.88% or more) after at least about 13 weeks of treatment. In some embodiments, the individual has an increase in HHD score for lower extremities by about 132.22N to about 296.87N (e.g., about 214.54N or more) after at least about 25 weeks of treatment. In some embodiments, the individual has an increase in HHD % for lower extremities by about 2.7% to about 7.72% (e.g., about 5.21% or more) after at least about 25 weeks of treatment. In some embodiments, the individual has an increase in HHD score for lower extremities by about 148.84N to about 309.98N (e.g., about 229.41N or more) after at least about 37 weeks of treatment. In some embodiments, the individual has an increase in HHD % for lower extremities by about 3.16% to about 8.07% (e.g., about 5.61% or more) after at least about 37 weeks of treatment. In some embodiments, the individual has an increase in HHD score for lower extremities by about 169.11N to about 352.27N (e.g., about 260.69N or more) after at least about 49 weeks of treatment. In some embodiments, the individual has an increase in HHD % for lower extremities by about 4.30% to about 9.63% (e.g., about 6.97% or more) after at least about 49 weeks of treatment.

In some embodiments, the individual has an increase in HHD score for lower extremities after receiving at least about 13 weeks of the treatment that is at least about 59.51N higher compared to that after treatment with alglucosidase alfa. In some embodiments, the individual has an increase in HHD % for lower extremities after receiving at least about 13 weeks of the treatment that is at least about 1.49% longer compared to that after treatment with alglucosidase alfa. In some embodiments, the individual has an increase in HHD score for lower extremities after receiving at least about 25 weeks of the treatment that is at least about 115.38N higher compared to that after treatment with alglucosidase alfa. In some embodiments, the individual has an increase in HHD % for lower extremities after receiving at least about 25 weeks of the treatment that is at least about 2.08% longer compared to that after treatment with alglucosidase alfa. In some embodiments, the individual has an increase in HHD score for lower extremities after receiving at least about 37 weeks of the treatment that is at least about 70.57N higher compared to that after treatment with alglucosidase alfa. In some embodiments, the individual has an increase in HHD % for lower extremities after receiving at least about 37 weeks of the treatment that is at least about 0.81% longer compared to that after treatment with alglucosidase alfa. In some embodiments, the individual has an increase in HHD score for lower extremities after receiving at least about 49 weeks of the treatment that is at least about 106.97N higher compared to that after treatment with alglucosidase alfa. In some embodiments, the individual has an increase in HHD % for lower extremities after receiving at least about 49 weeks of the treatment that is at least about 2.18% longer compared to that after treatment with alglucosidase alfa.

In some embodiments, the individual has an average increase in HHD score for lower extremities of about 260.7 N, or between 250 N and 275 N, or between 255 N and 265 N, within a confidence interval after receiving 49 weeks of treatment. In some embodiments, the average increase in HHD score for lower extremities is between 169.1 N to 352.3 N, or between 169N and 352N. In some embodiments, the confidence interval is a 95% confidence interval. In certain embodiments, the 95% confidence interval is between 169.1 N to 352.3 N, or between 169N and 362N. In other embodiments, the average increase in HHD score for lower extremities is about 260.7 N with a 95% confidence interval of 169.1 N to 352.3 N, or between 169N and 352N after the individual receives 49 weeks of treatment.

In some embodiments, the administration of the pharmaceutical composition to a plurality of individuals for 49 weeks results in an average increase in HHD score for lower extremities of about 260.7 N within a confidence interval. In some embodiments, the average increase in HHD score for lower extremities is between 169.1 N to 352.3 N. In some embodiments, the confidence interval is a 95% confidence interval. In certain embodiments, the 95% confidence interval is between 169.1 N to 352.3 N. In other embodiments, the average increase in HHD score for lower extremities is about 260.7 N with a 95% confidence interval of 169.1 N to 352.3 N. In some embodiments, the plurality of individuals is 51 individuals.

In some embodiments, the individual has an increase in HHD score for lower extremities of at least about 202.3 N after receiving 49 weeks of the treatment. In some embodiments, the individual has an increase in HHD score for lower extremities in an upright position of at least about 214.6 N after receiving 49 weeks of the treatment. In some embodiments, the individual has an increase in HHD score for lower extremities in an upright position of between 214.6 N and 306.8 N after receiving 49 weeks of treatment. In some embodiments, the individual has an increase in HHD score for lower extremities in an upright position of between 202.3 N and 307 N after receiving 49 weeks of treatment.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in HHD score for upper extremities of at least about 95 N, at least about 190 N, or at least about 245 N. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in HHD score for upper extremities of about 174 N within a 95% confidence interval of about 97.8 N to about 249 N. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in HHD score for upper extremities by at least about 97.84 Newton (e.g., at least about 173.54 Newton) after receiving at least about 49 weeks of the treatment. In some embodiments, there is provided a method of increasing HHD score or HHD % for upper extremities in a human individual having an LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, and wherein the pharmaceutical composition is administered at a dose of about 20 mg/kg. In some embodiments, the oligosaccharide-protein conjugate is avalglucosidase alfa. In some embodiments, the individual has an increase in HHD score for upper extremities after receiving the treatment (e.g., at week 49 of the treatment) that is at least about 63.87 Newton higher compared to that after treatment with alglucosidase alfa.

In some embodiments, the individual has an increase in HHD score for upper extremities by at least about any one of 50, 60, 70, 80, 90, 100, 125, 150, 175, 200, 225, 250, 275, 300, 325, 350, 375 or more Newtons, when measured after a certain duration of treatment. In some embodiments, the individual has an increase in HHD score for upper extremities by about any one of 50, 60, 70, 80, 90, 100, 125, 150, 175, 200, 225, 250, 275, 300, 325, 350, 375 or more Newtons, when measured after a certain duration of treatment, including any value or range in between these values. In some embodiments, the individual has an increase in HHD score for upper extremities after receiving the treatment for a certain duration that is at least about 50, 60, 70, 80, 90, 100, 125, 150, 175, 200, 225, 250 Newtons or more compared to that after treatment with alglucosidase alfa. In some embodiments, the HHD score or HHD % for upper extremities of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an increase in HHD score for upper extremities by about 97.84N to about 249.25N (e.g., about 173.54N or more) after at least about 49 weeks of treatment.

In some embodiments, the individual has an average increase in HHD score for upper extremities of about 173.5 N, or between 170 N and 175 N, within a confidence interval after receiving 49 weeks of treatment. In some embodiments, the average increase in HHD score for upper extremities is between 97.8 N to 249.3 N, or between 95N and 250N. In some embodiments, the confidence interval is a 95% confidence interval. In certain embodiments, the 95% confidence interval is between 97.8 N to 249.3 N, or between 95N and 250N. In other embodiments, the average increase in HHD score for upper extremities is about 173.5 N with a 95% confidence interval of 97.8 N to 249.3 N, or between 95N and 250N after the individual receives 49 weeks of treatment.

In some embodiments, the administration of the pharmaceutical composition to a plurality of individuals for 49 weeks results in an average increase in HHD score for upper extremities of about 173.5 N within a confidence interval. In some embodiments, the average increase in HHD score for upper extremities is between 97.8 N to 249.3 N. In some embodiments, the confidence interval is a 95% confidence interval. In certain embodiments, the 95% confidence interval is between 97.8 N to 249.3 N. In other embodiments, the average increase in HHD score for upper extremities is about 173.5 N with a 95% confidence interval of 97.8 N to 249.3 N. In some embodiments, the plurality of individuals is 51 individuals.

In some embodiments, the individual has an increase in HHD score for upper extremities of at least about 148.7 N after receiving 49 weeks of the treatment. In some embodiments, the individual has an increase in HHD score for upper extremities of at least about 135.5 N after receiving 49 weeks of the treatment. In some embodiments, the individual has an increase in HHD score for upper extremities of between 135.5 N and 211.6 N after receiving 49 weeks of treatment. In some embodiments, the individual has an increase in HHD score for upper extremities of between 148.7 N and 212 N after receiving 49 weeks of treatment.

The Quick Motor Function Test (QMFT) is a clinical parameter for assessing motor functions of patients with Pompe disease (See, van Capelle, C. I., et al. *J Inherit Metab Dis.* 2012 35:2). The QMFT is a functional motor scale specific for Pompe disease, in which an evaluator observes the performance of a patient and scores them on 16 items (e.g., raising the torso, neck flexion, picking up an object, etc.) each on a 5-point scale.

In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in QMFT total score of at least about 2.72 (e.g., at least about 3.98) after receiving the treatment. In some embodiments, there is provided a method of increasing a QMFT score of a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the oligosaccharide-protein conjugate is avalglucosidase alfa. In some embodiments, the individual has an increase in QMFT total score after receiving the treatment (e.g., at week 49 of the treatment) that is at least about 2.08 higher compared to that after treatment with alglucosidase alfa.

In some embodiments, the individual has an increase in QMFT total score by at least about any one of 0.5, 1, 1.25, 1.5, 1.75, 2, 2.25, 2.5, 2.75, 3, 3.25, 3.5, 3.75, 4, 4.5, 4.75, 5, 5.25 or more, when measured after a certain duration of treatment. In some embodiments, the individual has an increase in QMFT total score by about any one of 0.5, 1, 1.25, 1.5, 1.75, 2, 2.25, 2.5, 2.75, 3, 3.25, 3.5, 3.75, 4, 4.5, 4.75, 5, 5.25, or more, when measured after a certain duration of treatment, including any value or range in between these values. In some embodiments, the individual has an increase in QMFT total score by at least about any one of 10%, 20%, 30%, 40%, 50%, 60%, 70%, 80%, 90% or more, relative to baseline when measured after a certain duration of treatment. In some embodiments, the individual has an increase in QMFT total score by no more than about any one of 90%, 80%, 70%, 60%, 50%, 40%, 30%, 20%, or 10% relative to baseline when measured after a certain duration of treatment. In some embodiments, the individual has an increase in QMFT total score by about any one of 10%, 20%, 30%, 40%, 50%, 60%, 70%, 80%, 90%, including any value or range in between these values. In some embodiments, the individual has an increase in QMFT total score after receiving the treatment for a certain duration that is at least about 0.25, 0.5, 1, 1.25, 1.5, 1.75, 2, 2.25, 2.5, 2.75, 3, 3.25, 3.5, 3.75, 4, or higher compared to that after treatment with alglucosidase alfa. In some embodiments, the QMFT total score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an increase in QMFT total score by about 0.91 to about 3.09 (e.g., about 2.00 or more) after at least about 13 weeks of treatment. In some embodiments, the individual has an increase in QMFT total score by about 2.18 to about 4.35 (e.g., about 3.27 or more) after at least about 25 weeks of treatment. In some embodiments, the individual has an increase in QMFT total score by about 2.60 to about 4.99 (e.g., about 3.79 or more) after at least about 37 weeks of treatment. In some embodiments, the individual has an increase in QMFT total score by about 2.72 to about 5.23 (e.g., about 3.98 or more) after at least about 49 weeks of treatment.

In some embodiments, the individual has an increase in QMFT total score after receiving at least about 13 weeks of the treatment that is at least about 0.9 higher compared to that after treatment with alglucosidase alfa. In some embodiments, the individual has an increase in QMFT total score after receiving at least about 25 weeks of the treatment that is at least about 1.32 higher compared to that after treatment with alglucosidase alfa. In some embodiments, the individual has an increase in QMFT total score after receiving at least about 37 weeks of the treatment that is at least about 2.13 higher compared to that after treatment with alglucosidase alfa. In some embodiments, the individual has an increase in QMFT total score after receiving at least about 49 weeks of the treatment that is at least about 2.08 higher compared to that after treatment with alglucosidase alfa.

In some embodiments, the individual has an average increase in QMTF total score of about 4.0, or between 1 and 5, or between 2 and 3, within a confidence interval after receiving 49 weeks of treatment. In some embodiments, the average increase in QMTF total score is between 2.7 to 5.2, or between 2.5 and 5.5. In some embodiments, the confidence interval is a 95% confidence interval. In certain embodiments, the 95% confidence interval is between 2.7 to 5.2, or between 2.5 and 5.5. In other embodiments, the average increase in QMTF total score is about 4.0 with a 95% confidence interval of 2.7 to 5.2, or between 2.5 and 5.5 after the individual receives 49 weeks of treatment.

In some embodiments, the administration of the pharmaceutical composition to a plurality of individuals for 49 weeks results in an average increase in QMTF total score of about 4.0 within a confidence interval. In some embodiments, the average increase in QMTF total score is between 2.7 to 5.2. In some embodiments, the confidence interval is a 95% confidence interval. In certain embodiments, the 95% confidence interval is between 2.7 to 5.2. In other embodiments, the average increase in QMTF total score is about 4.0 with a 95% confidence interval of 2.7 to 5.2. In some embodiments, the plurality of individuals is 51 individuals.

In some embodiments, the individual has an increase in QMFT total score of at least about 2.58 after receiving 49 weeks of the treatment. In some embodiments, the individual has an increase in QMFT total score of at least about 3.4 after receiving 49 weeks of the treatment. In some embodiments, the individual has an increase in QMFT total score of between 3.4 and 4.6 after receiving 49 weeks of treatment. In some embodiments, the individual has an increase in QMFT total score of between 2.58 and 5 after receiving 49 weeks of treatment.

Muscle weakness associated with LOPD and motor functions may be assessed using a Gross Motor Function Measure-88 (GMFM-88) score. GMFM-88 is an 88-item measurement that takes into consideration an individual's gross motor activities in the five dimensions of (1) lying and rolling, (2) sitting, (3) crawling and kneeling, (4) standing, and (5) walking, running and jumping. Each item is scored on a 4-point Likert scale (i.e., 0=cannot do; 1=initiates [<10% of the task]; 2=partially completes [10% to <100% of the task]; 3=task completion). The score for each dimension is expressed as a percentage of the maximum score for that dimension. Total score is obtained by adding the percentage scores for each dimension and dividing the sum by the total number of dimensions. Therefore, each dimension contributes equally to the total score. GMFM-88 is used in the art according to a published manual (Russell, D. J., et al. *Gross Motor Function Measure* (GMFM-66 & GMFM-88) *User's Manual*, 2nd edition 2013). The GMFM-88 has been used to evaluate children and adults with Pompe disease (Winkel, L. P. et al., *Ann Neurol.* 2004 55:4) and can be used to measure change in motor performance over time secondary to an improvement or decline in muscle strength.

In some embodiments, the individual has increased GMFM-88 score after treatment. In some embodiments, the GMFM-88 score increases by at least about any one of 3%, 4%, 5%, 6%, 7%, 8%, 9%, 10%, 11%, 12%, 13%, 14%, 15%, or more including any value or range in between these values. In some embodiments, the GMFM-88 score increases by at least about any one of 5%, 10%, 20%, 30%, 40%, 50%, 60%, 70%, 80%, 90% or more, relative to baseline when measured after a certain duration of treatment. In some embodiments, the GMFM-88 score increases by no more than about any one of 90%, 80%, 70%, 60%, 50%, 40%, 30%, 20%, or 10% relative to baseline when measured after a certain duration of treatment. In some embodiments, the GMFM-88 score increases by about any one of 5%, 10%, 20%, 30%, 40%, 50%, 60%, 70%, 80%, or 90%, including any value or range in between these values. In some embodiments, the GMFM-88 score is determined after treatment of about any one of 1 months, 3 months, 6 months, 25 weeks, 7 months, 8 months, 9 months, 12 months, 2 years, 5 years, 10 years or more, including any value or range in between these values.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase of GMFM-88 Dimension D score of at least about 2.2, at least about 3.3, or at least about 5.8. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase of GMFM-88 Dimension D score of about 4.0 within a 95% confidence interval of about 2.2 to about 5.8. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in GMFM-88 dimension D of at least about 2.24 (e.g., at least about 4.02) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in GMFM-88 dimension E of at least about 0.72 (e.g., at least about 2.63) after receiving the treatment. In some embodiments, there is provided a method of increasing muscle strength or motor functions (e.g., GMFM-88 dimension D and/or dimension E) of a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the oligosaccharide-protein conjugate is avalglucosidase alfa.

In some embodiments, the individual has an increase in GMFM-88 dimension D by at least about any one of 0.25, 0.50, 0.75, 1, 1.25, 1.5, 1.75, 2, 2.5, 3, 3.5, 4, or more, when measured after a certain duration of treatment. In some embodiments, the individual has an increase in GMFM-88 dimension D by about any one of 0.25, 0.50, 0.75, 1, 1.25, 1.5, 1.75, 2, 2.5, 3, 3.5, 4, or more, when measured after a certain duration of treatment, including any value or range in between these values. In some embodiments, the individual has an increase in GMFM-88 dimension D by at least about any one of 10%, 20%, 30%, 40%, 50%, 60%, 70%, 80%, 90% or more, relative to baseline when measured after a certain duration of treatment. In some embodiments, the individual has an increase in GMFM-88 dimension D by no more than about any one of 90%, 80%, 70%, 60%, 50%, 40%, 30%, 20%, or 10% relative to baseline when measured after a certain duration of treatment. In some embodiments, the individual has an increase in GMFM-88 dimension D by about any one of 10%, 20%, 30%, 40%, 50%, 60%, 70%, 80%, 90%, including any value or range in between these values. In some embodiments, the individual has an increase in GMFM-88 dimension D after receiving the treatment for a certain duration that is at least about 0.25, 0.50, 0.75, 1, 1.25, 1.5, 1.75, 2, 2.5, 3, 3.5, 4, or higher compared to that after treatment with alglucosidase alfa. In some embodiments, the GMFM-88 dimension D of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in GMFM-88 dimension D of about 4.02, or between 2 and 6, or between 3 and 5 within a confidence interval after receiving 49 weeks of treatment. In some embodiments, the average increase in GMFM-88 dimension D is between 2.2 to 5.8, or between 2 and 6. In some embodiments, the confidence interval is a 95% confidence interval. In certain embodiments, the 95% confidence interval is between 2.2 to 5.8, or between 2 and 6. In other embodiments, the average increase in GMFM-88 dimension D is about 4.02 with a 95% confidence interval of 2.2 to 5.8, or between 2 and 6 after the individual receives 49 weeks of treatment.

In some embodiments, the administration of the pharmaceutical composition to a plurality of individuals for 49 weeks results in an average increase in GMFM-88 dimension D of about 2.6 within a confidence interval. In some embodiments, the average increase in GMFM-88 dimension D is between 2.2 to 5.8. In some embodiments, the confidence interval is a 95% confidence interval. In certain embodiments, the 95% confidence interval is between 2.2 to 5.8. In other embodiments, the average increase in GMFM-88 dimension D is about 2.6 with a 95% confidence interval of 2.2 to 5.8. In some embodiments, the plurality of individuals is 51 individuals.

In some embodiments, the individual has an increase in GMFM-88 dimension D of at least about 2.4 after receiving 49 weeks of the treatment. In some embodiments, the individual has an increase in GMFM-88 dimension D of at least about 3.1 after receiving 49 weeks of the treatment. In some embodiments, the individual has an increase in GMFM-88 dimension D of between 3.1 and 4.9 after receiving 49 weeks of treatment. In some embodiments, the individual has an increase in GMFM-88 dimension D of between 2.4 and 5.0 after receiving 49 weeks of treatment.

In some embodiments, the individual has an increase in GMFM-88 dimension E by at least about any one of 0.25, 0.50, 0.75, 1, 1.25, 1.5, 1.75, 2, 2.5, 3, 3.5, 4, or more, when measured after a certain duration of treatment. In some embodiments, the individual has an increase in GMFM-88 dimension E by about any one of 0.25, 0.50, 0.75, 1, 1.25, 1.5, 1.75, 2, 2.5, 3, 3.5, 4, or more, when measured after a certain duration of treatment, including any value or range in between these values. In some embodiments, the individual has an increase in GMFM-88 dimension E by at least about any one of 10%, 20%, 30%, 40%, 50%, 60%, 70%, 80%, 90% or more, relative to baseline when measured after a certain duration of treatment. In some embodiments, the individual has an increase in GMFM-88 dimension E by no more than about any one of 90%, 80%, 70%, 60%, 50%, 40%, 30%, 20%, or 10% relative to baseline when measured after a certain duration of treatment. In some embodiments, the individual has an increase in GMFM-88 dimension E by about any one of 10%, 20%, 30%, 40%, 50%, 60%, 70%, 80%, 90%, including any value or range in between these values. In some embodiments, the individual has an increase in GMFM-88 dimension E after receiving the treatment for a certain duration that is at least about 0.25, 0.50, 0.75, 1, 1.25, 1.5, 1.75, 2, 2.5, 3, 3.5, 4, or higher compared to that after treatment with alglucosidase alfa. In some embodiments, the GMFM-88 dimension E of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in GMFM-88 dimension E of about 2.62, or between 1 and 5, or between 2 and 3 within a confidence interval after receiving 49 weeks of treatment. In some embodiments, the average increase in GMFM-88 dimension E is between 0.7 to 4.5, or between 0.5 and 5. In some embodiments, the confidence interval is a 95% confidence interval. In certain embodiments, the 95% confidence interval is between 0.7 to 4.5, or between 0.5 and 5. In other embodiments, the average increase in GMFM-88 dimension E is about 2.6 with a 95% confidence interval of 0.7 to 4.5, or between 0.5 and 5 after the individual receives 49 weeks of treatment.

In some embodiments, the administration of the pharmaceutical composition to a plurality of individuals for 49 weeks results in an average increase in GMFM-88 dimension E of about 2.6 within a confidence interval. In some embodiments, the average increase in GMFM-88 dimension E is between 0.7 to 4.5. In some embodiments, the confidence interval is a 95% confidence interval. In certain embodiments, the 95% confidence interval is between 0.7 to 4.5. In other embodiments, the average increase in GMFM-88 dimension E is about 2.6 with a 95% confidence interval of 0.7 to 4.5. In some embodiments, the plurality of individuals is 51 individuals.

In some embodiments, the individual has an increase in GMFM-88 dimension E of at least about 3.9 after receiving 49 weeks of the treatment. In some embodiments, the individual has an increase in GMFM-88 dimension E of at least about 1.7 after receiving 49 weeks of the treatment. In some embodiments, the individual has an increase in GMFM-88 dimension E of between 1.7 and 3.6 after receiving 49 weeks of treatment. In some embodiments, the individual has an increase in GMFM-88 dimension E of between 3.6 and 4.0 after receiving 49 weeks of treatment.

Muscle weakness associated with LOPD and motor functions may be assessed using a Gait, Stair, Gower's Maneuver, and Chair (GSGC) functional ability score. The GSGC score provides a detailed picture of motor function by including quantitative measures of four main motor performances (G=Gait by walking for 10 meters, S=climbing 4 steps on a Stair, G=Gower's maneuver, C=rising from a Chair) and a qualitative global assessment of the manner to accomplish them. See, for example, Angelini C. et al., Muscle & Nerve, 2012, 45: 831-834. In some embodiments, the individual has decreased GSGC score after treatment.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average change of Gait, Stair, Gower's Maneuver, and Chair (GSGC) score of at least about −0.9, at least about −0.35, or at least about 0.40. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average change of Gait, Stair, Gower's Maneuver, and Chair (GSGC) score of about −0.25 within a 95% confidence interval of about −0.94 to about 0.43. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has a decrese in GSCS of at least about 0.25 (e.g., at least about 0.94) after receiving the treatment. In some embodiments, there is provided a method of increasing muscle strength and motor functions (e.g., a decrease in GSCS) of a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the oligosaccharide-protein conjugate is avalglucosidase alfa.

In some embodiments, the individual has a decrease in GSCS by at least about any one of 0.25, 0.50, 0.75, 1, 1.25, 1.5, 1.75, 2, 2.5, 3, or more, when measured after a certain duration of treatment. In some embodiments, the individual has a decrease GSCS by about any one of 0.25, 0.50, 0.75, 1, 1.25, 1.5, 1.75, 2, 2.5, 3, or more, when measured after a certain duration of treatment, including any value or range in between these values. In some embodiments, the individual has a decrease in GSCS by at least about any one of 10%, 20%, 30%, 40%, 50%, 60%, 70%, 80%, 90% or more, relative to baseline when measured after a certain duration of treatment. In some embodiments, the individual has a decrease in GSCS by no more than about any one of 90%, 80%, 70%, 60%, 50%, 40%, 30%, 20%, or 10% relative to baseline when measured after a certain duration of treatment. In some embodiments, the individual has a decrease in GSCS by about any one of 10%, 20%, 30%, 40%, 50%, 60%, 70%, 80%, 90%, including any value or range in between these values. In some embodiments, the individual has a decrease in GSCS after receiving the treatment for a certain duration that is at least about 0.25, 0.50, 0.75, 1, 1.25, 1.5, 1.75, 2, 2.5, 3, or higher compared to that after treatment with alglucosidase alfa. In some embodiments, the GSCS of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average a change in GSCS of about 0.25, or between 0 and 0.5 within a confidence interval after receiving 49 weeks of treatment. In some embodiments, the average change in GSCS is between −0.4 to 0.9, or between −0.5 and 1. In some embodiments, the confidence interval is a 95% confidence interval. In certain embodiments, the 95% confidence interval is between −0.4 to 0.9, or between −0.5 and 1. In other embodiments, the average change in GSCS is about 0.25 with a 95% confidence interval of −0.4 to 0.9, or between −0.5 and 1 after the individual receives 49 weeks of treatment.

In some embodiments, the administration of the pharmaceutical composition to a plurality of individuals for 49 weeks results in an average change in GSCS of about 0.25 within a confidence interval. In some embodiments, the average change in GSCS is between −0.4 to 0.9. In some embodiments, the confidence interval is a 95% confidence interval. In certain embodiments, the 95% confidence interval is between −0.4 to 0.9. In other embodiments, the average change in GSCS is about 0.25 with a 95% confidence interval of −0.4 to 0.9. In some embodiments, the plurality of individuals is 51 individuals.

In some embodiments, the individual has a decrease in GSCS of at least about 1.8 after receiving 49 weeks of the treatment. In some embodiments, the individual has a decrease in GSCS of at least about 0.6 after receiving 49 weeks of the treatment. In some embodiments, the individual has a decrease in GSCS of between 0.6 and 1.8 after receiving 49 weeks of treatment.

The health-related quality of life Short Form 12 (SF-12®) is a questionnaire consisting of twelve questions that measure eight health domains to assess physical and mental health. The Physical component score (PCS) of SF-12® is used for assessing physical health of a patient, and the mental component score of SF-12® is used for assessing mental health of a patient. Efficacy of the treatment may also be assessed using other health-related quality of life measures including, for example, EuroQoL in 5 dimensions (EQ-5D-5L), Pediatric Quality of Life Inventory (PedsQL) Generic Core Scale.

In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in health-related quality of life Short Form 12 Health Survey (SF-12®) physical component score (PCS) of at least about 0.4, at least about 3.7, or at least about 4.3%. In some embodiments, there is provided a method of treating LOPD in a human individual or a plurality of human individuals, comprising administering to the individual or each of the plurality of human individuals a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, wherein administration of the pharmaceutical composition to a plurality of human individuals for 49 weeks results in an average increase in health-related quality of life Short Form 12 Health Survey (SF-12®) physical component score (PCS) of 2.4 within a 95% confidence interval of about 0.40 to about 4.4. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in SF-12® PCS of at least about 0.40 (e.g., at least about 2.37) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in SF-12® MCS of at least about 0.47 (e.g., at least about 2.88) after receiving the treatment. In some embodiments, there is provided a method of increasing a health-related quality of life (e.g., SF-12® PCS and/or MCS) of a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the oligosaccharide-protein conjugate is avalglucosidase alfa. In some embodiments, the individual has an increase in SF-12® PCS after receiving the treatment (e.g., at week 49 of the treatment) that is at least about 0.77 higher compared to that after treatment with alglucosidase alfa. In some embodiments, the individual has an increase in SF-12® MCS after receiving the treatment (e.g., at week 49 of the treatment) that is at least about 2.12 higher compared to that after treatment with alglucosidase alfa.

In some embodiments, the individual has an increase in SF-12® PCS by at least about any one of 0.5, 1, 1.25, 1.5, 1.75, 2, 2.25, 2.5, 2.75, 3, 3.25, 3.5, 3.75, 4, 4.5, or more, when measured after a certain duration of treatment. In some embodiments, the individual has an increase in SF-12® PCS by about any one of 0.5, 1, 1.25, 1.5, 1.75, 2, 2.25, 2.5, 2.75, 3, 3.25, 3.5, 3.75, 4, 4.5, or more, when measured after a certain duration of treatment, including any value or range in between these values. In some embodiments, the individual has an increase in SF-12® PCS by at least about any one of 10%, 20%, 30%, 40%, 50%, 60%, 70%, 80%, 90% or more, relative to baseline when measured after a certain duration of treatment. In some embodiments, the individual has an increase in SF-12® PCS by no more than about any one of 90%, 80%, 70%, 60%, 50%, 40%, 30%, 20%, or 10% relative to baseline when measured after a certain duration of treatment. In some embodiments, the individual has an increase in SF-12® PCS by about any one of 10%, 20%, 30%, 40%, 50%, 60%, 70%, 80%, 90%, including any value or range in between these values. In some embodiments, the individual has an increase in SF-12® PCS after receiving the treatment for a certain duration that is at least about 0.25, 0.5, 1, 1.25, 1.5, 1.75, 2, 2.25, 2.5, or higher compared to that after treatment with alglucosidase alfa. In some embodiments, the SF-12® PCS of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an increase in SF-12® PCS by up to about 2.54 (e.g., about 1.03 or more) after at least about 13 weeks of treatment. In some embodiments, the individual has an increase in SF-12® PCS by about 1.32 to about 4.54 (e.g., about 2.93 or more) after at least about 25 weeks of treatment. In some embodiments, the individual has an increase in SF-12® PCS by about 0.77 to about 3.95 (e.g., about 2.36 or more) after at least about 37 weeks of treatment. In some embodiments, the individual has an increase in SF-12® PCS by about 0.40 to about 4.34 (e.g., about 2.37 or more) after at least about 49 weeks of treatment.

In some embodiments, the individual has an increase in SF-12® PCS after receiving at least about 25 weeks of the treatment that is at least about 0.9 higher compared to that after treatment with alglucosidase alfa. In some embodiments, the individual has an increase in SF-12® PCS after receiving at least about 49 weeks of the treatment that is at least about 0.77 higher compared to that after treatment with alglucosidase alfa.

In some embodiments, the individual has an average increase in SF-12® PCS of about 2.4, or between 0.5 and 4, or between 2 and 3 within a confidence interval after receiving 49 weeks of treatment. In some embodiments, the average increase in SF-12® PCS is between 0.4 to 4.3, or between 0.5 and 4.5. In some embodiments, the confidence interval is a 95% confidence interval. In certain embodiments, the 95% confidence interval is between 0.4 to 4.3, or between 0.5 and 4.5. In other embodiments, the average increase in SF-12® PCS is about 2.4 with a 95% confidence interval of 0.4 to 4.3, or between 0.5 and 4.5 after the individual receives 49 weeks of treatment.

In some embodiments, the administration of the pharmaceutical composition to a plurality of individuals for 49 weeks results in an average increase in SF-12® PCS of about 2.4 within a confidence interval. In some embodiments, the average increase in SF-12® PCS is between 0.4 to 4.3. In some embodiments, the confidence interval is a 95% confidence interval. In certain embodiments, the 95% confidence interval is between 0.4 to 4.3. In other embodiments, the average increase in SF-12® PCS is about 2.4 with a 95% confidence interval of 0.4 to 4.3. In some embodiments, the plurality of individuals is 51 individuals.

In some embodiments, the individual has an increase in SF-12® PCS of at least about 2.7 after receiving 49 weeks of the treatment. In some embodiments, the individual has an increase in SF-12® PCS of at least about 1.4 after receiving 49 weeks of the treatment. In some embodiments, the individual has an increase in SF-12® PCS of between 1.4 and 3.4 after receiving 49 weeks of treatment. In some embodiments, the individual has an increase in SF-12® PCS of between 2.7 and 3.4 after receiving 49 weeks of treatment.

In some embodiments, the individual has an increase in SF-12® MCS by at least about any one of 0.5, 1, 1.25, 1.5, 1.75, 2, 2.25, 2.5, 2.75, 3, 3.25, 3.5, 3.75, 4, 4.5, 5, 5.5 or more, when measured after a certain duration of treatment. In some embodiments, the individual has an increase in SF-12® MCS by about any one of 0.5, 1, 1.25, 1.5, 1.75, 2, 2.25, 2.5, 2.75, 3, 3.25, 3.5, 3.75, 4, 4.5, 5, 5.5 or more, when measured after a certain duration of treatment, including any value or range in between these values. In some embodiments, the individual has an increase in SF-12® MCS by at least about any one of 10%, 20%, 30%, 40%, 50%, 60%, 70%, 80%, 90% or more, relative to baseline when measured after a certain duration of treatment. In some embodiments, the individual has an increase in SF-12® MCS by no more than about any one of 90%, 80%, 70%, 60%, 50%, 40%, 30%, 20%, or 10% relative to baseline when measured after a certain duration of treatment. In some embodiments, the individual has an increase in SF-12® MCS by about any one of 10%, 20%, 30%, 40%, 50%, 60%, 70%, 80%, 90%, including any value or range in between these values. In some embodiments, the individual has an increase in SF-12® MCS after receiving the treatment for a certain duration that is at least about 0.25, 0.5, 1, 1.25, 1.5, 1.75, 2, 2.25, 2.5, 2.75, 3, 3.25, or higher compared to that after treatment with alglucosidase alfa. In some embodiments, the SF-12® MCS of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an increase in SF-12® MCS by up to about 3.14 (e.g., about 0.99 or more) after at least about 13 weeks of treatment. In some embodiments, the individual has an increase in SF-12® MCS by up to about 4.00 (e.g., about 1.98 or more) after at least about 25 weeks of treatment. In some embodiments, the individual has an increase in SF-12® MCS by about 0.69 to about 4.74 (e.g., about 2.72 or more) after at least about 37 weeks of treatment. In some embodiments, the individual has an increase in SF-12® MCS by about 0.47 to about 5.30 (e.g., about 2.88 or more) after at least about 49 weeks of treatment.

In some embodiments, the individual has an increase in SF-12® MCS after receiving at least about 25 weeks of the treatment that is at least about 0.69 higher compared to that after treatment with alglucosidase alfa. In some embodiments, the individual has an increase in SF-12® MCS after receiving at least about 37 weeks of the treatment that is at least about 3.13 higher compared to that after treatment with alglucosidase alfa. In some embodiments, the individual has an increase in SF-12® MCS after receiving at least about 49 weeks of the treatment that is at least about 2.12 higher compared to that after treatment with alglucosidase alfa.

In some embodiments, the individual has an average increase in SF-12® MCS of about 2.9, or between 0.5 and 5, or between 2 and 3 within a confidence interval after receiving 49 weeks of treatment. In some embodiments, the average increase in SF-12® MCS is between 0.5 to 5.3, or between 0.5 and 5.5. In some embodiments, the confidence interval is a 95% confidence interval. In certain embodiments, the 95% confidence interval is between 0.5 to 5.3, or between 0.5 and 5.5. In other embodiments, the average increase in SF-12® MCS is about 2.9 with a 95% confidence interval of 0.5 to 5.3, or between 0.5 and 5.5 after the individual receives 49 weeks of treatment.

In some embodiments, the administration of the pharmaceutical composition to a plurality of individuals for 49 weeks results in an average increase in SF-12® MCS of about 2.9 within a confidence interval. In some embodiments, the average increase in SF-12® MCS is between 0.5 to 5.3. In some embodiments, the confidence interval is a 95% confidence interval. In certain embodiments, the 95% confidence interval is between 0.5 to 5.3. In other embodiments, the average increase in SF-12® MCS is about 2.9 with a 95% confidence interval of 0.5 to 5.3. In some embodiments, the plurality of individuals is 51 individuals.

In some embodiments, the individual has an increase in SF-12® MCS of at least about 2.1 after receiving 49 weeks of the treatment. In some embodiments, the individual has an increase in SF-12® MCS of at least about 1.7 after receiving 49 weeks of the treatment. In some embodiments, the individual has an increase in SF-12® MCS of between 1.7 and 4.1 after receiving 49 weeks of treatment. In some embodiments, the individual has an increase in SF-12® MCS of between 2.1 and 4.1 after receiving 49 weeks of treatment.

The EuroQoL in 5 dimensions (EQ-5D-5L, also known as the EuroQol 5 Dimensions 5 Response levels Scale) measures health-related quality of life in Pompe patients. The EQ-5D-5L score comprises scores in five dimensions: mobility, self-care, usual activities, pain/discomfort and anxiety/depression. Each dimension has five levels: no problems, slight problems, moderate problems, severe problems and extreme problems. The EuroQol 5 Dimensions Visual Analogue Scale (EQ-VAS) score is another component of the EQ-5D-5L score. In some embodiments, the individual has decreased EQ-5D-5L score in mone or more dimentsions and/or an increase in EQ-VAS score after treatment.

In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has a decrease in EQ-5D-5L Mobility score of at least about 0.26 (e.g., at least about 0.47) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has a decrease in EQ-5D-5L Self-Care score of at least about 0.07 (e.g., at least about 0.13) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has a decrease in EQ-5D-5L Usual Activities score of at least about 0.08 (e.g., at least about 0.30) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has a decrease in EQ-5D-5L Pain/Discomfort score of at least about 0.04 (e.g., at least about 0.27) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has a decrease in EQ-5D-5L Anxiety/Depression score of at least about 0.19 (e.g., at least about 0.36) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in EQ-VAS score of at least about 3.53 (e.g., at least about 7.49) after receiving the treatment. In some embodiments, there is provided a method of increasing a health-related quality of life (e.g., EQ-5D-5L in one or more dimensions and/or EQ-VAS) of a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the oligosaccharide-protein conjugate is avalglucosidase alfa.

In some embodiments, the individual has a decrease in EQ-5D-5L Mobility score by at least about any one of 0.1, 0.2, 0.3, 0.4, 0.5, 1, 1.5, 2, or more, when measured after a certain duration of treatment. In some embodiments, the individual has a decrease in EQ-5D-5L Mobility score by about any one of 0.1, 0.2, 0.3, 0.4, 0.5, 1, 1.5, 2, or more, when measured after a certain duration of treatment, including any value or range in between these values. In some embodiments, the individual has a decrease in EQ-5D-5L Mobility score by at least about any one of 10%, 20%, 30%, 40%, 50%, 60%, 70%, 80%, 90% or more, relative to baseline when measured after a certain duration of treatment. In some embodiments, the individual has a decrease in EQ-5D-5L Mobility score by no more than about any one of 90%, 80%, 70%, 60%, 50%, 40%, 30%, 20%, or 10% relative to baseline when measured after a certain duration of treatment. In some embodiments, the individual has a decrease in EQ-5D-5L Mobility score by about any one of 10%, 20%, 30%, 40%, 50%, 60%, 70%, 80%, 90%, including any value or range in between these values. In some embodiments, the individual has a decrease in EQ-5D-5L Mobility score after receiving the treatment for a certain duration that is at least about 0.1, 0.2, 0.3, 0.4, 0.5, 1, 1.5, 2, or higher compared to that after treatment with alglucosidase alfa. In some embodiments, the EQ-5D-5L Mobility score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average decrease in EQ-5D-5L Mobility score of about 0.47, or between 0.3 and 0.7, or between 0.4 and 0.5 within a confidence interval after receiving 49 weeks of treatment. In some embodiments, the average decrease in EQ-5D-5L Mobility score is between 0.3 to 0.7. In some embodiments, the confidence interval is a 95% confidence interval. In certain embodiments, the 95% confidence interval is between 0.3 to 0.7. In other embodiments, the average decrease in EQ-5D-5L Mobility score is about 0.47 with a 95% confidence interval of 0.3 to 0.7 after the individual receives 49 weeks of treatment.

In some embodiments, the administration of the pharmaceutical composition to a plurality of individuals for 49 weeks results in an average decrease in EQ-5D-5L Mobility score decrease in EQ-5D-5L Mobility score of about 0.47 within a confidence interval. In some embodiments, the average decrease in EQ-5D-5L Mobility score is between 0.3 to 0.7. In some embodiments, the confidence interval is a 95% confidence interval. In certain embodiments, the 95% confidence interval is between 0.3 to 0.7. In other embodiments, the average decrease in EQ-5D-5L Mobility score is about 0.47 with a 95% confidence interval of 0.3 to 0.7. In some embodiments, the plurality of individuals is 51 individuals.

In some embodiments, the individual has decrease in EQ-5D-5L Mobility score of at least about 0.3 after receiving 49 weeks of the treatment. In some embodiments, the individual has decrease in EQ-5D-5L Mobility score of at least about 0.4 after receiving 49 weeks of the treatment. In some embodiments, the individual has decrease in EQ-5D-5L Mobility score of between 0.4 and 0.6 after receiving 49 weeks of treatment. In some embodiments, the individual has decrease in EQ-5D-5L Mobility score of between 0.3 and 1.0 after receiving 49 weeks of treatment.

In some embodiments, the individual has a decrease in EQ-5D-5L Self-Care score by at least about any one of 0.1, 0.2, 0.3, 0.4, 0.5, 1, 1.5, 2, or more, when measured after a certain duration of treatment. In some embodiments, the individual has a decrease in EQ-5D-5L Self-Care score by about any one of 0.1, 0.2, 0.3, 0.4, 0.5, 1, 1.5, 2, or more, when measured after a certain duration of treatment, including any value or range in between these values. In some embodiments, the individual has a decrease in EQ-5D-5L Self-Care score by at least about any one of 10%, 20%, 30%, 40%, 50%, 60%, 70%, 80%, 90% or more, relative to baseline when measured after a certain duration of treatment. In some embodiments, the individual has a decrease in EQ-5D-5L Self-Care score by no more than about any one of 90%, 80%, 70%, 60%, 50%, 40%, 30%, 20%, or 10% relative to baseline when measured after a certain duration of treatment. In some embodiments, the individual has a decrease in EQ-5D-5L Self-Care score by about any one of 10%, 20%, 30%, 40%, 50%, 60%, 70%, 80%, 90%, including any value or range in between these values. In some embodiments, the individual has a decrease in EQ-5D-5L Self-Care score after receiving the treatment for a certain duration that is at least about 0.1, 0.2, 0.3, 0.4, 0.5, 1, 1.5, 2, or higher compared to that after treatment with alglucosidase alfa. In some embodiments, the EQ-5D-5L Self-Care score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average decrease in EQ-5D-5L Self-care score of about 0.13, or between 0.1 and 0.2 within a confidence interval after receiving 49 weeks of treatment. In some embodiments, the average decrease in EQ-5D-5L Self-care score is between 0.1 to 0.33, or between 0.1 and 0.4. In some embodiments, the confidence interval is a 95% confidence interval. In certain embodiments, the 95% confidence interval is between 0.1 to 0.33, or between 0.1 and 0.4. In other embodiments, the average decrease in EQ-5D-5L Self-care score is about 0.13 with a 95% confidence interval of 0.1 to 0.33, or between 0.1 and 0.4 after the individual receives 49 weeks of treatment.

In some embodiments, the administration of the pharmaceutical composition to a plurality of individuals for 49 weeks results in an average decrease in EQ-5D-5L Self-care score decrease in EQ-5D-5L Self-care score of about 0.13 within a confidence interval. In some embodiments, the average decrease in EQ-5D-5L Self-care score is between 0.1 to 0.33. In some embodiments, the confidence interval is a 95% confidence interval. In certain embodiments, the 95% confidence interval is between 0.1 to 0.33. In other embodiments, the average decrease in EQ-5D-5L Self-care score is about 0.13 with a 95% confidence interval of 0.1 to 0.33. In some embodiments, the plurality of individuals is 51 individuals.

In some embodiments, the individual has decrease in EQ-5D-5L Self-care score of at least about 0.1 after receiving 49 weeks of the treatment. In some embodiments, the individual has decrease in EQ-5D-5L Self-care score of at least about 0.03 after receiving 49 weeks of the treatment. In some embodiments, the individual has decrease in EQ-5D-5L Self-care score of between 0.03 and 0.2 after receiving 49 weeks of treatment. In some embodiments, the individual has decrease in EQ-5D-5L Self-care score of between 0.1 and 0.2 after receiving 49 weeks of treatment.

In some embodiments, the individual has a decrease in EQ-5D-5L Usual Activities score by at least about any one of 0.1, 0.2, 0.3, 0.4, 0.5, 1, 1.5, 2, or more, when measured after a certain duration of treatment. In some embodiments, the individual has a decrease in EQ-5D-5L Usual Activities score by about any one of 0.1, 0.2, 0.3, 0.4, 0.5, 1, 1.5, 2, or more, when measured after a certain duration of treatment, including any value or range in between these values. In some embodiments, the individual has a decrease in EQ-5D-5L Usual Activities score by at least about any one of 10%, 20%, 30%, 40%, 50%, 60%, 70%, 80%, 90% or more, relative to baseline when measured after a certain duration of treatment. In some embodiments, the individual has a decrease in EQ-5D-5L Usual Activities score by no more than about any one of 90%, 80%, 70%, 60%, 50%, 40%, 30%, 20%, or 10% relative to baseline when measured after a certain duration of treatment. In some embodiments, the individual has a decrease in EQ-5D-5L Usual Activities score by about any one of 10%, 20%, 30%, 40%, 50%, 60%, 70%, 80%, 90%, including any value or range in between these values. In some embodiments, the individual has a decrease in EQ-5D-5L Usual Activities score after receiving the treatment for a certain duration that is at least about 0.1, 0.2, 0.3, 0.4, 0.5, 1, 1.5, 2, or higher compared to that after treatment with alglucosidase alfa. In some embodiments, the EQ-5D-5L Usual Activities score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average decrease in EQ-5D-5L Usual Activities score of about 0.3 within a confidence interval after receiving 49 weeks of treatment. In some embodiments, the average decrease in EQ-5D-5L Usual Activities score is between 0.1 to 0.52, or between 0.1 and 0.5. In some embodiments, the confidence interval is a 95% confidence interval. In certain embodiments, the 95% confidence interval is between 0.1 to 0.52, or between 0.1 and 0.5. In other embodiments, the average decrease in EQ-5D-5L Usual Activities score is about 0.3 with a 95% confidence interval of 0.1 to 0.52, or between 0.1 and 0.5 after the individual receives 49 weeks of treatment.

In some embodiments, the administration of the pharmaceutical composition to a plurality of individuals for 49 weeks results in an average decrease in EQ-5D-5L Usual Activities score decrease in EQ-5D-5L Usual Activities score of about 0.3 within a confidence interval. In some embodiments, the average decrease in EQ-5D-5L Usual Activities score is between 0.1 to 0.52. In some embodiments, the confidence interval is a 95% confidence interval. In certain embodiments, the 95% confidence interval is between 0.1 to 0.52. In other embodiments, the average decrease in EQ-5D-5L Usual Activities score is about 0.3 with a 95% confidence interval of 0.1 to 0.52. In some embodiments, the plurality of individuals is 51 individuals.

In some embodiments, the individual has decrease in EQ-5D-5L Usual Activities score of at least about 0.2 after receiving 49 weeks of the treatment. In some embodiments, the individual has decrease in EQ-5D-5L Usual Activities score of at least about 0.1 after receiving 49 weeks of the treatment. In some embodiments, the individual has decrease in EQ-5D-5L Usual Activities score of between 0.1 and 0.4 after receiving 49 weeks of treatment. In some embodiments, the individual has decrease in EQ-5D-5L Usual Activities score of between 0.2 and 0.4 after receiving 49 weeks of treatment.

In some embodiments, the individual has a decrease in EQ-5D-5L Pain/Discomfort score by at least about any one of 0.1, 0.2, 0.3, 0.4, 0.5, 1, 1.5, 2, or more, when measured after a certain duration of treatment. In some embodiments, the individual has a decrease in EQ-5D-5L Pain/Discomfort score by about any one of 0.1, 0.2, 0.3, 0.4, 0.5, 1, 1.5, 2, or more, when measured after a certain duration of treatment, including any value or range in between these values. In some embodiments, the individual has a decrease in EQ-5D-5L Pain/Discomfort score by at least about any one of 10%, 20%, 30%, 40%, 50%, 60%, 70%, 80%, 90% or more, relative to baseline when measured after a certain duration of treatment. In some embodiments, the individual has a decrease in EQ-5D-5L Pain/Discomfort score by no more than about any one of 90%, 80%, 70%, 60%, 50%, 40%, 30%, 20%, or 10% relative to baseline when measured after a certain duration of treatment. In some embodiments, the individual has a decrease in EQ-5D-5L Pain/Discomfort score by about any one of 10%, 20%, 30%, 40%, 50%, 60%, 70%, 80%, 90%, including any value or range in between these values. In some embodiments, the individual has a decrease in EQ-5D-5L Pain/Discomfort score after receiving the treatment for a certain duration that is at least about 0.1, 0.2, 0.3, 0.4, 0.5, 1, 1.5, 2, or higher compared to that after treatment with alglucosidase alfa. In some embodiments, the EQ-5D-5L Pain/Discomfort score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average decrease in EQ-5D-5L Pain/Discomfort score of about 0.27, or between 0.1 and 0.5, or between 0.2 and 0.3 within a confidence interval after receiving 49 weeks of treatment. In some embodiments, the average decrease in EQ-5D-5L Pain/Discomfort score is between 0.04 to 0.5, or between 0.05 and 0.5. In some embodiments, the confidence interval is a 95% confidence interval. In certain embodiments, the 95% confidence interval is between 0.04 to 0.5, or between 0.05 and 0.5. In other embodiments, the average decrease in EQ-5D-5L Pain/Discomfort score is about 0.27 with a 95% confidence interval of 0.04 to 0.5, or between 0.05 and 0.5 after the individual receives 49 weeks of treatment.

In some embodiments, the administration of the pharmaceutical composition to a plurality of individuals for 49 weeks results in an average decrease in EQ-5D-5L Pain/Discomfort score decrease in EQ-5D-5L Pain/Discomfort score of about 0.27 within a confidence interval. In some embodiments, the average decrease in EQ-5D-5L Pain/Discomfort score is between 0.04 to 0.5. In some embodiments, the confidence interval is a 95% confidence interval. In certain embodiments, the 95% confidence interval is between 0.04 to 0.5. In other embodiments, the average decrease in EQ-5D-5L Pain/Discomfort score is about 0.27 with a 95% confidence interval of 0.04 to 0.5. In some embodiments, the plurality of individuals is 51 individuals.

In some embodiments, the individual has decrease in EQ-5D-5L Pain/Discomfort score of at least about 0.4 after receiving 49 weeks of the treatment. In some embodiments, the individual has decrease in EQ-5D-5L Pain/Discomfort score of at least about 0.1 after receiving 49 weeks of the treatment. In some embodiments, the individual has decrease in EQ-5D-5L Pain/Discomfort score of between 0.1 and 0.3 after receiving 49 weeks of treatment. In some embodiments, the individual has decrease in EQ-5D-5L Pain/Discomfort score of between 0.3 and 0.4 after receiving 49 weeks of treatment.

In some embodiments, the individual has a decrease in EQ-5D-5L Anxiety/Depression score by at least about any one of 0.1, 0.2, 0.3, 0.4, 0.5, 1, 1.5, 2, or more, when measured after a certain duration of treatment. In some embodiments, the individual has a decrease in EQ-5D-5L Anxiety/Depression score by about any one of 0.1, 0.2, 0.3, 0.4, 0.5, 1, 1.5, 2, or more, when measured after a certain duration of treatment, including any value or range in between these values. In some embodiments, the individual has a decrease in EQ-5D-5L Anxiety/Depression score by at least about any one of 10%, 20%, 30%, 40%, 50%, 60%, 70%, 80%, 90% or more, relative to baseline when measured after a certain duration of treatment. In some embodiments, the individual has a decrease in EQ-5D-5L Anxiety/Depression score by no more than about any one of 90%, 80%, 70%, 60%, 50%, 40%, 30%, 20%, or 10% relative to baseline when measured after a certain duration of treatment. In some embodiments, the individual has a decrease in EQ-5D-5L Anxiety/Depression score by about any one of 10%, 20%, 30%, 40%, 50%, 60%, 70%, 80%, 90%, including any value or range in between these values. In some embodiments, the individual has a decrease in EQ-5D-5L Anxiety/Depression score after receiving the treatment for a certain duration that is at least about 0.1, 0.2, 0.3, 0.4, 0.5, 1, 1.5, 2, or higher compared to that after treatment with alglucosidase alfa. In some embodiments, the EQ-5D-5L Anxiety/Depression score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average decrease in EQ-5D-5L Anxiety/Depression score of about 0.36, or between 0.2 and 0.5, or between 0.3 and 0.4 within a confidence interval after receiving 49 weeks of treatment. In some embodiments, the average decrease in EQ-5D-5L Anxiety/Depression score is between 0.2 to 0.5. In some embodiments, the confidence interval is a 95% confidence interval. In certain embodiments, the 95% confidence interval is between 0.2 to 0.5. In other embodiments, the average decrease in EQ-5D-5L Anxiety/Depression score is about 0.36 with a 95% confidence interval of 0.2 to 0.5 after the individual receives 49 weeks of treatment.

In some embodiments, the administration of the pharmaceutical composition to a plurality of individuals for 49 weeks results in an average decrease in EQ-5D-5L Anxiety/Depression score of about 0.36 within a confidence interval. In some embodiments, the average decrease in EQ-5D-5L Anxiety/Depression score is between 0.2 to 0.5. In some embodiments, the confidence interval is a 95% confidence interval. In certain embodiments, the 95% confidence interval is between 0.2 to 0.5. In other embodiments, the average decrease in EQ-5D-5L Anxiety/Depression score is about 0.36 with a 95% confidence interval of 0.2 to 0.5. In some embodiments, the plurality of individuals is 51 individuals.

In some embodiments, the individual has decrease in EQ-5D-5L Anxiety/Depression score of at least about 0.4 after receiving 49 weeks of the treatment. In some embodiments, the individual has decrease in EQ-5D-5L Anxiety/Depression score of at least about 0.3 after receiving 49 weeks of the treatment. In some embodiments, the individual has decrease in EQ-5D-5L Anxiety/Depression score of between 0.3 and 0.5 after receiving 49 weeks of treatment. In some embodiments, the individual has decrease in EQ-5D-5L Anxiety/Depression score of between 0.4 and 0.5 after receiving 49 weeks of treatment.

In some embodiments, the individual has an increase in EQ-VAS score by at least about any one of 1, 1.5, 2, 2.5, 3, 3.5, 4, 5, 6, 7, 8, 9, 10, 11, or more, when measured after a certain duration of treatment. In some embodiments, the individual has an increase in EQ-VAS score by about any one of 1, 1.5, 2, 2.5, 3, 3.5, 4, 5, 6, 7, 8, 9, 10, 11, or more, when measured after a certain duration of treatment, including any value or range in between these values. In some embodiments, the individual has an increase in EQ-VAS score by at least about any one of 10%, 20%, 30%, 40%, 50%, 60%, 70%, 80%, 90% or more, relative to baseline when measured after a certain duration of treatment. In some embodiments, the individual has an increase in EQ-VAS score by no more than about any one of 90%, 80%, 70%, 60%, 50%, 40%, 30%, 20%, or 10% relative to baseline when measured after a certain duration of treatment. In some embodiments, the individual has an increase in EQ-VAS score by about any one of 10%, 20%, 30%, 40%, 50%, 60%, 70%, 80%, 90%, including any value or range in between these values. In some embodiments, the individual has an increase in EQ-VAS score after receiving the treatment for a certain duration that is at least about 1, 1.5, 2, 2.5, 3, 3.5, 4, 5, 6, 7, 8, 9, 10, 11, or higher compared to that after treatment with alglucosidase alfa. In some embodiments, the EQ-VAS score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in EQ-VAS score of about 7.49, or between 4 and 10, or between 6 and 8 within a confidence interval after receiving 49 weeks of treatment. In some embodiments, the average increase in EQ-VAS score is between 3.5 to 11.4, or between 3 and 12. In some embodiments, the confidence interval is a 95% confidence interval. In certain embodiments, the 95% confidence interval is between 3.5 to 11.4, or between 3 and 12. In other embodiments, the average increase in EQ-VAS score is about 7.49 with a 95% confidence interval of 3.5 to 11.4, or between 3 and 12 after the individual receives 49 weeks of treatment.

In some embodiments, the administration of the pharmaceutical composition to a plurality of individuals for 49 weeks results in an average increase in EQ-VAS score of about 7.49 within a confidence interval. In some embodiments, the average increase in EQ-VAS score is between 3.5 to 11.4. In some embodiments, the confidence interval is a 95% confidence interval. In certain embodiments, the 95% confidence interval is between 3.5 to 11.4. In other embodiments, the average increase in EQ-VAS score is about 7.49 with a 95% confidence interval of 3.5 to 11.4. In some embodiments, the plurality of individuals is 51 individuals.

In some embodiments, the individual has increase in EQ-VAS score of at least about 4.3 after receiving 49 weeks of the treatment. In some embodiments, the individual has increase in EQ-VAS score of at least about 5.5 after receiving 49 weeks of the treatment. In some embodiments, the individual has increase in EQ-VAS score of between 5.5 and 9.5 after receiving 49 weeks of treatment. In some embodiments, the individual has increase in EQ-VAS score of between 4.3 and 10 after receiving 49 weeks of treatment.

Efficacy of the treatment can be assessed based on patient-reported outcomes, including, but not limited to, Pompe Disease Symptom Scale (PDSS), Pompe Disease Impact Scale (PDIS), Rasch-built Pompe-specific Activity scale (R-PAct), and Patient Global Impression of Change (PGIC).

The Rasch-built Pompe-specific Activity scale (R-PAct) measures limitations in activities and restrictions in social participation over the course of treatment of Pompe patients older than 16 years. The R-Pact score is reported on a 1-36 scale based on patient reporting for 18 items relating to limitations in daily life (van der Beek, N. A., et al. [2013]. *Neuromuscular disorders: NMD;* 23(3): 256-64). In some embodiments, the patient has an increase in R-Pact after treatment.

In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in R-PAct of at least about 2.55 after receiving the treatment. In some embodiments, there is provided a method of increasing health-related quality of life (e.g., R-PAct) of a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the oligosaccharide-protein conjugate is avalglucosidase alfa.

In some embodiments, the individual has an increase in R-PAct by at least about any one of 0.5, 1, 1.5, 2, 2.5, 3, 3.5, 4, 5, or more, when measured after a certain duration of treatment. In some embodiments, the individual has an increase in R-PAct by about any one of 0.5, 1, 1.5, 2, 2.5, 3, 3.5, 4, 5, or more, when measured after a certain duration of treatment, including any value or range in between these values. In some embodiments, the individual has an increase in R-PAct by at least about any one of 10%, 20%, 30%, 40%, 50%, 60%, 70%, 80%, 90% or more, relative to baseline when measured after a certain duration of treatment. In some embodiments, the individual has an increase in R-PAct by no more than about any one of 90%, 80%, 70%, 60%, 50%, 40%, 30%, 20%, or 10% relative to baseline when measured after a certain duration of treatment. In some embodiments, the individual has an increase in R-PAct by about any one of 10%, 20%, 30%, 40%, 50%, 60%, 70%, 80%, 90%, including any value or range in between these values. In some embodiments, the individual has an increase in R-PAct after receiving the treatment for a certain duration that is at least about 0.5, 1, 1.5, 2, 2.5, 3, 4, 5, or higher compared to that after treatment with alglucosidase alfa. In some embodiments, the R-PAct of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average change in R-PAct of about 2.55, or between 1 and 4, or between 2 and 3 within a confidence interval after receiving 49 weeks of treatment. In some embodiments, the average change in R-PAct is between −0.1 to 5.2, or between 0 and 5. In some embodiments, the confidence interval is a 95% confidence interval. In certain embodiments, the 95% confidence interval is between −0.1 to 5.2, or between 0 and 5. In other embodiments, the average change in R-PAct is about 2.55 with a 95% confidence interval of −0.1 to 5.2, or between 0 and 5 after the individual receives 49 weeks of treatment.

In some embodiments, the administration of the pharmaceutical composition to a plurality of individuals for 49 weeks results in an average change in R-PAct of about 2.55 within a confidence interval. In some embodiments, the average change in R-PAct is between −0.1 to 5.2. In some embodiments, the confidence interval is a 95% confidence interval. In certain embodiments, the 95% confidence interval is between −0.1 to 5.2. In other embodiments, the average change in R-PAct is about 2.55 with a 95% confidence interval of −0.1 to 5.2. In some embodiments, the plurality of individuals is 51 individuals.

In some embodiments, the individual has increase in R-PAct of at least about 1.7 after receiving 49 weeks of the treatment. In some embodiments, the individual has increase in R-PAct of at least about 1.3 after receiving 49 weeks of the treatment. In some embodiments, the individual has increase in R-PAct of between 1.3 and 3.8 after receiving 49 weeks of treatment. In some embodiments, the individual has increase in R-PAct of between 1.7 and 4.0 after receiving 49 weeks of treatment.

Patient Global Impression of Change (PGIC) may also be used as to measure efficacy of treatment in Pompe patients. The Patient Global Impression of Change (PGIC) score measures epain intensity and pain interference in daily lifePerrot, S., et al. [2019]. *European journal of pain* (London, England); 23(6): 1117-28). Higher PGIC scores are indicative of improvements in pain and treatment efficacy. The PGIC can be scored across four different dimensions: daily activities, disease-related symptoms, ability to breathe, and mobility. In some embodiments, the patient has an increase in PGIC for one or more dimensions after treatment.

In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in PGIC Daily Activities score of at least about 4.63 (e.g., at least about 4.97) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in PGIC Disease-Related Symptoms score of at least about 5.05 (e.g., at least about 5.37) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in PGIC Ability to Breathe score of at least about 4.66 (e.g., at least about 4.98) after receiving the treatment. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and the individual has an increase in PGIC Mobility score of at least about 4.66 (e.g., at least about 4.84) after receiving the treatment. In some embodiments, there is provided a method of increasing health-related quality of life (e.g., PGIC in one or more dimensions) of a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the oligosaccharide-protein conjugate is avalglucosidase alfa.

In some embodiments, the individual has an increase in PGIC Daily Activities score by at least about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment. In some embodiments, the individual has an increase in PGIC Daily Activities by about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment, including any value or range in between these values. In some embodiments, the individual has an increase in PGIC Daily Activities score by at least about any one of 10%, 20%, 30%, 40%, 50%, 60%, 70%, 80%, 90% or more, relative to baseline when measured after a certain duration of treatment. In some embodiments, the individual has an increase in PGIC Daily Activities score by no more than about any one of 90%, 80%, 70%, 60%, 50%, 40%, 30%, 20%, or 10% relative to baseline when measured after a certain duration of treatment. In some embodiments, the individual has an increase in PGIC Daily Activities score by about any one of 10%, 20%, 30%, 40%, 50%, 60%, 70%, 80%, 90%, including any value or range in between these values. In some embodiments, the individual has an increase in PGIC Daily Activities score after receiving the treatment for a certain duration that is at least about 0.5, 1, 1.25, 1.5, 1.75, 2, 2.25, 2.5, 2.75, 3, 3.25, 3.5, 3.75, 4, 4.5, 5, 5.5, or higher compared to that after treatment with alglucosidase alfa. In some embodiments, the PGIC Daily Activities score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in PGIC Daily Activities of about 4.97, or between 4 and 6 within a confidence interval after receiving 49 weeks of treatment. In some embodiments, the average increase in PGIC Daily Activities is between 4.3 to 5.3, or between 4 and 6. In some embodiments, the confidence interval is a 95% confidence interval. In certain embodiments, the 95% confidence interval is between 4.3 to 5.3, or between 4 and 6. In other embodiments, the average increase in PGIC Daily Activities is about 4.97 with a 95% confidence interval of 4.3 to 5.3, or between 4 and 6 after the individual receives 49 weeks of treatment.

In some embodiments, the administration of the pharmaceutical composition to a plurality of individuals for 49 weeks results in an average increase in PGIC Daily Activities of about 4.97 within a confidence interval. In some embodiments, the average increase in PGIC Daily Activities is between 4.3 to 5.3. In some embodiments, the confidence interval is a 95% confidence interval. In certain embodiments, the 95% confidence interval is between 4.3 to 5.3. In other embodiments, the average increase in PGIC Daily Activities is about 4.97 with a 95% confidence interval of 4.3 to 5.3. In some embodiments, the plurality of individuals is 51 individuals.

In some embodiments, the individual has increase in PGIC Daily Activities of at least about 4.6 after receiving 49 weeks of the treatment. In some embodiments, the individual has increase in PGIC Daily Activities of at least about 4.8 after receiving 49 weeks of the treatment. In some embodiments, the individual has increase in PGIC Daily Activities of between 4.8 and 5.1 after receiving 49 weeks of treatment. In some embodiments, the individual has increase in PGIC Daily Activities of between 4.6 and 5.1 after receiving 49 weeks of treatment.

In some embodiments, the individual has an increase in PGIC Disease-Related Symptoms score by at least about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment. In some embodiments, the individual has an increase in PGIC Disease-Related Symptoms score by about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment, including any value or range in between these values. In some embodiments, the individual has an increase in PGIC Disease-Related score by at least about any one of 10%, 20%, 30%, 40%, 50%, 60%, 70%, 80%, 90% or more, relative to baseline when measured after a certain duration of treatment. In some embodiments, the individual has an increase in PGIC Disease-Related score by no more than about any one of 90%, 80%, 70%, 60%, 50%, 40%, 30%, 20%, or 10% relative to baseline when measured after a certain duration of treatment. In some embodiments, the individual has an increase in PGIC Disease-Related score by about any one of 10%, 20%, 30%, 40%, 50%, 60%, 70%, 80%, 90%, including any value or range in between these values. In some embodiments, the individual has an increase in PGIC Disease-Related score after receiving the treatment for a certain duration that is at least about 0.5, 1, 1.25, 1.5, 1.75, 2, 2.25, 2.5, 2.75, 3, 3.25, 3.5, 3.75, 4, 4.5, 5, 5.5, or higher compared to that after treatment with alglucosidase alfa. In some embodiments, the PGIC Disease-Related score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in PGIC Disease-Related Symptoms of about 5.37, or between 5 and 6, or between 5 and 5.5 within a confidence interval after receiving 49 weeks of treatment. In some embodiments, the average increase in PGIC Disease-Related Symptoms is between 5.1 to 5.7, or between 5 and 6. In some embodiments, the confidence interval is a 95% confidence interval. In certain embodiments, the 95% confidence interval is between 5.1 to 5.7, or between 5 and 6. In other embodiments, the average increase in PGIC Disease-Related Symptoms is about 5.37 with a 95% confidence interval of 5.1 to 5.7, or between 5 and 6 after the individual receives 49 weeks of treatment.

In some embodiments, the administration of the pharmaceutical composition to a plurality of individuals for 49 weeks results in an average increase in PGIC Disease-Related Symptoms of about 5.37 within a confidence interval. In some embodiments, the average increase in PGIC Disease-Related Symptoms is between 5.1 to 5.7. In some embodiments, the confidence interval is a 95% confidence interval. In certain embodiments, the 95% confidence interval is between 5.1 to 5.7. In other embodiments, the average increase in PGIC Disease-Related Symptoms is about 5.37 with a 95% confidence interval of 5.1 to 5.7. In some embodiments, the plurality of individuals is 51 individuals.

In some embodiments, the individual has increase in PGIC Disease-Related Symptoms of at least about 4.7 after receiving 49 weeks of the treatment. In some embodiments, the individual has increase in PGIC Disease-Related Symptoms of at least about 5.1 after receiving 49 weeks of the treatment. In some embodiments, the individual has increase in PGIC Disease-Related Symptoms of between 5.1 and 5.5 after receiving 49 weeks of treatment. In some embodiments, the individual has increase in PGIC Disease-Related Symptoms of between 4.7 and 6 after receiving 49 weeks of treatment.

In some embodiments, the individual has an increase in PGIC Ability to Breathe score by at least about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment. In some embodiments, the individual has an increase in PGIC Ability to Breathe score by about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment, including any value or range in between these values. In some embodiments, the individual has an increase in PGIC Ability to Breathe score by at least about any one of 10%, 20%, 30%, 40%, 50%, 60%, 70%, 80%, 90% or more, relative to baseline when measured after a certain duration of treatment. In some embodiments, the individual has an increase in PGIC Ability to Breathe score by no more than about any one of 90%, 80%, 70%, 60%, 50%, 40%, 30%, 20%, or 10% relative to baseline when measured after a certain duration of treatment. In some embodiments, the individual has an increase in PGIC Ability to Breathe score by about any one of 10%, 20%, 30%, 40%, 50%, 60%, 70%, 80%, 90%, including any value or range in between these values. In some embodiments, the individual has an increase in PGIC Ability to Breathe score after receiving the treatment for a certain duration that is at least about 0.5, 1, 1.25, 1.5, 1.75, 2, 2.25, 2.5, 2.75, 3, 3.25, 3.5, 3.75, 4, 4.5, 5, 5.5, or higher compared to that after treatment with alglucosidase alfa. In some embodiments, the PGIC Ability to Breathe score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in PGIC Ability to Breathe of about 4.98, or between 4 and 6 within a confidence interval after receiving 49 weeks of treatment. In some embodiments, the average increase in PGIC Ability to Breathe is between 4.7 to 5.3, or between 4.5 and 5.5. In some embodiments, the confidence interval is a 95% confidence interval. In certain embodiments, the 95% confidence interval is between 4.7 to 5.3, or between 4.5 and 5.5. In other embodiments, the average increase in PGIC Ability to Breathe is about 4.98 with a 95% confidence interval of 4.7 to 5.3, or between 4.5 and 5.5 after the individual receives 49 weeks of treatment.

In some embodiments, the administration of the pharmaceutical composition to a plurality of individuals for 49 weeks results in an average increase in PGIC Ability to Breathe of about 4.98 within a confidence interval. In some embodiments, the average increase in PGIC Ability to Breathe is between 4.7 to 5.3. In some embodiments, the confidence interval is a 95% confidence interval. In certain embodiments, the 95% confidence interval is between 4.7 to 5.3. In other embodiments, the average increase in PGIC Ability to Breathe is about 4.98 with a 95% confidence interval of 4.7 to 5.3. In some embodiments, the plurality of individuals is 51 individuals.

In some embodiments, the individual has increase in PGIC Ability to Breathe of at least about 4.8 after receiving 49 weeks of the treatment. In some embodiments, the individual has increase in PGIC Ability to Breathe of at least about 4.8 after receiving 49 weeks of the treatment. In some embodiments, the individual has increase in PGIC Ability to Breathe of between 4.8 and 5.1 after receiving 49 weeks of treatment. In some embodiments, the individual has increase in PGIC Ability to Breathe of between 4.8 and 5.1 after receiving 49 weeks of treatment.

In some embodiments, the individual has an increase in PGIC Mobility score by at least about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment. In some embodiments, the individual has an increase in PGIC Mobility score by about any one of 0.5, 1, 1.25, 1.5, 1.75, 2, 2.25, 2.5, 2.75, 3, 3.25, 3.5, 3.75, 4, 4.5, 5, 5.5, or more, when measured after a certain duration of treatment, including any value or range in between these values. In some embodiments, the individual has an increase in PGIC Mobility score by at least about any one of 10%, 20%, 30%, 40%, 50%, 60%, 70%, 80%, 90% or more, relative to baseline when measured after a certain duration of treatment. In some embodiments, the individual has an increase in PGIC Mobility score by no more than about any one of 90%, 80%, 70%, 60%, 50%, 40%, 30%, 20%, or 10% relative to baseline when measured after a certain duration of treatment. In some embodiments, the individual has an increase in PGIC Mobility score by about any one of 10%, 20%, 30%, 40%, 50%, 60%, 70%, 80%, 90%, including any value or range in between these values. In some embodiments, the individual has an increase in PGIC Mobility score after receiving the treatment for a certain duration that is at least about 0.5, 1, 1.25, 1.5, 1.75, 2, 2.25, 2.5, 2.75, 3, 3.25, 3.5, 3.75, 4, 4.5, 5, 5.5, or higher compared to that after treatment with alglucosidase alfa. In some embodiments, the PGIC Mobility score of the individual is measured after treatment of about any one of 1 month, 2 months, 3 months, 13 weeks, 6 months, 25 weeks, 7 months, 8 months, 9 months, 37 weeks, 49 weeks, 12 months, 2 years, 5 years, 10 years or more, including any value or range in between these values.

In some embodiments, the individual has an average increase in PGIC Mobility of about 4.84 within a confidence interval after receiving 49 weeks of treatment. In some embodiments, the average increase in PGIC Mobility is between 4.7 to 5.3. In some embodiments, the confidence interval is a 95% confidence interval. In certain embodiments, the 95% confidence interval is between 4.7 to 5.3. In other embodiments, the average increase in PGIC Mobility is about 4.84 with a 95% confidence interval of 4.7 to 5.3 after the individual receives 49 weeks of treatment.

In some embodiments, the administration of the pharmaceutical composition to a plurality of individuals for 49 weeks results in an average increase in PGIC Mobility of about 4.84 within a confidence interval. In some embodiments, the average increase in PGIC Mobility is between 4.7 to 5.3. In some embodiments, the confidence interval is a 95% confidence interval. In certain embodiments, the 95% confidence interval is between 4.7 to 5.3. In other embodiments, the average increase in PGIC Mobility is about 4.84 with a 95% confidence interval of 4.7 to 5.3. In some embodiments, the plurality of individuals is 51 individuals.

In some embodiments, the individual has increase in PGIC Mobility of at least about 4.4 after receiving 49 weeks of the treatment. In some embodiments, the individual has increase in PGIC Mobility of at least about 4.7 after receiving 49 weeks of the treatment. In some embodiments, the individual has increase in PGIC Mobility of between 4.7 and 5.0 after receiving 49 weeks of treatment. In some embodiments, the individual has increase in PGIC Mobility of between 4.4 and 5.0 after receiving 49 weeks of treatment.

Creatine kinase (CK, also known as creatine phosphokinase) is a serum enzyme biomarker of Pompe disease that is indicative of muscle damage; CK levels are elevated in patients in with classic LOPD. A CK blood test may be performed to measure the amount of CK enzyme in an individual's blood.

In some embodiments, the individual has a decrease in CK level by at least about any one of 50 IU/L, 60 IU/L, 70 IU/L, 80, IU/L, 90 IU/L, 100 IU/L, 110 IU/L, 120 IU/L, 130 IU/L, 140 IU/L, 150 IU/L, 160 IU/L, 170 IU/L, 180 IU/L, 190 IU/L, 200 IU/L, 250 IU/L, 300 IU/L, 400 IU/L, 500 IU/L, 600 IU/L, 700 IU/L, 800 IU/L or more, when measured after a certain duration of treatment. In some embodiments, the CK level decreases by about any one of 50 IU/L, 60 IU/L, 70 IU/L, 80, IU/L, 90 IU/L, 100 IU/L, 110 IU/L, 120 IU/L, 130 IU/L, 140 IU/L, 150 IU/L, 160 IU/L, 170 IU/L, 180 IU/L, 190 IU/L, 200 IU/L, 250 IU/L, 300 IU/L, 400 IU/L, 500 IU/L, 600 IU/L, 700 IU/L, 800 IU/L or more, when measured after a certain duration of treatment, including any value or range in between these values. In some embodiments, the CK level decreases by at least about any one of 10%, 20%, 30%, 40%, 50%, 60%, 70%, 80%, 90% or more, relative to baseline when measured after a certain duration of treatment. In some embodiments, the CK level decreases by no more than about any one of 90%, 80%, 70%, 60%, 50%, 40%, 30%, 20%, or 10% relative to baseline when measured after a certain duration of treatment. In some embodiments, the CK level decreases by about any one of 10%, 20%, 30%, 40%, 50%, 60%, 70%, 80%, 90%, including any value or range in between these values. In some embodiments, the CK level is measured after treatment of about any one of 1 months, 3 months, 6 months, 25 weeks, 7 months, 8 months, 9 months, 12 months, 2 years, 5 years, 10 years or more, including any value or range in between these values.

In some embodiments, the individual has a decrease in CK level of at least about 38.02% after receiving the treatment (e.g., at week 49 of the treatment). In some embodiments, the individual has a decrease in CK level after receiving the treatment (e.g., at week 49 of the treatment) that is at least about 23.89% lower compared to that after treatment with alglucosidase alfa.

In some embodiments, the individual has a decrease in CK level of at least about 38.9%, or between 35% and 45% after receiving 49 weeks of the treatment. In some embodiments, the individual has a decrease in CK level of at least about 13.1% after receiving 49 weeks of the treatment. In some embodiments, the individual has a decrease in CK level of between 13.1% and 63.0%, or between 15% and 65%, after receiving 49 weeks of treatment. In some embodiments, the individual has a decrease in CK level of between 38.9% and 63.0% after receiving 49 weeks of treatment.

Another biomarker of LOPD is glucose tetrasaccharide, which is elevated in urine and plasma of patients with Pompe disease. Glucose tetrasaccharide can be measured as hexose tetrasaccharide (Hex4) levels in urine, as Hex4 is a breakdown product of glycogen. Thus, urinary Hex4 serves as a biomarker of glycogen storage.

In some embodiments, the urinary Hex4 level of the individual decreases by at least about any one of 5 mmol/mol, 6 mmol/mol, 7 mmol/mol, 8 mmol/mol, 9 mmol/mol, 10 mmol/mol, 11 mmol/mol, 12 mmol/mol, 13 mmol/mol, 14 mmol/mol, 15 mmol/mol, 20 mmol/mol, 25 mmol/mol, 30 mmol/mol, 35 mmol/mol, 40 mmol/mol, or 50 mmol/mol, when measured after a certain duration of treatment. In some embodiments, the urinary Hex4 level of the individual decreases by about any one of 5 mmol/mol, 6 mmol/mol, 7 mmol/mol, 8 mmol/mol, 9 mmol/mol, 10 mmol/mol, 11 mmol/mol, 12 mmol/mol, 13 mmol/mol, 14 mmol/mol, 15 mmol/mol, 20 mmol/mol, 25 mmol/mol, 30 mmol/mol, 35 mmol/mol, 40 mmol/mol, or 50 mmol/mol, when measured after a certain duration of treatment, including any value or range in between these values. In some embodiments, the urinary Hex4 level decreases by at least about 10%, 20%, 30%, 40%, 50%, 60%, 70%, 80%, 90% or more, relative to baseline when measured after a certain duration of treatment. In some embodiments, the urinary Hex4 level decreases by no more than about 90%, 80%, 70%, 60%, 50%, 40%, 30%, 20%, or 10% relative to baseline when measured after a certain duration of treatment. In some embodiments, the Hex4 level decreases by about any one of 10%, 20%, 30%, 40%, 50%, 60%, 70%, 80%, 90%, including any value or range in between these values. In some embodiments, the Hex4 level is measured after treatment of about any one of 1 months, 3 months, 6 months, 25 weeks, 7 months, 8 months, 9 months, 12 months, 2 years, 5 years, 10 years or more, including any value or range in between these values.

In some embodiments, the individual has a decrease in urinary HEX4 level of at least about 53.90% after receiving the treatment (e.g., at week 49 of the treatment). In some embodiments, the individual has a decrease in urinary HEX4 level after receiving the treatment (e.g., at week 49 of the treatment) that is at least about 43.14% lower compared to that after treatment with alglucosidase alfa.

In some embodiments, the individual has a decrease in urinary HEX4 level of at least about 43.1%, or between 40% and 60% after receiving 49 weeks of the treatment. In some embodiments, the individual has a decrease in urinary HEX4 level of at least about 29.9% after receiving 49 weeks of the treatment. In some embodiments, the individual has a decrease in urinary HEX4 level of between 29.9% and 77.9%, or between 30% and 80% after receiving 49 weeks of treatment. In some embodiments, the individual has a decrease in urinary HEX4 level of between 43.1% and 78%, or about 40% and 80% after receiving 49 weeks of treatment.

Alanine aminotransferase (ALT, also known as alanine transaminase) is a serum enzyme biomarker of Pompe disease that is indicative of muscle damage; ALT levels are elevated in patients with classic LOPD. An ALT blood test may be performed to measure the amount of ALT in an individual's blood.

In some embodiments, the individual has a decrease in ALT level by at least about any one of 5 IU/L, 10 IU/L, 15 IU/L, 20 IU/L, 25 IU/L, 30 IU/L, 35 IU/L, 40 IU/L, 45 IU/L, 50 IU/L, 55 IU/L, 60 IU/L, 65 IU/L, 70 IU/L, 75 IU/L, 100 IU/L, 125 IU/L, 150 IU/L or more, when measured after a certain duration of treatment. In some embodiments, the ALT level decreases by about any one of 5 IU/L, 10 IU/L, 15 IU/L, 20 IU/L, 25 IU/L, 30 IU/L, 35 IU/L, 40 IU/L, 45 IU/L, 50 IU/L, 55 IU/L, 60 IU/L, 65 IU/L, 70 IU/L, 75 IU/L, 100 IU/L, 125 IU/L, 150 IU/L or more, when measured after a certain duration of treatment, including any value or range in between these values. In some embodiments, the ALT level decreases by at least about any one of 10%, 20%, 30%, 40%, 50%, 60%, 70%, 80%, 90% or more, relative to baseline when measured after a certain duration of treatment. In some embodiments, the ALT level decreases by no more than about any one of 90%, 80%, 70%, 60%, 50%, 40%, 30%, 20%, or 10% relative to baseline when measured after a certain duration of treatment. In some embodiments, the ALT level decreases by about any one of 10%, 20%, 30%, 40%, 50%, 60%, 70%, 80%, 90%, including any value or range in between these values. In some embodiments, the ALT level is measured after treatment of about any one of 1 months, 3 months, 6 months, 25 weeks, 7 months, 8 months, 9 months, 12 months, 2 years, 5 years, 10 years or more, including any value or range in between these values.

In some embodiments, the individual has a decrease in ALT level of at least about 37.4%, or between 30% and 50% after receiving 49 weeks of the treatment. In some embodiments, the individual has a decrease in ALT level of at least about 17.1% after receiving 49 weeks of the treatment. In some embodiments, the individual has a decrease in ALT level of between 17.1% and 67.0%, or between 15% and 70% after receiving 49 weeks of treatment. In some embodiments, the individual has a decrease in ALT level of between 37.4% and 67.0%, or between 35% and 70% after receiving 49 weeks of treatment.

Aspartate transaminase (AST, also known as aspartate aminotransferase or glutamic oxaloacetic transaminase) is a serum enzyme biomarker of Pompe disease that is indicative of muscle damage; AST levels are elevated in patients in with classic LOPD. An AST blood test may be performed to measure the amount of AST in an individual's blood.

In some embodiments, the individual has a decrease in AST level by at least about any one of 5 IU/L, 10 IU/L, 15 IU/L, 20 IU/L, 25 IU/L, 30 IU/L, 35 IU/L, 40 IU/L, 45 IU/L, 50 IU/L, 55 IU/L, 60 IU/L, 65 IU/L, 70 IU/L, 75 IU/L, 100 IU/L, 125 IU/L, 150 IU/L or more, when measured after a certain duration of treatment. In some embodiments, the AST level decreases by about any one of 5 IU/L, 10 IU/L, 15 IU/L, 20 IU/L, 25 IU/L, 30 IU/L, 35 IU/L, 40 IU/L, 45 IU/L, 50 IU/L, 55 IU/L, 60 IU/L, 65 IU/L, 70 IU/L, 75 IU/L, 100 IU/L, 125 IU/L, 150 IU/L or more, when measured after a certain duration of treatment, including any value or range in between these values. In some embodiments, the AST level decreases by at least about any one of 10%, 20%, 30%, 40%, 50%, 60%, 70%, 80%, 90% or more, relative to baseline when measured after a certain duration of treatment. In some embodiments, the AST level decreases by no more than about any one of 90%, 80%, 70%, 60%, 50%, 40%, 30%, 20%, or 10% relative to baseline when measured after a certain duration of treatment. In some embodiments, the AST level decreases by about any one of 10%, 20%, 30%, 40%, 50%, 60%, 70%, 80%, 90%, including any value or range in between these values. In some embodiments, the AST level is measured after treatment of about any one of 1 months, 3 months, 6 months, 25 weeks, 7 months, 8 months, 9 months, 12 months, 2 years, 5 years, 10 years or more, including any value or range in between these values.

In some embodiments, the individual has a decrease in AST level of at least about 33.3%, or between 25% and 40%, after receiving 49 weeks of the treatment. In some embodiments, the individual has a decrease in AST level of at least about 25.9% after receiving 49 weeks of the treatment. In some embodiments, the individual has a decrease in AST level of between 25.9% and 63.6%, or between 25% and 65% after receiving 49 weeks of treatment. In some embodiments, the individual has a decrease in AST level of between 33.3% and 66.3%, or between 30% and 65% after receiving 49 weeks of treatment.

Quanlitative and quantitative skeletal muscle MRI may be used to assess disease burden in an individual having Pompe disease. MRI may be used to identify muscles with structural changes corresponding to the clinical weakest muscles and correlates well with results of the functional muscle scales commonly used in clinical trials. See, for example, Figueroa-Bonaparte S, et al. Muscle MRI findings in childhood/adult onset Pompe disease correlate with muscle function. *PLoS ONE*. 2016; 11 (10): e0163493. Exemplary qualitative and/or quantitative skeletal muscle MRI parameters include, but are not limited to, T1W with Mercuri grading from Grade 1 (normal appearance) to Grade 4 (severe involvement), 3-point Dixon fat fraction on a scale of 0-100%, and T2 water with and without B1 correction. In some embodiments, the skeletal muscle MRI is carried out in quadriceps of the individual. In some embodiments, the skeletal muscle MRI is carried out in hamstring of the individual.

In some embodiments, the individual has stable Mercuri scores according to skeletal muscle magnetic resonance imaging (MRI) during the course of the treatment. Mercuri score is assigned according to the following: 1 is normal appearance; 2 is mild involvement; 3 is moderate involvement; 4 is severe involvement. The Mercuri score correlates well with glycogen tissue area in a biopsy of skeletal muscle tissue (e.g., quadriceps). In some embodiments, the Mercuri score is determined according to skeletal muscle MRI of a lower leg of the individual. In some embodiments, the Mercuri score is determined according to skeletal muscle MRI of a thigh of the individual. In some embodiments, the Mercuri scores do not change for more than 10%, 5%, 2%, 1%, 0.5%, or less during the course of the treatment. In some embodiments, the course of the treatment is at least about any one of 1 year, 2 years, 3 years, 4 years, 4.5 years, 5 years or more.

In some embodiments, the individual has stable T2 water according to skeletal muscle MRI imaging during the course of the treatment. In some embodiments, the T2 water is with B1 correction. In some embodiments, the T2 water is without B1 correction. For T2 water with B1 correction, the abnormal value may be defined as greater than about 39 ms. In some embodiments, the T2 water is according to skeletal muscle MRI of a lower leg of the individual. In some embodiments, the T2 water is according to skeletal muscle MRI of a thigh of the individual. In some embodiments, the T2 water does not change for more than 10%, 5%, 2%, 1%, 0.5%, or less during the course of the treatment. In some embodiments, the course of the treatment is at least about any one of 1 year, 2 years, 3 years, 4 years, 4.5 years, 5 years or more.

In some embodiments, the individual has stable 3-point Dixon fat fraction according to skeletal muscle MRI imaging during the course of the treatment. Images from the 3-point Dixon quantitative MRI technique can be analyzed to quantify the amount of fat per pixel, detecting slight changes in intramuscular fatty infiltration more accurately than T1-weighted (T1W) images. In some embodiments, the 3-point Dixon fat fraction is on a scale of 0-100%. In some embodiments, the 3-point Dixon fat fraction is determined according to skeletal muscle MRI of a lower leg of the individual. In some embodiments, the 3-point Dixon fat fraction is determined according to skeletal muscle MRI of a thigh of the individual. In some embodiments, the 3-point Dixon fat fraction does not change for more than 10%, 5%, 2%, 1%, 0.5%, or less during the course of the treatment. In some embodiments, the course of the treatment is at least about any one of 1 year, 2 years, 3 years, 4 years, 4.5 years, 5 years or more.

In some embodiments, there is provided a method of preserving muscle in a human individual having LOPD, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg. In some embodiments, the individual has stable Mercuri scores, 3-point Dixon fat fraction, and/or T2 water with or without B1 correction according to skeletal muscle magnetic resonance imaging (MRI) over the course of the treatment. The methods described herein are also associated with low incidents of adverse effects. In some embodiments, there is provided a method of treating LOPD in a human individual, comprising administering to the individual a pharmaceutical composition comprising any one of the oligosaccharide-GAA conjugates described herein (e.g., Formulae I-III, or avalglucosidase alfa) and a pharmaceutically acceptable carrier, wherein the pharmaceutical composition is administered at a dose of about 20 mg/kg, and wherein the individual has decreasing level of anti-drug antibody (ADA) against the oligosaccharide-protein conjugate over time. ADAs may form against a drug such as an oligosaccharide-protein conjugate. ADAs have the potential to neutralize the effects of a drug, and can therefore present a challenge in enzyme replacement therapies (ERTs).

In some embodiments, the methods described herein further comprise preparing the pharmaceutical composition. In some embodiments, the pharmaceutical composition is reconstituted from a lyophilized formulation. In some embodiments, the pharmaceutical composition is reconstituted from a lyophilized formulation comprising the oligosaccharide-protein conjugate.

In some embodiments, there is provided use of any one of the oligosaccharide-GAA conjugates described herein (e.g., Formulae I-III, or avalglucosidase alfa) in the manufacture of a medicament for treating LOPD in a human individual in need thereof. In some embodiments, there is provided a pharmaceutical composition comprising any one of the oligosaccharide-GAA conjugates described herein (e.g., Formulae I-III, or avalglucosidase alfa) for treating LOPD in a human individual in need thereof.

The pharmaceutical compositions described herein may be administered to the individual intravenously, or with another suitable route of administration. Suitable dosage of the pharmaceutical composition is about 5 mg/kg to about 40 mg/kg, including about any one of 5, 10, 15, 20, 25, 30, 35, or 40 mg/kg, including any value or range in between these values. In some embodiments, the pharmaceutical composition is administered at a dose of about 20 mg/kg.

The pharmaceutical compositions described herein may be administered at a suitable frequency, including, for example, biweekly, once per week, once every two weeks, once every three weeks, or once every month. In some embodiments, the pharmaceutical composition is administered to the individual once every two weeks.

Administration of a pharmaceutical composition of the present application to an individual may occur in a single dose or in repeat administrations. For example, the pharmaceutical compositions described herein may be administered by intravenous infusion at a dose of about 20 mg/kg of body weight every two weeks over approximately, e.g., 1, 2, 3, 4, 5, 6, 7, 8, 9, or 10 hours. In some embodiments, the rate of administration may be started at, e.g., 1 mg/kg/hr and then increased by, e.g., 2 mg/kg/hr every 30 minutes, after establishing patient tolerance to the infusion rate, until a maximum of, e.g., 7 mg/kg/hr.

The pharmaceutical compositions described herein may be administered to the individual over an extended period of time, including, for example, at least about any one of 13 weeks, 3 months, 25 weeks, 6 months, 7 months, 8 months, 37 weeks, 9 months, 10 months, 11 months, 49 weeks, 12 months, 2 years, 3 years, 4 years, 5 years, 6 years, 7 years, 8 years, 9 years, 10 years, 12 years, 15 years, 20 years, 25 years, 30 years, or longer, including any value or range between these values.

A. Patient Population

Pompe disease (also known as acid maltase deficiency or glycogen storage disease (GSD) type II) is a rare, autosomal recessive genetic disorder caused by the deficiency of lysosomal acid α-glucosidase (GAA), an enzyme that degrades glycogen (see OMIM 232300). Pompe disease has been classified into infantile onset and late onset forms. Classical infantile onset Pompe disease (IOPD) is characteristically fatal by one year of age without treatment. Late onset Pompe disease (LOPD) has a more variable course.

Alglucosidase alfa, which contains the active ingredient recombinant human acid α-glucosidase (rhGAA), can be used as to treat Pompe disease as a long-term enzyme replacement therapy (ERT) for patients with a confirmed diagnosis of Pompe disease. Alglucosidase alfa treatment is globally approved (tradenames MYOZYME® and LUMIZYME®) for the treatment of Pompe disease based on its efficacy to prolong invasive ventilator free survival and overall survival in infants, and its ability to improve mobility and stabilize respiratory function in children and adults with the disease. Despite the availability of rhGAA, there remains an unmet need in Pompe disease. Without wishing to be bound by any theory or hypothesis, this is thought to be, at least in part, due to the relative low level of bis-mannose-6-phosphate (bis-M6P) on alglucosidase alfa. Increasing the level of bis-M6P on alglucosidase alfa may provide a mechanism to drive uptake into the skeletal muscle and thereby improve outcomes in LOPD.

The methods described herein are suitable for treating human individuals having LOPD. In some embodiments, the individual is diagnosed with LOPD or shows the first symptom of Pompe disease at an age of at least about 18 years old. In some embodiments, the individual is diagnosed with LOPD or shows the first symptom of Pompe disease at an age of at least about any one of 20, 25, 30, 35, 40, 45, 50, 55, 60, 65, 70, 75, 80 years old or older. In some embodiments, the individual is diagnosed with LOPD or shows the first symptom of Pompe disease at an age of about any one of 20, 25, 30, 35, 40, 45, 50, 55, 60, 65, 70, 75, or 80 years old, including any values or ranges in between these values. In some embodiments, the individual is diagnosed with LOPD or shows the first symptom of Pompe disease at an age of about 18 years old to about 45 years old. In some embodiments, the individual is diagnosed with LOPD or shows the first symptom of Pompe disease at an age of no more than about 18 years old. In some embodiments, the individual is diagnosed with LOPD or shows the first symptom of Pompe disease at an age of about any one of 17, 16, 15, 14, 13, 12, 11, 10, 9, 8, 7, 6, 5, 4, 3, 2, or 1 years old, including any values and ranges in between these values.

In some embodiments, the individual has confirmed GAA enzyme deficiency from any tissue source, such as blood (e.g., dried blood spot, purified lymphocytes), muscle biopsy, and skin biopsy. In some embodiments, the individual has a GAA enzyme activity of no more than about any one of 80%, 70%, 60%, 50%, 40%, 30%, 20%, 10%, or less of the normal GAA enzyme activity. In some embodiments, the individual has about 1-40% of normal GAA enzyme activity. In some embodiments, the individual has at least 2 confirmed GAA gene variants. More than 200 mutations in the GAA gene have been described up to date. See, for example, Raben N, Nichols R C, Boerkoel C, et al. Genetic defects in patients with glycogenosis type II (acid maltase deficiency) Muscle Nerve. 1995; 3 (suppl): S70-S74. GAA gene variants can be detected using known methods in the art, including, for example, DNA sequencing, and RT-PCR.

In some embodiments, the individual does not have Pompe-specific cardiac hypertrophy. In some embodiments, the individual does not have cardiomyopathy at the time of diagnosis. In some embodiments, the individual does not have arrhythmia at the time of diagnosis. In some embodiments, the individual does not have cardiomegaly at the time of diagnosis. In some embodiments, the individual does not have severe hypotonia at the time of diagnosis. In some embodiments, the individual does not have severe myopathy at the time of diagnosis.

In some embodiments, the individual is at least 3 years old. In some embodiments, the individual is 18 years old or younger. In some embodiments, the individual is 17 years old or younger, 16 years old or younger, 15 years old or younger, 14 years old or younger, 13 years old or younger, 12 years old or younger, 11 years old or younger, 10 years old or younger, 9 years old or younger, 8 years old or younger, 7 years old or younger, 6 years old or younger, 5 years old or younger, 4 years old or younger, 3 years old or younger. In some embodiments, the individual is about 3 years old to about 18 years old. In some embodiments, the individual is older than 18 years old. In some embodiments, the individual is at least about any one of 20, 25, 30, 35, 40, 45, 50, 55, 60, 65, 70, 75, 80 years old or older. In some embodiments, the individual is about any one of 20, 25, 30, 35, 40, 45, 50, 55, 60, 65, 70, 75, or 80 years old, including any values or ranges in between these values. In some embodiments, the individual is at least about 45 years old. In some embodiments, the individual is about any one of 18-35, 35-45, 45-55, 55-65, 65-80, 18-30, 30-40, 40-50, 50-60, 60-70, 70-80, 18-45, 20-35, 35-55, 45-80, 18-50, 50-80, or 18-80 years old. In some embodiments, the individual is about 18 to about 45 years old. In some embodiments, the individual is between 3 and 5, 5 and 10, 3 and 10, 3 and 12, 12 and 18, or 3 and 18 years old.

In some embodiments, the individual has received at least 6 months of treatment with a recombinant GAA. In some embodiments, the individual has received at least about any one of 8 months, 10 months, 1 year, 2 years, 3 years, 4 years, 5 years, 10 years or more, including any value or range in between these values, of treatment with a recombinant GAA. In other embodiments, the individual has not received treatment with a recombinant GAA. Exemplary recombinant GAA include, but are not limited to, alglucosidase alfa, reveglucosidase alfa (BioMarin), and ATB200 (Amicus).

In some embodiments, the individual shows clinical decline after treatment with the recombinant GAA, wherein the clinical decline is determined by assessing one or more parameters selected from the group consisting of respiratory functions, motor skills and cardiac parameters. In some embodiments, the individual has suboptimal clinical response to treatment with the recombinant GAA. A suboptimal clinical response may be determined by assessing respiratory functions, motor skills, or cardiac parameters. Respiratory functions, motor skills, and/or cardiac parameters can be assessed by forced vital capacity (FV), Quick Motor Function Test, 6 Minute Walk test (6MWT), maximum inspiratory pressure (MIP), maximum expiratory pressure (MEP), hand-held dynamometry (HHD) score for lower extremities, Gait, Stair, Gower's Maneuver, and Chair (GSGC) functional ability score, Gross Motor Function Measure-88 (GMFM-88) and/or use of respiratory support.

In some embodiments, the individual has slow progression of the LOPD.

In some embodiments, prior to the treatment, the individual has an FVC % in an upright position of about 30% to about 85%. In some embodiments, prior to the treatment, the individual has an FVC % in an upright position of any one of 30%, 35%, 40%, 45%, 50%, 55%, 60%, 65%, 70%, 75%, 80%, 85%, including any value or range in between these values. In some embodiments, prior to the treatment, the individual has an FVC % in an upright position of at least about any one of 30%, 35%, 40%, 45%, 50%, 55%, 60%, 65%, 70%, 75%, 80%, or more. In some embodiments, prior to the treatment, the individual has an FVC % in an upright position of between 30% and 40%, between 40% and 50%, between 50% and 85%, or between 30% and 50%.

In some embodiments, prior to the treatment, the individual is able to ambulate for at least about 40 meters without stopping and without an ambulation assistance. In some embodiments, prior to the treatment, the individual is able to ambulate for about any one of 45, 50, 55, 60, 65, 70, 75, 80, 85, 90, 95, 100, 125, 150, 175, 200, 250 or more meters, including any value and range in between these values, without stopping and without an ambulation assistance. In some embodiments, prior to the treatment, the individual is able to ambulate for between 40 m and 50 m without stopping and without an ambulation assistance.

B. Oligosaccharide-Protein Conjugate

The methods described herein use oligosaccharide-protein conjugates (also referred herein as "oligosaccharide GAA conjugates") comprising an oligosaccharide, a GAA (also known as acid α-glucosidase), and a chemical linker connecting the oligosaccharide and the GAA, e.g., via an oxime group. In some embodiments, the oligosaccharide is a hexasaccharide. In some embodiments, the oligosaccharide has two mannose-6-phosphate (M6P). In some embodiments, the oligosaccharide-protein conjugate has about any one of 2, 4, 6, 8, 10, 12, 14, 16, 18, 20 or more M6P, including any value or range between these values. In some embodiments, the oligosaccharide-protein conjugate is avalglucosidase alfa.

In some embodiments, described herein is an oligosaccharide-protein conjugate comprising (1) a GAA protein, (2) an oligosaccharide, and (3) an oxime group connecting the GAA protein and the oligosaccharide.

In some embodiments, the oligosaccharide-protein conjugate has a structure of Formula (I):

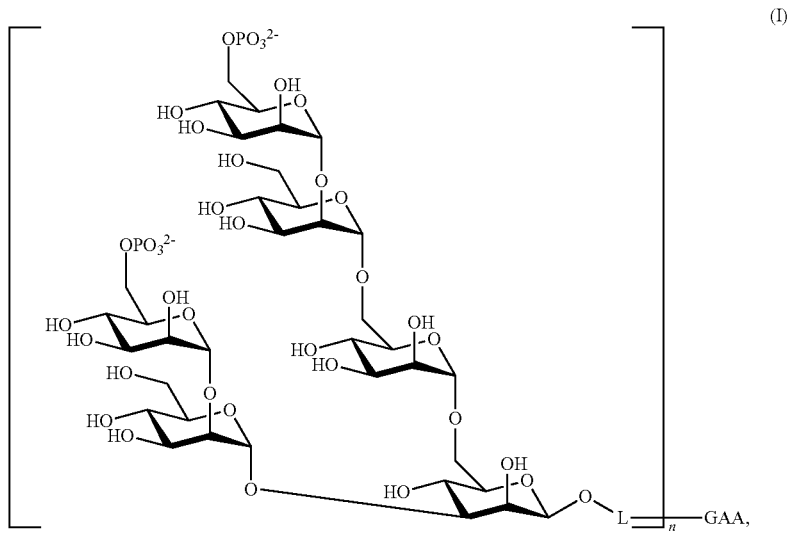

wherein GAA is acid α-glucosidase, L is a chemical linker connecting the oligosaccharide and the GAA, and n is 1 to 10. In some embodiments, n is 1. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is at least 1, 2, 3, 4, 5, 6, 7, 8, or 9. In some embodiments, n is no more than 2, 3, 4, 5, 6, 7, 8, 9, or 10. In some embodiments, n is selected from the following ranges: 1-2, 2-3, 3-4, 4-5, 5-6, 6-7, 7-8, 8-9, 9-10, 1-3, 3-5, 5-7, 7-9, 1-4, 4-7, 7-10, 1-5, 5-10, 2-10, 3-9, 4-8, 2-9, 3-8, 4-7, 5-8, 5-9, 5-10, 4-7, 3-7, 2-7, and 1-7. In some embodiments, n is 5-9.

In some embodiments, the oligosaccharide-protein conjugate has a structure of Formula (II):

wherein GAA is acid α-glucosidase, L' is a chemical linker, and n is 1 to 10. In some embodiments, n is 1. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is at least 1, 2, 3, 4, 5, 6, 7, 8, or 9. In some embodiments, n is no more than 2, 3, 4, 5, 6, 7, 8, 9, or 10. In some embodiments, n is selected from the following ranges: 1-2, 2-3, 3-4, 4-5, 5-6, 6-7, 7-8, 8-9, 9-10, 1-3, 3-5, 5-7, 7-9, 1-4, 4-7, 7-10, 1-5, 5-10, 2-10, 3-9, 4-8, 2-9, 3-8, 4-7, 5-8, 5-9, 5-10, 4-7, 3-7, 2-7, and 1-7. In some embodiments, n is 5-9.

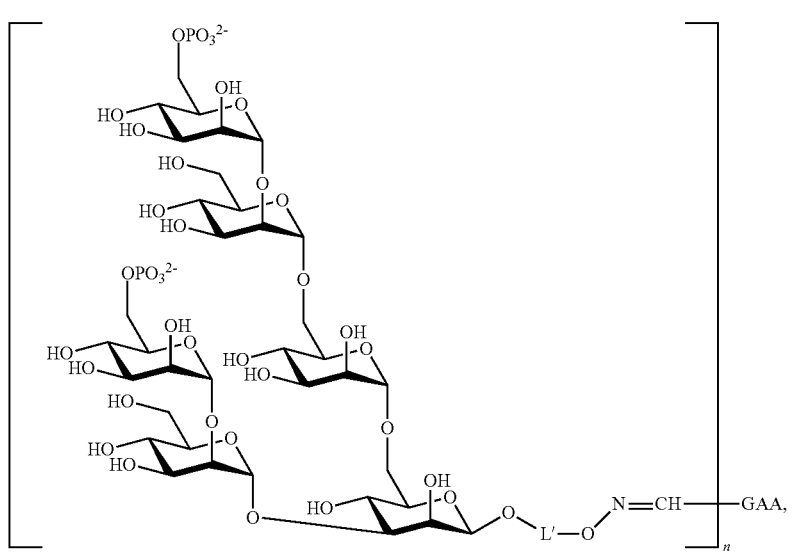

In some embodiments, the oligosaccharide-protein conjugate has a structure of Formula (III):

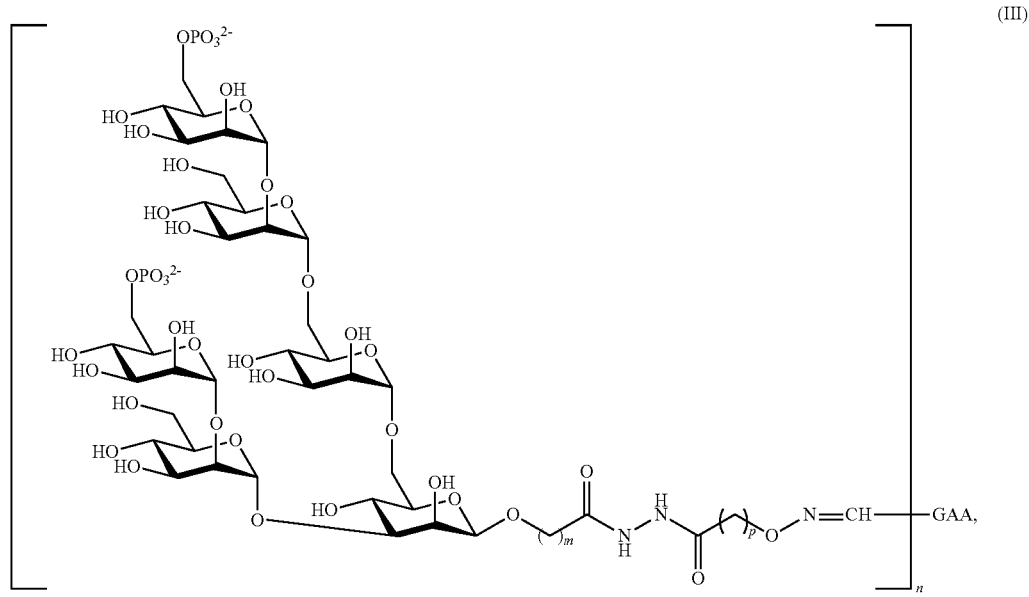

wherein GAA is acid α-glucosidase, n is 1 to 10, and m and p are independently chosen from integers ranging from 1 to 10. In some embodiments, n is 1. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is at least 1, 2, 3, 4, 5, 6, 7, 8, or 9. In some embodiments, n is no more than 2, 3, 4, 5, 6, 7, 8, 9, or 10. In some embodiments, n is selected from the following ranges: 1-2, 2-3, 3-4, 4-5, 5-6, 6-7, 7-8, 8-9, 9-10, 1-3, 3-5, 5-7, 7-9, 1-4, 4-7, 7-10, 1-5, 5-10, 2-10, 3-9, 4-8, 2-9, 3-8, 4-7, 5-8, 5-9, 5-10, 4-7, 3-7, 2-7, and 1-7. In some embodiments, n is 5-9. In some embodiments, m is 1, 2, 3, 4, 5, 6, 7, 8, or 9, or 10. In some embodiments, p is 1, 2, 3, 4, 5, 6, 7, 8, 9, or 10. In some embodiments, m and p are independently chosen from integers selected from the following ranges: 1-4, 4-8, 8-10, 2-4, 2-6, 2-8, 2-10, 1-3, 3-6, 6-9, and 4-10. In some embodiments, m and p are independently chosen from integers ranging from 1 to 5. In some embodiments, m is 1, 2, 3, 4, or 5 and p is 1, 2, 3, 4, or 5. In some embodiments, m is 1, 2, or 3 and p is 1, 2, or 3. In some embodiments, m is 5 and p is 1. In some embodiments, m is 4 and p is 1. In some embodiments, m is 3 and p is 1. In some embodiments, m is 2 and p is 1. In some embodiments, m is 1 and p is 1. In some embodiments, m is no more than 5, and p is no more than 3. In some embodiments, m is no more than 4, and p is no more than 2. In some embodiments, m is no more than 3, and p is no more than 1. In some embodiments, m is at least 1, and p is at least 1. In some embodiments, m is at least 2, and p is at least 1. In some embodiments, m is at least 3, and p is at least 1.

In some embodiments, the number of phosphate groups per oligosaccharide-protein conjugate (e.g., conjugate of formula (I), (II), or (III)] is about 2-20. In some embodiments, the number of phosphate groups per oligosaccharide-protein conjugate is 2, 4, 6, 8, 10, 12, 14, 16, 18, or 20. In some embodiments, the number of phosphate groups per oligosaccharide-protein conjugate is at least 2, 4, 6, 8, 10, 12, 14, 16, 18, or 20. In some embodiments, the number of phosphate groups per oligosaccharide-protein conjugate is no more than 2, 4, 6, 8, 10, 12, 14, 16, 18, or 20. In some embodiments, the number of phosphate groups per oligosaccharide-protein conjugate is an even integer selected from the following ranges: 2-4, 4-6, 6-8, 8-10, 10-12, 12-14, 14-16, 16-18, 18-20, 2-6, 6-10, 10-14, 14-18, 2-8, 8-14, 14-20, 2-10, 10-20, 4-20, 6-18, 8-16, 4-18, 6-16, 8-14, 10-16, 10-18, 10-20, 8-14, 6-14, 4-14, and 2-14.

In some embodiments, the oligosaccharide-protein conjugate is avalglucosidase alfa. Avalglucosidase alfa is also known as neoGAA or GZ402666. Avalglucosidase alfa is an oligosaccharide-modified form of human GAA, comprising a number of hexamannose structures containing two terminal mannose-6-phosphate (M6P) moieties conjugated to the GAA. See, Zhou Q., et al., Bioconjugate Chem. 2011; 22: 741-751. In vitro studies of avalglucosidase alfa demonstrated a 15-fold increase in myoblast uptake compared to alglucosidase alfa. See, Zhou Q. et al. Bioconjugate Chem. 2013; 24: 2025-2035. Avalglucosidase alfa reduced glycogen by a similar amount to alglucosidase alfa when given at one-fifth the dose in the Pompe disease mouse model. See, Zhu Y. et al. Mol. Ther. 2009; 17(6):954-63.

Methods of preparing the oligosaccharide-protein conjugates described herein are known in the art. See, for example, U.S. Pat. No. 7,723,296, WO2008/089403 and WO2010/075010, which are incorporated herein by reference in their entirety.

The oligosaccharide may be isolated from a natural source or may be prepared by chemical or enzymatic synthesis. An oligosaccharide isolated from a natural source may be homogeneous or may be a heterogeneous mixture of related oligosaccharides. In some embodiments, an oligosaccharide may be prepared by chemical or enzymatic modification of an oligosaccharide isolated from a natural source ("semi-synthesis"). In some embodiments, the oligosaccharide may be a synthetic oligosaccharide having the chemical structure of a naturally occurring oligosaccharide.

The sequence of GAA is well known (see, e.g., Martiniuk et al., *Proc. Natl. Acad. Sci. USA* 83:9641-9644 (1986); Hoefsloot et al., *Biochem. J.* 272:493-497 (1990); Moreland et al., *J. Biol. Chem.* 280:6780-6791 (2005). See also GenBank Accession No. NM_000152. The GAA may be a wildtype GAA or a sequence variant thereof.

The GAA may be obtained from a natural source, or recombinantly. In some embodiments, the GAA is a glycoprotein. In some embodiments, the GAA is a human GAA produced in Chinese hamster ovary (CHO) cells. In some embodiments, the human GAA has glycoform alfa. In some embodiments, the GAA has at least one carbonyl group. For example, a GAA having at least one carbonyl group may be obtained by oxidation of the GAA by any means known to those of skill in the art. In some embodiments, e.g., a GAA having at least one carbonyl group may be obtained by oxidation of the GAA with periodate (e.g., sodium periodate) or galactose oxidase. In some embodiments, the GAA having at least one carbonyl group may be chemically conjugated with an oligosaccharide functionalized at the reducing end with a carbonyl-reactive group (such as, e.g., a hydrazine, hydrazide, aminooxy, thiosemicarbazide, semicarbazide, or amine group) to yield an oligosaccharide-GAA conjugate. In some embodiments, the GAA is oxidized with about 1, 2, 3, 4, 5, 7.5, 10, or 22.5 mM periodate. In some embodiments, the GAA is oxidized under conditions sufficient to oxidize sialic acid residues on the glycans of the GAA, and minimize fucose and mannose oxidation. In some embodiments, the periodate concentration used in less than about 2, 3, 4, or 5 mM. In some embodiments, the periodate is sodium periodate.

Other methods of conjugating the oligosaccharide to the GAA protein may be used. In some embodiment, the oligosaccharide-protein conjugate is prepared by reacting an oligosaccharide comprising a first reactive group with a GAA protein having a second reactive group. In some embodiments, the oligosaccharide-protein conjugate is prepared by reacting an oligosaccharide comprising an aminooxy group with a GAA having at least one carbonyl group.

In some embodiments, the oligosaccharide may be conjugated to an amino acid of the GAA protein, such as a cysteine or lysine.

In some embodiments, the oligosaccharide can be conjugated to a glycan on the GAA. In some embodiments, the oligosaccharide may be conjugated to a sialic acid residue on a glycan. In other embodiments, the oligosaccharide may be conjugated to mannose, fucose, galactose, and/or sialic acid residues on a glycan. For conjugation through galactose, the glycoprotein may first be treated with sialidase to remove sialic acid residues, then treated with galactose oxidase prior to reaction with the oligosaccharide.

For example, the oligosaccharide-protein conjugate may be prepared by reaction of any functional group that may be present (including, e.g., an amine, a thiol, a carboxylic acid, a hydroxyl) and/or introduced into a protein with a suitable second functional group on an oligosaccharide. Methods for the introduction of functional groups are well known in the art. For example, a glycoprotein having at least one carbonyl group may be obtained by oxidation of that glycoprotein with, e.g., periodate (e.g., sodium periodate) or with galactose oxidase. In another example, a carbonyl group may be introduced by use of an expression system having an expanded genetic code, as described in, e.g., Wang et al., *Proc. Natl. Acad. Sci. USA* 100:56-61 (2003). See also, e.g., U.S. Patent Application Pub. No. 2006/0228348, which describes the introduction of reactive groups into a glycoprotein.

In certain embodiments, the methods further comprise adding a reducing agent to the oligosaccharide-protein conjugate. The reducing agent may be any reducing agent known to those of skill in the art, such as, e.g., sodium cyanoborohydride or sodium triacetoxyborohydride (STAB).

In certain embodiments, protein aggregates that form during conjugation can be removed using various chromatography methods. In one embodiment, hydrophobic interaction chromatography (HIC) may be employed. Examples of HIC columns include Butyl 650C and 650M, Hexyl 650C, Phenyl 6FF, Capto Octyl and Capto Phenyl. In other embodiments, aggregates may be removed by metal chelation chromatography, such as copper, nickel, cobalt, or mercury. In one embodiment, a copper column can be used in bind-and-elute or in flow-through mode.

In some embodiments, the oligosaccharide comprising a first reactive group is an oligosaccharide comprising an aminooxy group and has a structure of Formula (IV):

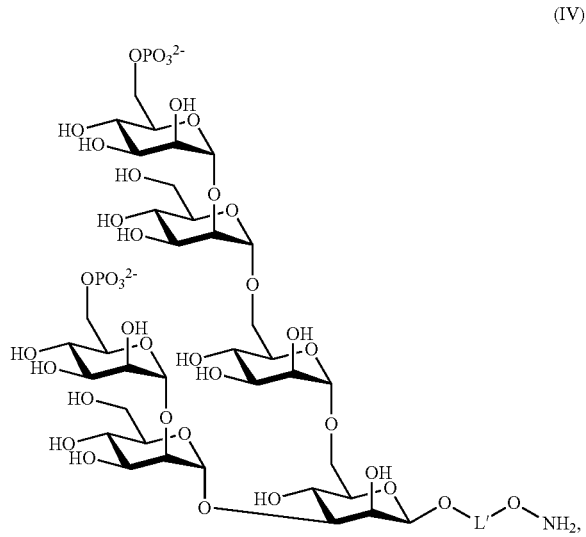

(IV)

wherein L' is a chemical linker.

In some embodiments, the oligosaccharide of Formula (III) is an oligosaccharide of Formula (V):

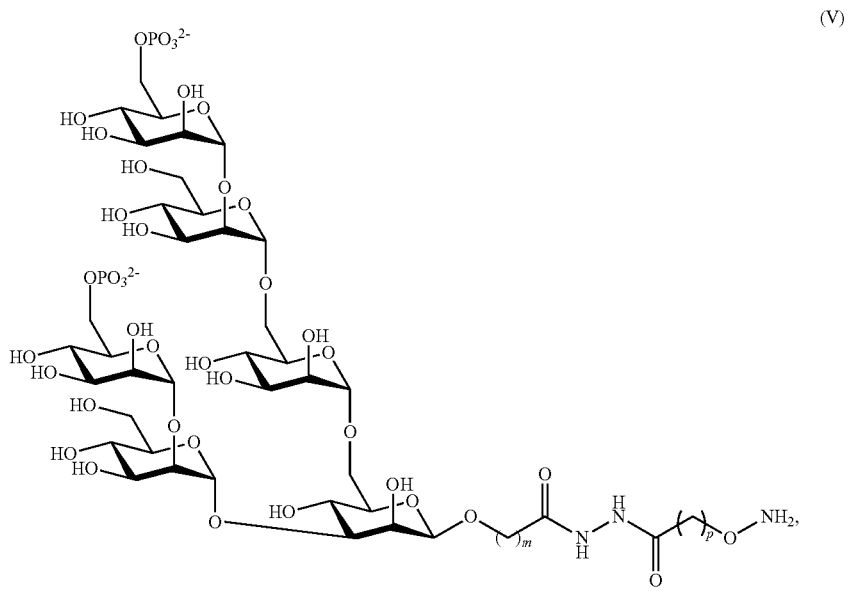

(V)

wherein m and p are independently chosen from integers ranging from 1 to 10. In some embodiments, m is 1, 2, 3, 4, 5, 6, 7, 8, 9, or 10. In some embodiments, p is 1, 2, 3, 4, 5, 6, 7, 8, 9, or 10. In some embodiments, p is at least 1, 2, 3, 4, 5, 6, 7, 8, 9, or 10. In some embodiments, m and p are independently chosen from integers selected from the following ranges: 1-4, 4-8, 8-10, 2-4, 2-6, 2-8, 2-10, 1-3, 3-6, 6-9, and 4-10. In some embodiments, m and p are independently chosen from integers ranging from 1 to 5. In some embodiments, m is 1, 2, 3, 4, or 5 and p is 1, 2, 3, 4, or 5. In some embodiments, m is 1, 2, or 3 and p is 1, 2, or 3. In some embodiments, m is 5 and p is 1. In some embodiments, m is 4 and p is 1. In some embodiments, m is 3 and p is 1. In some embodiments, m is 2 and p is 1. In some embodiments, m is 1 and p is 1. In some embodiments, m is no more than 5, and p is no more than 3. In some embodiments, m is no more than 4, and p is no more than 2. In some embodiments, m is no more than 3, and p is no more than 1. In some embodiments, m is at least 1, and p is at least 1. In some embodiments, m is at least 2, and p is at least 1. In some embodiments, m is at least 3, and p is at least 1.

Further provided are formulations and pharmaceutical compositions comprising any one of the oligosaccharide-GAA conjugates described herein (e.g., Formulae I-III, or avalglucosidase alfa). In some embodiments, the formulation is a lyophilized formulation. In some embodiments, the formulation is a lyophilizable formulation. In some embodiments, the pharmaceutical composition is reconstituted from the lyophilized formulation. Also provided are methods and use of the formulations and pharmaceutical compositions described herein for treating LOPD.

In some embodiments, the formulation comprises: (a) any one of the oligosaccharide-GAA conjugates described herein (e.g., Formulae I-III, or avalglucosidase alfa); and (b) mannitol. In some embodiments, the formulation further comprises a buffering agent, such as histidine. In some embodiments, the formulation further comprises one or more stabilizing agents, such as glycine or arginine. In some embodiments, the formulation further comprises a surfactant, such as polysorbate, e.g., polysorbate 80. In some embodiments, the formulation is a lyophilized formulation. In some embodiments, the formulation is a lyophilizable formulation. In some embodiments, the pharmaceutical composition is reconstituted from a lyophilized formulation.

In some embodiments, the pharmaceutical composition comprises: (a) any one of the oligosaccharide-GAA conjugates described herein (e.g., Formulae I-III, or avalglucosidase alfa); (b) mannitol; (c) arginine; and (d) a buffering agent, such as histidine. In some embodiments, the pharmaceutical composition further comprises a surfactant, such as polysorbate, e.g., polysorbate 80. In some embodiments, the pharmaceutical composition is reconstituted from a lyophilized formulation.

In some embodiments, the pharmaceutical composition comprises: (a) any one of the oligosaccharide-GAA conjugates described herein (e.g., Formulae I-III, or avalglucosidase alfa); (b) mannitol; (c) glycine; and (d) histidine. In some embodiments, the pharmaceutical composition comprises: (a) any one of the oligosaccharide-GAA conjugates described herein (e.g., Formulae I-III, or avalglucosidase alfa); (b) mannitol; (c) glycine; (d) histidine; and (e) polysorbate (e.g., polysorbate 80). In some embodiments, the pharmaceutical composition is reconstituted from a lyophilized formulation.

Unless indicated otherwise, the percentage concentrations described herein are weight-by-weight percentages. When referring to concentrations of the oligosaccharide-GAA conjugate or various excipients in a lyophilized formulation, the concentrations are determined in the composition prior to lyophilization (i.e., in a lyophilizable formulation), or after reconstitution of the lyophilized formulation. The pH of a lyophilized formulation also refers to the pH of the composition prior to lyophilization (i.e., in a lyophilizable formulation), or after reconstitution of the lyophilized formulation.

In some embodiments, the pharmaceutical composition comprises about 1% to about 5% of mannitol, including for example, about any one of 1%, 1.5%, 2%, 2.5%, 3%, 3.5%, 4%, 4.5%, or 5% of mannitol, including any value or range between these values. In some embodiments, the pharmaceutical composition comprises about any one of 1%-2%, 2%-3%, 3%-4%, 4%-5%, 1%-3%, 2%-4%, 1%-4% or 1%-5% of mannitol. In some embodiments, the pharmaceutical composition comprises about 1-4%, such as about 2%, mannitol.

In some embodiments, the pharmaceutical composition comprises about 0.25% to about 4% of an amino acid (e.g., glycine), including for example, about any one of 0.25%, 0.5%, 1%, 1.5%, 2%, 2.5%, 3%, 3.5%, or 4% of the amino acid, including any value or range between these values. In some embodiments, the pharmaceutical composition comprises about any one of 0.25%-0.5%, 0.5%-1%, 1%-2%, 2%-3%, 3%-4%, 1%-3%, 2%-4%, 0.25%-1%, 0.25%-1.5%, or 0.25%-2% of the amino acid. In some embodiments, the pharmaceutical composition comprises about 0.25%-2% glycine. In some embodiments, the pharmaceutical composition comprises about 2% glycine.

In some embodiments, the pharmaceutical composition comprises mannitol and an amino acid (e.g., glycine) at a weight ratio of about any one of 16:1, 8:1, 4:1, 2:1, 1:1, 1:2, 1:3, 1:4 or 1:5, including any value or range between these values. In some embodiments, the pharmaceutical composition comprises mannitol and glycine at a weight ratio of about 1:1.

In some embodiments, the pharmaceutical composition comprises about 5 mM to about 50 mM buffering agent (e.g., histidine), including for example, about any one of 5 mM, 10 mM, 15 mM, 20 mM, 25 mM, 30 mM, 35 mM, 40 mM, 45 mM or 50 mM, including any value or range between these values. In some embodiments, the pharmaceutical composition comprises about any one of 5-10 mM, 10-20 mM, 20-30 mM, 30-40 mM, 40-50 mM, 5-20 mM, 10-40 mM, 10-50 mM, 5-25 mM, or 25-50 mM of the buffering agent. In some embodiments, the pharmaceutical composition comprises about 10-50 mM histidine. In some embodiments, the pharmaceutical composition comprises about 10 mM histidine.

In some embodiments, the pharmaceutical composition has a pH of about 5.5 to about 6.5, including, for example, about any one of 5.5, 5.6, 5.7, 5.8, 5.9, 6.0, 6.1, 6.2, 6.3, 6.4, or 6.5, including any value or range between these values. In some embodiments, the pharmaceutical composition has a pH of about any one of 5.5-6, 6-6.5, 5.5-5.75, 5.75-6, 6-6.25, 5.75-6.25, or 6.25-6.5. In some embodiments, the pharmaceutical composition has a pH of about 6.2.

In some embodiments, the pharmaceutical composition comprises about 0.005-0.05% of a surfactant (e.g., polysorbate), including for example, about any one of 0.005%, 0.0075%, 0.01%, 0.015%, 0.02%, 0.025%, 0.03%, 0.035%, 0.04%, 0.045%, or 0.05%, including any value or range between these values. In some embodiments, the pharmaceutical composition comprises about any one of 0.005-0.01%, 0.01-0.02%, 0.02-0.03%, 0.03-0.04%, 0.04-0.05%, 0.005-0.02%, 0.01-0.04%, or 0.005-0.05% of the surfactant (e.g., polysorbate). In some embodiments, the pharmaceutical composition comprises about 0.01% polysorbate 80.

In some embodiments, the pharmaceutical composition comprises about 1-10 mg/mL of the oligosaccharide-GAA conjugate, including, for example, about any one of 1, 2, 3, 4, 5, 6, 7, 8, 9, or 10 mg/mL of the oligosaccharide-GAA conjugate. In some embodiments, the pharmaceutical composition comprises about any one of 1-5, 2-8, 3-7, 4-6, 1-2.5, 2.5-5, 5-7.5, 7.5-10 or 5-10 mg/mL of the oligosaccharide-GAA conjugate. In some embodiments, the pharmaceutical composition comprises about 5-10 mg/mL of the oligosaccharide-GAA conjugate. In some embodiments, the pharmaceutical composition comprises about 5 mg/mL of the oligosaccharide-GAA conjugate.

In some embodiments, the pharmaceutical composition comprises: (a) any one of the oligosaccharide-GAA conjugates described herein (e.g., Formulae I-III, or avalglucosidase alfa); (b) about 1-4% mannitol; (c) about 0.25-2% glycine; (d) about 10-50 mM histidine; and (e) about 0.005-0.05% polysorbate (e.g., polysorbate 80). In some embodiments, the pharmaceutical composition comprises about 5 mg/mL to about 10 mg/mL of the oligosaccharide-GAA conjugate. In some embodiments, the pharmaceutical composition has a pH of about 5.5 to about 6.5.

In some embodiments, the pharmaceutical composition comprises: (a) any one of the oligosaccharide-GAA conjugates described herein (e.g., Formulae I-III, or avalglucosidase alfa); (b) about 2% mannitol; (c) about 2% glycine; (d) about 10 mM histidine; and (e) about 0.01% polysorbate 80. In some embodiments, the pharmaceutical composition comprises about 5 mg/mL of the oligosaccharide-GAA conjugate. In some embodiments, the pharmaceutical composition has a pH of about 6.2.

The term "buffer" encompasses those agents which maintain the solution pH in an acceptable range prior to lyophilization and may include succinate (sodium or potassium), histidine, phosphate (sodium or potassium), Tris(tris (hydroxymethyl)aminomethane), diethanolamine, citrate (sodium) and the like. Examples of buffers that will control the pH in this range include succinate (such as sodium succinate), gluconate, histidine, citrate and other organic acid buffers.

The term "cryoprotectants" generally includes agents, which provide stability to the protein against freezing-induced stresses, presumably by being preferentially excluded from the protein surface. They may also offer protection during primary and secondary drying, and long-term product storage. Examples are polymers such as dextran and polyethylene glycol; sugars such as mannitol; surfactants such as polysorbates; and amino acids such as glycine, arginine, and serine.

The formulations described herein may further comprise one or more pharmaceutically acceptable excipients, such as bulking agents, tonicity modifiers, anti-oxidants and preservatives The cryoprotectants described herein, such as mannitol and glycine, may serve the multiple roles, including being a bulking agent and/or a tonicity modifier. The term "bulking agents" comprise agents that provide the structure of the freeze-dried product. In addition to providing a pharmaceutically elegant cake, bulking agents may also impart useful qualities in regard to modifying the collapse temperature, providing freeze-thaw protection, and enhancing the protein stability over long-term storage. The term "tonicity modifiers" includes salts (NaCl, KCl, $MgCl_2$, $CaC_{12}$, etc.) that used as tonicity modifiers to control osmotic pressure.

In some embodiments, the formulations described herein comprise an anti-oxidant, such as methionine. In some embodiments, the formulations described herein do not comprise an anti-oxidant. In some embodiments, the formulation comprises about 1-20 mM of an anti-oxidant (e.g., methionine), including for example, about any one of 1, 2, 5, 10, 15, or 20 mM of the anti-oxidant, including any value or range between these values.

The formulations described herein are stable. A "stable" formulation is one in which the protein therein essentially retains its physical stability and/or chemi-cal stability and/or biological activity upon storage. Various analytical techniques for measuring protein stability are available in the art and are reviewed in Peptide and Protein Drug Delivery, 247-301, Vincent Lee Ed., Marcel Dekker, Inc., New York, N.Y., Pubs. (1991) and Jones, A. Adv. Drug Delivery Rev. 10:29-90 (1993). Stability can be measured at a selected temperature for a selected time period.

III. Kits and Articles of Manufacture

The present application further provides kits and articles of manufacture for use in any embodiment of the treatment methods described herein. The kits and articles of manufacture may comprise any one of the formulations and pharmaceutical compositions described herein. For example, a kit comprising a lyophilized formulation of avalglucosidase alfa is provided.

In some embodiments, there is provided a kit for treating LOPD comprising a formulation comprising any one of the oligosaccharide-GAA conjugates described herein (e.g., Formulae I-III, or avalglucosidase alfa). In some embodiments, the kit comprises a formulation comprising any one of the oligosaccharide-GAA conjugates described herein (e.g., Formulae I-III, or avalglucosidase alfa), histidine, glycine, mannitol, and polysorbate 80. In some embodiments, the formulation comprises about 10-50 mM (e.g., about 10 mM) histidine, about 0.25-2% (e.g., about 2%) glycine, about 1-4% (e.g., about 2%) mannitol and about 0.005-0.05% (e.g., about 0.01%) polysorbate 80. In some embodiments, the formulation is a lyophilized formulation, a lyophilizable formulation, or a reconstituted liquid formulation. In some embodiments, the pH of the formulation is about 5.5 to about 6.5 (e.g., about 6.2). In some embodiments, the formulation comprises about 5 mg/mL to about 10 mg/mL of the oligosaccharide-GAA conjugate. In some embodiments, the formulation comprises avalglucosidase alfa.

In one embodiment, there is provided an article of manufacture for treating LOPD comprising a container comprising a formulation comprising any one of the oligosaccharide-GAA conjugates described herein (e.g., Formulae I-III, or avalglucosidase alfa). In some embodiments, the article of manufacture comprises a container comprises a formulation comprising any one of the oligosaccharide-GAA conjugates described herein (e.g., Formulae I-III, or avalglucosidase alfa), about 10-50 mM (e.g., about 10 mM) histidine, about 0.25-2% (e.g., about 2%) glycine, about 1-4% (e.g., about 2%) mannitol and about 0.005-0.05% (e.g., about 0.01%) polysorbate 80. In some embodiments, the formulation is a lyophilized formulation, a lyophilizable formulation or a reconstituted liquid formulation. In some embodiments, the pH of the formulation is about 5.5 to about 6.5 (e.g., about 6.2). In some embodiments, the formulation comprises about 5 mg/mL to about 10 mg/mL of the oligosaccharide-GAA conjugate. In some embodiments, the formulation comprises avalglucosidase alfa. In some embodiments, the container is a vial. In some embodiments, the container is a 20 cc vial.

The kits and articles of manufacture of the present application are in suitable packaging. Suitable packaging include, but is not limited to, vials, bottles, jars, flexible packaging (e.g., Mylar or plastic bags), and the like. Kits may optionally provide additional components such as buffers and interpretative information. The present application thus also provides articles of manufacture, which include vials (such as sealed vials), bottles, jars, flexible packaging, and the like.

A kit further comprises instructions for using the oligosaccharide-GAA conjugate in treating LOPD. In some embodiments, the kit further comprises an instructional manual, such as a manual describing a protocol of any embodiment of the treatment methods described herein. The instructions may include information on dosage, dosing schedule, and routes of administration of oligosaccharide-GAA conjugate (e.g., avalglucosidase alfa). In some embodiments, the kit further comprises instructions for selecting an individual for the treatment method. In some embodiments, the kit further comprises instructions for monitoring an individual after receiving the treatment.

The containers may be unit doses, bulk packages (e.g., multi-dose packages) or sub-unit doses. For example, kits may be provided that contain sufficient oligosaccharide-GAA conjugate (e.g., avalglucosidase alfa) as disclosed herein to provide effective treatment of an individual for an extended period, such as any of 3 weeks, 6 weeks, 9 weeks, 3 months, 4 months, 5 months, 6 months, 8 months, 9 months, 1 year or more.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

IV. Exemplary Embodiments

The invention provides the following embodiments:

Embodiment I-1. A method for treating a late-onset Pompe disease (LOPD) in a human individual, comprising administering to the individual a pharmaceutical composition comprising an oligosaccharide-protein conjugate and a pharmaceutically acceptable carrier, wherein the oligosaccharide-protein conjugate has a structure of Formula I:

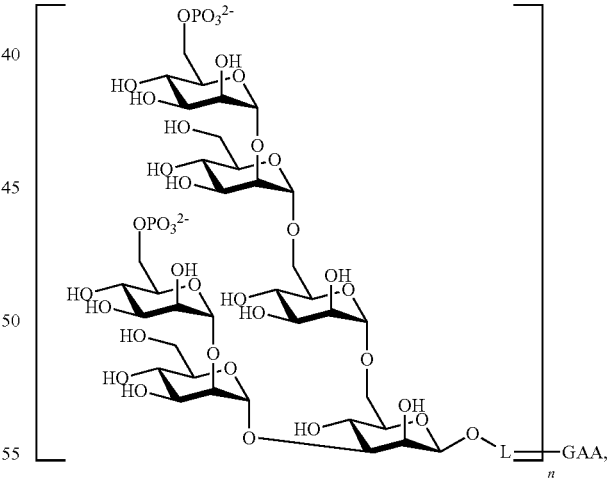

wherein GAA is acid α-glucosidase, L is a chemical linker connecting the oligosaccharide and the GAA, and n is 1 to 10, and wherein the pharmaceutical composition is administered at a dose of about 20 mg/kg.

Embodiment I-2. The method of Embodiment I-1, wherein the individual is at least about 45 years old.

Embodiment I-3. The method of Embodiment I-1, wherein the individual is between about 18 years old and about 45 years old.

Embodiment I-4. The method of Embodiment I-1, wherein the individual is no more than about 18 years old.

Embodiment I-5. The method of any one of Embodiments I-1 to I-4, wherein the individual is diagnosed with Pompe disease at an age of at least about 18 years old.

Embodiment I-6. The method of any one of Embodiments I-1 to I-5, wherein the individual shows the first symptom of Pompe Disease at an age of at least about 18 years old.

Embodiment I-7. The method of any one of Embodiments I-1 to I-6, wherein the individual has not previously received treatment with a recombinant GAA.

Embodiment I-8. The method of any one of Embodiments I-1 to I-6, wherein the individual has previously received treatment with a recombinant GAA.

Embodiment I-9. The method of Embodiment I-7 or I-8, wherein the recombinant GAA is alglucosidase alfa.

Embodiment I-10. The method of any one of Embodiments I-1 to I-9, wherein prior to the treatment, the individual has a forced vital capacity percentage of predicted value (FVC %) in an upright position between about 30% and about 85%.

Embodiment I-11. The method of any one of Embodiments I-1 to I-10, wherein prior to the treatment, the individual is able to ambulate for at least about 40 meters without stopping and without an ambulation assistance device.

Embodiment I-12. The method of any one of Embodiments I-1 to I-11, wherein the individual does not have Pompe-specific cardiac hypertrophy.

Embodiment I-13. The method of any one of Embodiments I-1 to I-12, wherein the individual has confirmed GAA enzyme deficiency from any tissue source and/or at least 2 confirmed GAA gene variants.

Embodiment I-14. The method of any one of Embodiments I-1 to I-13, wherein the individual is administered with the pharmaceutical composition for at least about 49 weeks.

Embodiment I-15. The method of Embodiment I-14, wherein the individual has an increase in FVC % in an upright position by at least about 1.13% after receiving the treatment (e.g., for about 49 weeks).

Embodiment I-16. The method of Embodiment I-14 or I-15, wherein the individual has an increase in FVC % in an upright position after receiving the treatment that is at least about 2.43% higher compared to that after treatment with alglucosidase alfa (e.g., for about 49 weeks).

Embodiment I-17. The method of any one of Embodiments I-14 to I-16, wherein the individual has an increase in 6-minute walk test (6MWT) distance by at least about 12.47 meters after receiving the treatment (e.g., for about 49 weeks).

Embodiment I-18. The method of any one of Embodiments I-14 to I-17, wherein the individual has an increase in 6MWT distance after receiving the treatment that is at least about 30.01 meters longer compared to that after treatment with alglucosidase alfa (e.g., for about 49 weeks).

Embodiment I-19. The method of any one of Embodiments I-14 to I-18, wherein the individual has an increase in 6MWT percentage of predicted value (6MWT %) by at least about 1.95% after receiving the treatment (e.g., for about 49 weeks).

Embodiment I-20. The method of any one of Embodiments I-14 to I-19, wherein the individual has an increase in 6MWT % after receiving the treatment that is at least about 4.71% longer compared to that after treatment with alglucosidase alfa (e.g., for about 49 weeks).

Embodiment I-21. The method of any one of Embodiments I-14 to I-20, wherein the individual has an increase in maximum inspiratory pressure percentage of predicted value (MIP %) in an upright position of at least about 8.70% after receiving the treatment (e.g., for about 49 weeks).

Embodiment I-22. The method of any one of Embodiments I-14 to I-20, wherein the individual has an increase in MIP % in an upright position after receiving the treatment that is at least about 4.40% higher compared to that after treatment with alglucosidase alfa (e.g., for about 49 weeks).

Embodiment I-23. The method of any one of Embodiments I-14 to I-22, wherein the individual has an increase in maximum expiratory pressure percentage (MEP %) in an upright position of at least about 10.89% after receiving the treatment (e.g., for about 49 weeks).

Embodiment I-24. The method of any one of Embodiments I-14 to I-23, wherein the individual has an increase in MEP % in an upright position after receiving the treatment that is at least about 2.51% higher compared to that after treatment with alglucosidase alfa (e.g., for about 49 weeks).

Embodiment I-25. The method of any one of Embodiments I-14 to I-24, wherein the individual has an increase in hand-held dynamometry (HHD) score for lower extremities of at least about 169.11 Newton after receiving the treatment (e.g., for about 49 weeks).

Embodiment I-26. The method of any one of Embodiments I-14 to I-25, wherein the individual has an increase in HHD score for lower extremities after receiving the treatment that is at least about 106.97 Newton higher compared to that after treatment with alglucosidase alfa (e.g., for about 49 weeks).

Embodiment I-27. The method of any one of Embodiments I-14 to I-26, wherein the individual has an increase in HHD score for upper extremities by at least about 97.84 Newton after treatment with alglucosidase alfa (e.g., for about 49 weeks).

Embodiment I-28. The method of any one of Embodiments I-14 to I-27, wherein the individual has an increase in HHD score for upper extremities of at least about 63.87 Newton higher compared to that after treatment with alglucosidase alfa (e.g., for about 49 weeks).

Embodiment I-29. The method of any one of Embodiments I-14 to I-28, wherein the individual has an increase in quick motor function test (QMFT) total score of at least about 2.72 after receiving the treatment (e.g., for about 49 weeks).

Embodiment I-30. The method of any one of Embodiments I-14 to I-29, wherein the individual has an increase in QMFT total score after receiving the treatment that is at least about 2.08 higher compared to that after treatment with alglucosidase alfa (e.g., for about 49 weeks).

Embodiment I-31. The method of any one of Embodiments I-14 to I-30, wherein the individual has an increase in health-related quality of life Short Form 12 Health Survey (SF-12®) physical component score (PCS) of at least about 0.40 after receiving the treatment (e.g., for about 49 weeks).

Embodiment I-32. The method of any one of Embodiments I-14 to I-31, wherein the individual has an increase in SF-12® PCS after receiving the treatment that is at least about 0.77 higher compared to that after treatment with alglucosidase alfa (e.g., for about 49 weeks).

Embodiment I-33. The method of any one of Embodiments I-14 to I-32, wherein the individual has an increase in SF-12® mental component score (MCS) of at least about 0.47 after receiving the treatment (e.g., for about 49 weeks).

Embodiment I-34. The method of any one of Embodiments I-14 to I-33, wherein the individual has an increase in SF-12® MCS after receiving the treatment that is at least about 2.12 higher compared to that after treatment with alglucosidase alfa (e.g., for about 49 weeks).

Embodiment I-35. The method of any one of Embodiments I-14 to I-34, wherein the individual has a decrease in urinary HEX4 level of at least about 53.90% after receiving the treatment (e.g., for about 49 weeks).

Embodiment I-36. The method of any one of Embodiments I-14 to I-35, wherein the individual has a decrease in urinary HEX4 level after receiving the treatment that is at least about 43.14% lower compared to that after treatment with alglucosidase alfa (e.g., for about 49 weeks).

Embodiment I-37. The method of any one of Embodiments I-14 to I-36, wherein the individual has a decrease in creatine kinase level of at least about 38.02% after receiving the treatment (e.g., for about 49 weeks).

Embodiment I-38. The method of any one of Embodiments I-14 to I-37, wherein the individual has a decrease in creatine kinase level after receiving the treatment that is at least about 23.89% lower compared to that after treatment with alglucosidase alfa (e.g., for about 49 weeks).

Embodiment I-39. The method of any one of Embodiments I-14 to I-38, wherein the individual has a decrease in alanine aminotransferase (ALT) level after receiving the treatment that is at least about 33.9% lower compared to that after treatment with alglucosidase alfa (e.g., for about 49 weeks).

Embodiment I-40. The method of any one of Embodiments I-14 to I-39, wherein the individual has a decrease in ALT level of at least about 43.32% after receiving the treatment (e.g., for about 49 weeks).

Embodiment I-41. The method of any one of Embodiments I-14 to I-40, wherein the individual has a decrease in aspartate aminotransferase (AST) level after receiving the treatment that is at least about 32.28% lower compared to that after treatment with alglucosidase alfa (e.g., for about 49 weeks).

Embodiment I-42. The method of any one of Embodiments I-14 to I-41, wherein the individual has a decrease in AST level of at least about 46.12% after receiving the treatment (e.g., for about 49 weeks).

Embodiment I-43. The method of any one of Embodiments I-1 to I-42, wherein the individual has stable Mercuri scores, 3-point Dixon fat fraction, and/or T2 water with or without B1 correction according to skeletal muscle magnetic resonance imaging (MRI) over the course of the treatment.

Embodiment I-44. The method of any one of Embodiments I-1 to I-43, wherein the individual has lower risk of infusion-associated reaction (IARs) after receiving the treatment compared to that after treatment with alglucosidase alfa.

Embodiment I-45. The method of any one of Embodiments I-1 to I-44, wherein the individual has decreasing level of antidrug antibody (ADA) against the oligosaccharide-protein conjugate over time.

Embodiment I-46. The method of any one of Embodiments I-1 to I-45, wherein the pharmaceutical composition is administered to the individual once every two weeks.

Embodiment I-47. The method of any one of Embodiments I-1 to I-46, wherein the pharmaceutical composition is administered intravenously.

Embodiment I-48. The method of any one of Embodiments I-1 to I-47, wherein the pharmaceutical composition is reconstituted from a lyophilized formulation comprising the oligosaccharide-protein conjugate.

Embodiment I-49. The method of Embodiment I-48, wherein the pharmaceutically acceptable carrier comprises about 10-50 mM histidine, about 0.25-2% glycine, about 1-4% mannitol, and about 0.005-0.05% polysorbate 80.

Embodiment I-50. The method of Embodiment I-49, wherein the pharmaceutically acceptable carrier comprises about 10 mM histidine, about 2% glycine, about 2% mannitol, and about 0.01% polysorbate 80.

Embodiment I-51. The method of any one of Embodiments I-1 to I-50, wherein the oligosaccharide-protein conjugate has a structure of Formula II:

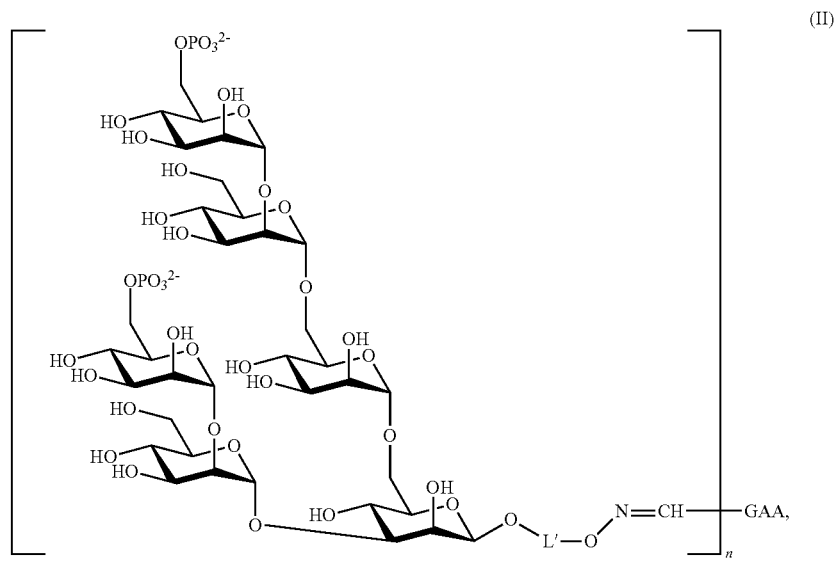

wherein GAA is acid α-glucosidase, L' is a chemical linker, and n is 1 to 10.

Embodiment I-52. The method of Embodiment I-51, wherein the oligosaccharide-protein conjugate has a structure of Formula III:

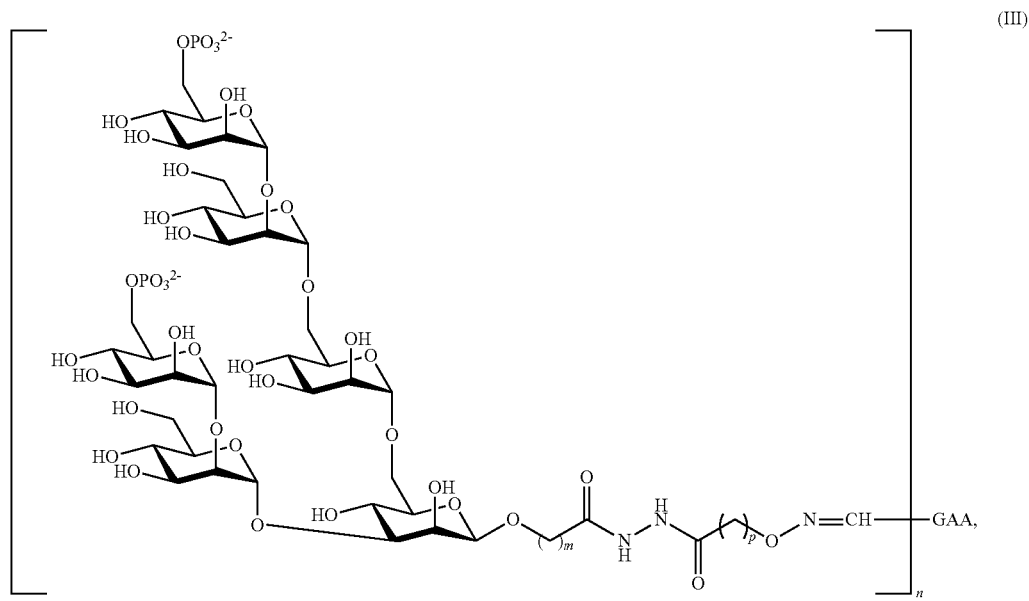

wherein GAA is acid α-glucosidase, n is 1 to 10, and wherein m and p are independently chosen from integers ranging from 1 to 10.

Embodiment I-53. The method of Embodiment I-52, wherein m is 3 and p is 1.

Embodiment I-54. The method of Embodiment I-52 or I-53, wherein n is 5-7.

Embodiment I-55. The method of any one of Embodiments 1-54, wherein the GAA is a human GAA produced in Chinese hamster ovary (CHO) cells.

Embodiment I-56. The method of Embodiment I-55, wherein the human GAA has glycoform alfa.

Embodiment I-57. The method of Embodiment I-56, wherein the oligosaccharide-protein conjugate is avalglucosidase alfa.

The present application further provides the following exemplary Embodiments:

Embodiment II-1. A method for treating a late-onset Pompe disease (LOPD) in a human individual in need thereof, comprising administering to the individual a pharmaceutical composition comprising an oligosaccharide-protein conjugate and a pharmaceutically acceptable carrier, wherein the oligosaccharide-protein conjugate has a structure of Formula I:

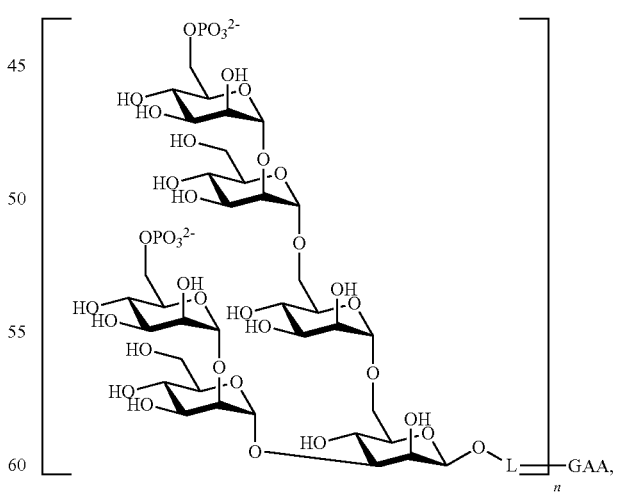

wherein GAA is acid α-glucosidase, L is a chemical linker connecting the oligosaccharide and the GAA, and n is 1 to 10, wherein the pharmaceutical composition is administered at a dose of about 20 mg/kg, wherein the individual has one or more of the following characteristics:
(a) the individual is about 3 years old to about 18 years old at the start of the treatment;
(b) the individual has a forced vital capacity (FVC) percentage of predicted value of about 30% to about 50% before receiving the treatment; and
(c) the individual is able to ambulate about 40 meters to about 50 meters without stopping or using an assistive device before receiving the treatment.

Embodiment II-2. The method of Embodiment II-1, wherein the individual is about 3 years old to about 18 years old at the start of the treatment.

Embodiment II-3. The method of Embodiment II-1 or II-2, wherein the individual has a forced vital capacity (FVC) percentage of predicted value of about 30% to about 50% before receiving the treatment.

Embodiment II-4. The method of any one of the preceding Embodiments II, the individual is able to ambulate about 40 meters to about 50 meters without stopping or using an assistive device before receiving the treatment.

Embodiment II-5. The method of any one of the preceding Embodiments II, wherein administration of the pharmaceutical composition to a plurality of human individuals for 49 weeks results in one or more of the following:
(a) an average increase of FVC % in an upright position of at least about 1.1%, at least about 2.3%, or at least about 4.6%;
(b) an average increase of 6-minute walk test (6MWT) distance of at least about 12.5 m, at least about 23 m, or at least about 50 m;
(c) an average increase in 6MWT percentage of predicted value (6MWT %) of at least about 2%, at least about 3.5%, or at least about 8%;
(d) an average increase in maximum inspiratory pressure percentage of predicted value (MIP %) in an upright position of at least about 4.5%, at least about 8.7%, or at least about 12.5%;
(e) an average increase in maximum expiratory pressure percentage (MEP %) in an upright position of at least about 5.2%, at least about 10.9%, at least about 14.3%, or at least about 16.5%;
(f) an average increase in hand-held dynamometry (HHD) score for lower extremities of at least about 170 Newtons (N), at least about 250 N, or at least about 350 N;
(g) an average increase in HHD score for upper extremities of at least about 95 N, at least about 190 N, or at least about 245 N;
(h) an average increase in quick motor function test (QMFT) total score of at least about 2.7, at least about 3.3, or at least about 5.2;
(i) an average change of Gait, Stair, Gower's Maneuver, and Chair (GSGC) score of at least about −0.9, at least about −0.35, or at least about 0.40;
(j) an average increase of GMFM-88 Dimension D score of at least about 2.2, at least about 3.3, or at least about 5.8;
(k) an average increase of GMFM-88 Dimension E score of at least about 0.7, at least about 4.5, or at least about 5.2;
(l) an average increase in health-related quality of life Short Form 12 Health Survey (SF-12®) physical component score (PCS) of at least about 0.4, at least about 3.7, or at least about 4.3%;
(m) an average increase in SF-12® mental component score (MCS) of at least about 0.45, at least about 3.4, or at least about 5.3;
(n) an average decrease in urinary HEX4 level of at least about 30%, at least about 43%, or at least about 78%;
(o) an average decrease in creatine kinase level of at least about 13%, at least about 39%, or at least about 63%;
(p) an average decrease in alanine aminotransferase (ALT) level of at least about 19%, at least about 38%, or at least about 68%; and
(q) an average decrease in aspartate aminotransferase (AST) level of at least about 26%, at least about 33%, or at least about 66%.

Embodiment II-6. A method for treating a late-onset Pompe disease (LOPD) in a human individual in need thereof, comprising administering to the individual a pharmaceutical composition comprising an oligosaccharide-protein conjugate and a pharmaceutically acceptable carrier, wherein the oligosaccharide-protein conjugate has a structure of Formula I:

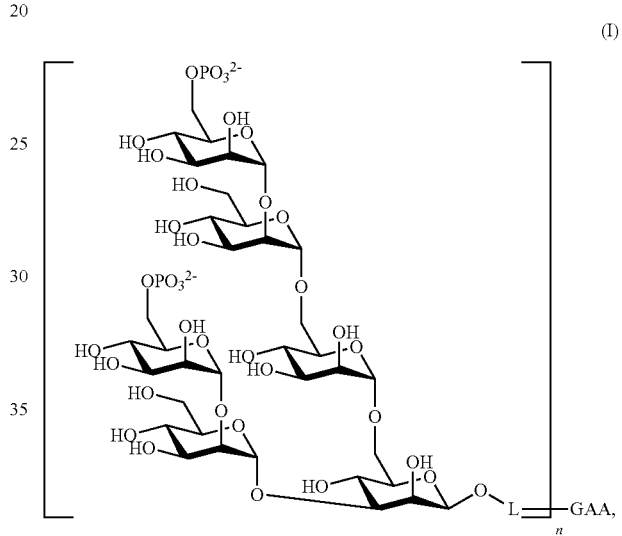

wherein GAA is acid α-glucosidase, L is a chemical linker connecting the oligosaccharide and the GAA, and n is 1 to 10,
wherein the pharmaceutical composition is administered at a dose of about 20 mg/kg, and
wherein administration of the pharmaceutical composition to a plurality of human individuals for 49 weeks results in one or more of the following:
(a) an average increase of FVC % in an upright position of at least about 1.1%, at least about 2.3%, or at least about 4.6%;
(b) an average increase of 6-minute walk test (6MWT) distance of at least about 12.5 m, at least about 23 m, or at least about 50 m;
(c) an average increase in 6MWT percentage of predicted value (6MWT %) of at least about 2%, at least about 3.5%, or at least about 8%;
(d) an average increase in maximum inspiratory pressure percentage of predicted value (MIP %) in an upright position of at least about 4.5%, at least about 8.7%, or at least about 12.5%;
(e) an average increase in maximum expiratory pressure percentage (MEP %) in an upright position of at least about 5.2%, at least about 10.9%, at least about 14.3%, or at least about 16.5%;

(f) an average increase in hand-held dynamometry (HHD) score for lower extremities of at least about 170 Newtons (N), at least about 250 N, or at least about 350 N;

(g) an average increase in HHD score for upper extremities of at least about 95 N, at least about 190 N, or at least about 245 N;

(h) an average increase in quick motor function test (QMFT) total score of at least about 2.7, at least about 3.3, or at least about 5.2;

(i) an average change of Gait, Stair, Gower's Maneuver, and Chair (GSGC) score of at least about −0.9, at least about −0.35, or at least about 0.40;

(j) an average increase of GMFM-88 Dimension D score of at least about 2.2, at least about 3.3, or at least about 5.8;

(k) an average increase of GMFM-88 Dimension E score of at least about 0.7, at least about 4.5, or at least about 5.2;

(l) an average increase in health-related quality of life Short Form 12 Health Survey (SF-12®) physical component score (PCS) of at least about 0.4, at least about 3.7, or at least about 4.3%;

(m) an average increase in SF-12® mental component score (MCS) of at least about 0.45, at least about 3.4, or at least about 5.3;

(n) an average decrease in urinary HEX4 level of at least about 30%, at least about 43%, or at least about 78%;

(o) an average decrease in creatine kinase level of at least about 13%, at least about 39%, or at least about 63%;

(p) an average decrease in alanine aminotransferase (ALT) level of at least about 19%, at least about 38%, or at least about 68%; and (q) an average decrease in aspartate aminotransferase (AST) level of at least about 26%, at least about 33%, or at least about 66%.

Embodiment II-7. The method of Embodiment II-6, wherein the individual is at least about 45 years old.

Embodiment II-8. The method of Embodiment II-6, wherein the individual is between about 18 years old and about 45 years old.

Embodiment II-9. The method of Embodiment II-6, wherein the individual is no more than about 18 years old.

Embodiment II-10. The method of any one of Embodiments II-6 to II-8, wherein the individual is diagnosed with Pompe disease at an age of at least about 18 years old.

Embodiment II-11. The method of any one of Embodiments II-6 to II-8 and II-10, wherein the individual shows the first symptom of Pompe Disease at an age of at least about 18 years old.

Embodiment II-12. The method of any one of the preceding Embodiments II, wherein administration of the pharmaceutical composition to a plurality of human individuals for 49 weeks results in one or more of the following:

(a) an average increase of FVC % in an upright position of about 2.89% within a 95% confidence interval of about 1.1% to about 4.7%;

(b) an average increase of 6-minute walk test (6MWT) distance of about 32.2 meters within a 95% confidence interval of about 12.4 meters to about 52 meters;

(c) an average increase in 6MWT percentage of predicted value (6MWT %) of about 5.0% within a 95% confidence interval of about 1.9% to about 8.1%;

(d) an average increase in maximum inspiratory pressure percentage of predicted value (MIP %) in an upright position of about 8.7% within a 95% confidence interval of about 4.5% to about 12.9%;

(e) an average increase in maximum expiratory pressure percentage (MEP %) in an upright position of at least about 10.9% within a 95% confidence interval of about 5.2% to about 16.5%;

(f) an average increase in hand-held dynamometry (HHD) score for lower extremities of about 260 Newtons (N) within a 95% confidence interval of about 169 N to about 352 N;

(g) an average increase in HHD score for upper extremities of about 174 N within a 95% confidence interval of about 97.8 N to about 249 N;

(h) an average increase in quick motor function test (QMFT) total score of about 4.0 within a 95% confidence interval of about 2.7 to about 5.2;

(i) an average change of Gait, Stair, Gower's Maneuver, and Chair (GSGC) score of about −0.25 within a 95% confidence interval of about −0.94 to about 0.43;

(j) an average increase of GMFM-88 Dimension D score of about 4.0 within a 95% confidence interval of about 2.2 to about 5.8;

(k) an average increase of GMFM-88 Dimension E score of about 2.6 within a 95% confidence interval of about 0.72 to about 4.5;

(l) an average increase in health-related quality of life Short Form 12 Health Survey (SF-12®) physical component score (PCS) of 2.4 within a 95% confidence interval of about 0.40 to about 4.4;

(m) an average increase in SF-12® mental component score (MCS) of 2.9 within a 95% confidence interval of about 0.45 to about 5.3;

(n) an average decrease in urinary HEX4 level of about 10.8% with a standard deviation of about 24.0%;

(o) an average decrease in creatine kinase level of about 38.0% with a standard deviation of about 24.9%;

(p) an average decrease in alanine aminotransferase (ALT) level of about 43.3% with a standard deviation of about 24.7%; and (q) an average decrease in aspartate aminotransferase (AST) level of about 46.1% with a standard deviation of about 20.2%.

Embodiment II-13. The method of any one of the preceding Embodiments II, wherein administration of the pharmaceutical composition to a plurality of human individuals for 49 weeks results in an average increase of FVC % in an upright position of at least about 1.1%, at least about 2.3%, or at least about 4.6%.

Embodiment II-14. The method of Embodiment II-13, wherein administration of the pharmaceutical composition to a plurality of human individuals for 49 weeks results in an average increase of FVC % in an upright position of about 2.89% within a 95% confidence interval of about 1.1% to about 4.7%.

Embodiment II-15. The method of any one of the preceding Embodiments II, wherein administration of the pharmaceutical composition to a plurality of human individuals for 49 weeks results in an average increase of 6-minute walk test (6MWT) distance of at least about 12.5 m, at least about 23 m, or at least about 50 m.

Embodiment II-16. The method of Embodiment II-15, wherein administration of the pharmaceutical composition to a plurality of human individuals for 49 weeks results in an average increase of 6-minute walk test (6MWT) distance of about 32.2 meters within a 95% confidence interval of about 12.4 meters to about 52 meters.

Embodiment II-17. The method of any one of the preceding Embodiments II, wherein administration of the pharmaceutical composition to a plurality of human individuals for 49 weeks results in an average increase in 6MWT percentage of predicted value (6MWT %) of at least about 2%, at least about 3.5%, or at least about 8%.

Embodiment II-18. The method of Embodiment II-15, wherein administration of the pharmaceutical composition to a plurality of human individuals for 49 weeks results in an average increase in 6MWT percentage of predicted value (6MWT %) of about 5.0% within a 95% confidence interval of about 1.9% to about 8.1%.

Embodiment II-19. The method of any one of the preceding Embodiments II, wherein administration of the pharmaceutical composition to a plurality of human individuals for 49 weeks results in an average increase in maximum inspiratory pressure percentage of predicted value (MIP %) in an upright position of at least about 4.5%, at least about 8.7%, or at least about 12.5%.

Embodiment II-20. The method of Embodiment II-19, wherein administration of the pharmaceutical composition to a plurality of human individuals for 49 weeks results in an average increase in maximum inspiratory pressure percentage of predicted value (MIP %) in an upright position of about 8.7% within a 95% confidence interval of about 4.5% to about 12.9%.

Embodiment II-21. The method of any one of the preceding Embodiments II, wherein administration of the pharmaceutical composition to a plurality of human individuals for 49 weeks results in an average increase in maximum expiratory pressure percentage (MEP %) in an upright position of at least about 5.2%, at least about 10.9%, at least about 14.3%, or at least about 16.5%.

Embodiment II-22. The method of Embodiment II-21, wherein administration of the pharmaceutical composition to a plurality of human individuals for 49 weeks results in an average increase in an average increase in maximum expiratory pressure percentage (MEP %) in an upright position of at least about 10.9% within a 95% confidence interval of about 5.2% to about 16.5%.

Embodiment II-23. The method of any one of the preceding Embodiments II, wherein administration of the pharmaceutical composition to a plurality of human individuals for 49 weeks results in an average increase in hand-held dynamometry (HHD) score for lower extremities of at least about 170 Newtons (N), at least about 250 N, or at least about 350 N.

Embodiment II-24. The method of Embodiment II-23, wherein administration of the pharmaceutical composition to a plurality of human individuals for 49 weeks results in an average increase in hand-held dynamometry (HHD) score for lower extremities of about 260 Newtons (N) within a 95% confidence interval of about 169 N to about 352 N.

Embodiment II-25. The method of any one of the preceding Embodiments II, wherein administration of the pharmaceutical composition to a plurality of human individuals for 49 weeks results in an average increase in HHD score for upper extremities of at least about 95 N, at least about 190 N, or at least about 245 N.

Embodiment II-26. The method of Embodiment II-25, wherein administration of the pharmaceutical composition to a plurality of human individuals for 49 weeks results in an average increase in HHD score for upper extremities of about 174 N within a 95% confidence interval of about 97.8 N to about 249 N.

Embodiment II-27. The method of any one of the preceding Embodiments II, wherein administration of the pharmaceutical composition to a plurality of human individuals for 49 weeks results in an average increase in quick motor function test (QMFT) total score of at least about 2.7, at least about 3.3, or at least about 5.2.

Embodiment II-28. The method of Embodiment II-27, wherein administration of the pharmaceutical composition to a plurality of human individuals for 49 weeks results in an average increase in quick motor function test (QMFT) total score of about 4.0 within a 95% confidence interval of about 2.7 to about 5.2.

Embodiment II-29. The method of any one of the preceding Embodiments II, wherein administration of the pharmaceutical composition to a plurality of human individuals for 49 weeks results in an average change of Gait, Stair, Gower's Maneuver, and Chair (GSGC) score of at least about −0.9, at least about −0.35, or at least about 0.40.

Embodiment II-30. The method of Embodiment II-29, wherein administration of the pharmaceutical composition to a plurality of human individuals for 49 weeks results in an average change of Gait, Stair, Gower's Maneuver, and Chair (GSGC) score of about −0.25 within a 95% confidence interval of about −0.94 to about 0.43.

Embodiment II-31. The method of any one of the preceding Embodiments II, wherein administration of the pharmaceutical composition to a plurality of human individuals for 49 weeks results in an average increase of GMFM-88 Dimension D score of at least about 2.2, at least about 3.3, or at least about 5.8.

Embodiment II-32. The method of Embodiment II-31, wherein administration of the pharmaceutical composition to a plurality of human individuals for 49 weeks results in an average increase of GMFM-88 Dimension D score of about 4.0 within a 95% confidence interval of about 2.2 to about 5.8.

Embodiment II-33. The method of any one of the preceding Embodiments II, wherein administration of the pharmaceutical composition to a plurality of human individuals for 49 weeks results in an average increase of GMFM-88 Dimension E score of at least about 0.7, at least about 4.5, or at least about 5.2.

Embodiment II-34. The method of Embodiment II-33, wherein administration of the pharmaceutical composition to a plurality of human individuals for 49 weeks results in an average increase of GMFM-88 Dimension E score of about 2.6 within a 95% confidence interval of about 0.72 to about 4.5.

Embodiment II-35. The method of any one of the preceding Embodiments II, wherein administration of the pharmaceutical composition to a plurality of human individuals for 49 weeks results in an average increase in health-related quality of life Short Form 12 Health Survey (SF-12®) physical component score (PCS) of at least about 0.4, at least about 3.7, or at least about 4.3%.

Embodiment II-36. The method of Embodiment II-35, wherein administration of the pharmaceutical composition to a plurality of human individuals for 49 weeks results in an average increase in health-related quality of life Short Form 12 Health Survey (SF-12®) physical component score (PCS) of 2.4 within a 95% confidence interval of about 0.40 to about 4.4.

Embodiment II-37. The method of any one of the preceding Embodiments II, wherein administration of the pharmaceutical composition to a plurality of human individuals for 49 weeks results in an average increase in SF-12® mental component score (MCS) of at least about 0.45, at least about 3.4, or at least about 5.3.

Embodiment II-38. The method of Embodiment II-37, wherein administration of the pharmaceutical composition to a plurality of human individuals for 49 weeks results in an average increase in SF-12® mental component score (MCS) of 2.9 within a 95% confidence interval of about 0.45 to about 5.3.

Embodiment II-39. The method of any one of the preceding Embodiments II, wherein administration of the pharmaceutical composition to a plurality of human individuals for 49 weeks results in an average decrease in urinary HEX4 level of at least about 30%, at least about 43%, or at least about 78%.

Embodiment II-40. The method of Embodiment II-39, wherein administration of the pharmaceutical composition to a plurality of human individuals for 49 weeks results in an average decrease in urinary HEX4 level of about 10.8% with a standard deviation of about 24.0%.

Embodiment II-41. The method of any one of the preceding Embodiments II, wherein administration of the pharmaceutical composition to a plurality of human individuals for 49 weeks results in an average decrease in creatine kinase level of at least about 13%, at least about 39%, or at least about 63%.

Embodiment II-42. The method of Embodiment II-41, wherein administration of the pharmaceutical composition to a plurality of human individuals for 49 weeks results in an average decrease in creatine kinase level of about 38.0% with a standard deviation of about 24.9%.

Embodiment II-43. The method of any one of the preceding Embodiments II, wherein administration of the pharmaceutical composition to a plurality of human individuals for 49 weeks results in an average decrease in alanine aminotransferase (ALT) level of at least about 19%, at least about 38%, or at least about 68%.

Embodiment II-44. The method of Embodiment II-43, wherein administration of the pharmaceutical composition to a plurality of human individuals for 49 weeks results in an average decrease in alanine aminotransferase (ALT) level of about 43.3% with a standard deviation of about 24.7%

Embodiment II-45. The method of any one of the preceding Embodiments II, wherein administration of the pharmaceutical composition to a plurality of human individuals for 49 weeks results in an average decrease in aspartate aminotransferase (AST) level of at least about 26%, at least about 33%, or at least about 66%.

Embodiment II-46. The method of Embodiment II-45, wherein administration of the pharmaceutical composition to a plurality of human individuals for 49 weeks results in an average decrease in aspartate aminotransferase (AST) level of about 46.1% with a standard deviation of about 20.2%.

Embodiment II-47. The method of any one of the preceding Embodiments II, wherein the individual has not previously received treatment with a recombinant GAA.

Embodiment II-48. The method of any one of Embodiments II-1 to II-46, wherein the individual has previously received treatment with a recombinant GAA.

Embodiment II-49. The method of Embodiment II-47 or II-48, wherein the recombinant GAA is alglucosidase alfa.

Embodiment II-50. The method of any one of Embodiments II-6 to II-49, wherein prior to the treatment, the individual has a forced vital capacity percentage of predicted value (FVC %) in an upright position between about 30% and about 85%.

Embodiment II-51. The method of any one of Embodiments II-6 to II-50, wherein prior to the treatment, the individual is able to ambulate for at least about 40 meters without stopping and without an ambulation assistance device.

Embodiment II-52. The method of any one of the preceding Embodiments II, wherein the individual does not have Pompe-specific cardiac hypertrophy.

Embodiment II-53. The method of any one of the preceding Embodiments II, wherein the individual has confirmed GAA enzyme deficiency from any tissue source and/or at least 2 confirmed GAA gene variants.

Embodiment II-54. The method of any one of the preceding Embodiments II, wherein the individual is administered with the pharmaceutical composition for at least about 49 weeks.

Embodiment II-55. The method of the preceding Embodiments II, wherein the individual has an increase in FVC % in an upright position by at least about 1.13% after receiving the treatment for about 49 weeks.

Embodiment II-56. The method of Embodiment II-54 or II-55, wherein the individual has an increase in FVC % in an upright position after receiving the treatment that is at least about 2.43% higher compared to that after treatment with alglucosidase alfa for about 49 weeks.

Embodiment II-57. The method of any one of Embodiments II-54 to II-56, wherein the individual has an increase in 6-minute walk test (6MWT) distance by at least about 12.47 meters after receiving the treatment for about 49 weeks.

Embodiment II-58. The method of any one of Embodiments II-54 to II-57, wherein the individual has an increase in 6MWT distance after receiving the treatment that is at least about 30.01 meters longer compared to that after treatment with alglucosidase alfa for about 49 weeks.

Embodiment II-59. The method of any one of Embodiments II-54 to II-58, wherein the individual has an increase in 6MWT percentage of predicted value (6MWT %) by at least about 1.95% after receiving the treatment for about 49 weeks.

Embodiment II-60. The method of any one of Embodiments II-54 to II-59, wherein the individual has an increase in 6MWT % after receiving the treatment that is at least about 4.71% longer compared to that after treatment with alglucosidase alfa for about 49 weeks.

Embodiment II-61. The method of any one of Embodiments II-54 to II-60, wherein the individual has an increase in maximum inspiratory pressure percentage of predicted value (MIP %) in an upright position of at least about 8.70% after receiving the treatment for about 49 weeks.

Embodiment II-62. The method of any one of Embodiments II-54 to II-60, wherein the individual has an increase in MIP % in an upright position after receiving the treatment that is at least about 4.40% higher compared to that after treatment with alglucosidase alfa for about 49 weeks.

Embodiment II-63. The method of any one of Embodiments II-54 to II-62, wherein the individual has an increase in maximum expiratory pressure percentage (MEP %) in an upright position of at least about 10.89% after receiving the treatment for about 49 weeks.

Embodiment II-64. The method of any one of Embodiments II-54 to II-63, wherein the individual has an increase in MEP % in an upright position after receiving the treatment that is at least about 2.51% higher compared to that after treatment with alglucosidase alfa for about 49 weeks.

Embodiment II-65. The method of any one of Embodiments II-54 to II-64, wherein the individual has an increase in hand-held dynamometry (HHD) score for lower extremities of at least about 169.11 Newton after receiving the treatment for about 49 weeks.

Embodiment II-66. The method of any one of Embodiments II-54 to II-65, wherein the individual has an increase in HHD score for lower extremities after receiving the treatment that is at least about 106.97 Newton higher compared to that after treatment with alglucosidase alfa for about 49 weeks.

Embodiment II-67. The method of any one of Embodiments II-54 to II-66, wherein the individual has an increase in HHD score for upper extremities by at least about 97.84 Newton after treatment with alglucosidase alfa for about 49 weeks.

Embodiment II-68. The method of any one of Embodiments II-54 to II-67, wherein the individual has an increase in HHD score for upper extremities of at least about 63.87 Newton higher compared to that after treatment with alglucosidase alfa for about 49 weeks.

Embodiment II-69. The method of any one of Embodiments II-54 to II-68, wherein the individual has an increase in quick motor function test (QMFT) total score of at least about 2.72 after receiving the treatment for about 49 weeks.

Embodiment II-70. The method of any one of Embodiments II-54 to II-69, wherein the individual has an increase in QMFT total score after receiving the treatment that is at least about 2.08 higher compared to that after treatment with alglucosidase alfa for about 49 weeks.

Embodiment II-71. The method of any one of Embodiments II-54 to II-70, wherein the individual has an increase in health-related quality of life Short Form 12 Health Survey (SF-12®) physical component score (PCS) of at least about 0.40 after receiving the treatment for about 49 weeks.

Embodiment II-72. The method of any one of Embodiments II-54 to II-71, wherein the individual has an increase in SF-12® PCS after receiving the treatment that is at least about 0.77 higher compared to that after treatment with alglucosidase alfa for about 49 weeks.

Embodiment II-73. The method of any one of Embodiments II-54 to II-72, wherein the individual has an increase in SF-12® mental component score (MCS) of at least about 0.47 after receiving the treatment for about 49 weeks.

Embodiment II-74. The method of any one of Embodiments II-54 to II-73, wherein the individual has an increase in SF-12® MCS after receiving the treatment that is at least about 2.12 higher compared to that after treatment with alglucosidase alfa for about 49 weeks.

Embodiment II-75. The method of any one of Embodiments II-54 to II-74, wherein the individual has a decrease in urinary HEX4 level of at least about 53.90% after receiving the treatment for about 49 weeks.

Embodiment II-76. The method of any one of Embodiments II-54 to II-75, wherein the individual has a decrease in urinary HEX4 level after receiving the treatment that is at least about 43.14% lower compared to that after treatment with alglucosidase alfa for about 49 weeks.

Embodiment II-77. The method of any one of Embodiments II-54 to II-76, wherein the individual has a decrease in creatine kinase level of at least about 38.02% after receiving the treatment for about 49 weeks.

Embodiment II-78. The method of any one of Embodiments II-54 to II-77, wherein the individual has a decrease in creatine kinase level after receiving the treatment that is at least about 23.89% lower compared to that after treatment with alglucosidase alfa for about 49 weeks.

Embodiment II-79. The method of any one of Embodiments II-54 to II-78, wherein the individual has a decrease in alanine aminotransferase (ALT) level after receiving the treatment that is at least about 33.9% lower compared to that after treatment with alglucosidase alfa for about 49 weeks.

Embodiment II-80. The method of any one of Embodiments II-54 to II-79, wherein the individual has a decrease in ALT level of at least about 43.32% after receiving the treatment for about 49 weeks.

Embodiment II-81. The method of any one of Embodiments II-54 to II-80, wherein the individual has a decrease in aspartate aminotransferase (AST) level after receiving the treatment that is at least about 32.28% lower compared to that after treatment with alglucosidase alfa for about 49 weeks.

Embodiment II-82. The method of any one of Embodiments II-54 to II-81, wherein the individual has a decrease in AST level of at least about 46.12% after receiving the treatment for about 49 weeks.

Embodiment II-83. The method of any one of the preceding Embodiments II, wherein the individual has stable Mercuri scores, 3-point Dixon fat fraction, and/or T2 water with or without B1 correction according to skeletal muscle magnetic resonance imaging (MRI) over the course of the treatment.

Embodiment II-84. The method of any one of the preceding Embodiments II, wherein the individual has lower risk of infusion-associated reaction (IARs) after receiving the treatment compared to that after treatment with alglucosidase alfa.

Embodiment II-85. The method of any one of the preceding Embodiments II, wherein the individual has decreasing level of antidrug antibody (ADA) against the oligosaccharide-protein conjugate over time.

Embodiment II-86. The method of any one of the preceding Embodiments II, wherein the pharmaceutical composition is administered to the individual once every two weeks.

Embodiment II-87. The method of any one of the preceding Embodiments II, wherein the pharmaceutical composition is administered intravenously.

Embodiment II-88. The method of any one of the preceding Embodiments II, wherein the pharmaceutical composition is reconstituted from a lyophilized formulation comprising the oligosaccharide-protein conjugate.

Embodiment II-89. The method of Embodiment II-88, wherein the pharmaceutically acceptable carrier comprises about 10-50 mM histidine, about 0.25-2% glycine, about 1-4% mannitol, and about 0.005-0.05% polysorbate 80.

Embodiment II-90. The method of Embodiment II-89, wherein the pharmaceutically acceptable carrier comprises about 10 mM histidine, about 2% glycine, about 2% mannitol, and about 0.01% polysorbate 80.

Embodiment II-91. The method of any one of the preceding Embodiments II, wherein the oligosaccharide-protein conjugate has a structure of Formula II:

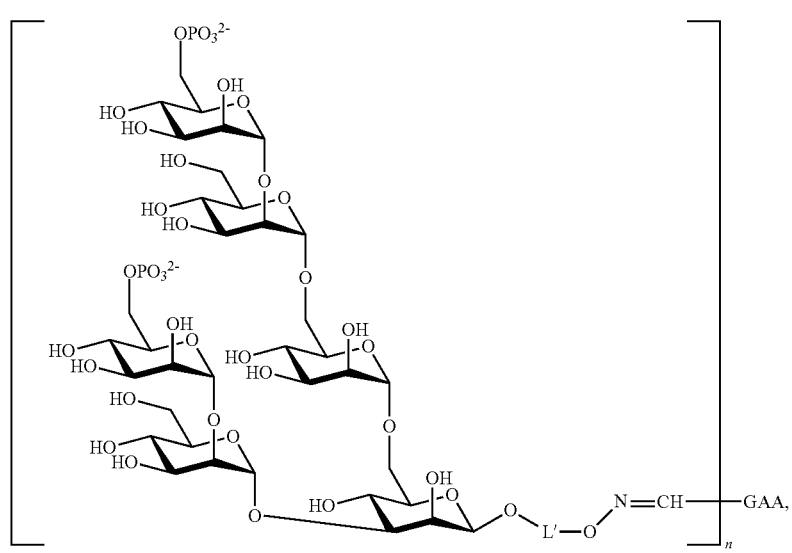

(II)

wherein GAA is acid α-glucosidase, L' is a chemical linker, and n is 1 to 10.

Embodiment II-92. The method of Embodiment II-91, wherein the oligosaccharide-protein conjugate has a structure of Formula III:

Embodiment II-96. The method of Embodiment II-95, wherein the human GAA has glycoform alfa.

Embodiment II-97. The method of any one of the preceding Embodiments II, wherein the oligosaccharide-protein conjugate is avalglucosidase alfa.

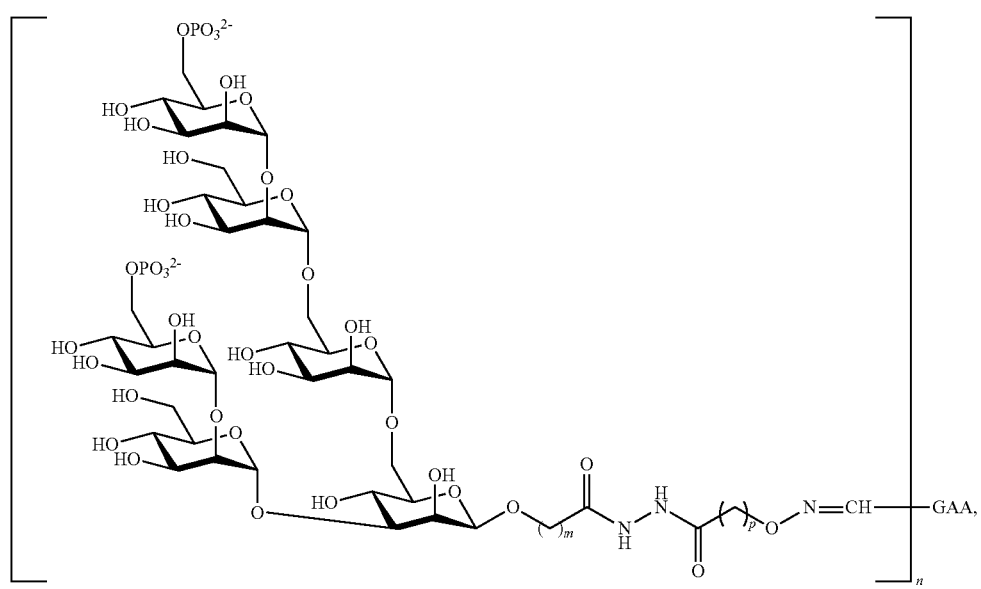

(III)

wherein GAA is acid α-glucosidase, n is 1 to 10, and wherein m and p are independently chosen from integers ranging from 1 to 10.

Embodiment II-93. The method of Embodiment II-92, wherein m is 3 and p is 1.

Embodiment II-94. The method of Embodiment II-92 or II-93, wherein n is 5-7.

Embodiment II-95. The method of any one of Embodiments II-1 to II-94, wherein the GAA is a human GAA produced in Chinese hamster ovary (CHO) cells.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further details of the invention are illustrated by the following non-limiting Examples.

EXAMPLES

The examples below are intended to be purely exemplary of the present technology and should therefore not be considered to limit the present technology in any way. The following examples and detailed description are offered by way of illustration and not by way of limitation.

Example 1. Comparative Enzyme Replacement Trial with neoGAA Versus rhGAA

The following example describes a Phase 3, multicenter, multinational, randomized, double-blinded trial comparing efficacy and safety of intravenous avalglucosidase alfa (also known as neoGAA or GZ402666) compared to alglucosidase alfa (also known as rhGAA) in treating patients with late-onset Pompe disease (LOPD).

A. Study Design
Objectives

The primary objective of the study is to determine the effect of avalglucosidase alfa treatment on respiratory muscle strength as measured by % predicted Forced Vital Capacity (FVC) in the upright position, as compared to alglucosidase alfa. Secondary objectives are to determine the safety and effect of avalglucosidase alfa treatment on functional endurance (6 minute walk test [6MWT]), inspiratory muscle strength (maximum inspiratory pressure [MIP]), expiratory muscle strength (maximum expiratory pressure [MEP]), lower extremity muscle strength (hand-held dynamometry [HHD]), motor function (Quick Motor Function Test [QMFT]), and health-related quality of life (Short Form 12 [SF-12®]).

Other objectives are to determine pharmacokinetics, exploratory pharmacodynamics, pharmacogenetics and effect of avalglucosidase alfa treatment on motor function (Gross Motor Function Measure-88 [GMFM-88] and Gait, Stair, Gower's Maneuver, and Chair [GSGC]), upper extremity muscle strength (HHD), health-related quality of life (EuroQoL in 5 dimensions [EQ-5D-5L] and Pediatric Quality of Life Inventory [PedsQL] Generic Core Scale), and patient reported outcomes (Pompe Disease Symptom Scale [PDSS], Pompe Disease Impact Scale [PDIS], Raschbuilt Pompe-specific Activity scale [R-PAct], and Patient Global Impression of Change [PGIC]).

Key clinical laboratory parameters and biomarkers for Pompe disease (urinary hexose tetrasaccharide [Hex4], serum creatine kinase [CK], and liver enzymes alanine aminotransferase [ALT] and aspartate aminotransferase [AST] were also measured. Genotypes were reported based on historical results, or for those participants without available historical results, analysis as part of the study.

Methodology

The study is a Phase 3, multicenter, multinational, randomized, double blind, 12-month primary analysis period (PAP) study comparing the efficacy and safety of avalglucosidase alfa and alglucosidase alfa (both at 20 mg/kg qow) in treatment naïve patients with LOPD aged 3 and above. The study includes an open label avalglucosidase alfa long-term follow up phase (extended treatment period, ETP) for all patients, in which patients in the alglucosidase alfa arm were switched to avalglucosidase alfa treatment after 12 months. Randomization was in a 1:1 ratio with stratification factors based on baseline % predicted FVC (<55%, ≥55%), gender, age (<18 y, ≥18 y), and country (Japan or ex-Japan). To control the number of participants with high baseline FVC, the percentage of randomized participants with baseline upright FVC 80-85% predicted was held at 15% of the total population. The inclusion and exclusion criteria for the study are summarized in FIG. 1, and a schematic of the study is shown in FIG. 2.

In the blinded treatment period avalglucosidase alfa or alglucosidase alfa was administered by intravenous (IV) infusion every 2 weeks starting at the randomization visit (Day 1/Day 2) continuing up to week 49 (W49) for a total of 25 doses.

In the open-label avalglucosidase alfa long-term follow-up phase, avalglucosidase alfa was administered by IV infusion every 2 weeks starting at W51 continuing up to V76/W145 for a total of 48 doses.

In the extended open-label avalglucosidase alfa extension period, avalglucosidase alfa was administered by IV infusion every 2 weeks starting at V77/W147 and continuing up to 144 additional weeks (or until avalglucosidase alfa is approved in the patient's country, whichever came first), for up to 72 additional doses.

For pediatric patients aged 3 to <18 years enrolling directly in the open-label long-term follow-up phase, avalglucosidase alfa is administered by IV infusion every 2 weeks starting at the randomization visit (Day 1/Day 2) continuing up to W97 for a total of 49 doses. For these patients, in the extended open-label avalglucosidase alfa extension period, avalglucosidase alfa was administered by IV infusion every 2 weeks starting at V53/W99 and continuing up to 144 additional weeks (or until avalglucosidase alfa is approved in the patient's country, whichever came first), for up to 72 additional doses.

Inclusion and Exclusion Criteria

The diagnosis and inclusion criteria for the study were as follow: (1) the patient is ≥3 years of age and has confirmed acid alpha-glucosidase (GAA) enzyme deficiency from any tissue source and/or 2 confirmed GAA gene mutations, and (2) the patient is able to successfully perform repeated FVC measurements in upright position of ≥30% predicted and ≤85% predicted and is able to ambulate at least 40 meters (approximately 130 feet) without stopping and without an assistive device.

The criteria for exclusion of patients from the study were as follow: (1) Pompe-specific cardiac hypertrophy; (2) requires invasive ventilation (non-invasive ventilation is allowed); (3) wheelchair dependency; (4) clinically significant organic disease, apart from Pompe disease-related symptoms; (5) prior or current use of immune tolerance induction therapy; (6) pregnant or breastfeeding; (7) female patient of childbearing potential not protected by highly effective contraceptive method of birth control and/or is unwilling or unable to be tested for pregnancy; (8) the patient (and patient's legal guardian if patient is legally minor as defined by local regulation) was not able to comply with the clinical protocol; (9) the patient was concurrent participation in another clinical study using investigational treatment or has taken other investigational drugs or prohibited concomitant medications within 30 days or 5 half-lives from or randomization, whichever was longer; and (10) known history of drug or alcohol abuse within 6 months prior to the time of screening.

Primary and Main Secondary Key Endpoints

For efficacy, the primary endpoints was a change in % predicted FVC in the upright position from baseline to 12 months (week 49). The secondary endpoints (change in the following parameters from baseline to 12 months [Week 49]) were 6MWT distance walked, MIP and MEP (% predicted), lower extremity muscle strength (HHD), motor function (QMFT), and health-related quality of life (SF-12®).

For safety, the endpoints were adverse events (AEs)/treatment-emergent adverse events (TEAEs), including infusion-associated reactions (IARs), clinical laboratory including standard biochemistry, hematology and urinalysis, physical examination, vital signs, height and body weight measurements, 12-lead electrocardiogram (ECG) measurements, and immunogenicity assessments.

Immunogenecity during the PAP was assessed by measuring anti-drug antibody (ADA) and neutralizing antibody (NAb) responses.

Tertiary Endpoints

The tertiary endpoints include motor function (GMFM-88 and GSGC), upper extremity muscle strength (HHD), Health-related quality of life (EQ-5D-5L and PedsQL), and pharmacokinetics, pharmacogenetics, and pharmacodynamics assessments.

Exploratory endpoints for patient reported outcomes include Pompe Disease Symptom Scale (PDSS), Pompe Disease Impact Scale (PDIS), Rasch-built Pompe-specific Activity scale (R-Pact), and Patient Global Impression of Change (PGIC).

Key clinical laboratory parameters and biomarkers for Pompe disease included urinary hexose tetrasaccharide (Hex4), serum creatine kinase (CK), and liver enzymes alanine aminotransferase (ALT) and aspartate aminotransferase (AST).

Statistical Methods

The modified intent to treat (mITT) population is defined as all randomized patients who received at least 1 infusion (partial or total). The mITT population is the primary analysis population for all efficacy endpoints. Patients were analyzed in the treatment group to which they were randomized.

The per protocol (PP) population was defined as a subset of the mITT population that excludes patients with major protocol deviations that potentially impact the primary efficacy endpoint. The criteria for exclusion of patients from the PP population is determined and documented prior to database lock. The PP population is used for sensitivity analysis purposes.

All safety analyses were performed on the safety population defined as all patients who received at least 1 infusion (partial or total). Patients were summarized based on the treatment they received.

The estimand (i.e., variable to be estimated in statistical analysis) for this study was defined as the difference between avalglucosidase alfa and alglucosidase alfa in the mean change in % predicted FVC from baseline to week 49 (W49), regardless of whether intercurrent events have occurred. This estimand corresponds to a 'treatment policy strategy'. The analysis method for the estimand (estimator) is based on a mixed model for repeated measures (MMRM) assuming missing data are missing at random (MAR). The MMRM model includes the baseline % predicted FVC as a continuous variable, and gender, age, treatment group, visit, and treatment by visit interaction as fixed effects. An unstructured covariance matrix shared across treatment groups is used to model the within patient error, the Kenward Roger approximation is used to estimate the degrees of freedom, and the model is fit using restricted maximum likelihood. All observed data during the study that include the data collected after study treatment discontinuation were used in the analyses. Secondary endpoints were analyzed similarly.

Safety analyses were performed using the safety population and the "as treated" population. All AEs were coded using the most recent version of the Medical Dictionary for Regulatory Activities (MedDRA). Adverse event incidence tables are presented by system organ class (SOC) sorted by internationally agreed order and preferred term (PT) sorted alphabetically for each treatment arm, by the number and percentage of patients experiencing an AE. Multiple occurrences of the same event in the same patient were counted only once in the tables. The denominator for computation of percentages is the safety population within each treatment arm. All TEAEs, all TEAEs potentially related to study drug, all TEAEs leading to treatment discontinuation, all TEAEs that are IARs, all treatment-emergent serious adverse events (SAEs) (including treatment-related SAEs), all AEs with fatal outcome, and adverse event of special interest (AESI)s were summarized descriptively by treatment groups. Additional safety data including clinical laboratory tests, vital signs, ECG, and immunogenicity were also summarized descriptively by treatment groups.

Study Duration

The duration of the study for each patient was at least up to approximately 3 years (151 weeks) or (2 years [99 weeks] for the subgroup of pediatric patients aged 3 to <18 years enrolling directly in the open-label long-term follow-up phase).

The study period included: (1) an up to 14-day screening period; (2) a 49-week blinded treatment period (PAP), except for the subgroup of pediatric patients aged 3 to <18 years enrolling directly in the open-label long-term follow-up phase; (3) an up to 96-week open-label treatment period (open-label avalglucosidase alfa long-term follow-up phase) for all patients regardless of prior randomization group; (4) an extended open-label avalglucosidase alfa long-term follow-up period will last up to 144 additional weeks (or until avalglucosidase alfa is approved in the patient's country, whichever came first); and (5) an up to 4-week post-treatment observation period will close the patient's participation.

B. Results

Population Characteristics

As depicted in FIG. 2, 100 patients were randomized, and all were treated: 51 in the avalglucosidase alfa arm and 49 in the alglucosidase alfa arm. Patient demographics and characteristics at baseline were representative of the LOPD population and were in general similar in the 2 treatment arms. The mean±SD age of participants was 46.0±14.5 years in the avalglucosidase alfa arm and 50.3±13.7 years in the alglucosidase alfa arm. Most participants were ≥45 years old: 27 (52.9%) in the avalglucosidase alfa arm and 30 (61.2%) in the alglucosidase alfa arm. One participant in the avalglucosidase alfa arm was <18 years of age. More participants in the alglucosidase alfa group (24.5%, n=12) were of Hispanic/Latino ethnicity compared to the avalglucosidase alfa arm (5.9%, n=3). More participants in the avalglucosidase alfa arm (60.8%, n=31) were enrolled in Europe compared to the alglucosidase alfa arm (42.9%, n=21). The ages (mean±SD, years) at first symptom onset were 32.94±16.58 (avalglucosidase alfa) and 37.73±15.74 (alglucosidase alfa). The times (mean±SD, years) from first symptom to first study drug infusion were 13.36±10.98 (avalglucosidase alfa) and 12.65±10.08 (alglucosidase alfa) and from diagnosis to first infusion were 1.3±2.67 (avalglucosidase alfa) and 2.21±4.99 (alglucosidase alfa).

Five patients permanently discontinued in the PAP (all in alglucosidase alfa arm) due to adverse events (4) or other reason (1). Ninety-five patients entered the ETP and 4 patients discontinued in the ETP (3) who were in the avalglucosidase alfa arm in PAP [2 due to adverse events and 1 for other reason] and 1 who was in the alglucosidase alfa arm in PAP [adverse event]). The remaining 91 patients are ongoing in the ETP at the time of the data cut-off.

The most frequent variant, c. −32-13T>G, was found in at least one of the two alleles in 89 participants overall: 43 (84.3%) of the avalglucosidase alfa participants and 46 (93.9%) of alglucosidase alfa participants. Due to the regional distributions, among participants with the c. 32-13T>G variant, there were more participants from Hispanic/Latino ethnicity in the alglucosidase alfa group (23.9%) than in the avalglucosidase alfa group (7.0%).

Mean baseline values for % predicted FVC and 6MWT were respectively 62.5% and 399.3 m in the avalglucosidase alfa arm and 61.6% and 378.1 m in the alglucosidase alfa arm. MIP % predicted was 51.74±24.85 for avalglucosidase alfa and 53.71±23.47 for alglucosidase alfa. MEP % predicted was higher in the alglucosidase alfa arm (70.21±27.32) than in the avalglucosidase alfa arm (59.17±21.60). The HHD (lower extremity) composite score was higher in the alglucosidase alfa arm (1466.16±604.91) than in the avalglucosidase alfa arm (1330.45±625.44). The HHD (upper extremity) composite score also was higher for alglucosidase alfa (1608.56±633.95) versus avalglucosidase alfa (1535.95±673.60).

As expected in a treatment-naïve LOPD population, CK, ALT, and AST were elevated at baseline in both groups, with all being higher in the avalglucosidase alfa arm. Urinary Hex4 was elevated at baseline in all participants in both groups but was higher in the avalglucosidase alfa arm compared to the alglucosidase alfa arm: 12.71±10.10 versus 8.74±5.04 mmol/mol/Cr, respectively (normal: 0.194-3.36 [ages 13-18 years]; 0.142-1.92 [ages >18 years]).

Figure 3:
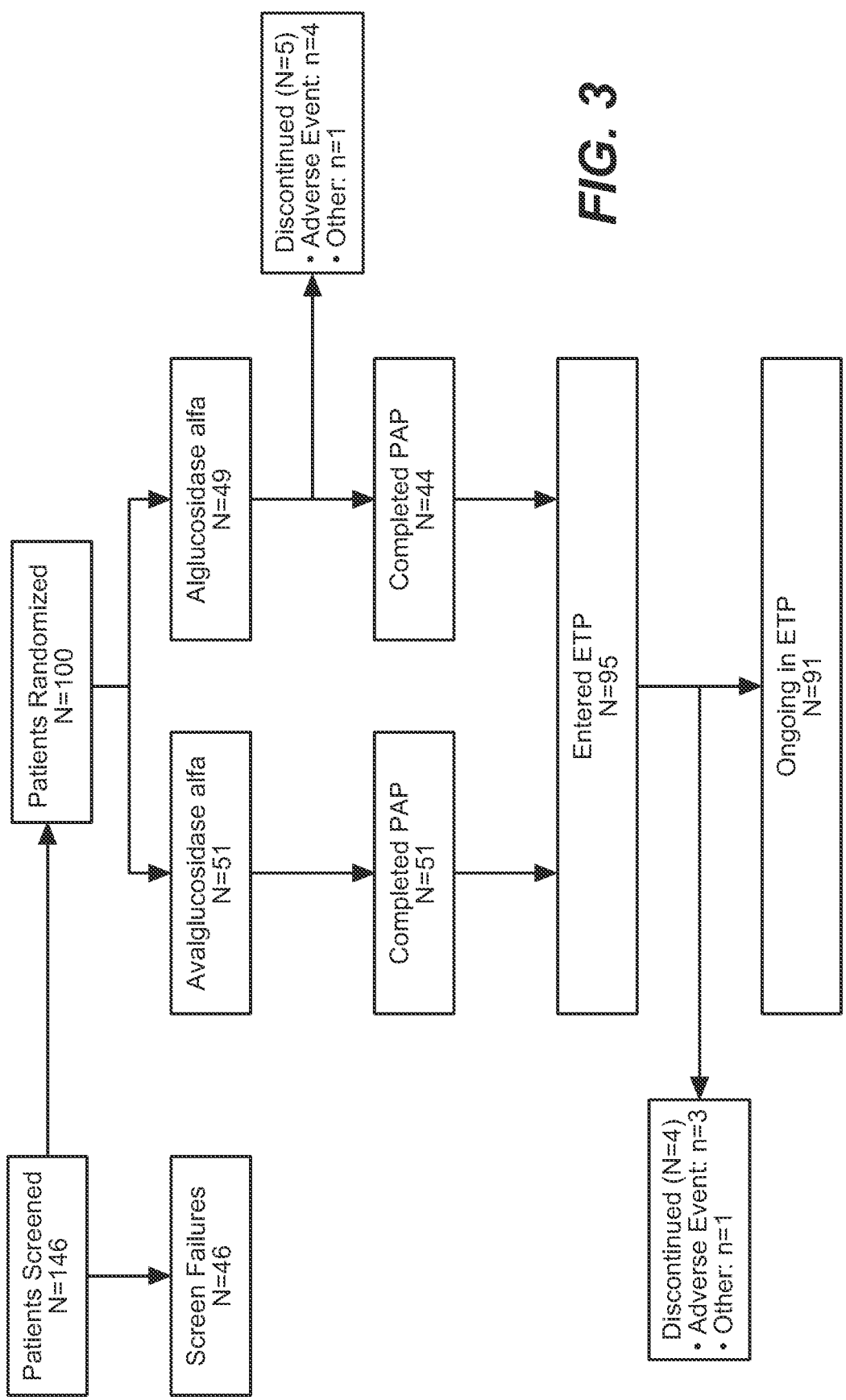
FIG. 3 depicts the patient predisposition and analysis population. A total of 100 patients from 56 study sites were randomized. 5 patients were permanently discontinued in the PAP (all in alglucosidase alfa arm). 95 patients entered the ETP. 4 patients discontinued in the ETP: 3 originated from the PAP avalglucosidase alfa arm, and 1 was previously in the PAP alglucosidase alfa arm. 91 patients are participating in the ETP. Adverse event (AE), primary analysis period (PAP) and extended treatment period (ETP) are noted. The ETP is ongoing as of Mar. 19, 2020.

FIG. 3 and FIG. 19 show the disposition of patients and the analysis population. FIG. 4 and FIGS. 20A-20B summarize the demographic and baseline characteristics for the patient population. FIGS. 21A-21D show the disease characteristics at baseline, while FIG. 5, FIG. 6, and FIGS. 22A-22C show the baseline values of key efficacy parameters for the patient population. FIG. 34 shows the baseline levels of Pompe disease biomarkers and laboratory parameters. A summary of the duration of exposure during the primary analysis period is shown in FIG. 7 and FIGS. 23A-23B.

Efficacy Results

Figure 8A:
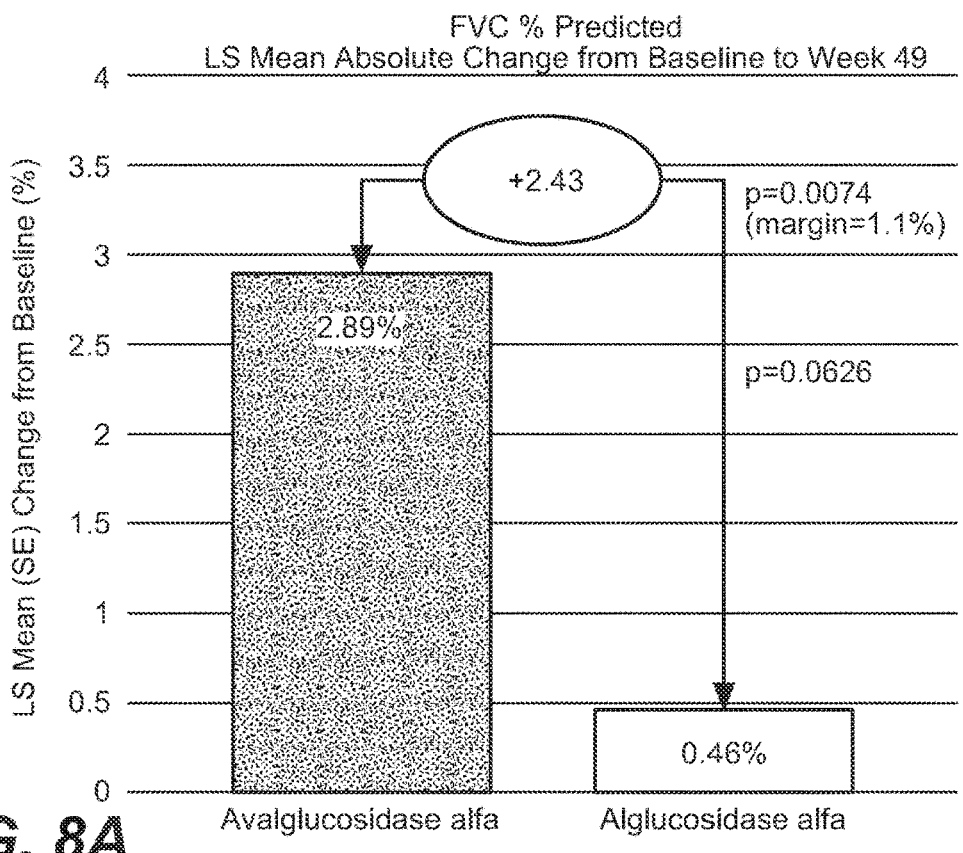
FIGS. 8A-8B shows least squares (LS) mean absolute change from baseline to week 49 in % predicted FVC and 6MWT distance.
Figure 8B:
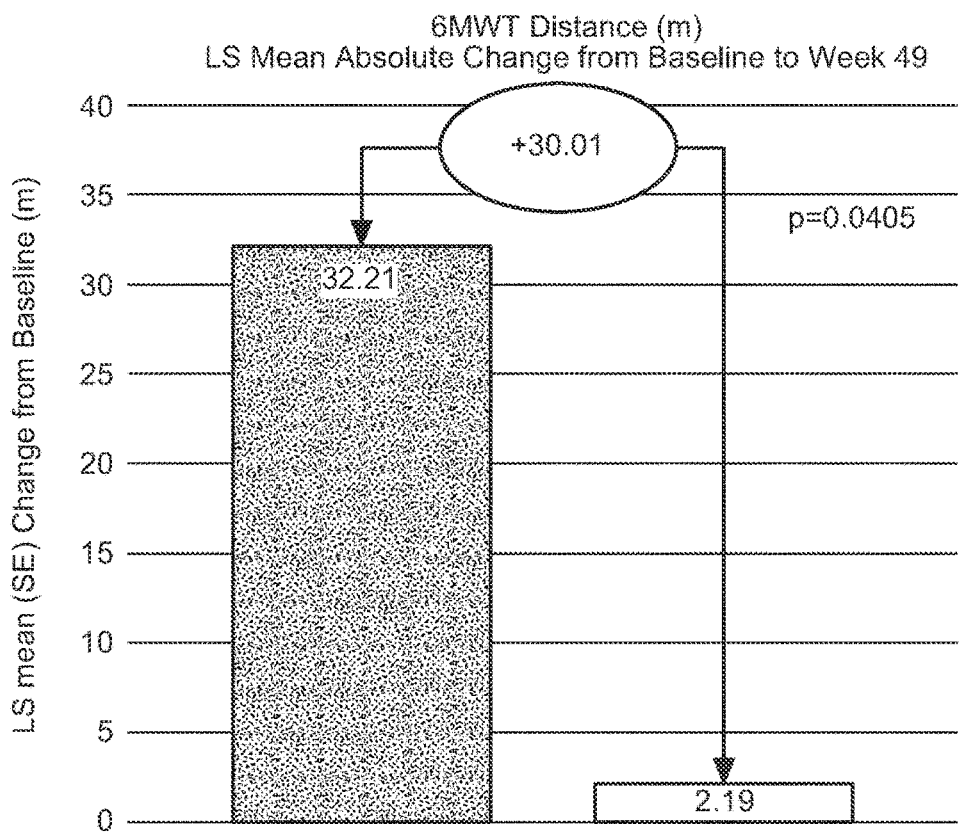
Figure 9A:
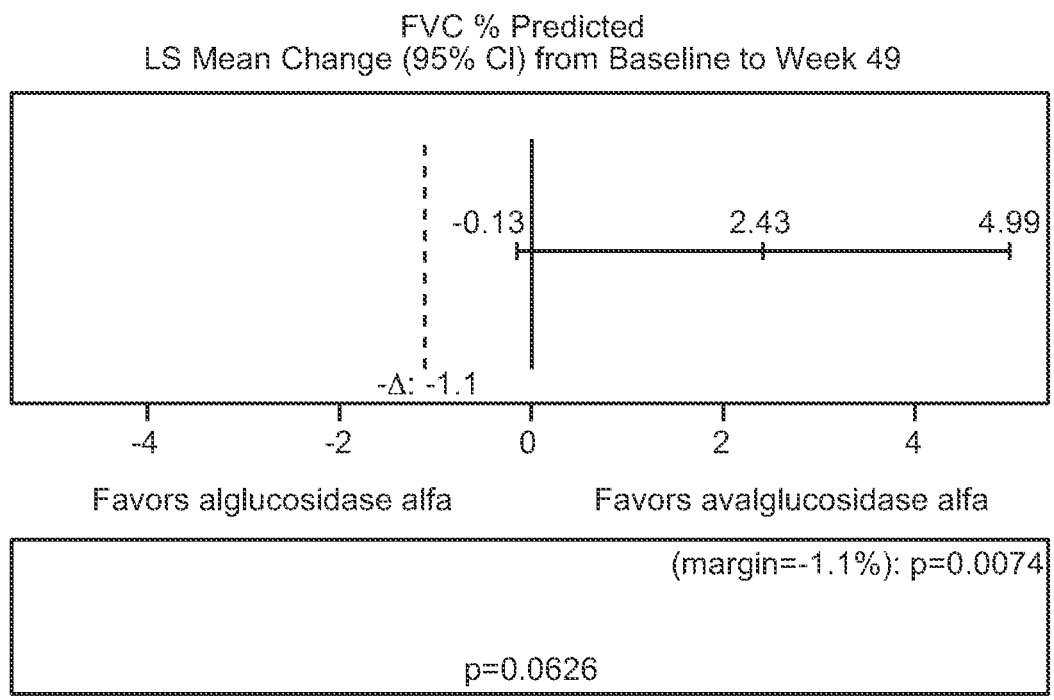
FIGS. 9A-9B show the change from baseline to week 49 in FVC and 6MWT.
Figure 9B:
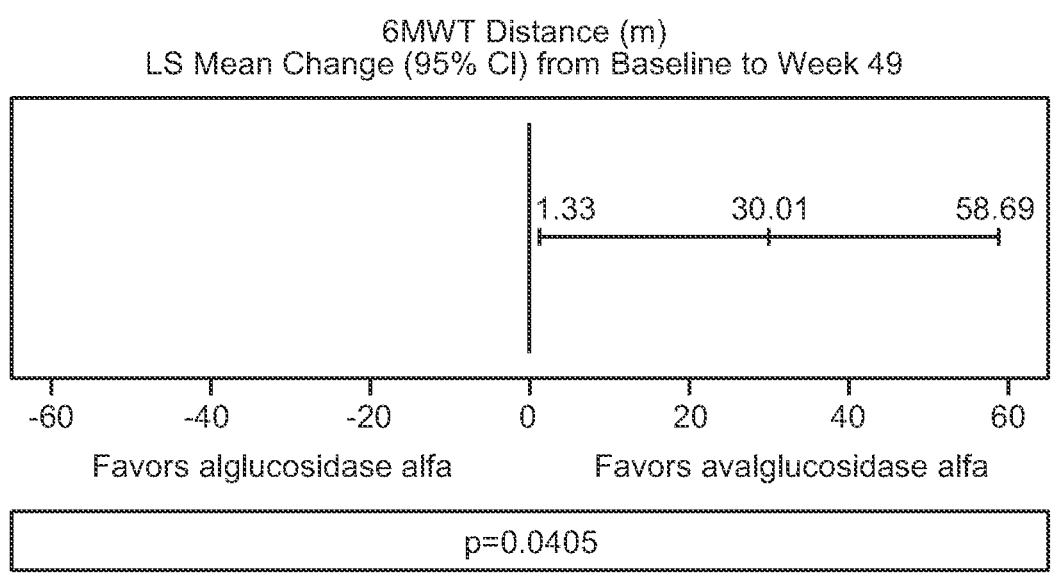
Figure 10:
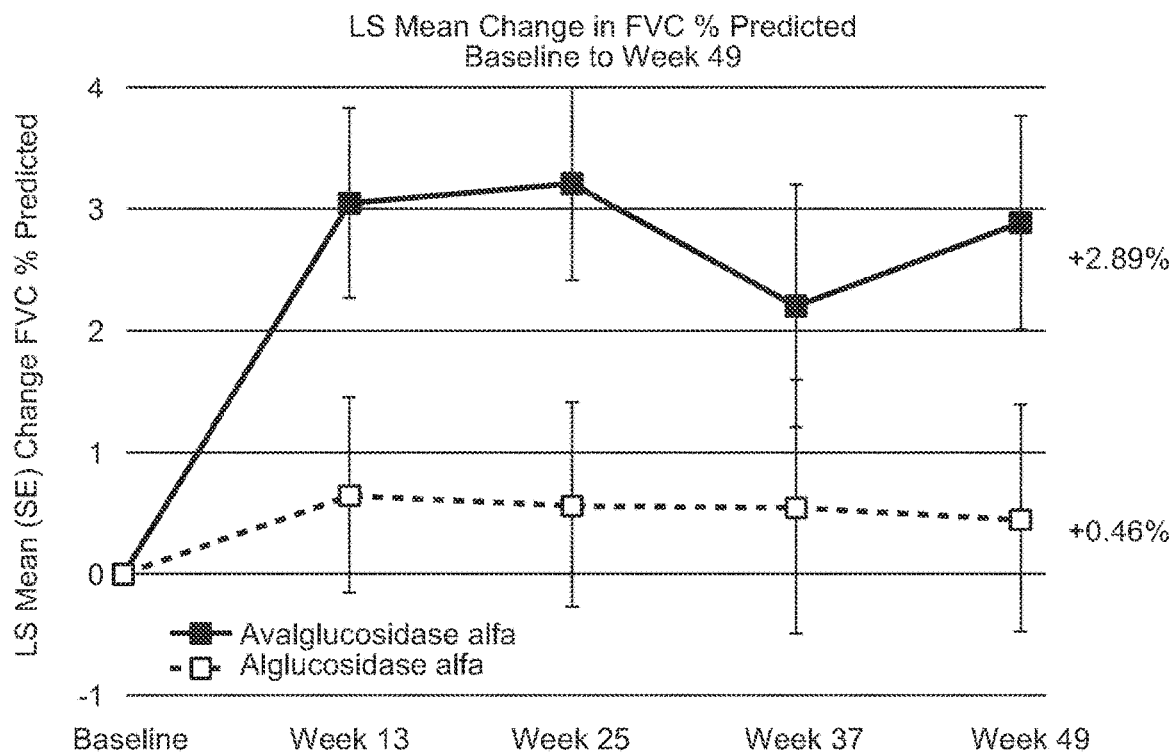
FIG. 10 shows the LS mean change in % predicted FVC from baseline to week 49. Avalglucosidase alfa treatment resulted in a 2.43% greater increase in % predicted FVC as compared to alglucosidase alfa. At week 49, participants treated with avalglucosidase alfa showed a 2.43% greater increase in predicted FVC compared to those treated with alglucosidase alfa (95% CI: −0.13%, 4.99%). The LS mean change % (SE) from baseline at week 49 was avalglucosidase alfa=2.89% (0.88%) (95% CI: 1.13%, 4.65%), and Alglucosidase alfa=0.46% (0.93%) (95% CI: −1.39%, 2.31%). "CI" denotes the confidence interval, while "SE denotes the standard error.
Figure 11:
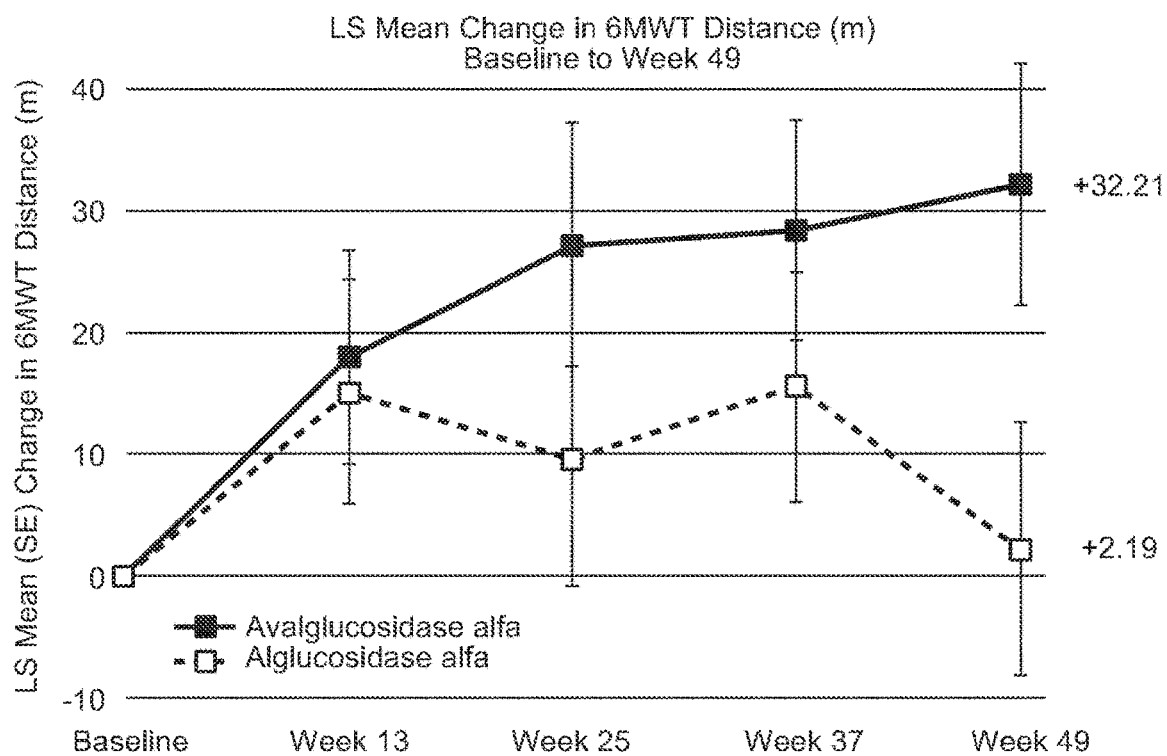
FIG. 11 shows the LS mean change in 6MWT distance (m) from baseline to week 49. Avalglucosidase alfa treatment resulted in a 30.01 m greater increase in 6MWT distance compared to alglucosidase alfa. The LS mean (SE) change (m) from baseline at week 49 was avalglucosidase alfa=32.21 m (9.93 m) (95% CI: 12.47 m, 51.94 m), alglucosidase alfa=2.19 m (10.40 m) (95% CI: −18.48 m, 22.86 m), and the difference=30.01 m (14.43 m) (95% CI: 1.33 m, 58.69 m; p=0.0405).
Figure 12:
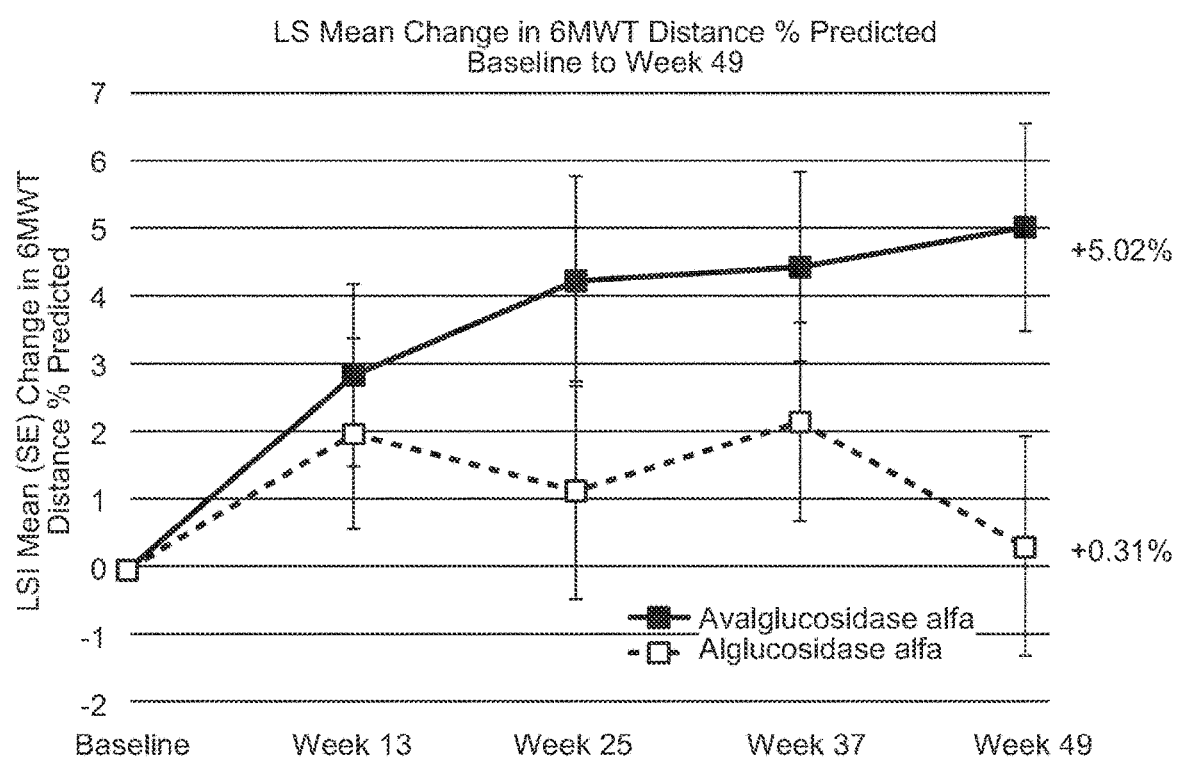
FIG. 12 shows the LS mean change in % predicted 6MWT distance from baseline to week 49. Avalglucosidase alfa treatment resulted in 4.71% greater increase in % predicted 6MWT distance compared to alglucosidase alfa. The LS mean (SE) change % from baseline at week 49 was Avalglucosidase alfa=5.02% (1.54%) (95% CI: 1.95%, 8.09%), and Alglucosidase alfa=0.31% (1.62%) (95% CI: −2.90%, 3.52%), and the difference=4.71% (2.24%) (95% CI: 0.25%, 9.17%; p=0.0386).

The least squares (LS) mean change (standard error, or SE) from baseline to week 49 in % predicted FVC was 2.89% (0.88%) in the avalglucosidase alfa group and 0.46% (0.93%) in the alglucosidase alfa group (see FIGS. 8A-8B and FIG. 24). At week 49, patients treated with avalglucosidase alfa showed a 2.43% greater increase in predicted FVC compared to those treated with alglucosidase alfa (95% CI: −0.13%, 4.99%; p=0.0626) (see FIGS. 9A-9B and FIG. 10).

Additionally, a responder analysis for FVC % predicted showed more participants in the avalglucosidase alfa group reported a relative increase from baseline of >15% at week 49 (n=10, 19.6%) than in the alglucosidase alfa group (n=3, 6.1%) with an odds ratio (OR) from logistic regression of 3.47 (95% CI: 0.86, 13.98).

The LS mean change (SE) in 6MWT (meters) from baseline at week 49 was 32.21 m (9.93 m) in the avalglucosidase alfa group and 2.19 m (10.40 m) in the alglucosidase alfa group. Avalglucosidase alfa treatment resulted in 30.01-m (SE=14.43 m; 95% CI: 1.33 m, 58.69 m) greater increase in 6MWT distance compared to alglucosidase alfa (p-value=0.0405), showing an improvement with avalglucosidase alfa, compared to alglucosidase alfa. Avalglucosidase alfa treatment resulted in 4.71% (SE=2.24%) greater increase in 6MWT distance % predicted compared to alglucosidase alfa (p-value=0.0386). See FIG. 11, FIG. 12 and FIGS. 26A-26B.

A responder analysis for 6MWT distance (meters) showed more participants in the avalglucosidase alfa group reported an increase from baseline at week 49 of ≥54 meters (n=12 [23.5%]) than in the alglucosidase alfa group (n=6 [12.2%]) with an OR from logistic regression of 2.09 (95% CI: 0.70, 6.25)

Figure 13A:
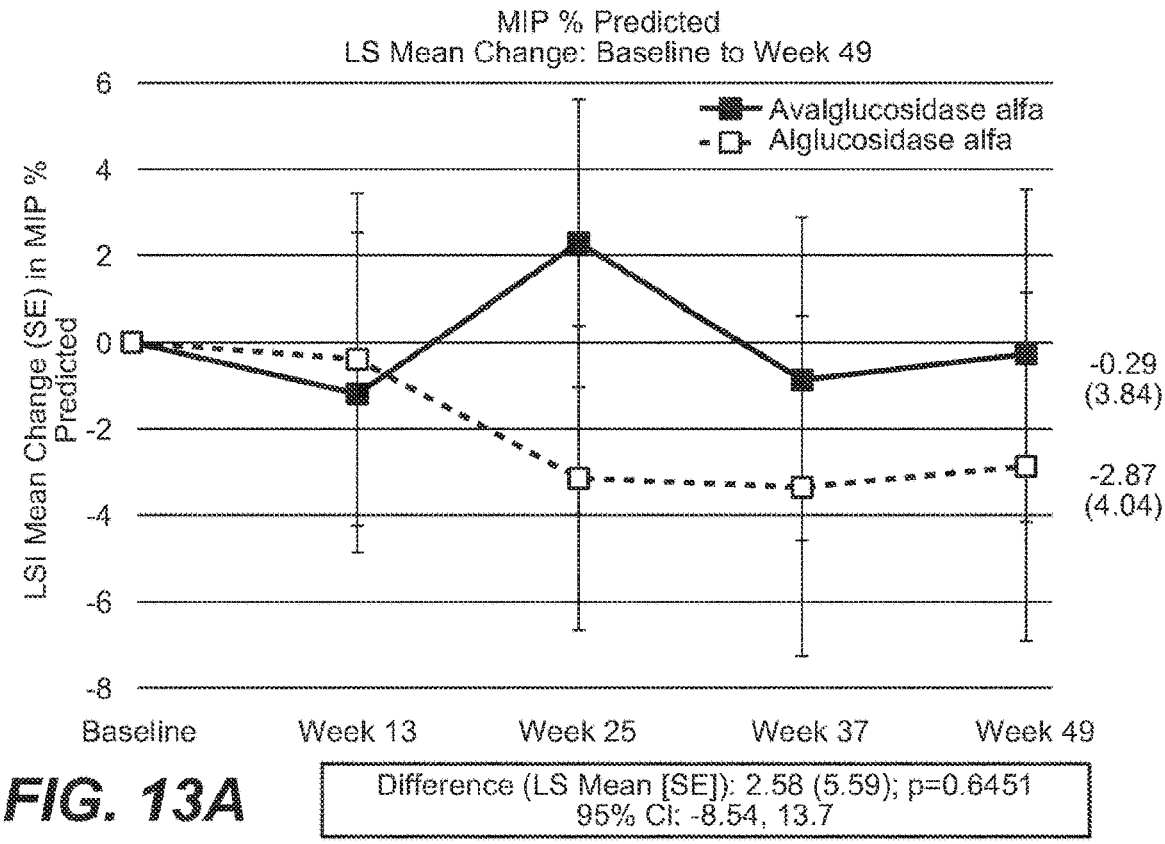
FIGS. 13A-13B show the trends in change from baseline in % predicted MIP and % predicted MEP at week 49 for avalglucosidase alfa compared to alglucosidase alfa.
Figure 13B:
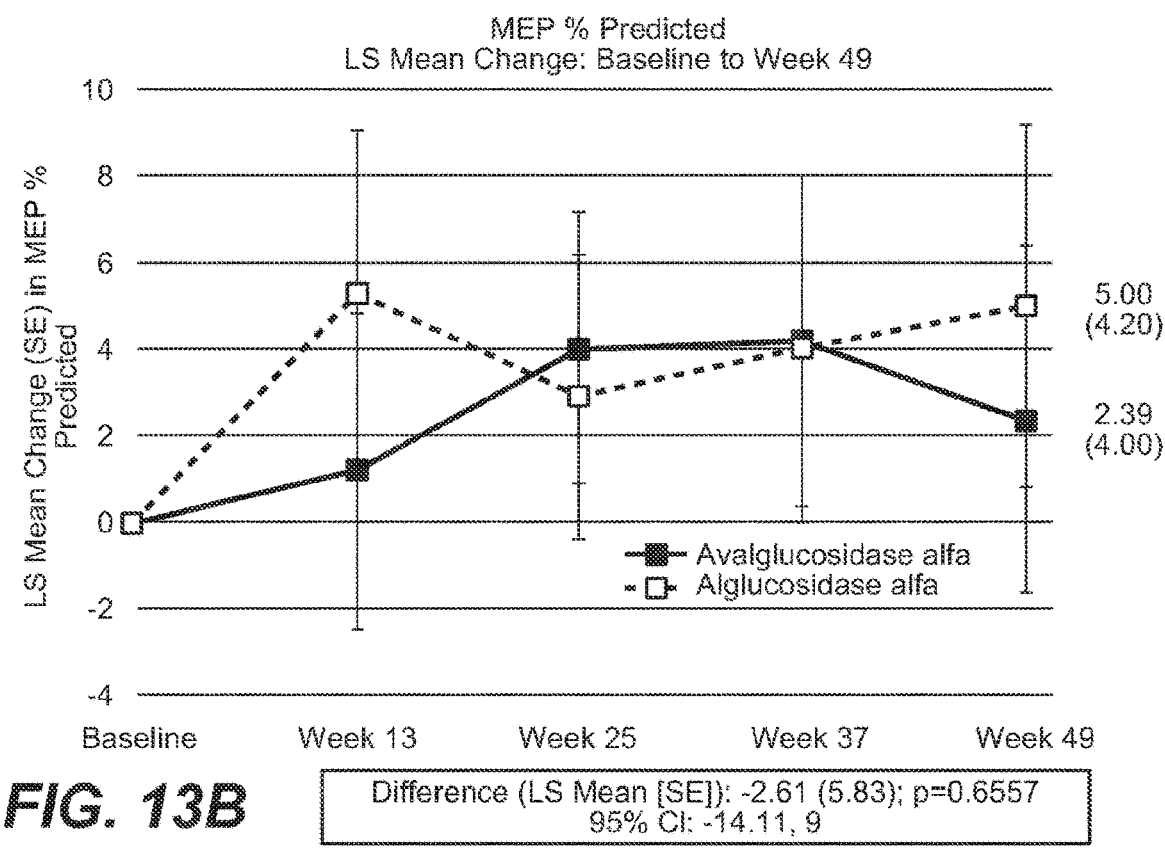
Figure 14:
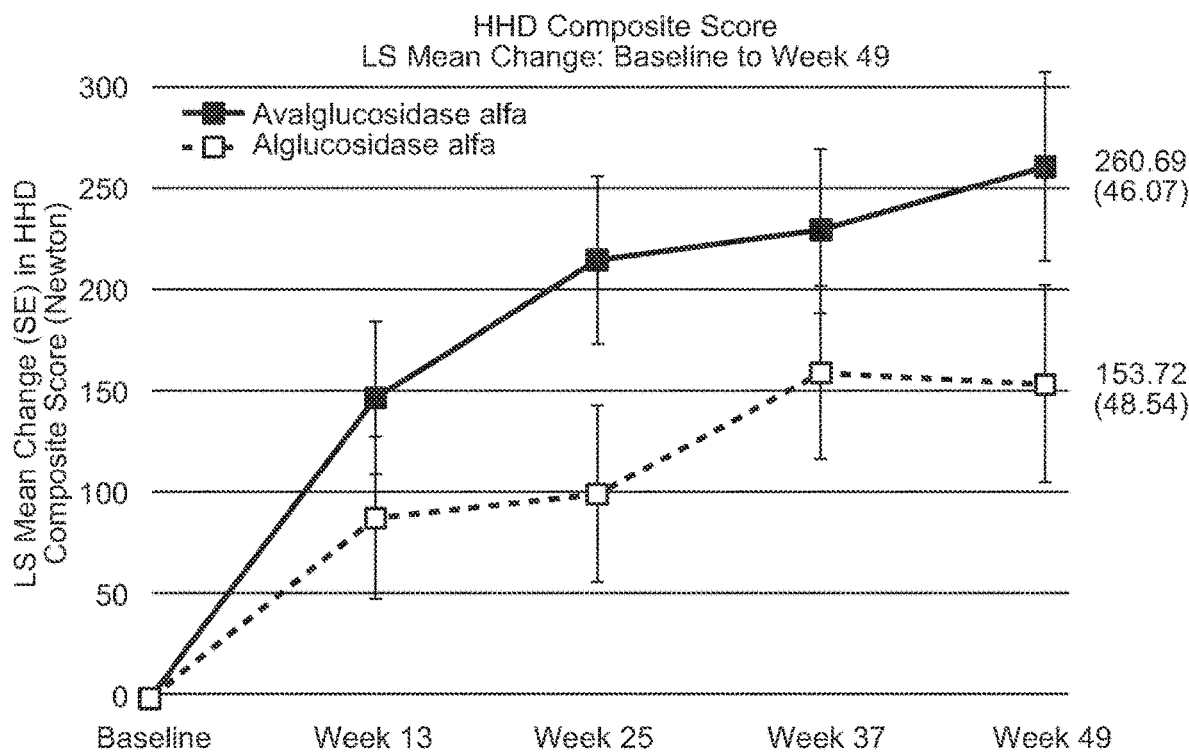
FIG. 14 shows the HHD composite score LS mean change from baseline to week 49. The change from baseline in HHD (lower extremity) score at week 49 showed a positive trend for avalglucosidase alfa compared to alglucosidase alfa. The difference (LS Mean [SE]) was 106.97 (67.17), p=0.1150, 95% CI: −26.56, 240.5.
Figure 15:
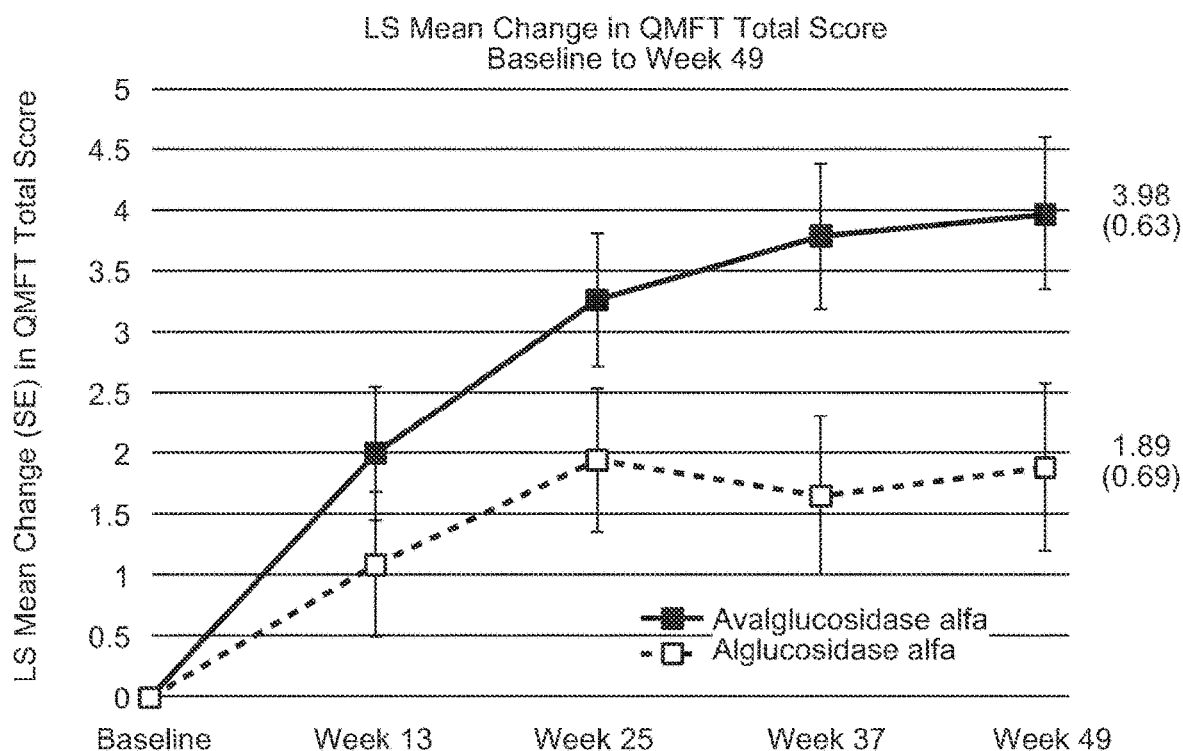
FIG. 15 shows the LS mean change in QMFT total score from baseline to week 49. The change from baseline in QMFT total score at week 49 showed a positive trend for avalglucosidase alfa compared to alglucosidase alfa. The difference (LS Mean [SE]) was 2.08 (0.94); p=0.0288, 95% CI: 0.22, 3.95.
Figure 16A:
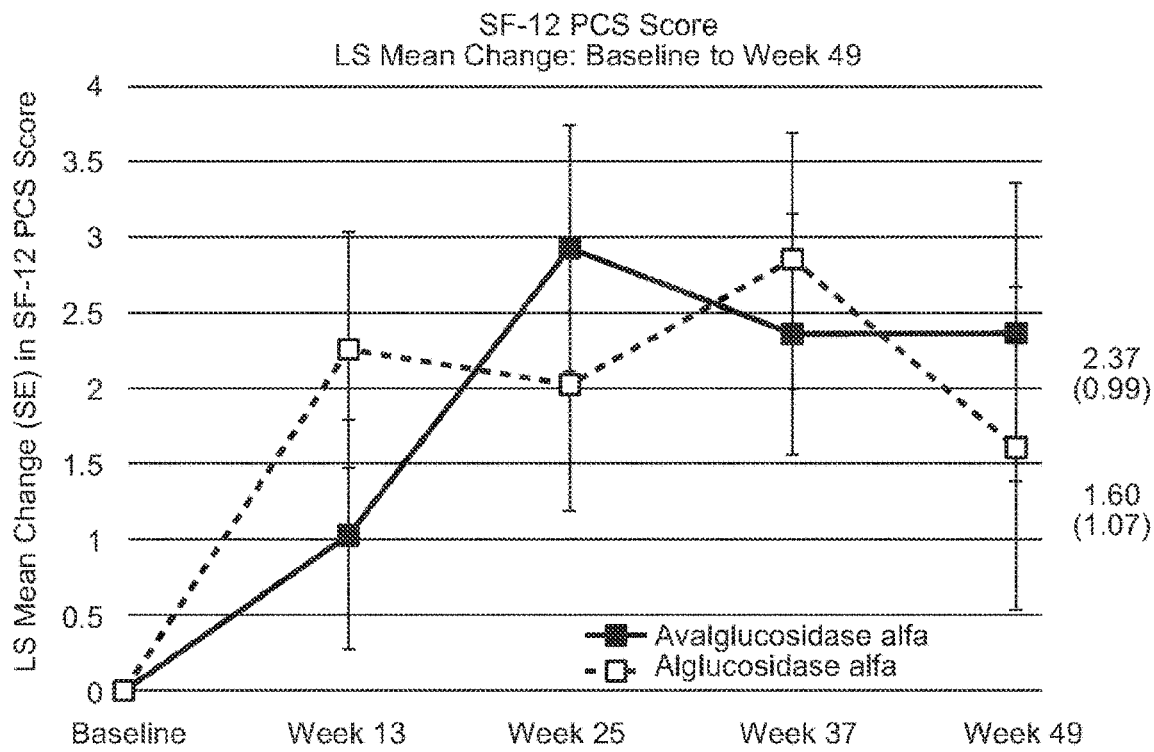
FIGS. 16A-16B show the LS mean change from baseline to week 49 in health-related quality of life Short Form 12 Health Survey (SF-12®) physical component score (PCS) and mental health component score (MCS).
Figure 16B:
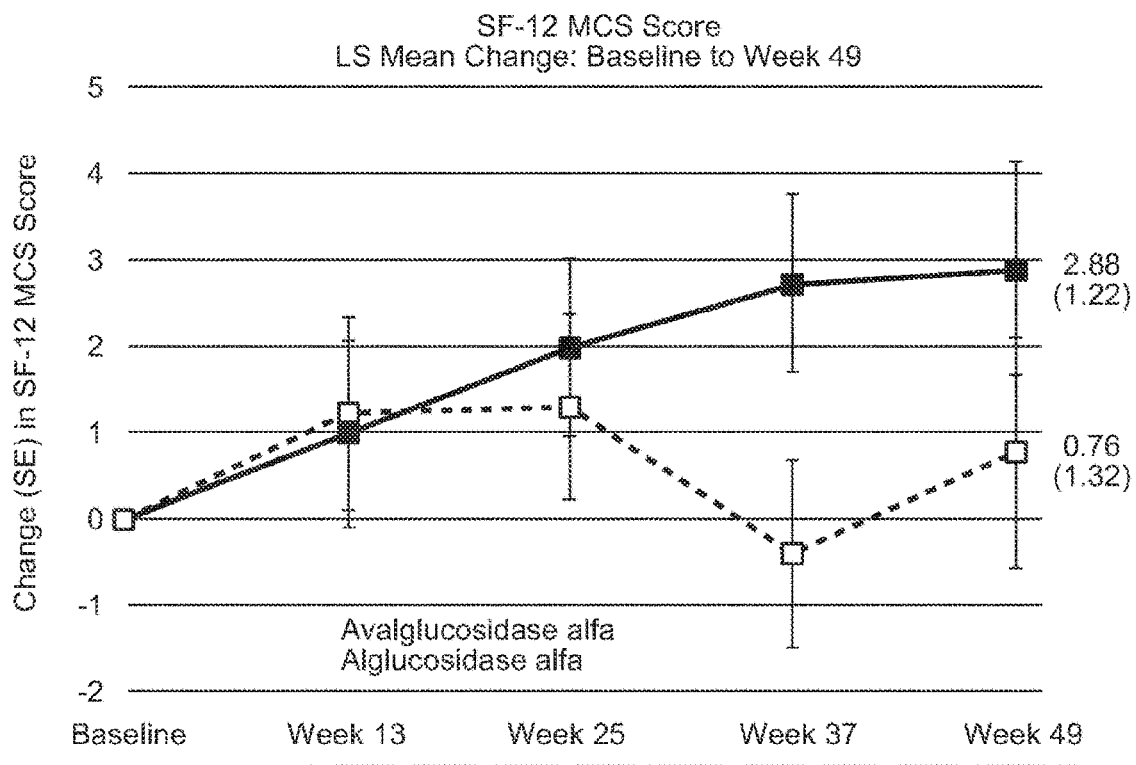
Figure 41A:
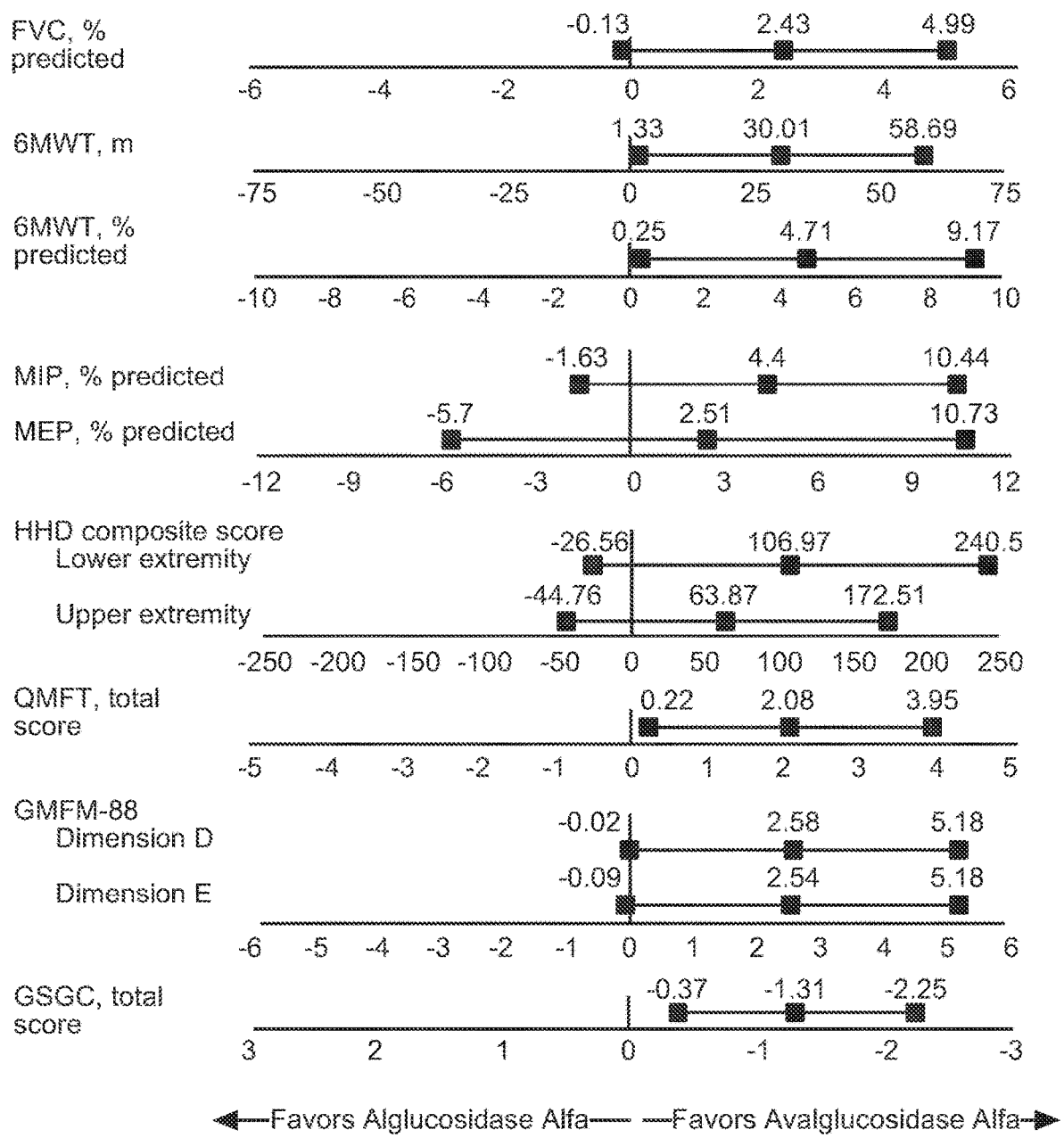
FIG. 41A shows the LS mean (95% CI) differences for changes from baseline for the avalglucosidase alfa group compared to the alglucosidase alfa group in the primary (FVC), secondary, and other efficacy outcomes measuring respiratory muscle function, functional endurance, muscle strength, and motor function.
Figure 41B:
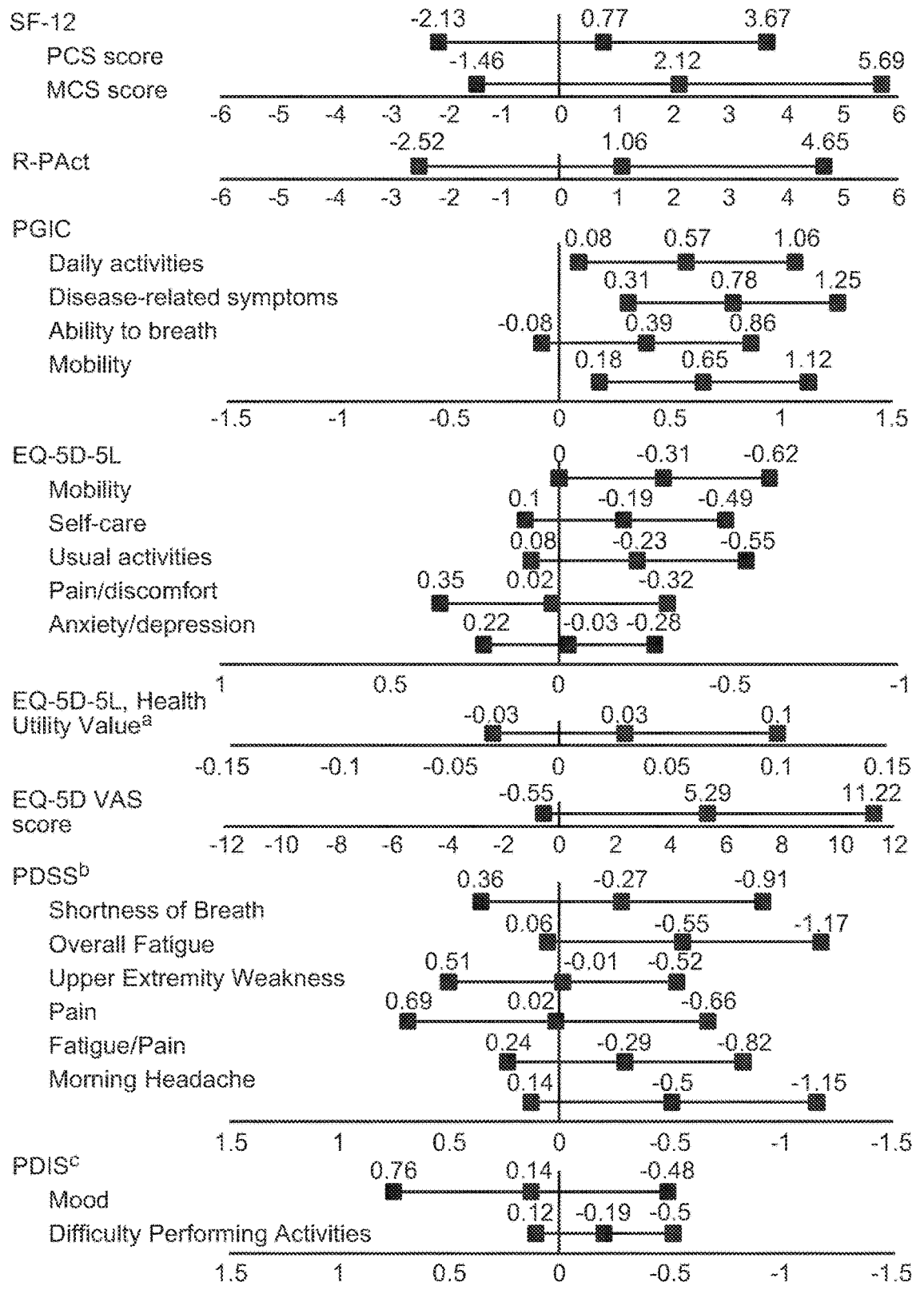
FIG. 41B shows the LS mean change (95% CI) difference for changes from baseline for the avalglucosidase alfa group compared to the alglucosidase alfa group in secondary and other efficacy outcomes measuring health-related quality of life (QoL). The EuroQol 5 Dimensions 5 Response Levels Scale (EQ-5D-5L) Health Utility Value was determined based on health-tate utility values (5L) using UK tariff by treatment (crosswalk method). For the Pompe Disease Symptom Scale (PDSS), shortness of breath score included breathing and breathing while lying down; the overall fatigue score included tiredness, fatigue, muscle weakness anywhere, muscle weakness lower body, and muscle weakness upper body; the upper extremity weakness score included muscle weakness arms and muscle weakness hands; and the pain score included muscle aches and pain; the fatigue/pain score included the overall fatigue score, upper extremity weakness score, and pain score. For the Pompe Disease Impact Scale (PDIS), the mood score included anxiety, worry, and depression; and the difficulty performing activities score included walk difficulty, climb difficulty, rise difficulty, bend over difficulty, and squat down difficulty. As they appear in the figure: 6MWT, 6-Minute Walk Test; EQ-5D-5L, EuroQol 5 Dimensions 5 Response Levels Scale; EQ-5D-VAS, EuroQol 5 Dimensions Visual Analogue Scale; FVC, forced vital capacity; HHD, Hand-Held Dynamometry; MCS, Mental Component Summary; MEP, maximum expiratory pressure; MIP, minimum expiratory pressure; PCS, Physical Component Summary; PDIS, Pompe Disease Impact Scale; PDSS, Pompe Disease Symptom Scale; PGIC, Patient Global Impression of Change; QMFT, quick Motor Function Test; R-Pact, Rasch-built Pompe-specific activity; and SF-12®, 12-Item Short-Form health survey.
Figure 42A:
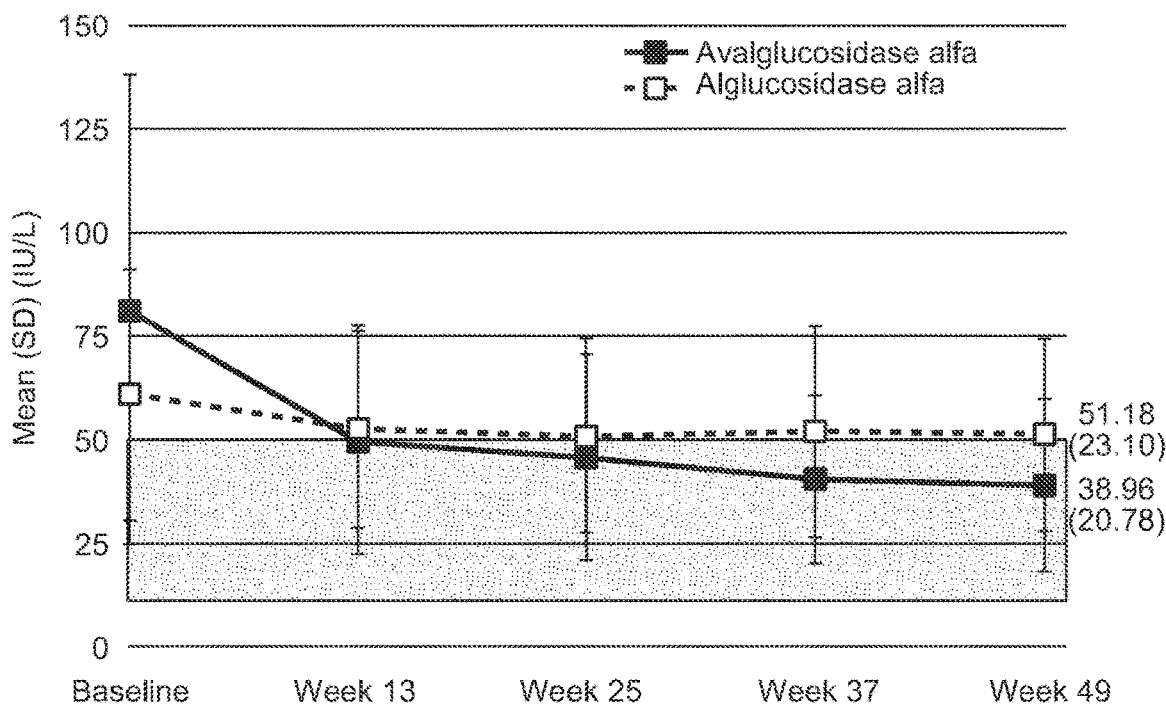
FIG. 42A shows the mean alanine transaminase (ALT) levels from baseline to week 49.
Figure 42B:
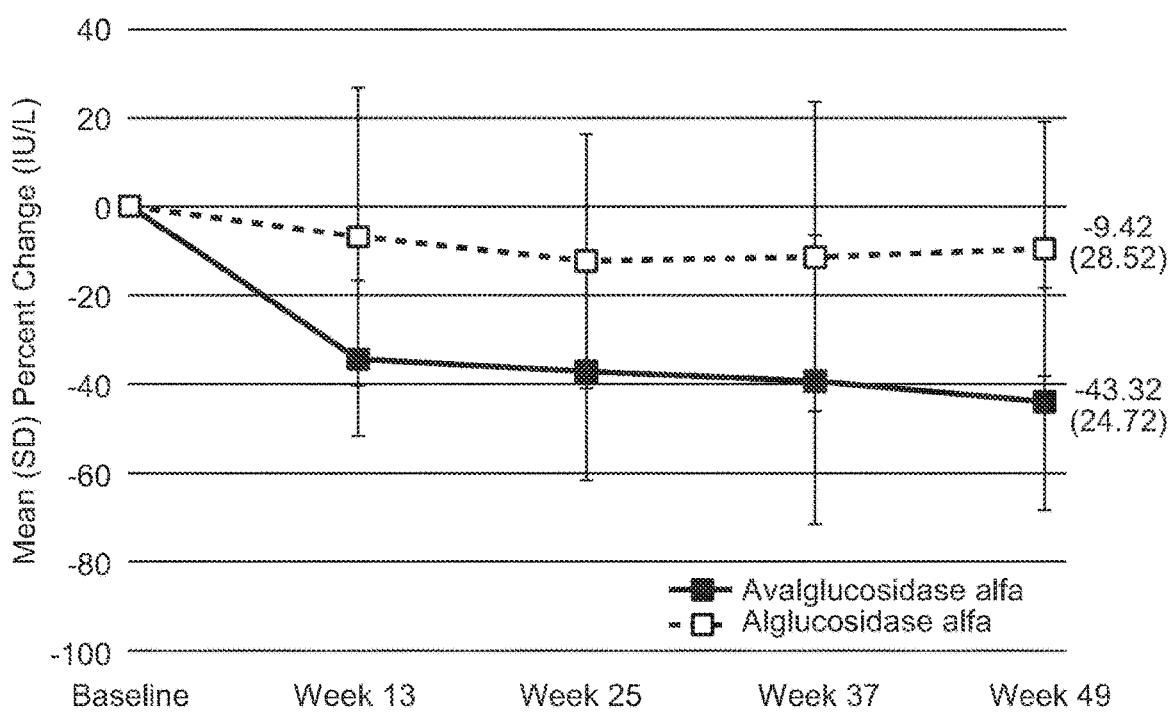
FIG. 42B shows the mean percent change in ALT levels from baseline to week 49. SD, Standard deviation. Normal ranges (shaded in FIG. 42A) for ALT (IU/L): 6-34 (females, ages <69 years); 6-32 (females, ages >69 years); 6-43 (males, ages 10-18 years); and 6-35 (males, ages >69 years).
Figure 43A:
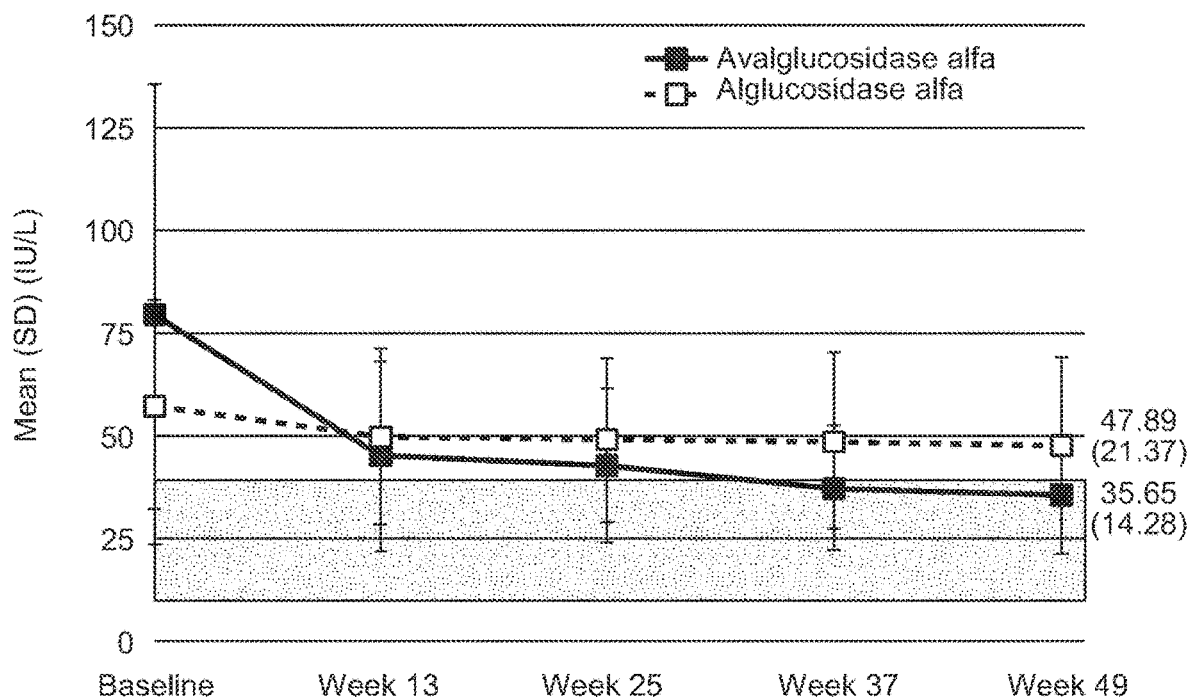
FIG. 43A shows the mean aspartate taminotransferase (AST) levels from baseline to week 49.
Figure 43B:
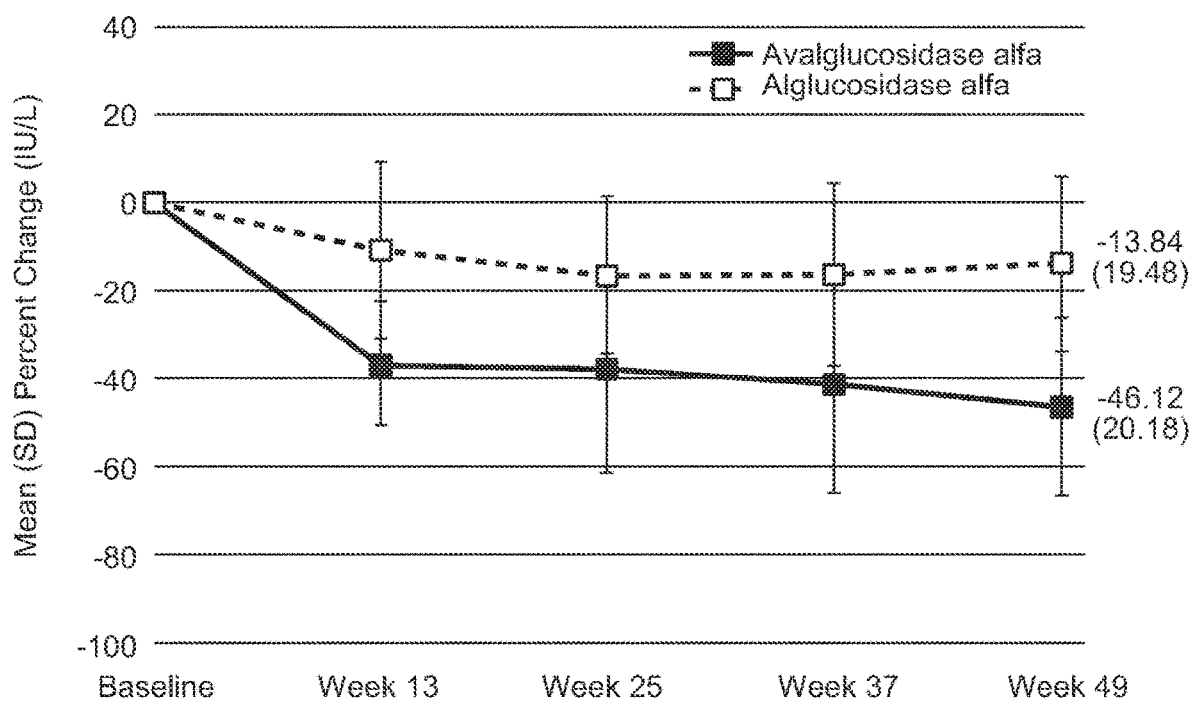
FIG. 43B shows the mean percent change in AST levels from baseline to week 49. SD, Standard deviation. Normal ranges (shaded in FIG. 43A) for AST (IU/L): 6-34 (females, ages <69 years); 6-32 (females, ages >69 years); 6-43 (males, ages 10-18 years); and 6-35 (males, ages >69 years).

Similar tests were performed for % predicted MIP and % predicted MEP (see FIGS. 13A-13B and FIG. 28), HHD (lower extremity) (see FIG. 14 and FIG. 29), QMFT (see FIG. 15 and FIG. 30), and SF-12® (both PCS and MCS; see FIGS. 15A-15B and FIGS. 31A-31B). Table 1, Table 2 and FIGS. 41A-41B summarize the trends for other secondary endpoint values.

TABLE 1

Other secondary endpoints

| LS mean change (SE) from baseline at W49 | Avalglucosidase alfa | Alglucosidase alfa | p-value (without multiplicity adjustment) |
|---|---|---|---|
| MIP (% predicted) | −0.29 (3.84) | −2.87 (4.04) | 0.6451 |
| MEP (% predicted) | 2.39 (4.00) | 5.00 (4.20) | 0.6557 |
| HHD (summary score, % predicted) | 6.97 (1.34) | 4.78 (1.41) | 0.2681 |
| QMFT (total score) | 3.98 (0.63) | 1.89 (0.69) | 0.0288 |
| SF-12 PCS score | 2.37 (0.99) | 1.60 (10.7) | 0.5996 |
| SF-12 MCS score | 2.88 (1.22) | 0.76 (1.32) | 0.2427 |

TABLE 2

LS mean change (SE) for other secondary and tertiary endpoints.

| Parameter | Avalglucosidase Alfa (N = 51) | Alglucosidase Alfa (N = 49) |
|---|---|---|
| MIP % Predicted | | |
| Mean (SE) | 8.70 (2.09) | 4.29 (2.19) |
| 95% CI | 4.54, 12.85 | −0.07, 8.65 |
| MEP % Predicted | | |
| LS Mean (SE) | 10.89 (2.84) | 8.38 (2.96) |
| 95% CI | 5.24, 16.54 | 2.49, 14.26 |

TABLE 2-continued

| LS mean change (SE) for other secondary and tertiary endpoints. | | |
|---|---|---|
| Parameter | Avalglucosidase Alfa (N = 51) | Alglucosidase Alfa (N = 49) |
| HHD, lower extremity | | |
| LS Mean (SE) | 260.69 (46.07) | 153.72 (48.54) |
| 95% CI | 169.11, 352.27 | 57.22, 250.22 |
| HHD, upper extremity | | |
| LS Mean (SE) | 173.54 (38.04) | 109.67 (38.98) |
| 95% CI | 97.84, 249.25 | 32.11, 187.24 |
| SF-12 MCS | | |
| LS Mean (SE) | 2.88 (0.76) | 0.76 (1.32) |
| 95% CI | 0.47, 5.30 | −1.86, 3.39 |
| R-PAct Summary Score | | |
| LS Mean (SE) | 2.55 (1.29) | 1.49 (1.21) |
| 95% CI | −0.07, 5.17 | −0.95, 3.93 |
| PGIC Daily Activities | | |
| LS Mean (SE) | 4.97 (0.17) | 4.40 (0.18) |
| 95% CI | 4.63, 5.30 | 4.04, 4.76 |
| PGIC Disease-Related Symptoms | | |
| LS Mean (SE) | 5.37 (0.16) | 4.59 (0.18) |
| 95% CI | 5.05, 5.69 | 4.04, 4.76 |
| PGIC Ability to Breathe | | |
| LS Mean (SE) | 4.98 (0.16) | 4.60 (0.17) |
| 95% CI | 4.66, 5.31 | 4.26, 4.94 |
| PGIC Mobility | | |
| LS Mean (SE) | 4.84 (0.16) | 4.19 (0.17) |
| 95% CI | 4.66, 5.31 | 3.85, 4.54 |
| GSCS Total Score | | |
| LS Mean (SE) | −0.25 (0.35) | −1.31 (0.48) |
| 95% CI | −0.94, 0.43 | −2.25, −0.37 |
| GMFM-88 Dimension D | | |
| LS Mean (SE) | 4.02 (0.89) | 1.44 (0.95) |
| 95% CI | 2.24, 5.80 | −0.45, 3.32 |
| GMFM-88 Dimension E | | |
| LS Mean (SE) | 2.63 (0.96) | 2.54 (1.32) |
| 95% CI | 0.72, 4.54 | −0.09, 5.18 |
| EQ-5D-5L, Mobility | | |
| LS Mean (SE) | −0.47 (0.11) | −0.15 (0.11) |
| 95% CI | −0.68, −0.26 | −0.38, 0.07 |
| EQ-5D-5L, Self-Care Score | | |
| LS Mean (SE) | −0.13 (0.10) | 0.06 (0.11) |
| 95% CI | −0.33, 0.07 | −0.15, 0.28 |
| EQ-5D-5L, Usual Activities Score | | |
| LS Mean (SE) | −0.30 (0.11) | −0.07 (0.12) |
| 95% CI | −0.51, −0.08 | −0.29, 0.16 |
| EQ-5D-5L, Pain/Discomfort Score | | |
| LS Mean (SE) | −0.27 (0.11) | −0.29 (0.12) |
| 95% CI | −0.50, −0.04 | −0.53, −0.05 |
| EQ-5D-5L, Anxiety/Depression Score | | |
| LS Mean (SE) | −0.36 (0.09) | −0.33 (0.09) |
| 95% CI | −0.53, −0.19 | −0.52, −0.15 |
| EQ-5D-5L, VAS Score | | |
| LS Mean (SE) | 7.49 (1.99) | 2.20 (2.14) |
| 95% CI | 3.53, 11.44 | −2.04, 6.44 |

Figure 33A:
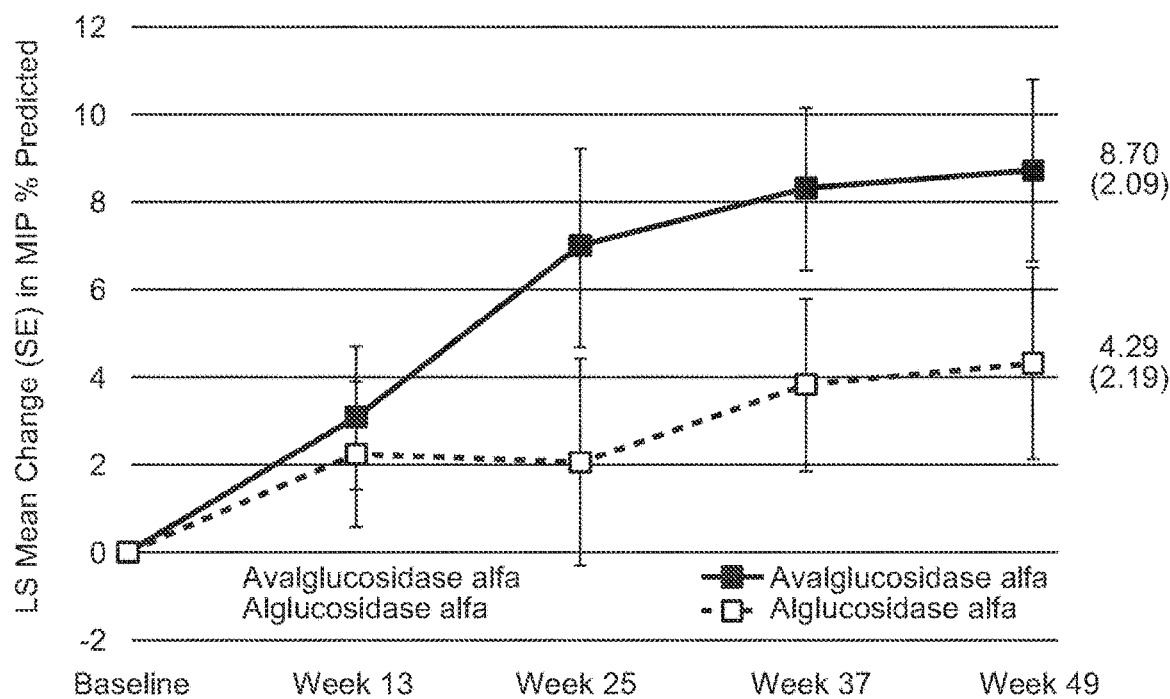
FIGS. 33A-33B show the trends in change from baseline in % predicted MIP and % predicted MEP at week 49 for avalglucosidase alfa compared to alglucosidase alfa after re-analysis of the data. Four patients (2 in each arm) were excluded due to implausible MIP % predicted and MEP % predicted values at baseline.
Figure 33B:
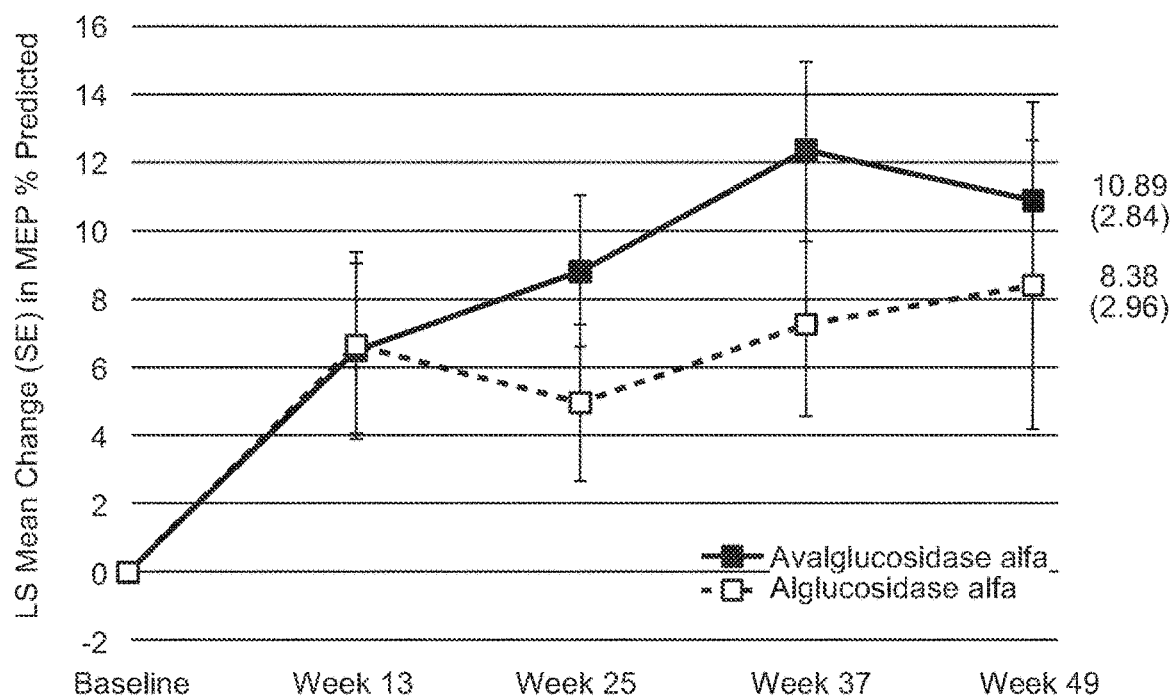
Figure 35A:
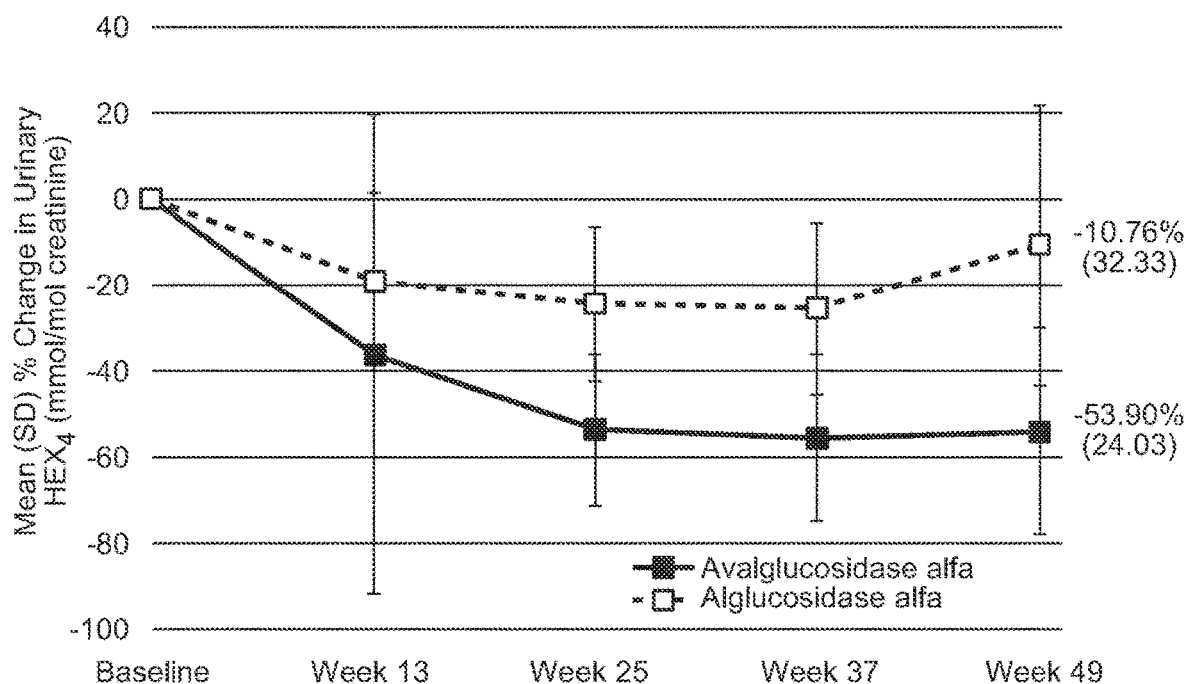
FIGS. 35A-35B show the mean change from baseline to week 49 for Pompe disease biomarkers.
Figure 35B:
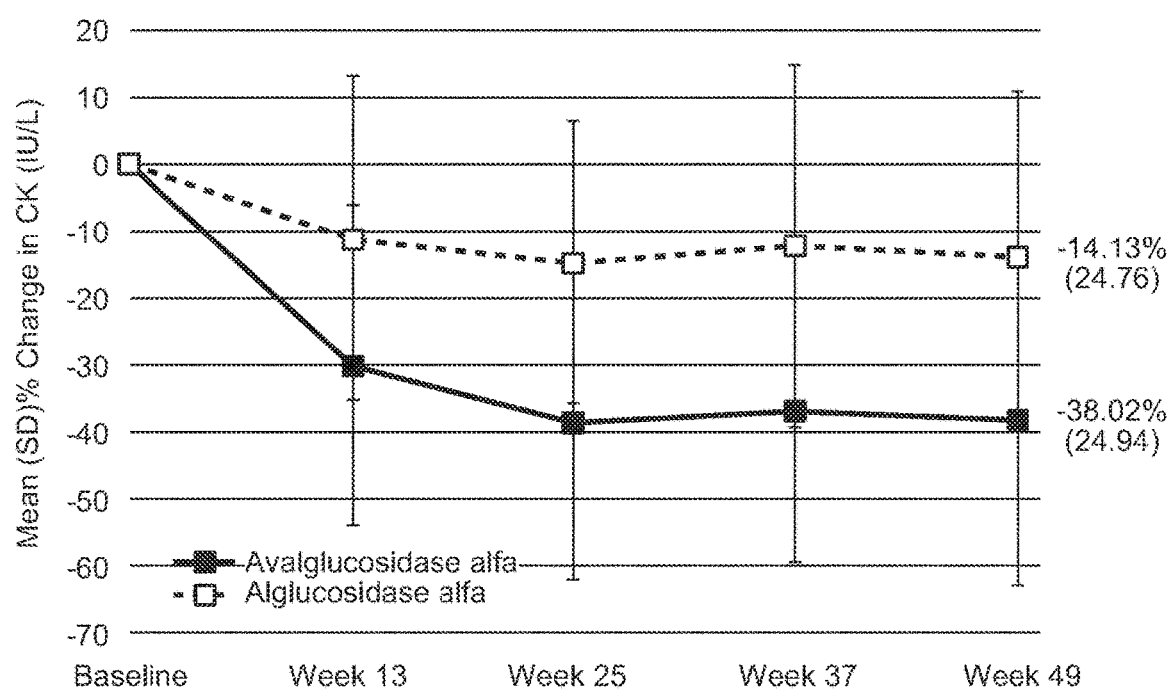
Figure 35C:
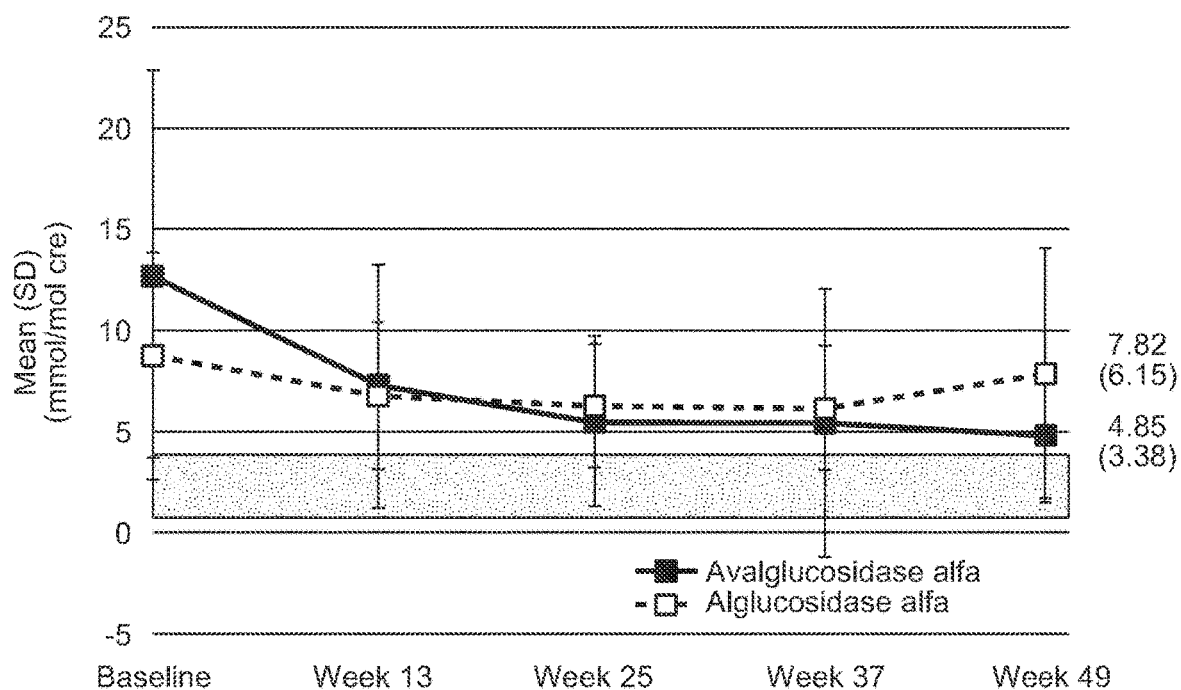
FIG. 35C shows the mean urinary Hex4 levels from baseline to week 49.
Figure 35D:
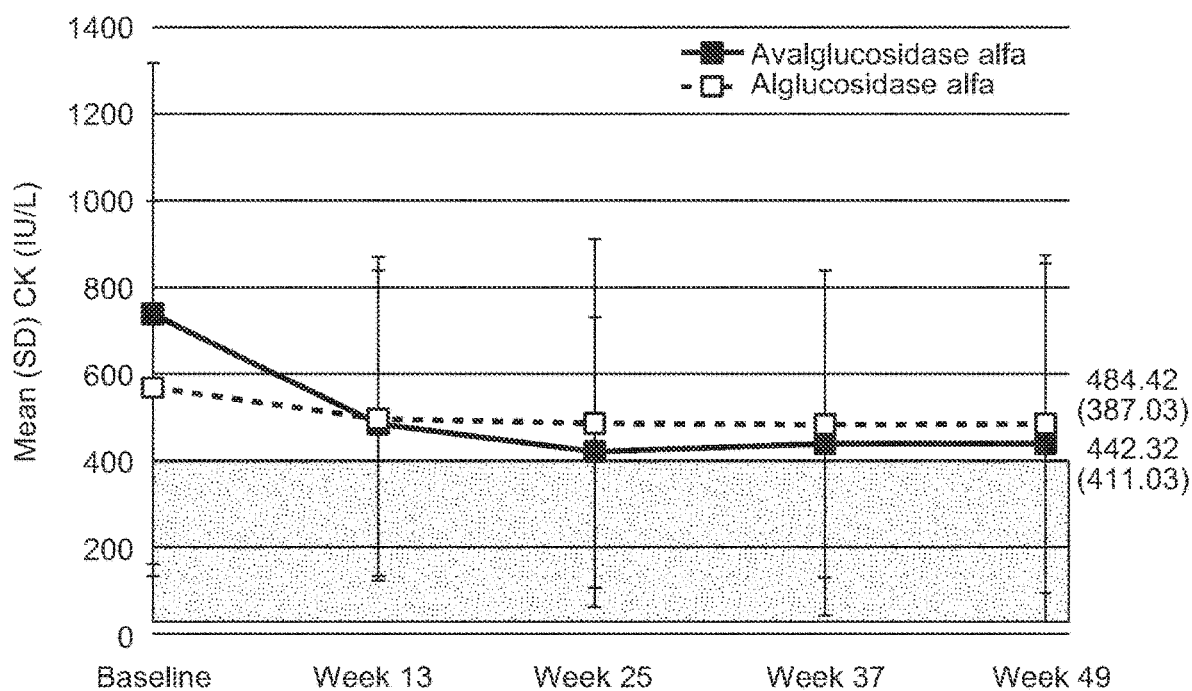
FIG. 35D shows the mean creatine kinase levels from baseline to week 49. Decrease (mean±SD) relative to baseline was seen over time in all parameters, with larger decreases seen at Week 49 in patients in the avalglucosidase alfa arm vs. in patients in the alglucosidase arm, with some values at week 49 approaching normal ranges. PAP, Primary Analysis Period; and SD, standard deviation. Normal ranges (shaded in FIG. 35C) for urinary Hex4 (mmol/mol cre): 0.194-3.36 (males and females, ages 13-18 years); and 0.142-1.92 (males and females, ages >18 years. Normal range (shaded in FIG. 35D) for CK (IU/L): 18-169 (females, ages 16-18); 26-192 (females, ages >18 years); and 18-408 (males, ages 16-18 years), 39-308 (males, ages >18 years).

For % predicted MIP and % predicted MEP, the data was reanalyzed after four patients (2 in each arm) were excluded due to implausible MIP % predicted and MEP % predicted values at baseline. FIGS. 33A-33B show the mean change from baseline at week 49 in % predicted MIP and % predicted MEP after reanalysis. Table 3 summarizes the % predicted MIP and % predicted MEP at baseline after reanalysis. After reanalysis, the difference in the changes (LS mean±SE) from baseline for % predicted MIP was 4.40%±3.04% (95% CI: 1.63, 10.44; p=0.1505) and for % predicted MEP was 2.51%±4.14% (95% CI: −5.70, 10.73; respectively 3.9% and 0% of the avalglucosidase alfa treated patients (reported as AESI in 2.0% and 0% respectively) and 6.1% and 4.1% of the alglucosidase alfa treated patients (reported as AESI in 6.1% and 2.0% respectively). A similar incidence of laboratory or ECG related potentially clinically significant abnormalities (PCSAs) were observed in both groups.

Anti-drug antibody (ADA) responses were similar in both treatment arms. AllTwo patients in each treatment arm were reported to be positive for ADAs at baseline. Treatment-induced ADAs (i.e. ADAs that developed during the study in

TABLE 3

MIP % predicted and MEP % predicted at baseline (after reanalysis).

| Parameter | Avalglucosidase Alfa (N = 51) | Alglucosidase Alfa (N = 49) | Total (N = 100) |
|---|---|---|---|
| MIP % Predicted, Upright | n = 48 | n = 47 | |
| Mean (SD) | 51.74 (24.85) | 53.71 (23.47) | — |
| Median (Min, Max) | 46.60 (9, 116.5) | 48.57 (17.7, 106.5) | — |
| MEP % Predicted, Upright | n = 48 | n = 47 | |
| Mean (SD) | 59.17 (21.60) | 70.21 (27.32) | — |
| Median (Min, Max) | 54.12 (28.7, 117.9) | 66.54 (19.7, 136.2) | — |

Decreases (mean±SD) relative to baseline were seen over time in Pompe disease biomarkers and all parameters, with larger decreases seen at week 49 in patients in the avalglucosidase alfa arm as compared to patients in the alglucosidase arm, with some values at week 49 approaching normal ranges. CK decreased by 306.78±577.66 IU/L (from 739.9±577.62 to 442.32±411.03 IU/L) with avalglucosidase alfa and by 103.58±154.78 IU/L (from 566.35±431.46 to 484.42±387.03 IU/L) with alglucosidase alfa. Urinary Hex4 decreased by 53.9±24.03% (from 12.71±10.10 to 4.85±3.38 mmol/mol) with avalglucosidase alfa and by 10.73±32.33% (from 8.74±5.04 to 7.82±6.15 mmol/mol) with alglucosidase alfa. FIGS. 35A-35D show the mean percentage changes for Pompe disease biomarkers urinary HEX4 and creatine kinase (CK) levels.

For patients who switched from the alglucosidase alfa treatment arm to the avalglucosidase alfa treatment arm after 49 weeks, the LS mean change (SE) in % predicted FVC from W49 to W97 was 0.15% (1.06%) (p=0.8854; see FIG. 25 and FIG. 18A) and the LS mean change (SE) in 6MWT (meters) was 23.32 m (13.69 m) (p=0.0918; see FIG. 27 and FIG. 18B).

Safety Results

The incidence of treatment-emergent adverse events (TE-AEs) was 86.3% in avalglucosidase alfa arm and 91.8% in alglucosidase alfa arm in the PAP (see FIG. 17, and FIGS. 32A-32B). Treatment-emergent serious AEs (SAEs) occurred in 15.7% patients in avalglucosidase alfa arm (including 2.0% related) and in 24.5% patients in alglucosidase alfa arm (including 6.1% related). One patient treated with alglucosidase alfa died due to SAE of acute myocardial infarction (unrelated) in the PAP. One additional patient who switched from alglucosidase alfa to avalglucosidase alfa in the ETP died due to SAE of adenocarcinoma pancreas (unrelated). Four patients permanently discontinued due to adverse events during PAP in the alglucosidase alfa arm (including 2 patients with IARs), none in the avalglucosidase alfa arm. 27.5% of the patients treated with avalglucosidase alfa and 32.7% of the patients treated with alglucosidase alfa experienced at least one protocol defined IAR in the PAP.

In PAP, AEs of alanine aminotransferase (ALT) and aspartate aminotransferase (AST) increase were reported in patients who were negative for ADAs at baseline) were reported in 96.1% patients in the avalglucosidase alfa arm vs. 95.8% in the alglucosidase arm. Fewer patients in the avalglucosidase arm (19.6%, n=10) had ADA peak titers ≥12,800 reported than patients in the alglucosidase alfa arm (33.3%, n=19). A lower proportion of participants with persistent high titers was noted with avalglucosidase alfa (24.4%, n=10) versus alglucosidase alfa (34.8%, n=16). Among participants with persistent ADAs, high peak titer levels tended to remain at higher levels, while moderate and low titers trended towards reduction and tolerization. Peak titer ranges were 100-51,200 for avalglucosidase alfa and 100-409,600 for alglucosidase alfa, while the last titer ranges were 100-51,200 for avalglucosidase alfa and 100-204,800 for alglucosidase alfa. Two participants in the avalglucosidase alfa arm had peak and last titers of 51,200, and one participant in the alglucosidase arm had peak titer of 409,600 and last titer of 204,800. Three (6.1%) patients in the avalglucosidase alfa arm tolerized, as compared to 4 (8.7%) patients in the alglucosidase alfa arm. Neutralizing antibody (NAb) responses, based on either enzyme activity inhibition or enzyme activity uptake, were more commonly reported for alglucosidase alfa than avalglucosidase alfa. FIG. 36 and Table 4 summarize the ADA and NAb responses.

TABLE 4

Anti-drug antibody (ADA) responses.

| | Avalglucosidase alfa N = 51 | Alglucosidase alfa N = 49 |
|---|---|---|
| ADA Status, n (%) | | |
| Always negative | 2 (3.9) | 2 (4.2) |
| Ever positive with negative baseline | 47 (92.2) | 44 (91.7) |
| Positive at baseline | 2 (3.9) | 2 (4.2) |
| Treatment-emergent ADA, n (%) | 49 (96.1) | 46 (95.8) |
| Treatment-induced ADA, n (%) | 47 (95.9) | 44 (95.7) |
| Transient ADA | 1 (2.0) | 1 (2.2) |
| Persistent ADA | 43 (87.8) | 39 (84.8) |
| Tolerized ADA | 3 (6.1) | 4 (7.7) |
| Treatment-boosted ADA, n (%) | 2 (100) | 2 (100) |

TABLE 4-continued

Anti-drug antibody (ADA) responses.

|  | Avalglucosidase alfa N = 51 | Alglucosidase alfa N = 49 |
|---|---|---|
| ADA peak titer, n (%) | | |
| 100-800 | 17 (33.3) | 8 (16.7) |
| 1600-6400 | 20 (39.2) | 20 (41.7) |
| ≥12,800 | 10 (19.6) | 16 (33.3) |
| ADA last titer, n (%) | | |
| 100-800 | 26 (55.3) | 13 (29.5) |
| 1600-6400 | 11 (23.4) | 17 (38.6) |
| ≥12,800 | 10 (21.3) | 14 (31.8) |

For participants with evaluable ADA: avalglucosidase alfa, n=47; alglucosidase alfa, n=44.

C. Conclusions

Substantial improvements in primary endpoint and key secondary endpoints 6MWT were observed for avalglucosidase alfa vs. alglucosidase alfa. Consistent positive numerical trends were also observed across muscle measures (i.e., MIP, HHD, QMFT) and health-related quality of life (i.e., SF-12® MCS, PCS).

Specifically, primary endpoint % predicted FVC at week 49 showed numerical improvement for avalglucosidase alfa vs. alglucosidase alfa (2.89% v. 0.46%, p=0.0626). Secondary endpoint 6MWT change from baseline at week 49 showed numerical improvement for avalglucosidase alfa vs. alglucosidase alfa (32.21 vs 2.19, p=0.0405). Additional secondary endpoints showed similar positive numerical trends for avalglucosidase alfa in MIP, HHD, QMFT and SF-12® (change from baseline at week 49) while trend was more favorable to alglucosidase alfa for MEP (change from baseline at week 49).

Evaluation of the effect of switching treatment from alglucosidase alfa to avalglucosidase alfa after week 49 during the extension period while remaining blinded to their initial treatment demonstrated numerical improvement for % predicted FVC and 6MWT at week 97. Of note at the time of the data cut-off, 20/49 (41%) and 21/49 (43%) patients had available data for % predicted FVC and 6MWT at week 97, respectively.

The safety profile of avalglucosidase alfa is possibly more favorable when compared to alglucosidase alfa. Similar incidence of TEAEs between the two treatment arms were observed. Protocol defined IARs occurred less frequently in the avalglucosidase alfa treatment arm, compared with alglucosidase alfa treatment arm.

Example 2. Magnetic Resonance Imaging of Muscle in Patients with Pompe Disease after Long-Term Avalglucosidase Alfa Treatment This example describes an ongoing clinical study to assess the disease burden of participants with late-onset Pompe disease (LOPD) by qualitative and quantitative magnetic resonance imaging (MRI) measurements, and to evaluate the effects of avalglucosidase alfa on muscle structure in participants in an ongoing study.

A. Study Design

The study had two different open-label, multicenter, multinational study periods (FIG. 37A): (1) an ascending dose study of avalglucosidase alfa in previously treated and treatment-naïve LOPD participants enrolled in the study (NEO1, NTC01898364); and (2) a study of avalglucosidase alfa in previously treated and treatment-naïve LOPD participants enrolled in the NEO1 study (NEO-EXT, NTC02032524).

Long-term safety and efficacy of avalglucosidase alfa were assessed in adult participants with LOPD in the NEO-EXT study. Skeletal muscle magnetic resonance imaging (MRI) was a pharmacodynamic secondary endpoint. Secondary efficacy endpoints also included pulmonary and motor function measures (forced vital capacity % predicted [% predicted FVC], maximum inspiratory pressure [MIP], maximum expiratory pressure [MEP], and 6-minute walk test [6MWT]).

Figure 37A:
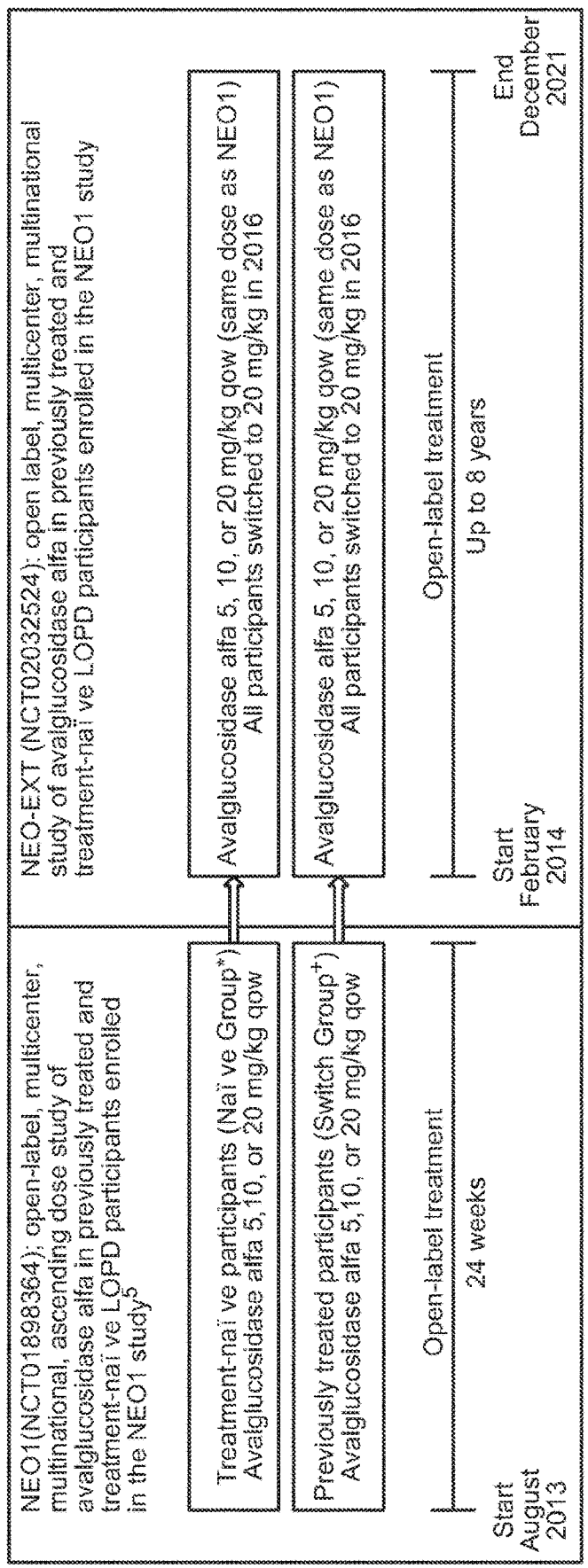
Figure 37B:
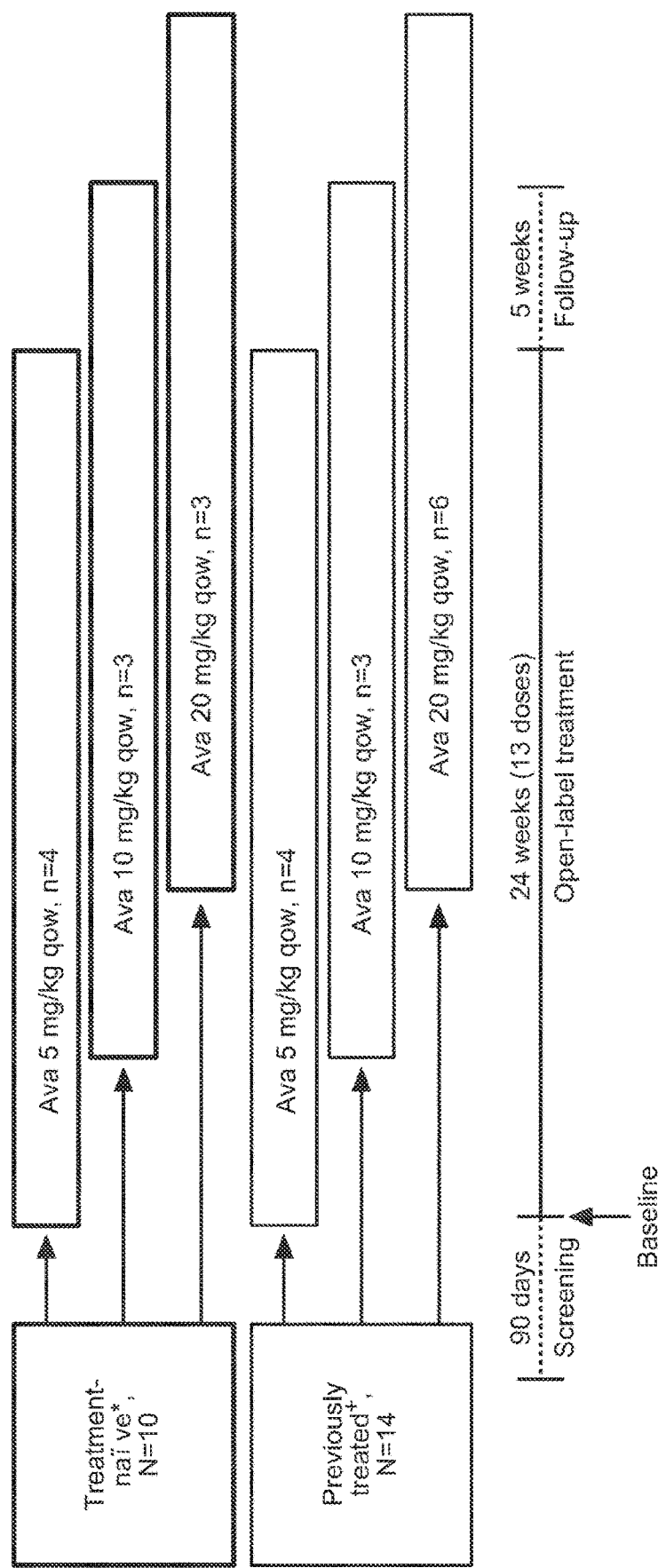

At enrollment in the NEO1, the participants were either treatment-naïve (naïve group, n=10) or had previously received alglucosidase alfa for ≥9 months (switch group, n=14). In the first study period, participants received avalglucosidase alfa at doses of 5, 10, or 20 mg/kg intravenous every 2 weeks (qow) for 6 months. Participants who subsequently entered the NEO-EXT period (naïve group, n=8; switch group, n=11) continued on their first study period dose until all switched to 20 mg/kg qow in 2016. (FIGS. 37A-37B). Qualitative and quantitative skeletal muscle MRI (T1-weighed [T1W] MRI imaging with Mercuri grading from grade 1 [normal appearance] to grade 4 [severe involvement]; 3-point Dixon fat fraction on a scale of 0-100%; T2-weighed [T2] water MRI imaging with and without B2 correction were used to measure participants' disease burden at enrollment in the first study period.

The impact of avalglucosidase alfa on different components of muscle structure was assessed at completion of the NEO1 period (week 27) and every 2 years thereafter in the NEO-EXT study.

In the NEO1 study, glycogen content was measured in skeletal muscle biopsies taken at baseline and week 27 (W27) in all participants. In the NEO-EXT study, biopsies were only sampled in participants who had a muscle glycogen content >5% (naïve group, n=0; switch group, n=3). No patient was sampled because of significant clinical decline.

B. Results

MRI can efficiently identify muscles with structural changes corresponding to the clinically weakest muscles and correlates well with results of the functional muscle scales in clinical trials. Qualitative and quantitative MRI was used to measure the disease burden of participants with LOPD at enrollment into the NEO1 study (NCT01898364) and to evaluate the effects of avalglucosidase alfa on muscle structure in participants in the NEO-EXT study (NCT02032524), an ongoing NEO1 study extension.

A total of 24 participants enrolled into the NEO1 study and at the interim data cutoff between the NEO1 and NEO-EXT study periods, 17 participants remained in the study. Due to lag in time to evaluation of MRI and muscle biopsies, mostly data up to year 4.5 were available for these participants.

Figure 39:
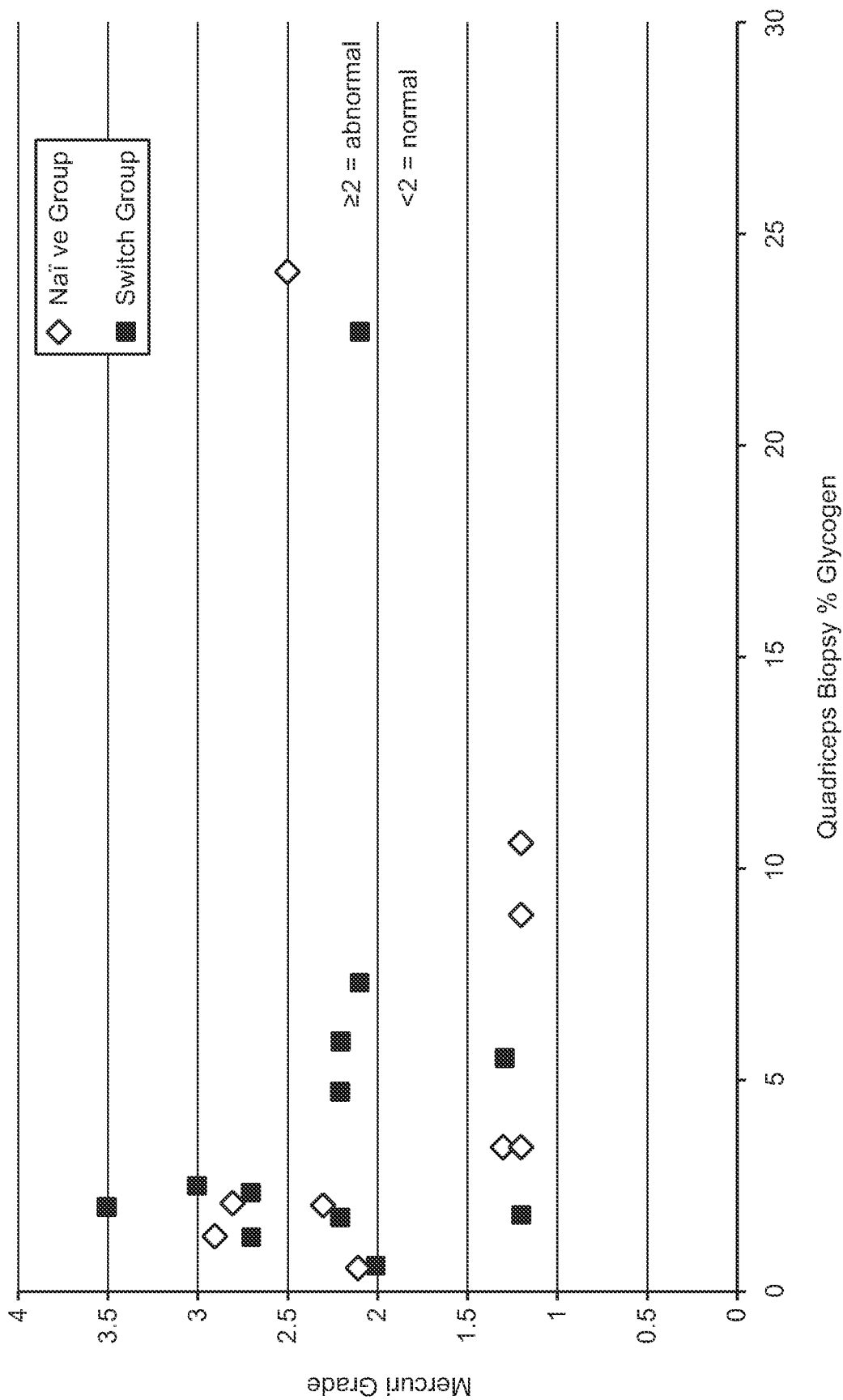
FIG. 39 shows the relationship between baseline quadriceps Mercuri grade and glycogen tissue area.

Participant characteristics at baseline are shown in FIG. 37C. At enrollment in the NEO1 study, motor assessments, muscle glycogen content, T1-weighted (T1W) MRI Mercuri grading, and 3-point Dixon quantitative MRI fat fraction were found to be consistent with previous natural history data (FIG. 38). At baseline, most participants' glycogen levels were <5%, and motor function was moderately impaired, and the baseline 3-point Dixon fat fractions were higher in the switch group compared with the naïve group (FIG. 38). The baseline Mercuri scores were inversely correlated with glycogen levels (% tissue area) (FIG. 39):

quadriceps with Mercuri scores of 1 (normal) had high glycogen content, while quadriceps with Mercuri scores ≥2 had low glycogen content.

Figure 40A:
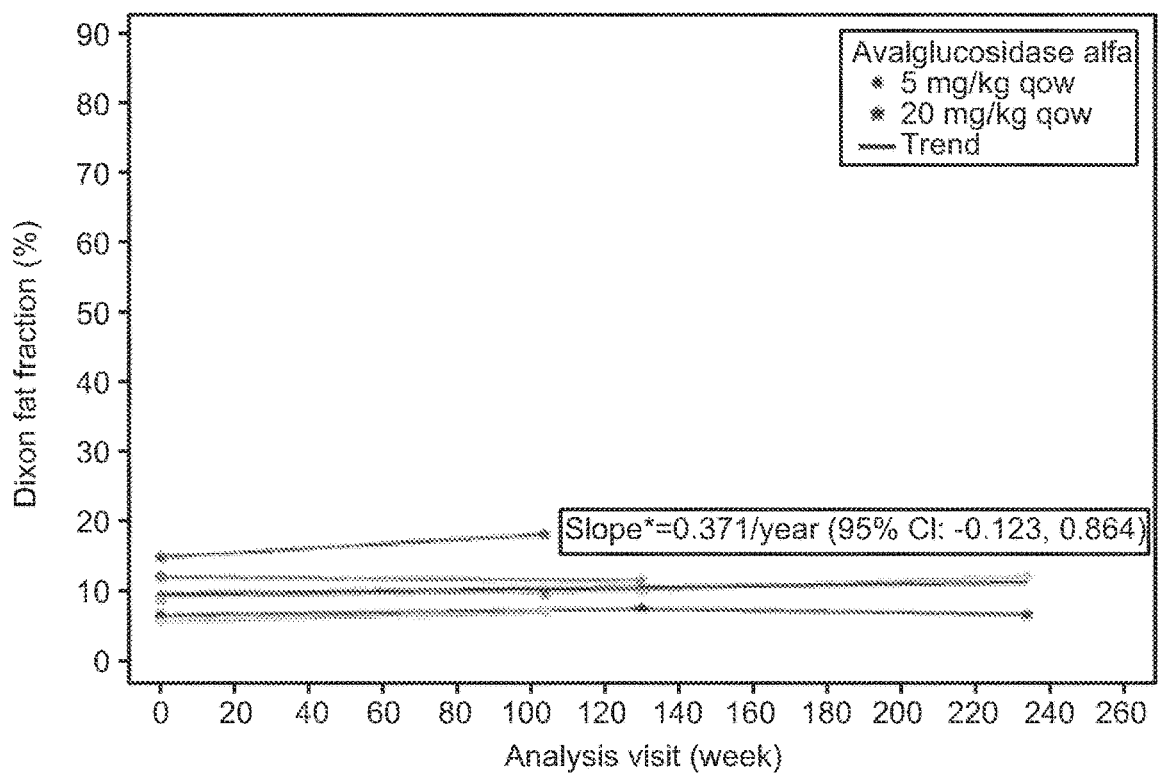
FIGS. 40A-40D show individual participant's 3-point Dixon fat fraction trajectories in quadriceps and hamstrings.
Figure 40B:
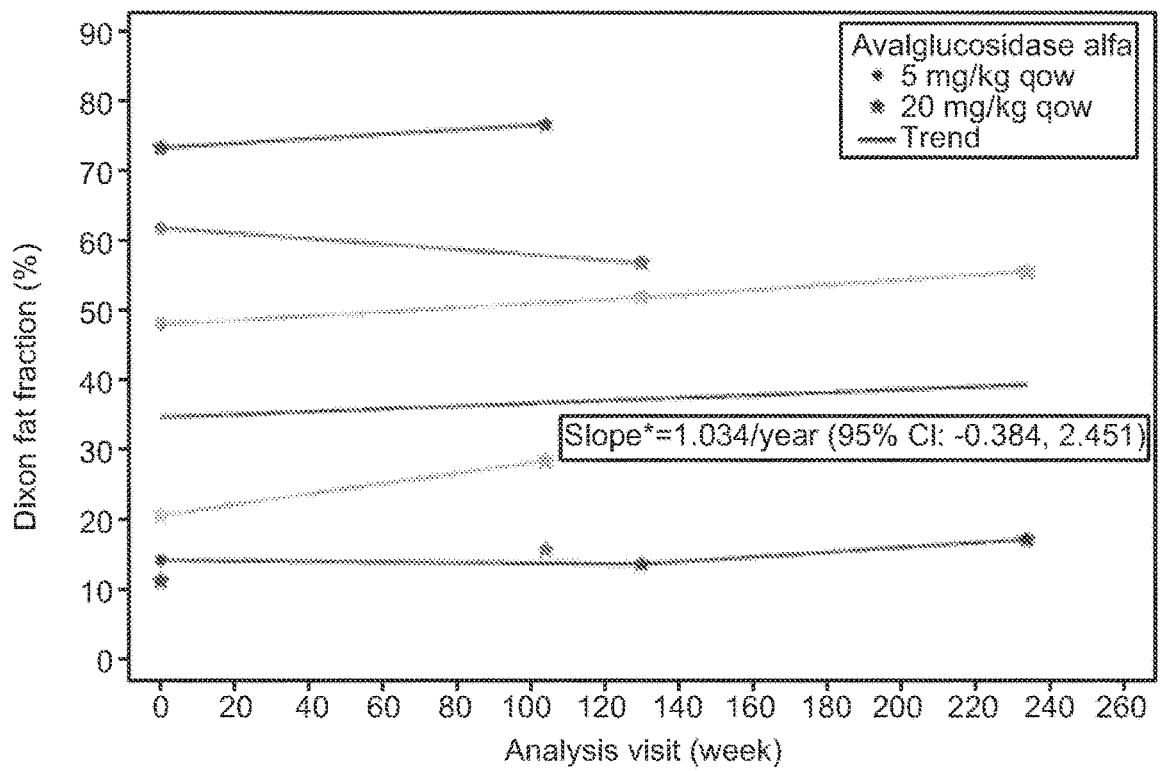
Figure 40C:
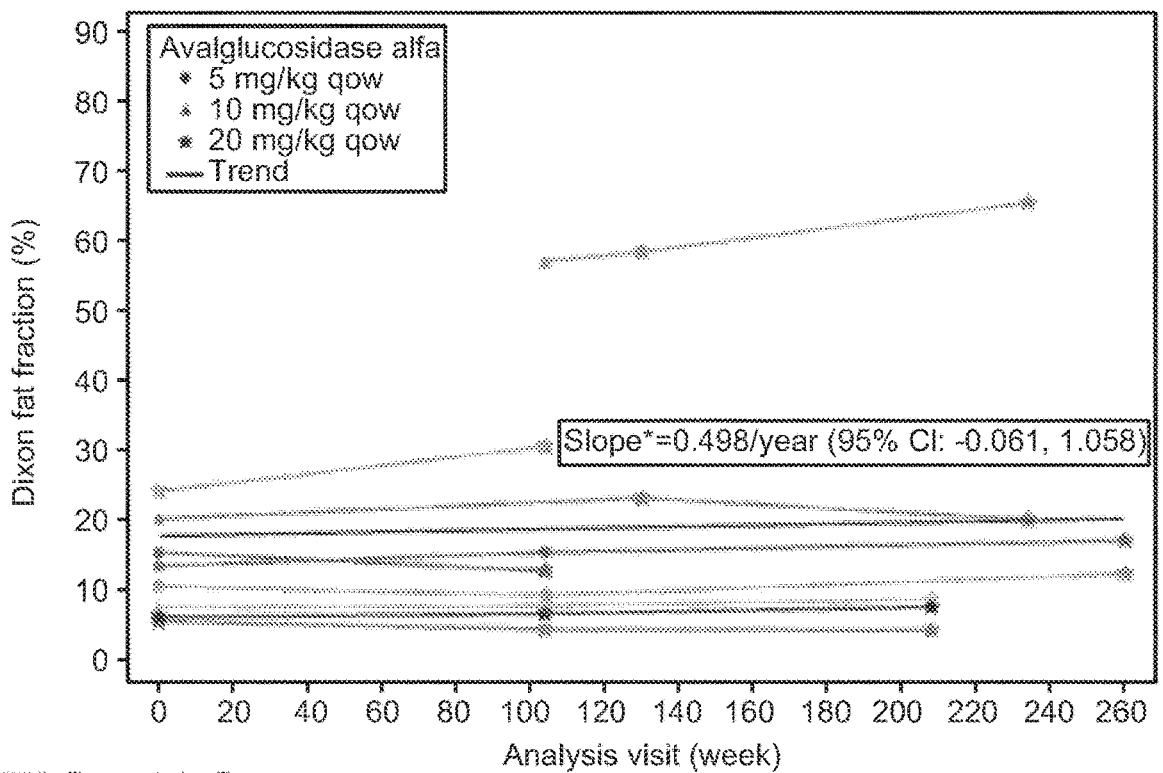
Figure 40D:
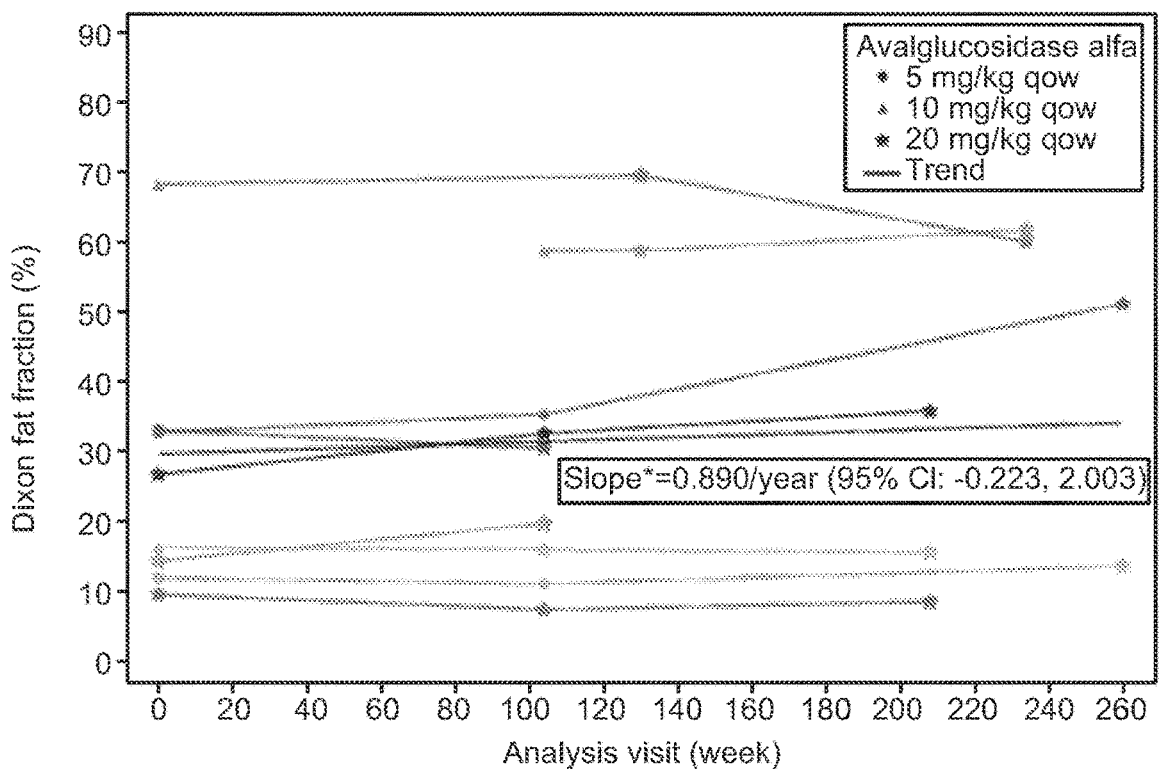

Progression of fat fraction may depend on the baseline mean thigh fat fraction, and participants with fractions between 20-50% at baseline are those likely to change the most (Nunez-Peralta, C., et al. (2020) *J Cachexia Sarcopenia Muscle* 11(4):1032-46). The quadriceps 3-point Dixon fat fractions mostly began and remained <20% (FIG. 40A and FIG. 40C). The hamstring 3-point Dixon fat fractions (FIG. 4B and FIG. 40D) were higher than for quadriceps. Two naïve group and three switch group participants had baseline hamstring fat fractions between 20-50% and experienced the most change in the NEO-EXT study. One participant in each group had increasing hamstring fat fraction over time and the other participants stabilized. Two naïve group and two switch group participants had baseline hamstring fat fraction >50%, among whom one in each group stabilized and the other decreased hamstring fat fraction over time.

During the NEO-EXT study, quadriceps and hamstring 3-point Dixon fat fraction, water T2 (with and without B1 heterogeneity correction), and muscle mass index were generally stable for up to 4.5 years of avalglucosidase alfa in most participants. The change per year in % fat fraction from baseline was 0.3 and −0.02 in quadriceps for the naïve and switch groups, respectively, and 1.2 and −1.8 in hamstring for the naïve and switch groups, respectively.

C. Conclusions

At the start of the study, quantitative MRI assessments successfully identified muscles affected with active Pompe disease and appeared to be linked with clinical motor function endpoints. Avalglucosidase alfa showed potential for muscle preservation as indicated by the stabilized MRI fat fraction in treatment-naïve (naïve group) and treatment-experienced (switch group) study participants. This is in contrast with reports of progressive fatty replacement in untreated LOPD and in some alglucosidase alfa recipients. An apparent inverse relationship of glycogen content and fat fraction, as expected with disease evolution from glycogen accumulation to fat replacement, warrants further pathophysiologic study in larger populations. The quantitative MRI fat fraction and muscle function tests also offer utility for stratification and longitudinal valuation in clinical trials.

What is claimed is:

1. A method for treating a late-onset Pompe disease (LOPD) in a human individual in need thereof, comprising administering to the individual a pharmaceutical composition comprising an oligosaccharide-protein conjugate and a pharmaceutically acceptable carrier, wherein the oligosaccharide-protein conjugate is avalglucosidase alfa
wherein the pharmaceutical composition is administered at a dose of about 20 mg/kg,
wherein the individual shows the first symptom of Pompe Disease at an age of at least about 18 years old, and
wherein administration of the pharmaceutical composition to a plurality of human individuals for 49 weeks results in one or more of the following:
(a) an average increase of FVC % in an upright position of at least about 1.1%, at least about 2.3%, or at least about 4.6%;
(b) an average increase of 6-minute walk test (6MWT) distance of at least about 12.5 m, at least about 23 m, or at least about 50 m;
(c) an average increase in 6MWT percentage of predicted value (6MWT %) of at least about 2%, at least about 3.5%, or at least about 8%;
(d) an average increase in maximum inspiratory pressure percentage of predicted value (MIP %) in an upright position of at least about 4.5%, at least about 8.7%, or at least about 12.5%;
(e) an average increase in maximum expiratory pressure percentage (MEP %) in an upright position of at least about 5.2%, at least about 10.9%, at least about 14.3%, or at least about 16.5%;
(f) an average increase in hand-held dynamometry (HHD) score for lower extremities of at least about 170 Newtons (N), at least about 250 N, or at least about 350 N;
(g) an average increase in HHD score for upper extremities of at least about 95 N, at least about 190 N, or at least about 245 N;
(h) an average increase in quick motor function test (QMFT) total score of at least about 2.7, at least about 3.3, or at least about 5.2;
(i) an average change of Gait, Stair, Gower's Maneuver, and Chair (GSGC) score of at least about −0.9, at least about −0.35, or at least about 0.40;
(j) an average increase of Gross Motor Function Measure (GMFM-88) Dimension D score of at least about 2.2, at least about 3.3, or at least about 5.8;
(k) an average increase of GMFM-88 Dimension E score of at least about 0.7, at least about 4.5, or at least about 5.2;
(l) an average increase in health-related quality of life Short Form 12 Health Survey SF-12®) physical component score (PCS) of at least about 0.4, at least about 3.7, or at least about 4.3%;
(m) an average increase in SF-12® mental component score (MCS) of at least about 0.45, at least about 3.4, or at least about 5.3;
(n) an average decrease in urinary hexose tetrasaccharide (HEX4) level of at least about 30%, at least about 43%, or at least about 78%;
(o) an average decrease in creatine kinase level of at least about 13%, at least about 39%, or at least about 63%;
(p) an average decrease in alanine aminotransferase (ALT) level of at least about 19%, at least about 38%, or at least about 68%; and
(q) an average decrease in aspartate aminotransferase (AST) level of at least about 26%, at least about 33%, or at least about 66%.

2. The method of claim 1, wherein the individual is:
(i) at least about 45 years old;
(ii) between about 18 years old and about 45 years old; or
(iii) no more than about 18 years old.

3. The method of claim 1, wherein the individual is diagnosed with Pompe disease at an age of at least about 18 years old.

4. The method of claim 1, wherein the individual:
(i) has not previously received treatment with a recombinant GAA; or
(ii) has previously received treatment with a recombinant GAA.

5. The method of claim 4, wherein the recombinant GAA is alglucosidase alfa.

6. The method of claim 1, wherein prior to the treatment, the individual has at least one of the following characteristics:
(i) the individual has a forced vital capacity percentage of predicted value (FVC %) in an upright position between about 30% and about 85%; and (ii) the individual is able to ambulate for at least about 40 meters without stopping and without an ambulation assistance device.

7. The method of claim 1, wherein the individual has at least one of the following characteristics:
   (i) the individual does not have Pompe-specific cardiac hypertrophy;
   (ii) the individual has confirmed GAA enzyme deficiency from any tissue source and/or at least 2 confirmed GAA gene variants;
   (iii) the individual is administered with the pharmaceutical composition for at least about 49 weeks;
   (iv) the individual has stable Mercuri scores, 3-point Dixon fat fraction, and/or T2 water with or without B1 correction according to skeletal muscle magnetic resonance imaging (MRI) over the course of the treatment;
   (v) the individual has lower risk of infusion-associated reaction (IARs) after receiving the treatment compared to that after treatment with alglucosidase alfa; and
   (vi) the individual has decreasing level of antidrug antibody (ADA) against the oligosaccharide-protein conjugate over time.

8. The method of claim 1, wherein the pharmaceutical composition is administered to the individual at least one of once every two weeks and intravenously.

9. The method of claim 1, wherein the pharmaceutical composition is reconstituted from a lyophilized formulation comprising the oligosaccharide-protein conjugate.

10. The method of claim 9, wherein the pharmaceutically acceptable carrier comprises about 10-50 mM histidine, about 0.25-2% glycine, about 1-4% mannitol, and about 0.005-0.05% polysorbate 80.

11. The method of claim 1, wherein administration of the pharmaceutical composition to the plurality of human individuals for 49 weeks results in one or more of the following:
   (a) an increase of FVC % in an upright position that is at least about 2.43% higher compared to the increase of FVC % in an upright position in a plurality of human individuals treated with alglucosidase alfa;
   (b) an increase in 6MWT distance that is at least about 30.01 meters longer compared to the increase in 6MWT distance in a plurality of human individuals treated with alglucosidase alfa;
   (c) an increase in 6MWT percentage of predicted value (6MWT %) that is at least about 4.71% longer compared to the percent increase of 6MWT % in a plurality of human individuals treated with alglucosidase alfa;
   (d) an increase in maximum inspiratory pressure percentage of predicted value (MIP %) in an upright position that is at least about 4.40% higher compared to the increase in MIP % in a plurality of human individuals treated with alglucosidase alfa;
   (e) an increase in maximum expiratory pressure percentage of predicted value (MEP %) in an upright position that is at least about 2.51% higher compared to the increase in MEP % in a plurality of human individuals treated with alglucosidase alfa;
   (f) an increase in hand-held dynamometry (HHD) score for lower extremities that is at least about 106.97 N higher compared to the increase in HHD score for lower extremities in a plurality of human individuals treated with alglucosidase alfa;
   (g) an increase in HHD score for upper extremities that is at least about 63.87 N higher compared to the increase in HHD score for upper extremities in a plurality of human individuals treated with alglucosidase alfa;
   (h) an increase in quick motor function test (QMFT) total score that is at least about 2.08 higher compared to the increase in QMFT total score in a plurality of human individuals treated with alglucosidase alfa;
   (i) an increase in health-related quality of life Short Form 12 Health Survey (SF-12®) physical component score (PCS) that is at least about 0.77 higher compared to the increase in SF-12® PCS in a plurality of human individuals treated with alglucosidase alfa;
   (j) an increase in-SF-12® mental component score (MCS) that is at least about 2.12 higher compared to the increase in SF-12® MCS in a plurality of human individuals treated with alglucosidase alfa;
   (k) a decrease in urinary hexose tetrasaccharide (HEX4) level that is at least about 43.41% lower compared to the decrease in HEX4 level in a plurality of human individuals treated with alglucosidase alfa;
   (l) a decrease in creatine kinase level that is at least about 23.89% lower compared to the decrease in creatine kinase level in a plurality of human individuals treated with alglucosidase alfa;
   (m) a decrease in alanine aminotransferase (ALT) level that is at least 33.9% lower compared to the decrease in ALT level in a plurality of human individuals treated with alglucosidase alfa; and
   (n) a decrease in aspartate aminotransferase (AST) level that is at least 32.28% lower compared to the decrease in AST level in a plurality of human individuals treated with alglucosidase alfa,
   wherein the plurality of human individuals treated with alglucosidase alfa is administered alglucosidase alfa at a dose of about 20 mg/kg for 49 weeks.

* * * * *